(12) United States Patent
Hirose et al.

(10) Patent No.: US 11,279,408 B2
(45) Date of Patent: Mar. 22, 2022

(54) HOLLOW MEMBER

(71) Applicant: NIPPON STEEL CORPORATION, Tokyo (JP)

(72) Inventors: Satoshi Hirose, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 65 days.

(21) Appl. No.: 16/642,686

(22) PCT Filed: Sep. 1, 2017

(86) PCT No.: PCT/JP2017/031523
§ 371 (c)(1),
(2) Date: Feb. 27, 2020

(87) PCT Pub. No.: WO2019/043899
PCT Pub. Date: Mar. 7, 2019

(65) Prior Publication Data
US 2020/0198703 A1 Jun. 25, 2020

(51) Int. Cl.
*B60J 7/00* (2006.01)
*B62D 21/15* (2006.01)
*B62D 29/00* (2006.01)

(52) U.S. Cl.
CPC ......... *B62D 21/15* (2013.01); *B62D 29/002* (2013.01)

(58) Field of Classification Search
CPC .... B01D 35/147; B01D 35/15; B61D 45/007; G06F 11/3409; G06F 11/3433; H01L 2924/00; H01L 2924/12042; C04B 38/08; C04B 41/009; C08F 36/04
See application file for complete search history.

(56) References Cited

U.S. PATENT DOCUMENTS

| | | | |
|---|---|---|---|
| 5,575,526 A * | 11/1996 | Wycech | B29C 44/1228 296/205 |
| 5,884,960 A * | 3/1999 | Wycech | B62D 25/084 296/146.6 |
| 6,168,226 B1 * | 1/2001 | Wycech | B62D 29/007 296/146.6 |

(Continued)

FOREIGN PATENT DOCUMENTS

| | | |
|---|---|---|
| CN | 1262652 A | 8/2000 |
| CN | 105008210 A | 10/2015 |

(Continued)

OTHER PUBLICATIONS

International Search Report for PCT/JP2017/031523 dated Oct. 10, 2017.

(Continued)

*Primary Examiner* — Kiran B Patel
(74) *Attorney, Agent, or Firm* — Birch, Stewart, Kolasch & Birch, LLP

(57) ABSTRACT

The amount of absorbed energy at the time of load input is improved with high mass efficiency.
A hollow member includes: a hollow metal member having a bending induction portion in a portion in a longitudinal direction; and a resin material which is made of a resin having a Young's modulus of 20 MPa or more and is disposed in the bending induction portion in close contact with the metal member.

18 Claims, 107 Drawing Sheets

(56) References Cited

U.S. PATENT DOCUMENTS

| | | | |
|---|---|---|---|
| 6,233,826 B1* | 5/2001 | Wycech | A61B 8/485 |
| | | | 29/897.1 |
| 6,296,299 B1 | 10/2001 | Hanakawa | |
| 6,474,726 B1 | 11/2002 | Hanakawa et al. | |
| 8,100,444 B2* | 1/2012 | Erzgraber | B60R 19/18 |
| | | | 293/120 |
| 2002/0066254 A1* | 6/2002 | Ebbinghaus | B21C 37/04 |
| | | | 52/36.5 |
| 2015/0229267 A1* | 8/2015 | Hilliard | H02S 40/44 |
| | | | 136/248 |
| 2016/0016609 A1 | 1/2016 | Kurokawa | |
| 2016/0288186 A1* | 10/2016 | Ito | B21D 47/00 |
| 2017/0197237 A1* | 7/2017 | Okada | B21D 7/12 |
| 2018/0029166 A1* | 2/2018 | Kodama | B23K 9/23 |
| 2018/0194310 A1* | 7/2018 | Koga | B60R 19/04 |
| 2019/0009829 A1* | 1/2019 | Shirakami | B62D 25/2045 |
| 2019/0077466 A1* | 3/2019 | Imamura | B22D 19/04 |
| 2019/0118865 A1* | 4/2019 | Hirose | B60J 5/0443 |
| 2019/0152528 A1* | 5/2019 | Hirose | B62D 21/08 |
| 2020/0001924 A1* | 1/2020 | Hirose | B60R 19/03 |
| 2020/0086815 A1* | 3/2020 | Koga | B60R 19/18 |
| 2020/0094885 A1* | 3/2020 | Kubo | C21D 1/673 |
| 2020/0139911 A1* | 5/2020 | Hirose | B62D 25/04 |
| 2020/0198703 A1* | 6/2020 | Hirose | B62D 21/15 |
| 2020/0263752 A1* | 8/2020 | Miura | F16F 7/12 |
| 2020/0369324 A1* | 11/2020 | Koga | B62D 27/02 |
| 2021/0039718 A1* | 2/2021 | Koga | B60R 19/18 |

FOREIGN PATENT DOCUMENTS

| | | |
|---|---|---|
| JP | 1-141182 U | 9/1989 |
| JP | 7-246953 A | 9/1995 |
| JP | 2001-48054 A | 2/2001 |
| JP | 2002-18868 A | 1/2002 |
| JP | 2010-64669 A | 3/2010 |

OTHER PUBLICATIONS

Written Opinion of the International Searching Authority for PCT/JP2017/031523 (PCT/ISA/237) dated Oct. 10, 2017.

* cited by examiner

III-III

820

820

HOLLOW MEMBER

TECHNICAL FIELD OF THE INVENTION

The present invention relates to a hollow member.

RELATED ART

As a method of forming a structure such as a vehicle, a railway vehicle, an aircraft, or a building, there is a method of forming a structure using a frame corresponding to a skeleton and other structural members (such as a sheath). Such a frame typically requires high-strengthening and a reduction in weight from the viewpoint of improving the strength of the structure and suppressing costs. For example, regarding vehicles, high-strengthening and thinning of steel sheets forming a frame have proceeded from the viewpoint of maintaining or improving collision safety performance and improving fuel efficiency.

In addition, in order to suppress deformation of the frame in a collision of a vehicle or the like, the inside of the frame may be filled with a filling member formed of a foamed resin material or the like. For example, Patent Document 1 below discloses a technique in which a filling member is disposed inside a frame with no gap.

PRIOR ART DOCUMENT

Patent Document

[Patent Document 1] Japanese Unexamined Patent Application, First Publication No. 2002-18868

DISCLOSURE OF THE INVENTION

Problems to be Solved by the Invention

When a load is applied to a frame as in a collision of a vehicle, the frame is deformed. At this time, deformation occurs in the cross section of the frame. This deformation is called cross-sectional deformation. When the load applied to the frame exceeds a predetermined value, buckling occurs in the frame, and the load bearing performance of the frame is significantly reduced. Occurrence of buckling means bending. In this case, there is a possibility that the amount of absorbed energy postulated for the frame may not be secured.

It is considered that the cross-sectional deformation of the frame is suppressed by filling the inner space of the frame with a filling member. However, when the filling member is filled unnecessarily as in the technique described in Patent Document 1, the weight of the frame is increased in return for the improvement in the amount of absorbed energy.

For this reason, the present inventors considered that it is useful to further improve the mass efficiency for improving the amount of absorbed energy by the filling member and to suppress the out-of-plane deformation that causes a reduction in the amount of absorbed energy of the frame. However, no effective disposition of the filling member has been hitherto examined for suppressing out-of-plane deformation and improving the amount of absorbed energy of the frame.

The present invention has been made in view of the above problems. An object of the present invention is to provide a novel and improved hollow member that realizes energy absorption at the time of load input with high mass efficiency.

Means for Solving the Problem

In order to solve the above-described problems, according to the present invention, there is provided a hollow member including: a hollow metal member having a bending induction portion in a portion thereof in a longitudinal direction; and a resin material made of a resin having a Young's modulus of 20 MPa or more and disposed in the bending induction portion in close contact with the metal member.

The metal member may include a bottom wall part, a pair of side wall parts standing from both ends of the bottom wall part, and a top wall part facing the bottom wall part, and a closed cross section may be formed by the bottom wall part, the pair of side wall parts, and the top wall part.

The resin material may be disposed in close contact with an inner surface of at least one of the bottom wall part and the top wall part.

The resin material may be disposed in close contact with an inner surface of at least one of the pair of side wall parts.

A second metal sheet may be disposed on an inside of the metal member and joins to a first metal sheet forming the metal member.

The resin material may be disposed in close contact with the second metal sheet.

The first metal sheet forming the metal member may have a hole, the resin material may be made of a foamed resin, and the resin material may pass through the hole and be disposed in close contact with both an outer surface and an inner surface of the first metal sheet.

A hole edge end of the hole may be located inward of the metal member from the first metal sheet forming the metal member.

The hole may be a burring hole in which the hole edge end of the hole protrudes from an outside to the inside of the first metal sheet forming the metal member.

The hole may be provided with a recess portion recessed inward of the metal member from the first metal sheet forming the metal member, and the hole may be provided in an inner portion of the recess portion.

The bending induction portion may be a portion where a full plastic moment of the metal member changes in the longitudinal direction.

The bending induction portion may be a portion in which a radius of curvature of a locus of a center of mass along the longitudinal direction formed by the center of mass of a cross sections of the metal member is 260 mm or less.

The bending induction portion may be a sheet thickness changing portion.

The bending induction portion may be a portion provided with a recessed part.

The bending induction portion may be a portion provided with a protrusion.

The bending induction portion may be a portion provided with a hole.

The resin material may be disposed so as to cover the bending induction portion and peripheral portions of the bending induction portion on both sides in the longitudinal direction.

The resin material may be disposed so as to cover the bending induction portion and the peripheral portions of the bending induction portion on both sides in the longitudinal direction within a range in which a distance from the bending induction portion to an end portion of the resin material in the longitudinal direction is ½ or less of a cross-sectional height of the metal member.

In a cross section of the metal member, the resin material may be disposed on a side where the bending induction portion is present with respect to a boundary that halves the cross section in a height direction of the cross section defined by a direction from a center of mass of the cross section toward the bending induction portion.

The resin material may be disposed in a portion of the bending induction portion and is not disposed in another portion of the bending induction portion.

According to the above configuration, while bending deformation is induced by the bending induction portion at the time of load input, out-of-plane deformation that occurs in the bending induction portion when the bending deformation occurs can be suppressed by the resin material disposed in the bending induction portion. Accordingly, since the out-of-plane deformation of the hollow member at the time of load input is suppressed, the load bearing performance exhibited by the cross section of the hollow member can be maintained in a level postulated in a design stage. Therefore, the amount of absorbed energy at the time of load input can be improved. Moreover, since the place where out-of-plane deformation has to be suppressed is limited to the bending induction portion or the periphery thereof, the amount of absorbed energy at the time of load input can be improved with high mass efficiency.

Effects of the Invention

As described above, according to the present invention, energy absorption at the time of load input can be realized with high mass efficiency.

BRIEF DESCRIPTION OF THE DRAWINGS

FIG. 120 is a graph showing changes in the longitudinal direction in the full plastic moment ratio of the hollow members according to each of the examples and reference example regarding the full plastic moment changing portion and the positions where bending deformation occurs.

FIG. 121 is a side view of the frame of an example regarding the Young's modulus of the filling member.

FIG. 122 is a plan view of the frame shown in FIG. 121.

FIG. 123 is a cross-sectional view of the frame shown in FIG. 122 taken along cutting-plane line A1-A1.

FIG. 124 is a cross-sectional view of the frame shown in FIG. 122 taken along cutting-plane line A2-A2.

FIG. 125 is a graph showing the relationship between the density, the yield stress, and the Young's modulus of the filling member according to the examples regarding the Young's modulus of the filling member.

FIG. 126 is a view showing a list of deformation behaviors of the examples and reference example regarding the Young's modulus of the filling member.

FIG. 127 is a graph showing reaction forces and strokes during deformation of each of the examples and reference example regarding the Young's modulus of the filling member.

FIG. 128 is a graph showing the collision energy absorption amount of each of the examples and reference example regarding the Young's modulus of the filling member.

FIG. 129 is a cross-sectional view showing an example of a change in the cross-sectional shape of a thinned frame.

FIG. 130 is a cross-sectional view showing another example of a change in the cross-sectional shape of a thinned frame.

FIG. 131 is a partial cross-sectional view showing a configuration example of a frame in which a filling member is disposed.

Figure 132:
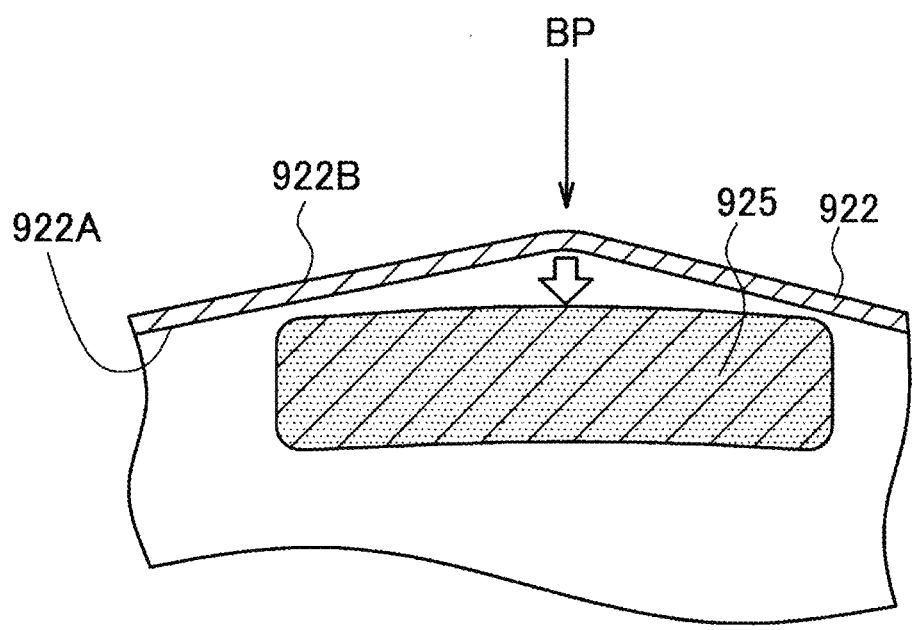

FIG. 132 is a partial cross-sectional view showing an example of an action of the frame in which the filling member is disposed.

EMBODIMENTS OF THE INVENTION

Exemplary embodiments of the present invention will be described below in detail with reference to the accompanying drawings. In the present specification and drawings, like elements having substantially the same functional configuration are denoted by like reference numerals, and overlapping description will be omitted.

1. Application Object of Hollow Member

A hollow member according to an embodiment of the present invention can be used as various structural members. In the present specification, as an example, a case where the hollow member according to the embodiment is utilized for a vehicle frame as a vehicle structural member is described. Hereinafter, the vehicle frame is simply referred to as a frame.

Figure 1:
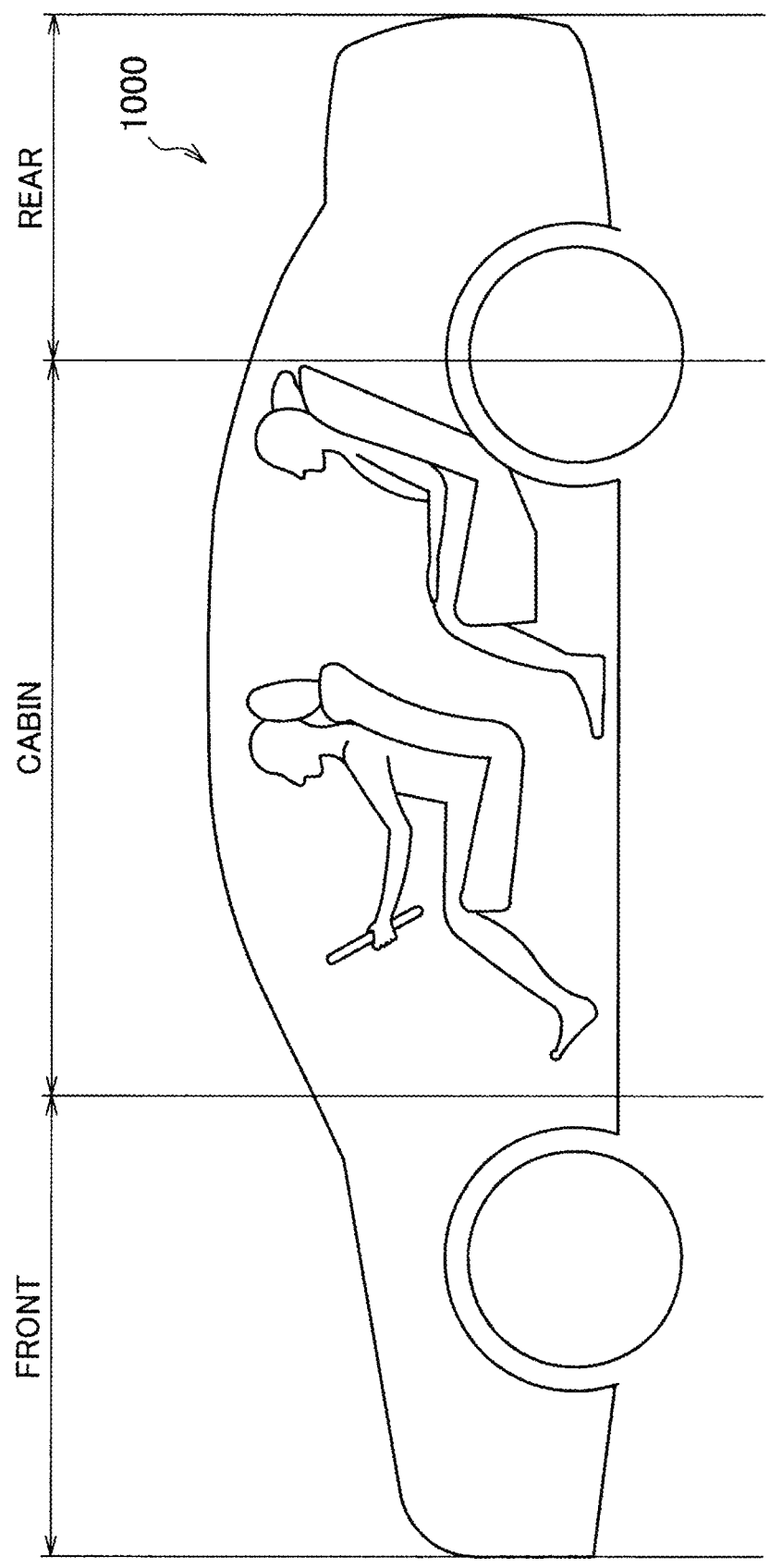
FIG. 1 is a schematic configuration view of a vehicle showing an application object of a frame according to an embodiment of the present invention.

FIG. 1 is a schematic configuration diagram of a vehicle showing an application object of the frame according to the present embodiment. A vehicle body provided in a vehicle 1000 such as a general vehicle shown in FIG. 1 can be classified into a front structure (FRONT), a rear structure (REAR), and a cabin structure (CABIN).

The front structure and the rear structure are also called "crushable zones" and have a function of absorbing and mitigating an impact on the vehicle (impact absorbing function). The crushable zones are collapsed by the collision energy in a collision of the vehicle. That is, in order to secure the safety of occupants in the cabin in a collision of the vehicle, the front structure and the rear structure are required to be structures that absorb energy (collision energy) generated by the collision. Therefore, frames constituting the front structure and the rear structure are required to absorb the collision energy even when bending and crushing occurs during a collision. Examples of the frames used for the front structure and the rear structure include a frontside member, a rearside member, a bumper reinforcement, and a crash box. The frontside member includes a frontside rear member that constitutes a rear end portion, and a frontside front member that constitutes a portion forward of the rear end portion. The rearside member includes a rearside rear member that constitutes a rear end portion, and a rearside front member that constitutes a portion forward of the rear end portion.

On the other hand, the cabin structure is also called a "safety zone" and has a function (occupant protection function) for securing the safety of an occupant in the vehicle in a collision of the vehicle. That is, in order to secure the safety of the occupant in a collision of the vehicle, the cabin structure is required to be a structure that is not easily crushed by an impact force. Therefore, frames constituting the cabin structure are required to be less likely to be deformed and have high load bearing performance. Examples of the frames used in the cabin structure include a front pillar (A pillar), a center pillar (B pillar), a rear pillar (C pillar, D pillar), a lower front pillar (lower A pillar), a side sill, a roof rail, a cross member, and a tunnel.

However, in order to achieve both the maintenance of the collision safety performance and a reduction in the weight of the vehicle, high-strengthening and thinning of structural materials (for example, steel sheets) forming a vehicle body structure have proceeded. The frames constituting the front structure, the rear structure, and the cabin structure are also being replaced with thinned high strength steel sheets. For the replacement, at least one of the amount of absorbed collision energy and the load bearing performance needs to be equivalent to that of a frame in the related art. The sheet thickness of the frame formed of the high strength steel sheet can be made thinner than a frame formed of a steel sheet in the related art. Accordingly, it is considered that the weight of the frame can be reduced while maintaining the collision performance of the high strength frame in an equivalent level to that of the frame in the related art.

However, the present inventors found that in a case where a collision occurs in the longitudinal direction in the thinned frame, when the cross-sectional deformation of the frame becomes large at the time of bending of the frame, there is a possibility that the collision safety performance postulated for the frame may not be secured. Buckling often occurs as the sheet thickness of the frame decreases.

Figure 129:
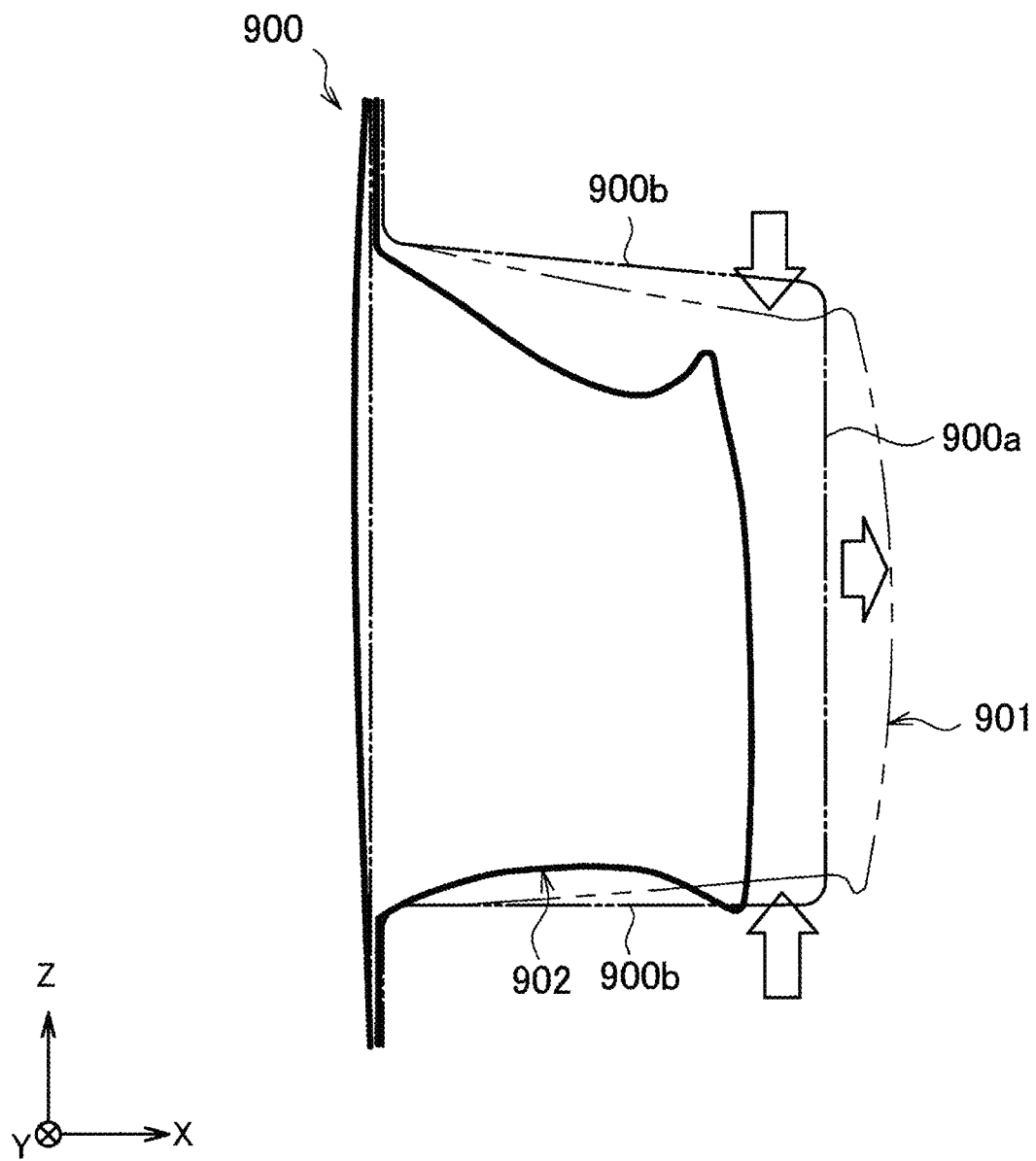

FIG. 129 is a cross-sectional view showing an example of a change in the cross-sectional shape of a thinned frame 900. As shown in FIG. 129, when a collision load is applied in the longitudinal direction (Y-axis direction) of the frame 900 and bending occurs in the frame 900, a bottom wall part 900a swells in an out-of-plane direction, and side wall parts 900b are deformed so as to bend in the out-of-plane direction (cross-sectional shape 901). In addition, the bottom wall part 900a is a bend inside. As the bending further progresses, deformation of the bottom wall part 900a and the side wall parts 900b in the out-of-plane direction further progresses. As a result, the frame 900 buckles. A cross-sectional shape 902 of the buckled frame 900 deviates significantly from the original cross-sectional shape.

Figure 130:
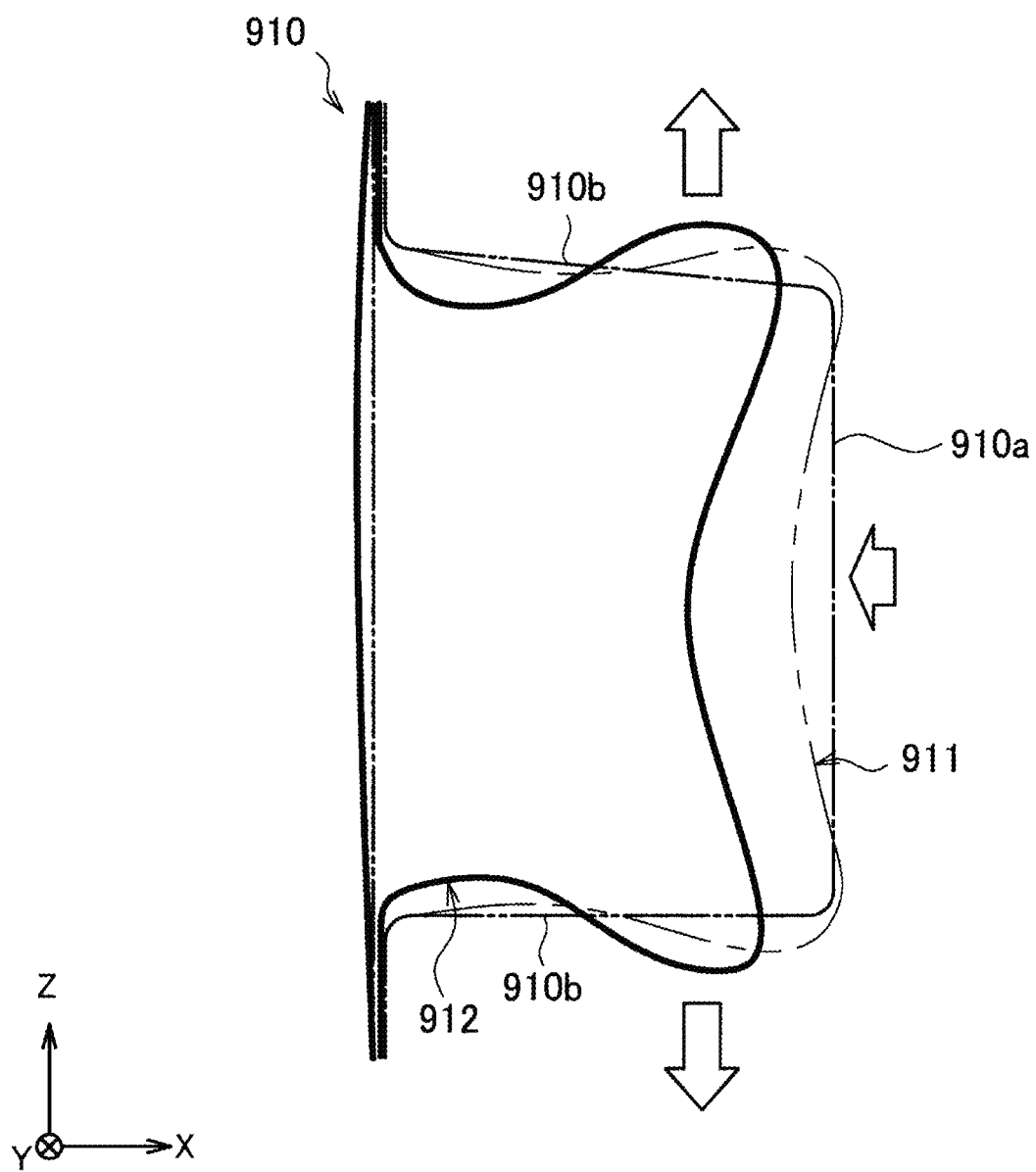

FIG. 130 is a cross-sectional view showing another example of a change in the cross-sectional shape of a thinned frame 910. As shown in FIG. 130, when a collision load is applied in the longitudinal direction (Y-axis direction) of the frame 910 or a collision load is applied in a direction perpendicular to the surface of a bottom wall part 910a and bending occurs in the frame 910, the bottom wall part 910a is recessed and side wall parts 910b are deformed so as to bend (cross-sectional shape 911). In addition, the bottom wall part 910a is a bend inside. As the bending further progresses, the bottom wall part 910a and the side wall parts 910b are further deformed in the out-of-plane direction. As a result, the frame 910 buckles. A cross-sectional shape 912 of the buckled frame 910 deviates significantly from the original cross-sectional shape. When buckling as shown in FIGS. 129 and 130 occurs in the frame 900 (910), the cross section is collapsed flat. Such deformation is referred to as cross-sectional collapse.

The bending rigidity of a structural material depends on the sheet thickness of the structural material. When the sheet thickness of a frame becomes smaller than that in the related art, surfaces constituting the frame easily undergo out-of-plane deformation. As a result, the bending rigidity of the frame decreases. That is, bending deformation of the frame is likely to occur as shown in FIGS. 129 and 130. When the frame undergoes cross-sectional deformation, the height (thickness) of the frame is gradually reduced, so that the bending rigidity is gradually reduced. When the bending deformation progresses and buckling occurs, the bending rigidity rapidly decreases. As a result of buckling, the load bearing performance of the frame becomes extremely lower than a designed value. For this reason, the collision safety performance owned by the frame is reduced. In other words, there is a possibility that the postulated collision safety performance cannot be secured only by reducing the weight of the vehicle body by thinning the frame simply using a high strength steel sheet due to cross-sectional deformation or buckling of the frame.

When the internal space of the frame is filled with a filling member, the cross-sectional deformation of the frame can be suppressed. However, when the filling member is filled, although the amount of absorbed energy at the time of load input is improved, the weight of the frame is increased. Accordingly, the present inventors conceived a hollow member which is provided with a bending induction portion that induces bending deformation at the time of load input and can improve the amount of absorbed energy at the time of load input with high mass efficiency by disposing a filling member in the bending induction portion. When the filling member is disposed in the frame, the place where the filling member is disposed is increased in thickness, so that the bending rigidity is increased. Since the bending induction portion preferentially undergoes out-of-plane deformation, disposing the filling member in the bending induction portion is an effective disposition of the filling member. According to the present invention, as a result of the filling member disposed in the bending induction portion increasing the rigidity of the frame until the frame undergoes out-of-plane deformation and buckles, the frame absorbs energy tenaciously. Moreover, the amount of the filling member that leads to an increase in weight can also be suppressed. Hereinafter, a hollow member according to an embodiment of the present invention will be described.

In the following description, a case where the hollow member according to the embodiment of the present invention is applied to a vehicle structural member is described as an example. In this case, the load is, for example, a collision load. The amount of absorbed energy at the time of load input is the amount of collision energy absorbed by the frame when a collision load is input. Improving the amount of collision energy absorbed means improving collision safety performance.

2. First Embodiment

A first embodiment is a form in which a resin material is disposed in a bending induction portion in close contact with a second metal sheet.

<2.1. Configuration of Frame>

Figure 2:
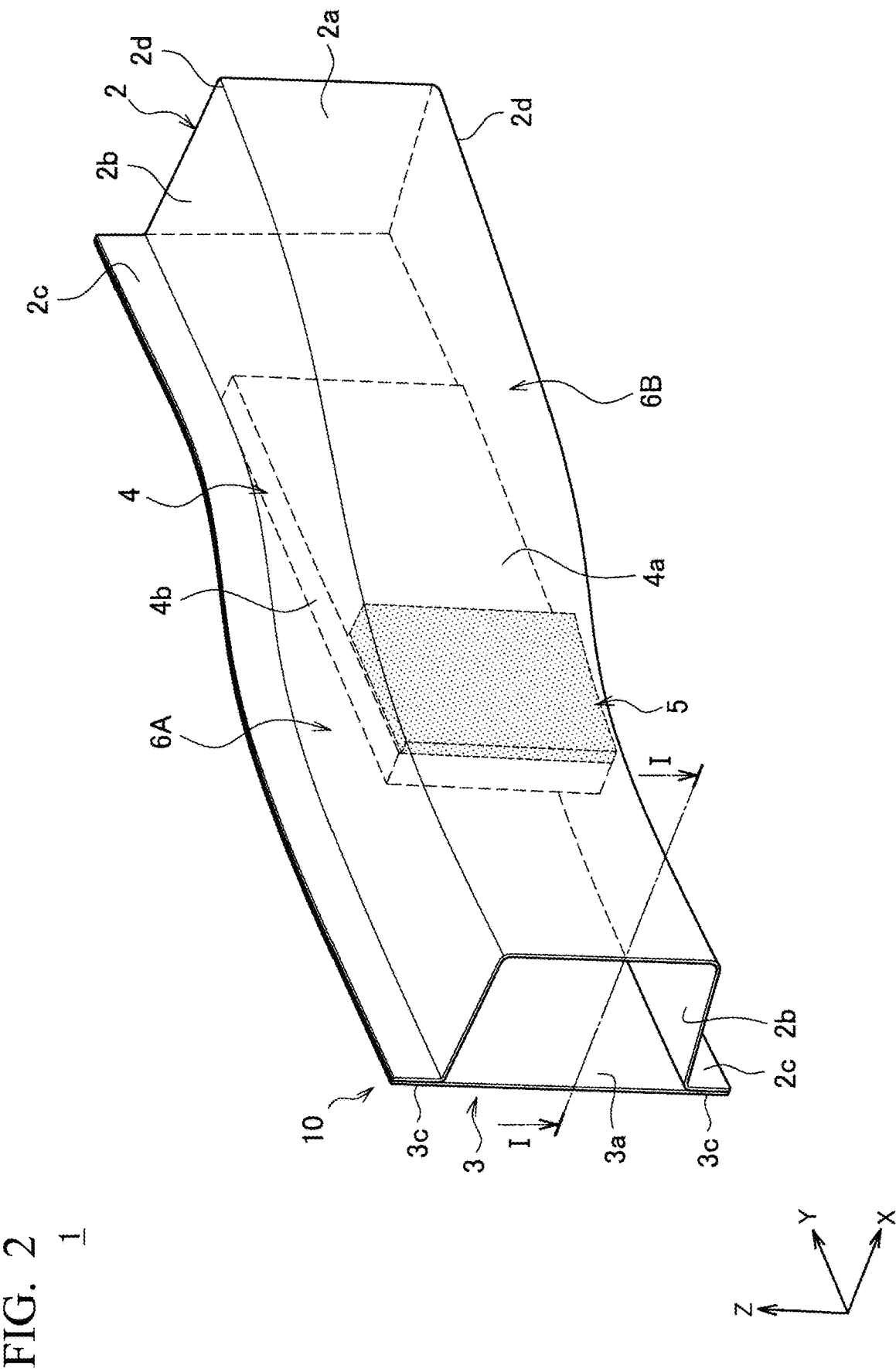
FIG. 2 is a perspective view showing a schematic configuration of an example of a frame according to a first embodiment of the present invention.

FIG. 2 is a perspective view showing a schematic configuration of an example of a frame 1 according to the first embodiment of the present invention. The frame 1 in the present specification is an example of a hollow member. The hollow member is used, for example, for a frontside member and a rearside member of a vehicle. The frontside member includes a frontside rear member that constitutes a rear end portion, and a frontside front member that constitutes a portion forward of the rear end portion. The rearside member includes a rearside rear member that constitutes a rear end portion, and a rearside front member that constitutes a portion forward of the rear end portion. In addition, the hollow member is also used for a pillar of a vehicle. Examples of the pillar include a front pillar (A pillar), a center pillar (B pillar), a rear pillar (C pillar, D pillar), and a lower front pillar (lower A pillar). The hollow member can also be used for a floor reinforcement, a floor cross member, a bumper reinforcement, a side sill, a roof side rail, a roof center reinforcement, a crash box, a tunnel, and the like. The hollow member is applicable not only to vehicles but also to other vehicles and self-propelled machines. Examples of other vehicles and self-propelled machines include two-wheeled vehicles, large vehicles such as buses or towing vehicles, trailers, railway vehicles, construction machinery, mining machinery, agricultural machinery, general machinery, aircrafts, and ships.

Figure 3:
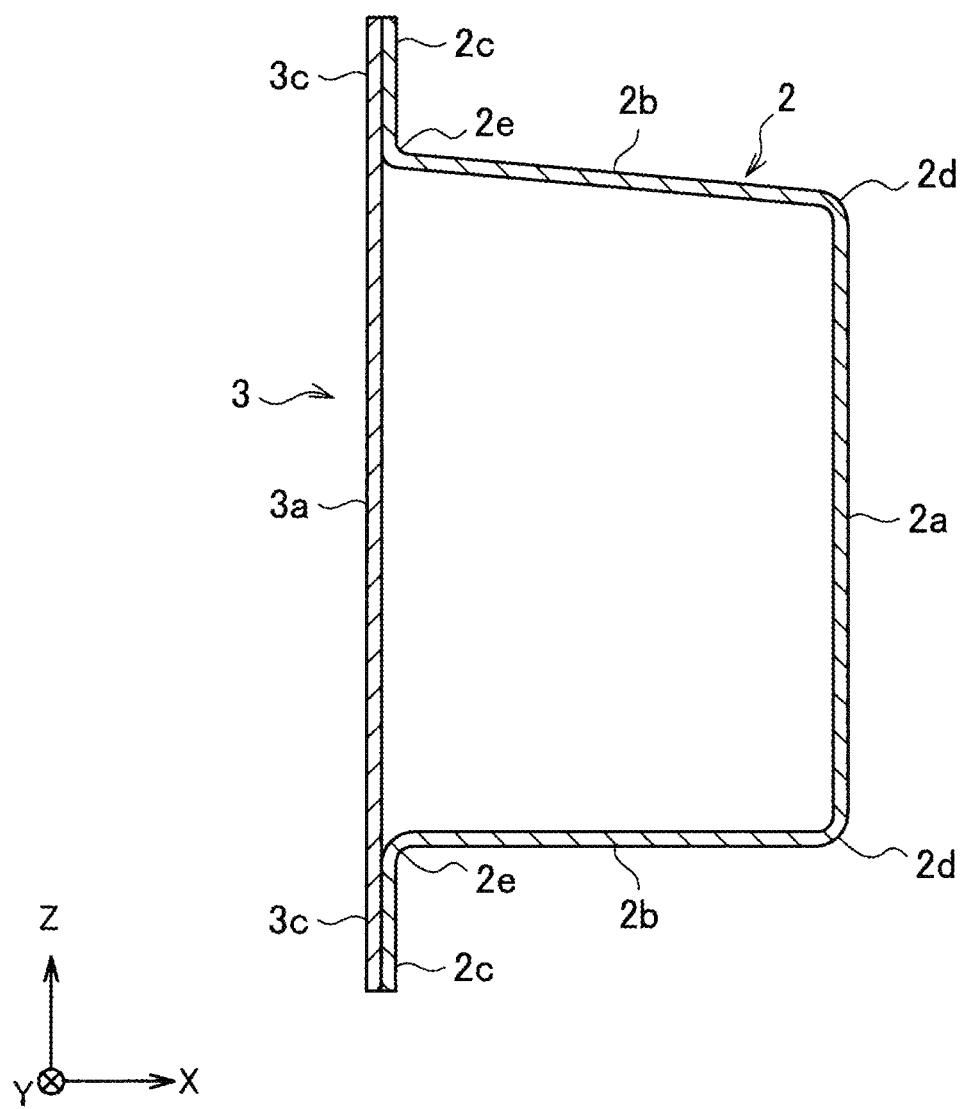
FIG. 3 is a cross-sectional view showing a cross section orthogonal to a Y-axis direction of an example of a hollow member according to the embodiment.

The frame 1 according to the present embodiment includes a first structural member 2, a second structural member 3, a reinforcement 4, and a filling member 5. A hollow member 10 according to the present embodiment is formed by the first structural member 2 and the second structural member 3. FIG. 3 is a cross-sectional view showing a cross section orthogonal to the Y-axis direction of an example of the hollow member 10 according to the present embodiment. Hereinafter, the configuration of the frame 1 according to the present embodiment will be described with reference to FIGS. 2 and 3.

The first structural member 2 according to the present embodiment is an example of a structural member forming the hollow member 10 having an elongated shape, and has a hat-shaped cross-sectional shape. As shown in FIGS. 2 and 3, the first structural member 2 includes a bottom wall part 2a, side wall parts 2b and 2b, flange portions 2c and 2c, and ridge portions 2d, 2d, 2e, and 2e, which extend in the longitudinal direction (Y-axis direction).

The side wall parts 2b are provided to stand from both ends of the bottom wall part 2a in a Z-axis direction (width direction). The angle formed by the side wall part 2b and the bottom wall part 2a is not limited to being substantially perpendicular, but is appropriately set according to the design of the member. The ridge portion 2d is a portion that becomes a boundary between the bottom wall part 2a and the side wall part 2b.

The flange portion 2c is provided to stand outward along the Z-axis direction from the end portion of the side wall part 2b on the opposite side to the bottom wall part 2a. The angle formed by the flange portion 2c and the side wall part 2b may be appropriately determined according to the design of the member. The ridge portion 2e is a portion which is the boundary between the side wall part 2b and the flange portion 2c.

The second structural member 3 according to the present embodiment is an example of a structural member forming the hollow member 10 together with the first structural member 2. The second structural member 3 is a plate-like member. As shown in FIG. 3, the second structural member 3 includes a top wall part 3a and joint portions 3c and 3c.

The top wall part 3a is a part facing the bottom wall part 2a of the first structural member 2. In addition, the joint portion 3c is a portion which abuts the flange portion 2c of the first structural member 2 and is joined to the flange portion 2c. That is, the top wall part 3a is a part corresponding to a region that exists between respective connection portions of the pair of ridge portions 2e in the second structural member 3. The joint portion 3c is a portion that abuts a region of the flange portion 2c interposed between the ridge portion 2e and the end portion of the flange portion 2c in the second structural member 3.

The hollow member 10 according to the present embodiment is formed by the first structural member 2 and the second structural member 3 by joining the flange portion 2c and the joint portion 3c to each other. At this time, as shown in FIG. 3, the hollow member 10 has a closed cross section. The closed cross section is formed by the bottom wall part 2a, the pair of side wall parts 2b and 2b, and the top wall part 3a. A method of joining the flange portion 2c and the joint portion 3c to each other is not particularly limited. For example, the joining method may be welding such as laser welding, arc welding, or spot welding or the like, mechanical joining such as riveting or bolt fastening, or adhesion by an adhesive or brazing. In the present embodiment, the flange portion 2c and the joint portion 3c are joined by spot welding.

In addition, the shape of the closed cross section of the hollow member 10 is a substantially polygon. Here, the substantially polygon means a closed plane figure that can be approximated by a plurality of line segments. For example, the closed cross section shown in FIG. 3 is a substantially quadrilateral composed of four line segments (corresponding to the bottom wall part 2a, the side wall parts 2b, and the top wall part 3a) and four vertices (corresponding to the ridge portions 2d and 2e). This substantially quadrilateral includes a rectangle, a trapezoid, and the like.

Even in a case where the shape of the closed cross section of the hollow member 10 is a substantially polygon other than the substantially quadrilateral, in the present specification, the hollow member 10 is described as being formed by the bottom wall part 2a, the pair of side wall parts 2b and 2b, and the top wall part 3a. Examples of the shape of the closed cross section of the hollow member 10 will be described later.

The hollow member 10 may have a closed cross-sectional structure as described above, or may have an open cross-sectional structure such as a U-shape. Moreover, the shape of the cross section orthogonal to the longitudinal direction of the hollow member 10 is not particularly limited. For example, the cross-sectional shape of the hollow member 10 may be a rectangular cross section or a circular cross section.

The hollow member according to the present embodiment is an example of a metal member. For example, the first structural member 2 and the second structural member 3 according to the present embodiment are formed of a metal sheet such as a steel sheet. The first structural member 2 and the second structural member 3 according to the present embodiment are an example of a first metal sheet. From the viewpoint of a reduction in weight, regarding the sheet thickness of both structural members, the sheet thickness in a frame structure that is often used in large vehicles such as buses is preferably 2.3 mm or less, the sheet thickness in a monocoque structure vehicle that is often used in normal size vehicles is preferably 1.8 mm or less, and the sheet thickness in small vehicles such as such as motorcycles is preferably 1.4 mm or less. Furthermore, from the viewpoint of the present invention, when a bending induction portion is provided in these metal sheets having a relatively small sheet thickness, out-of-plane deformation can be generated in the bending induction portion with priority over other points. Moreover, the strength of the first structural member 2 and the second structural member 3 according to the present embodiment is not particularly limited. However, the tensile strength of both structural members is preferably 780 MPa or more. In addition, the tensile strength of both structural members is more preferably 980 MPa or more. This is because metal members constituting the hollow member are disposed on the surfaces to which the highest tensile stress is applied in the bending induction portion. Members having low tensile strength also have low yield strength. When the yield strength is low, the hollow member is easily plastically deformed when out-of-plane deformation occurs. As the plastic deformation progresses, the hollow member buckles.

Returning to FIG. 2, the elements of the frame 1 will be described. As shown in FIG. 2, the reinforcement 4 is disposed inside the hollow member 10. As shown in FIG. 2, the reinforcement 4 includes a main surface part 4a and joint portions 4b. The reinforcement 4 disposed so that the main surface part 4a according to the present embodiment faces the bottom wall part 2a and the top wall part 3a.

In addition, the joint portion 4b according to the present embodiment is joined to the side wall part 2b. Accordingly, the main surface part 4a is provided so as to stretch between the pair of side wall parts 2b and 2b. Then, when an impact is applied to the hollow member 10, the reinforcement 4 suppresses the deformation of the pair of side wall parts 2b and 2b, so that the cross-sectional deformation of the hollow member 10 can be suppressed. In addition, a method of joining the joint portion 4b and the side wall part 2b to each other is not particularly limited. For example, the joining method is not particularly limited as in the joining of the flange portion 2c and the joint portion 3c. In the present embodiment, the joint portion 4b and the side wall part 2b are joined by spot welding. The reinforcement 4 also has a function as a threshold plate for dividing the disposition region of the filling member 5.

The reinforcement 4 according to the present embodiment is an example of the second metal sheet. For example, the reinforcement 4 according to the present embodiment is formed of a metal sheet such as a steel sheet. The material forming the reinforcement 4 may be plastic, carbon fiber, an alloy sheet, or a composite material.

A specific disposition position of the reinforcement 4 inside of the hollow member 10 according to the present embodiment will be described later.

The filling member 5 according to the present embodiment is a resin material. The filling member 5 is made of a urethane-based, epoxy-based, or any other resin. The filling member 5 can be formed with a Young's modulus of a maximum of about 300 MPa in a case of a urethane-based resin, and a maximum of about 3000 MPa in a case of an epoxy-based resin. The filling member 5 may be a hard foamed filling member made of, for example, a foamed resin. The inside of the hollow member 10 is filled with the foamed resin and the foamed resin is cured by chemical changes, whereby the filling member 5 is formed. The Young's modulus of the filling member 5 is preferably 20 MPa or more. The Young's modulus of the filling member 5 can be changed according to the density of the resin forming the filling member 5. However, since formation of the resin becomes more difficult as the density of the resin is higher, the Young's modulus of the filling member 5 is preferably 300 to 400 MPa at the maximum.

A specific disposition position of the filling member 5 in the hollow member 10 according to the present embodiment will be described later.

Figure 4:
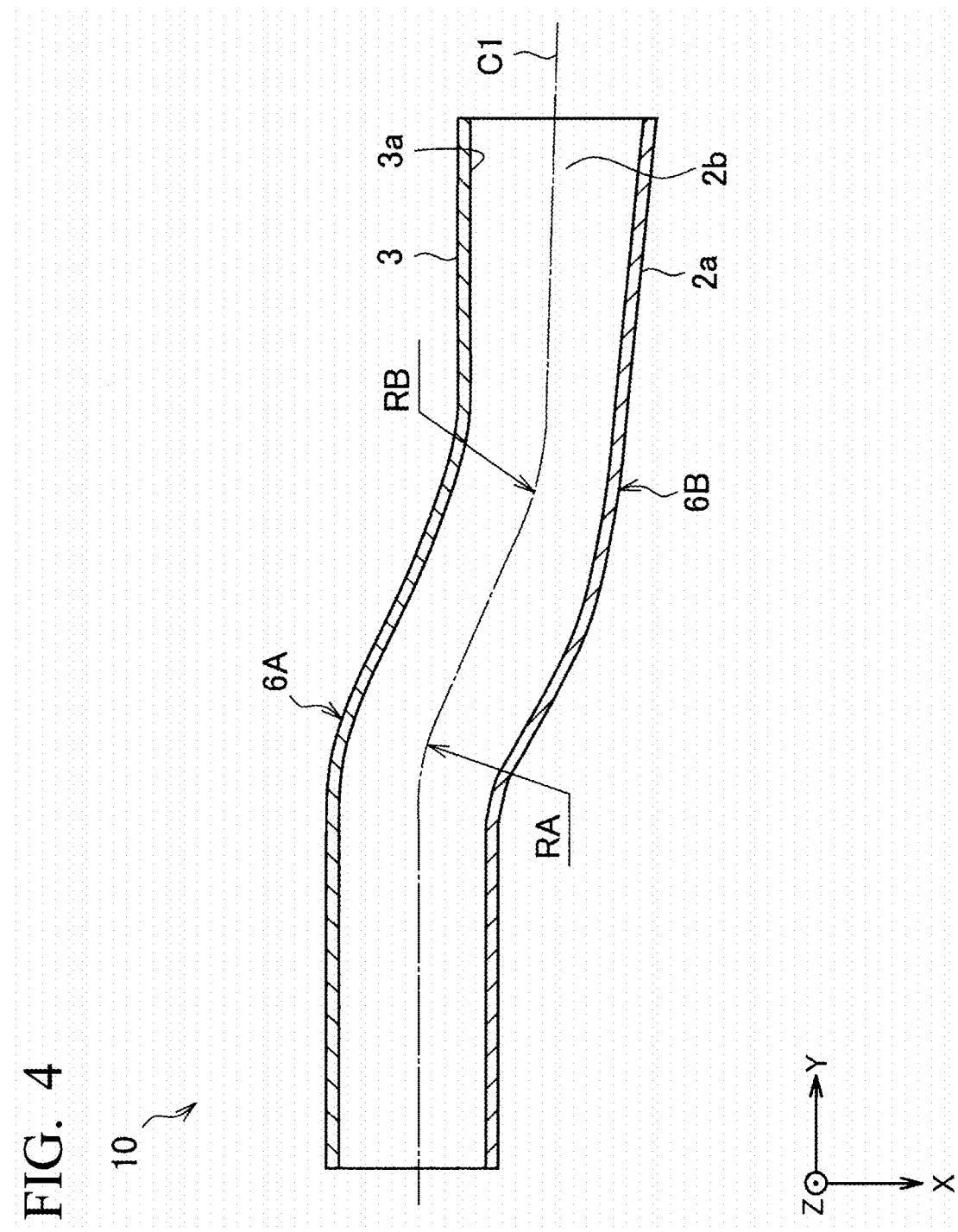
FIG. 4 is a schematic view visualizing the locus of the center of mass of the cross sections of the hollow member.

In addition, the hollow member 10 according to the present embodiment is provided with bent portions 6A and 6B. A bent portion 6 is a portion where the hollow member 10 is bent. That is, the bent portion 6 is a portion in which, in the longitudinal direction, the radius of curvature of a locus of the center of mass defined along the center of mass of the cross sections of the hollow member 10 is 260 mm or less. FIG. 4 is a schematic view visualizing the locus of the center of mass of the cross sections of the hollow member 10. As shown in FIG. 4, a locus C1 of the center of mass of the cross sections of the hollow member 10 is bent at the bent portions 6A and 6B.

The bent portion 6 is an example of the bending induction portion, which will be described in detail later. The hollow member 10 provided with such a bent portion 6 is obtained, for example, by performing press forming on the first structural member 2 and the second structural member 3 into a partially bent shape and assembling these structural members. Such a bent portion 6 is appropriately provided according to the structure of a vehicle to which the frame 1 is applied. That is, the frame 1 has a point where bending deformation is allowed according to the structure of the vehicle, and the bent portion 6 is provided at the point. The point where bending deformation is allowed is exemplified by a point where, even if the frame 1 undergoes bending deformation at the point, the bent frame 1 does not come into contact with an occupant and important components. The number of bent portions 6 provided in the hollow member 10 is not particularly limited, and is appropriately determined according to the structure of the vehicle as described above.

The bending induction portion is provided in a portion of the hollow member 10 in the longitudinal direction. In a case where the bending induction portion is formed in the hollow member 10, bending deformation occurs in the bending induction portion due to a collision in the longitudinal direction. For example, as shown in FIG. 4, when at least one of the radii of curvature RA and RB of the bent portions 6A and 6B is 260 mm or less, in the hollow member 10, bending deformation occurs in at least one of the bent portions 6A and 6B satisfying the condition of the radius of curvature at the time of collision load input. Energy required for this bending deformation is supplied from the energy caused by the collision. That is, the collision energy can be absorbed by the bending deformation of the hollow member 10. By providing this bending induction portion in the hollow member 10, a bending origin of the hollow member 10 caused by the collision can be set. Therefore, an impact on the cabin due to unpostulated bending of the hollow member 10 can be avoided, so that the safety of the cabin can be maintained.

Furthermore, the reinforcement 4 is provided inside the bending induction portion of the hollow member 10 so as to support the hollow member 10 from the inside. Accordingly, the cross-sectional deformation of the hollow member 10 in the collision can be suppressed, and the load resistance against a collision can be improved. Therefore, collision safety performance can be improved.

The length of the bottom wall part 2a in the Z-axis direction is preferably equal to or more than the length of the side wall part 2b in an X-axis direction. Accordingly, the second moment of area of the hollow member 10 about the Z-axis direction becomes larger than the second moment of area about the X-axis direction. Therefore, when a collision load is input to the hollow member 10, the bottom wall part 2a and the top wall part 3a are easily bent.

Hereinafter, an example of the disposition of the reinforcement 4 and the filling member 5 in the frame 1 according to the present embodiment will be described. In addition, the bending induction portion described above is not limited to the bent portion 6. A specific example of the bending induction portion will be described later.

(Disposition of Filling Member and Reinforcement)

Figure 5:
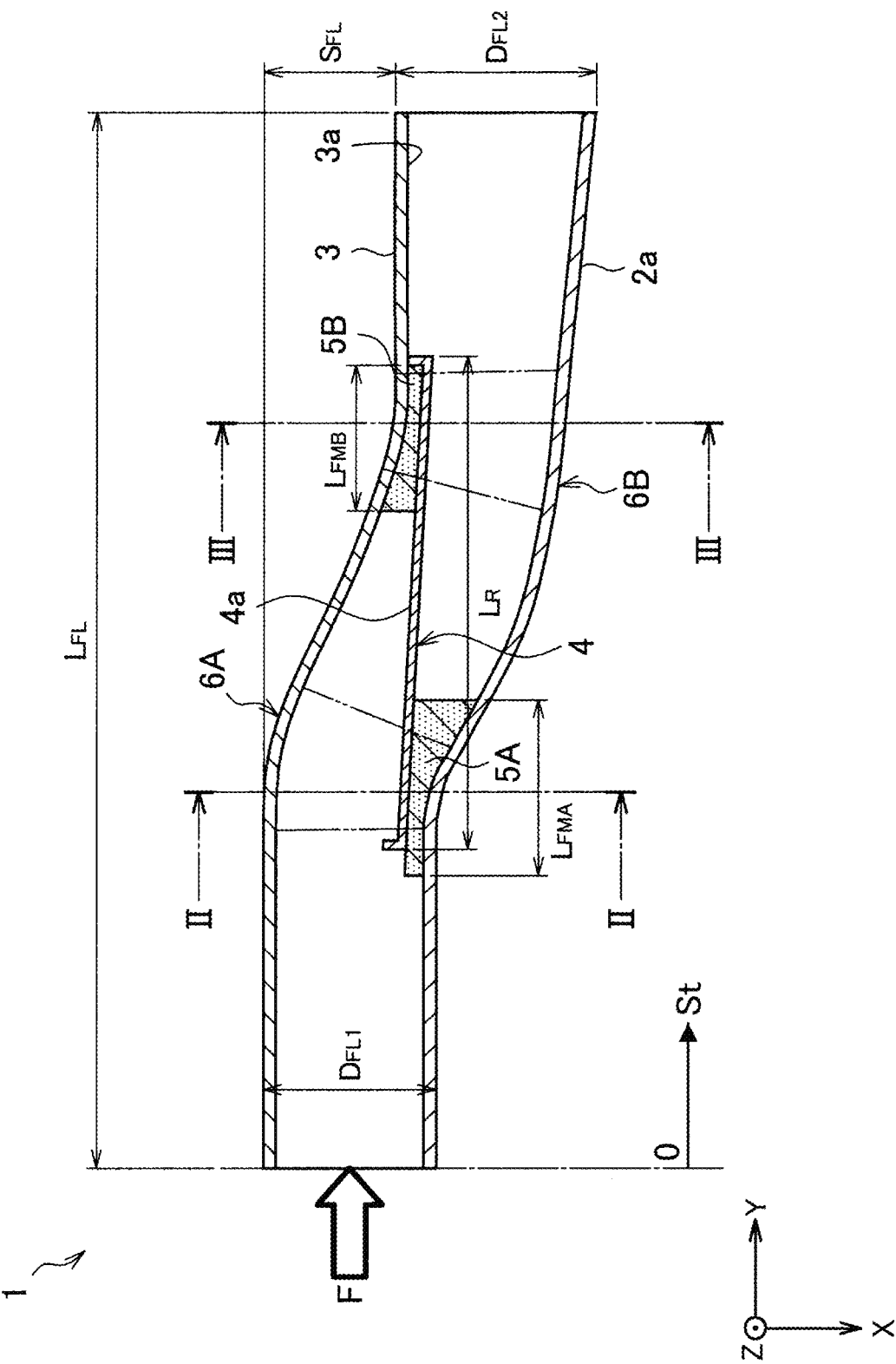
FIG. 5 is a sectional view of a section orthogonal to a Z-axis direction of an example of the frame according to the embodiment.

FIG. 5 is a sectional view of a section orthogonal to the Z-axis direction of an example of the frame 1 according to the present embodiment. The sectional view shown in FIG. 5 corresponds to a sectional view of the hollow member 10 taken along cutting-plane line 1-1 shown in FIG. 2. As shown in FIG. 5, there are two bent portions 6A and 6B in the hollow member 10. The bent portion 6A bends in a direction toward the bottom wall part 2a so that the bottom wall part 2a becomes a bend inside. The bent portion 6B bends in a direction toward the top wall part 3a so that the top wall part 3a becomes a bend inside. These bent portions 6A and 6B correspond to bending induction portions in the frame 1.

Filling members 5A and 5B according to the present embodiment are disposed in close contact with the main surface part 4a of the reinforcement 4. In the example shown in FIG. 5, the filling member 5A is provided at a portion facing the bottom wall part 2a. The filling member 5B is provided at a portion facing the top wall part 3a.

In addition, the definition of the symbol of each dimension attached regarding the frame 1 shown in FIG. 5 is as follows. A length $L_{FL}$ of the hollow member 10 according to the present embodiment is, for example, about several hundred mm.

$L_{FL}$: Length of the hollow member 10 in the Y-axis direction (longitudinal direction).

$D_{FL1}$: Cross-sectional dimension in the X-axis direction at an end portion of the hollow member 10 on a collision side.

$D_{FL2}$: Cross-sectional dimension in the X-axis direction at the second end portion of the hollow member 10.

$L_R$: Length of the reinforcement 4 in the longitudinal direction.

$S_{FL}$: Offset length of the second structural member 3 before and after the bent portion 6 in the longitudinal direction.

$L_{FMA}$, $L_{FMB}$: Lengths of the filling members 5A and 5B in the Y-axis direction.

Figure 6:
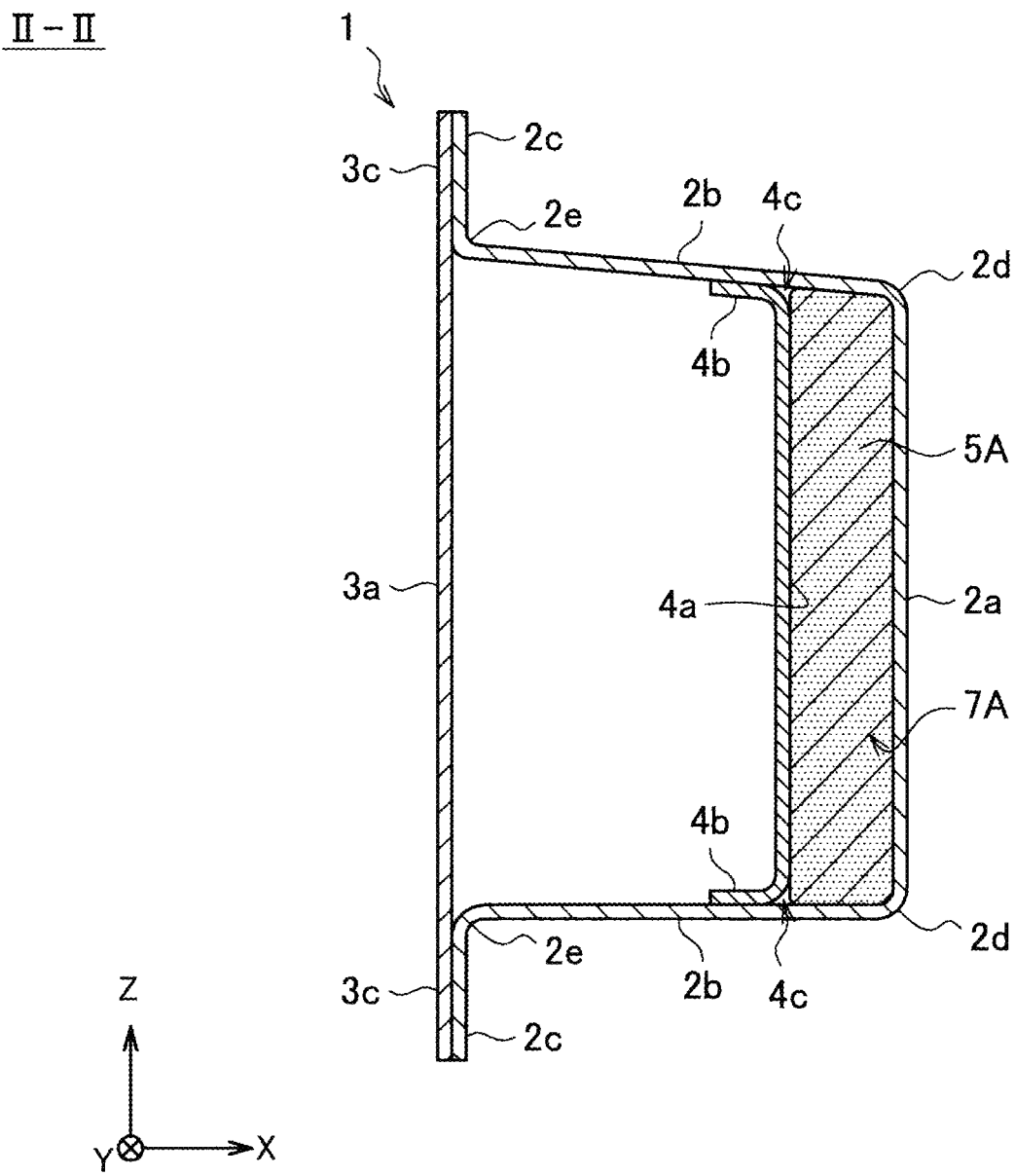
FIG. 6 is a cross-sectional view of the frame shown in FIG. 5 taken along cutting-plane line II-II.
Figure 7:
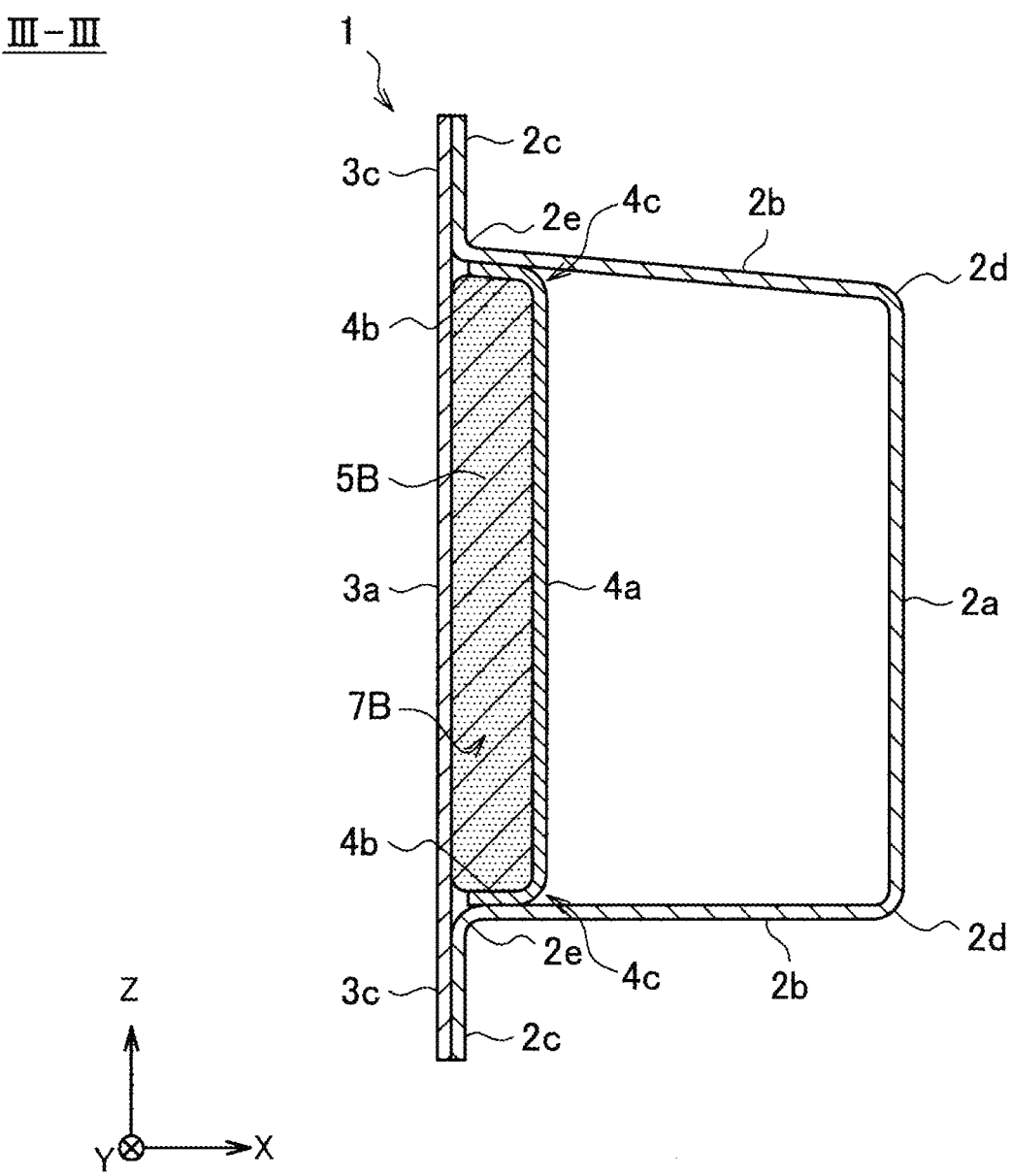
FIG. 7 is a cross-sectional view of the frame shown in FIG. 5 taken along cutting-plane line III-III.

FIGS. 6 and 7 are cross-sectional views of the frame 1 shown in FIG. 5 taken along cutting-plane lines II-II and III-III. As shown in FIG. 6, the filling member 5A is disposed in close contact with the main surface part 4a in a space 7A formed by the bottom wall part 2a, the main surface part 4a, and the pair of side wall parts 2b. In addition, although described later in detail, the filling members 5A may be disposed in close contact with at least the main surface part 4a. For example, the filling member 5A may not be necessarily disposed on the space 7A side. More specifically, the filling member 5A may be disposed in close contact with the main surface part 4a in a space opposite to the space 7A with respect to the reinforcement 4. Furthermore, as shown in FIG. 7, in the bent portion 6B, the filling member 5B is disposed in close contact with the main surface part 4a in a space 7B formed by the top wall part 3a, the main surface part 4a, and the pair of side wall parts 2b. As in the example of the filling member 5A, the filling member 5B may not be necessarily disposed in the space 7B. More specifically, the filling member 5B may be disposed in close contact with the main surface part 4a in a space opposite to the space 7B with respect to the reinforcement 4.

Actions and effects of the filling member 5A will be described with reference to FIG. 6. First, the filling member 5A is disposed in close contact with the main surface part 4a of the reinforcement 4. By the filling member 5A being in close contact with (preferably adhered to) the main surface part 4a, resistance to out-of-plane deformation of the main surface part 4a increases. Accordingly, in a case where a collision load is input to the frame 1 and bending occurs in the bent portion 6A, the out-of-plane deformation of the main surface part 4a that may occur due to compressive stress in the Z-axis direction applied to the reinforcement 4 can be suppressed, and buckling of the reinforcement 4 can be suppressed. Therefore, the reinforcement 4 can suppress the deformation of the side wall part 2b due to the input of the collision load, so that the cross-sectional deformation of the closed cross section of the hollow member 10 is also suppressed. Therefore, the collision safety performance of the frame 1 can be more reliably exhibited.

Referring to FIG. 6, the filling member 5A is disposed in close contact with the inner surface of a portion of the bottom wall part 2a in the bent portion 6. Since the filling member 5A is disposed in close contact (preferably adhered) at such a position, resistance to out-of-plane deformation of the bottom wall part 2a in the bent portion 6A increases. Accordingly, in a case where a collision load is input to the frame 1 and bending occurs in the bent portion 6A, the out-of-plane deformation of the bottom wall part 2a at the position where the bending occurs can be suppressed. Therefore, the cross-sectional deformation of the closed cross section of the hollow member 10 is directly suppressed by the filling member 5A. Therefore, the collision safety performance of the frame 1 can be further improved.

Furthermore, in the example shown in FIG. 6, the filling member 5A connects the main surface part 4a to the bottom wall part 2a. Here, the connection means that the filling member 5A straddles the main surface part 4a and the bottom wall part 2a and is disposed in close contact with each thereof. In a case where a collision load is input to the frame 1 and bending occurs in the bent portion 6A, out-of-plane deformations in the main surface part 4a and the bottom wall part 2a occur in opposite directions. Here, by connecting the main surface part 4a and the bottom wall part 2a by the filling member 5A, the filling member 5A can cancel the forces received by the respective deformations of the main surface part 4a and the bottom wall part 2a. Accordingly, not only can the out-of-plane deformation of the main surface part 4a be suppressed, but also the force itself that causes the out-of-plane deformation can be reduced. Therefore, the collision safety performance of the frame 1 can be further improved.

In the example shown in FIG. 6, the filling member 5A is disposed continuously in close contact with the reinforcement 4 and the side wall parts 2b. That is, the filling member 5A is disposed in close contact with the inside of a connection portion 4c that connects the main surface part 4a to the side wall part 2b. In a case where a collision load is input to the frame 1 and bending occurs in the bent portion 6, high stress is generated in the connection portion 4c, and plastic deformation locally occurs in the connection portion 4c. Since the filling member 5A is disposed in close contact with (preferably adhered to) the connection portion 4c, local plastic deformation occurring in the connection portion 4c can be suppressed. Accordingly, the collision safety performance of the frame 1 can be improved more effectively.

In the example shown in FIG. 6, the filling member 5A is disposed continuously in close contact with the bottom wall part 2a and the side wall parts 2b. That is, the filling member 5A is disposed in close contact with the inner side of the ridge portion 2d. Similarly to the plastic deformation in the connection portion 4c described above, in a case where a collision load is input to the frame 1 and bending occurs in the bent portion 6A, plastic deformation locally occurs in the ridge portion 2d. Therefore, since the filling member 5A is disposed in close contact (preferably adhered) at such a position, local plastic deformation occurring in the ridge portion 2d can be suppressed. Accordingly, the collision safety performance of the frame 1 can be improved more effectively.

In the example shown in FIG. 6, the filling member 5A is disposed in close contact with all the insides of the ridge portions 2d and the connection portions 4c. The disposition is not limited to this, and the improvement in the collision safety performance is exhibited as long as the filling member 5A is disposed on the inside of at least one of the ridge portions 2d and the connection portions 4c.

Here, as the Young's modulus of the filling member 5 increases, the effect of suppressing the plastic deformation described above by the filling member 5 is increased. However, in order to increase the Young's modulus of the filling member 5, the resin needs to be formed at a high density. That is, when the Young's modulus of the filling member 5 is increased, the mass per unit volume of the filling member 5 increases. In the present embodiment, the place where the cross-sectional deformation occurs, that is, the place where the cross-sectional deformation has to be suppressed can be limited to the bent portion 6 or its periphery. For this reason, the place where the filling member 5 has to be disposed can be limited in anticipation of the place where the cross-sectional deformation occurs. That is, in the present embodiment, it is possible to reduce an increase in weight caused by the increase in the Young's modulus of the filling member 5. As described above, in the present embodiment, it is possible to improve the collision safety performance with high mass efficiency.

The actions and effects incurred by the disposition of the filling member 5A have been described above. The above-described actions and effects are similarly exhibited by the filling member 5B filled between the top wall part 3a and the main surface part 4a as shown in FIG. 7.

Thus, in the frame 1 according to the present embodiment, the reinforcement 4 is provided inside the bent portion 6 that is a bending induction portion, and the filling member 5 is disposed in close contact with the reinforcement 4. With this configuration, the out-of-plane deformation of the reinforcement 4 can be suppressed when a collision load is input to the frame 1, and the buckling of the reinforcement 4 can be suppressed. Accordingly, the cross-sectional shape of the hollow member 10 is maintained by the reinforcement 4, so that the cross-sectional deformation of the hollow member 10 can be suppressed. Therefore, even in a case where the sheet thickness of the hollow member 10 and the reinforcement 4 is reduced in order to reduce the weight of the vehicle body, the collision safety performance of the frame 1 can be maintained.

The reinforcement 4 shown in FIG. 5 is formed of a single member and is provided so as to face each of the bottom wall part 2*a* and the top wall part 3*a* in the bent portion 6, but the present invention is not limited to this example. For example, a plurality of reinforcements 4 may be provided to face the bottom wall part 2*a* or the top wall part 3*a* in the bending induction portion such as the bent portion 6. In addition, the reinforcement 4 may be provided entirely along the longitudinal direction of the hollow member 10. That is, as long as the reinforcement 4 is provided inside the bending induction portion, the position and length of the reinforcement 4 in the longitudinal direction of the hollow member 10 are not particularly limited.

<2.2. Disposition Example of Filling Member>

The disposition of the filling members 5A and 5B according to the present embodiment has been described above. The disposition of the filling member 5 is not limited to the examples shown in FIGS. 6 and 7. Hereinafter, other disposition examples of the filling member 5 will be described.

(First Disposition Example)

In a first disposition example, out-of-plane deformation of the reinforcement 4 is suppressed by a filling member 510 disposed in close contact with the reinforcement 4. When the out-of-plane deformation of the reinforcement 4 can be suppressed, the out-of-plane deformation of a wall part (for example, the side wall part 2*b*) to which the reinforcement 4 is connected can be suppressed. As a result, the cross-sectional deformation of the hollow member 10 can be suppressed.

Figure 8:
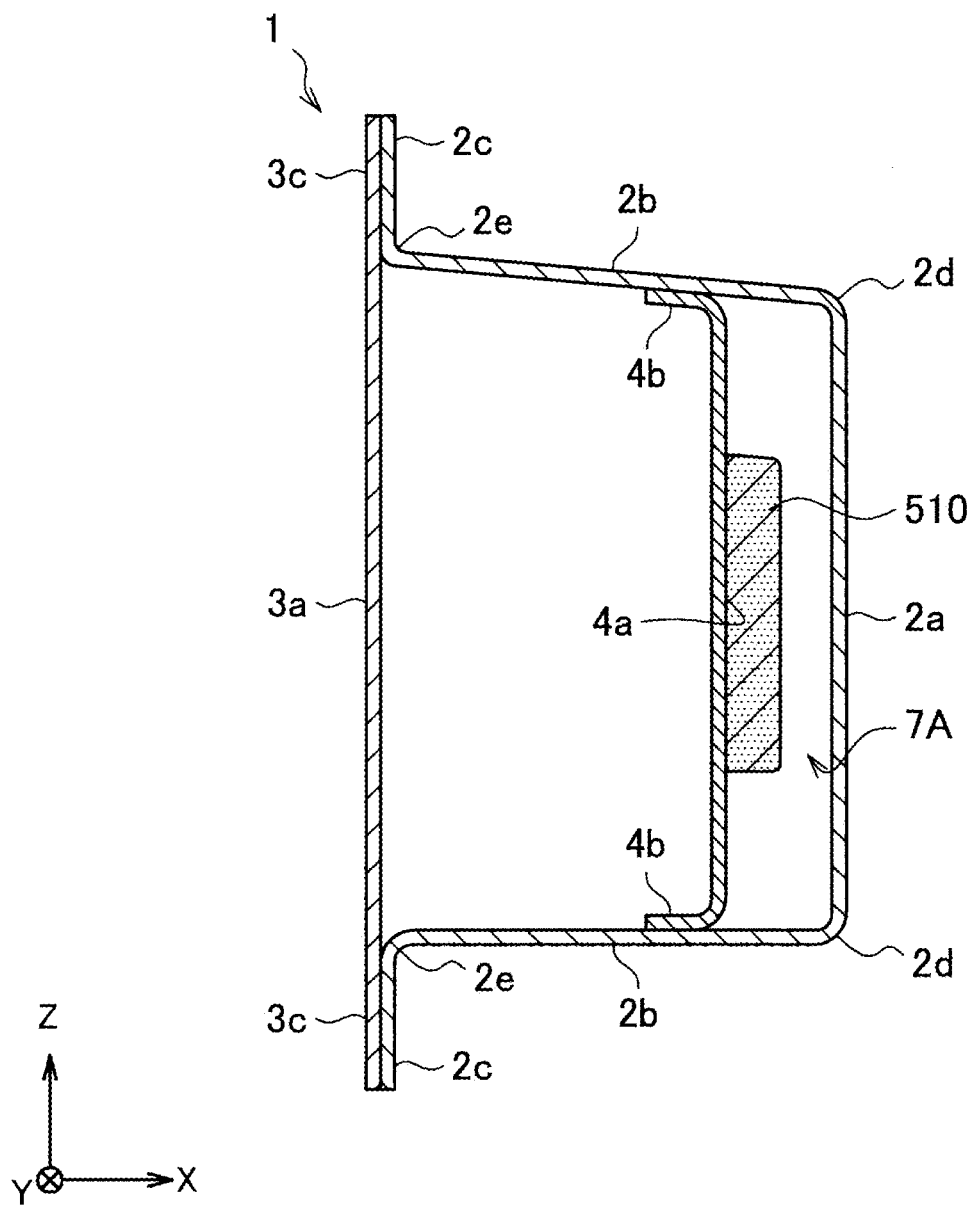
FIG. 8 is a cross-sectional view of the frame showing a first disposition example of a filling member according to the embodiment.

FIG. 8 is a cross-sectional view of the frame 1 showing the first disposition example of the filling member according to the present embodiment. The cross-sectional view shown in FIG. 8 corresponds to a cross section of the frame 1 taken along cutting-plane line II-II of the frame 1 shown in FIG. 5.

As shown in FIG. 8, the filling member 510 is disposed in close contact with (preferably adhered to) the center portion of the surface of the main surface part 4*a* facing the bottom wall part 2*a*. With this disposition, as described above, resistance to out-of-plane deformation of the main surface part 4*a* can be increased. That is, even when the filling member 510 is disposed in close contact with only a portion of the main surface part 4*a*, the out-of-plane deformation of the reinforcement 4 can be suppressed, and buckling of the reinforcement 4 can be suppressed. That is, the effect of suppressing the cross-sectional deformation of the hollow member 10 can be sufficiently obtained. Therefore, as long as it is possible to secure the required collision safety performance, the filling member 510 may be disposed only on a portion of the main surface part 4*a* as shown in FIG. 8. Accordingly, the filling amount of the filling member 510 decreases, so that the cost of the filling member 510 and the weight of the frame 1 can be kept low.

The disposition position of the filling member 510 is not limited to the side of the main surface part 4*a* facing the bottom wall part 2*a* as described above. For example, the filling member 510 shown in FIG. 8 may be provided on a side of the main surface part 4*a* facing the top wall part 3*a*. That is, as long as the filling member 510 is disposed in close contact with the reinforcement 4, the surface of the main surface part 4*a* where the filling member 510 is disposed is not particularly limited.

(Second Disposition Example)

In a second disposition example, a filling member 511 connects the reinforcement 4 and a wall part (for example, the bottom wall part 2*a*) facing the reinforcement 4. Since the reinforcement 4 and the wall part facing the reinforcement 4 restrain each other through the filling member 511, out-of-plane deformation of the reinforcement 4 and the wall part facing the reinforcement 4 can be suppressed. Furthermore, since the out-of-plane deformation of the reinforcement 4 can be suppressed, the out-of-plane deformation of the wall part to which the reinforcement 4 is connected can also be suppressed. As a result, the cross-sectional deformation of the hollow member 10 can be suppressed.

Figure 9:
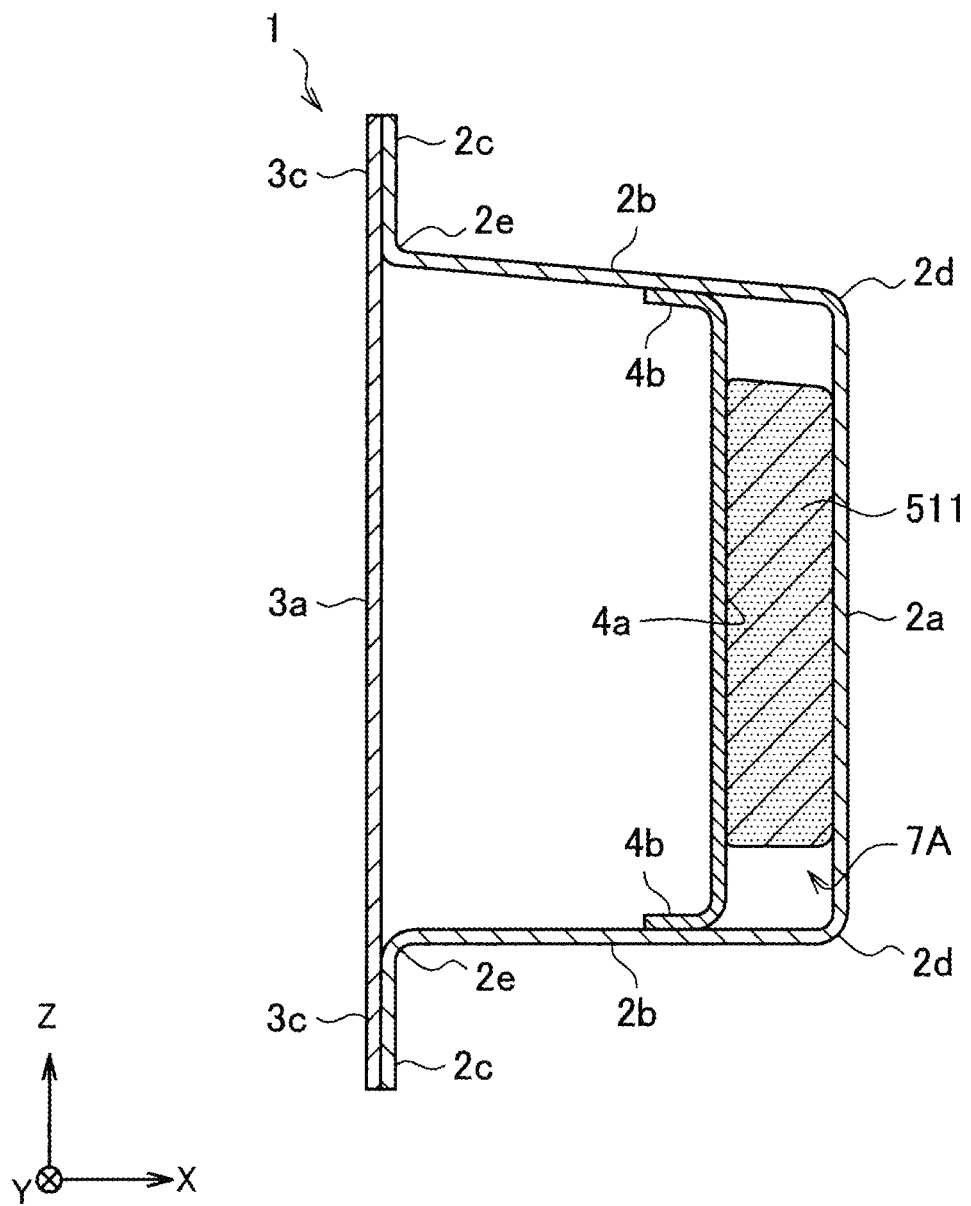
FIG. 9 is a cross-sectional view of the frame showing a second disposition example of the filling member according to the embodiment.

FIG. 9 is a cross-sectional view of the frame 1 showing the second disposition example of the filling member according to the present embodiment. The cross-sectional view shown in FIG. 9 corresponds to a cross section of the frame 1 taken along cutting-plane line II-II of the frame 1 shown in FIG. 5.

As shown in FIG. 9, the filling member 511 is disposed in close contact with (preferably adhered to) each of the center portion of the main surface part 4*a* and the center portion of the bottom wall part 2*a* so as to connect the center portions. With this disposition, as described above, the out-of-plane deformation of the reinforcement 4 and the bottom wall part 2*a* can be more effectively suppressed. In this case, as shown in FIG. 9, even when the filling member 511 connects only a portion of the main surface part 4*a* to a portion of the bottom wall part 2*a*, the effect of suppressing the cross-sectional deformation of the hollow member 10 can be sufficiently obtained. Therefore, as long as it is possible to secure the required collision safety performance, as shown in FIG. 9, the filling member 511 may be disposed so as to connect only portions of the main surface part 4*a* and the bottom wall part 2*a*. Accordingly, the filling amount of the filling member 511 decreases, so that the cost of the filling member 511 and the weight of the frame 1 can be kept low.

The disposition position of the filling member 511 is not limited to between the main surface part 4*a* and the bottom wall part 2*a* as described above. For example, the filling member 511 shown in FIG. 9 may be disposed between the main surface part 4*a* and the top wall part 3*a* and connect the main surface part 4*a* to the top wall part 3*a*. In a case where the main surface part 4*a* of the reinforcement 4 is provided so as to face the side wall part 2*b*, the filling member 511 may connect any of the side wall parts 2*b* to the main surface part 4*a*. That is, as long as the filling member 511 is disposed in close contact with the reinforcement 4, the portion to be connected by the filling member 511 is not particularly limited.

In addition, the disposition position of the filling member 5 in the Z-axis direction of the main surface part 4*a* (and the bottom wall part 2*a*) shown in the first disposition example and the second disposition example is not particularly limited. However, it is preferable that the filling member 5 is disposed in close contact with the center portion of the main surface part 4*a* where the deflection amount of the main surface part 4*a* receiving the bending moment is the largest. Furthermore, the width of the filling member 5 on the main surface part 4*a* is desirably 20% or more of the width of the main surface part. The width thereof is preferably 30% or more. Accordingly, application of the collision energy to the reinforcement 4 due to the elastic deformation of the reinforcement 4 can be prevented. This is because when the collision energy is applied to the reinforcement 4, energy absorption due to bending in the collision is impeded.

Furthermore, as shown in FIGS. 8 and 9, the filling member 5 may not necessarily be disposed to densely fill the space 7A. As long as the filling member 5 is disposed in close contact with at least the main surface part 4*a* of the reinforcement 4, the effect of suppressing the cross-sectional deformation of the hollow member by the reinforcement 4 is exhibited. The filling amount and the disposition position of the filling member 5 in the space 7A can be appropriately adjusted based on the required collision safety performance of the frame 1, the weight of the frame 1, the filling cost by the filling member 5, and the like. The filling member 5 may not necessarily be provided in the space 7A. That is, the filling member 5 may be disposed in a space on a side different from the space 7A among the spaces of the hollow member 10.

(Third Disposition Example)

In a third disposition example, a filling member 512 connects the reinforcement 4 and a wall part to which the reinforcement 4 is connected. Since the reinforcement 4 and the wall part to which the reinforcement 4 is connected are restrained by the filling member 512, the angle formed by the reinforcement 4 and the wall part to which the reinforcement 4 is connected is fixed. As a result, the cross-sectional deformation of the hollow member 10 can be suppressed.

Figure 10:
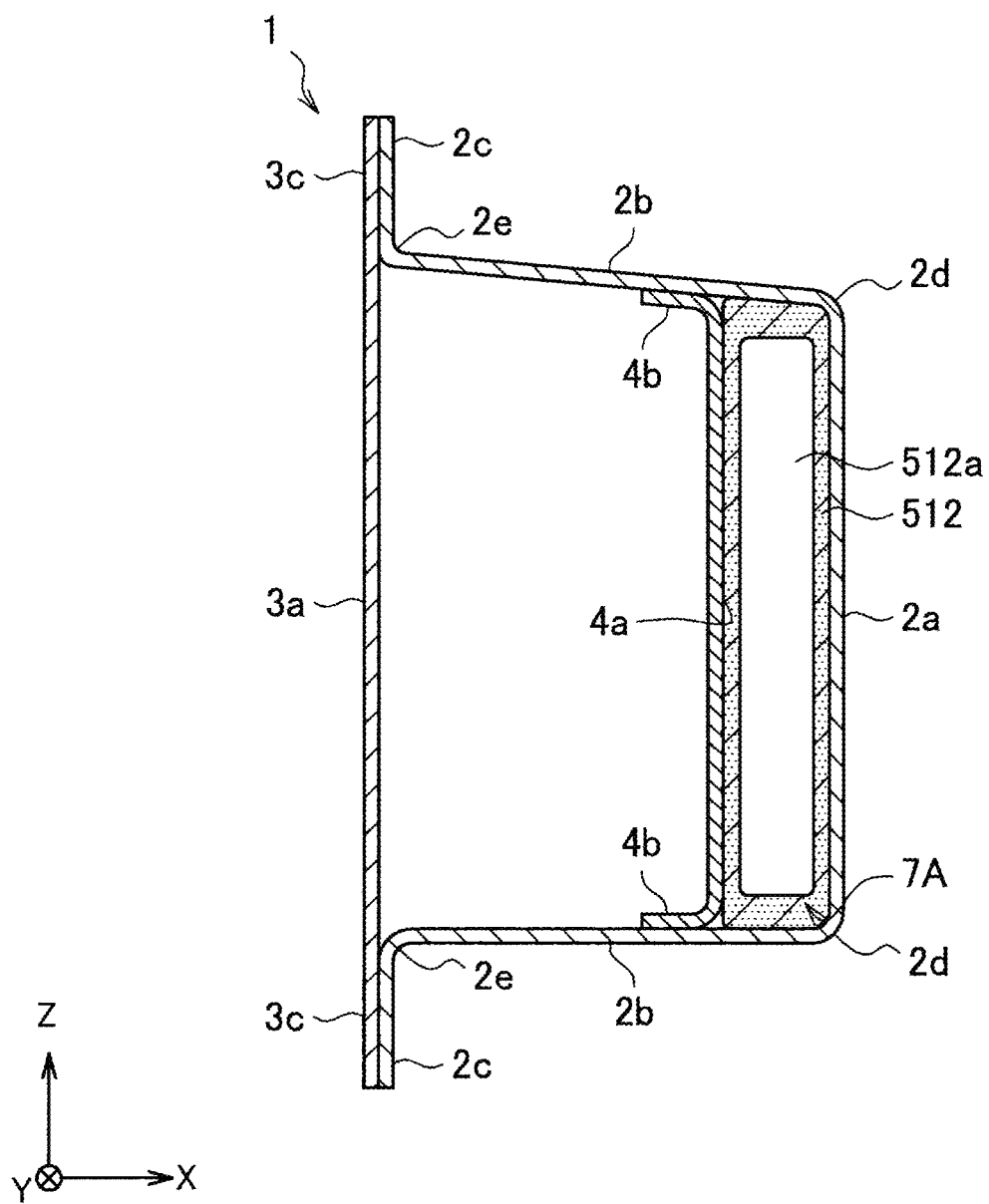
FIG. 10 is a cross-sectional view of a frame showing a third disposition example of the filling member according to the embodiment.

FIG. 10 is a cross-sectional view of the frame 1 showing the third disposition example of the filling member according to the present embodiment. The cross-sectional view shown in FIG. 10 corresponds to a cross section of the frame 1 taken along cutting-plane line II-II of the frame 1 shown in FIG. 5.

As shown in FIG. 10, the filling member 512 is disposed in the space 7A formed by being surrounded by the main surface part 4a, the bottom wall part 2a, and the pair of side wall parts 2b so as to be in close contact with (preferably adhered to) the main surface part 4a, the bottom wall part 2a, and the pair of side wall parts 2b. The filling member 512 has a cavity 512a therein. Accordingly, the filling amount of the filling member 512 can be suppressed while enhancing the effect of suppressing deformation of the reinforcement 4 and the hollow member 10. As long as the filling member 512 shown in FIG. 10 is disposed in close contact with the reinforcement 4, the presence or absence of close contact with other wall parts and the filling amount are not particularly limited.

3. Second Embodiment

A second embodiment is a form in which a resin material is disposed in a bending induction portion in close contact with the inner surface of at least one of the bottom wall and the top wall of a metal member.

<3.1. Configuration of Frame>

(Elements of Frame)

Figure 11:
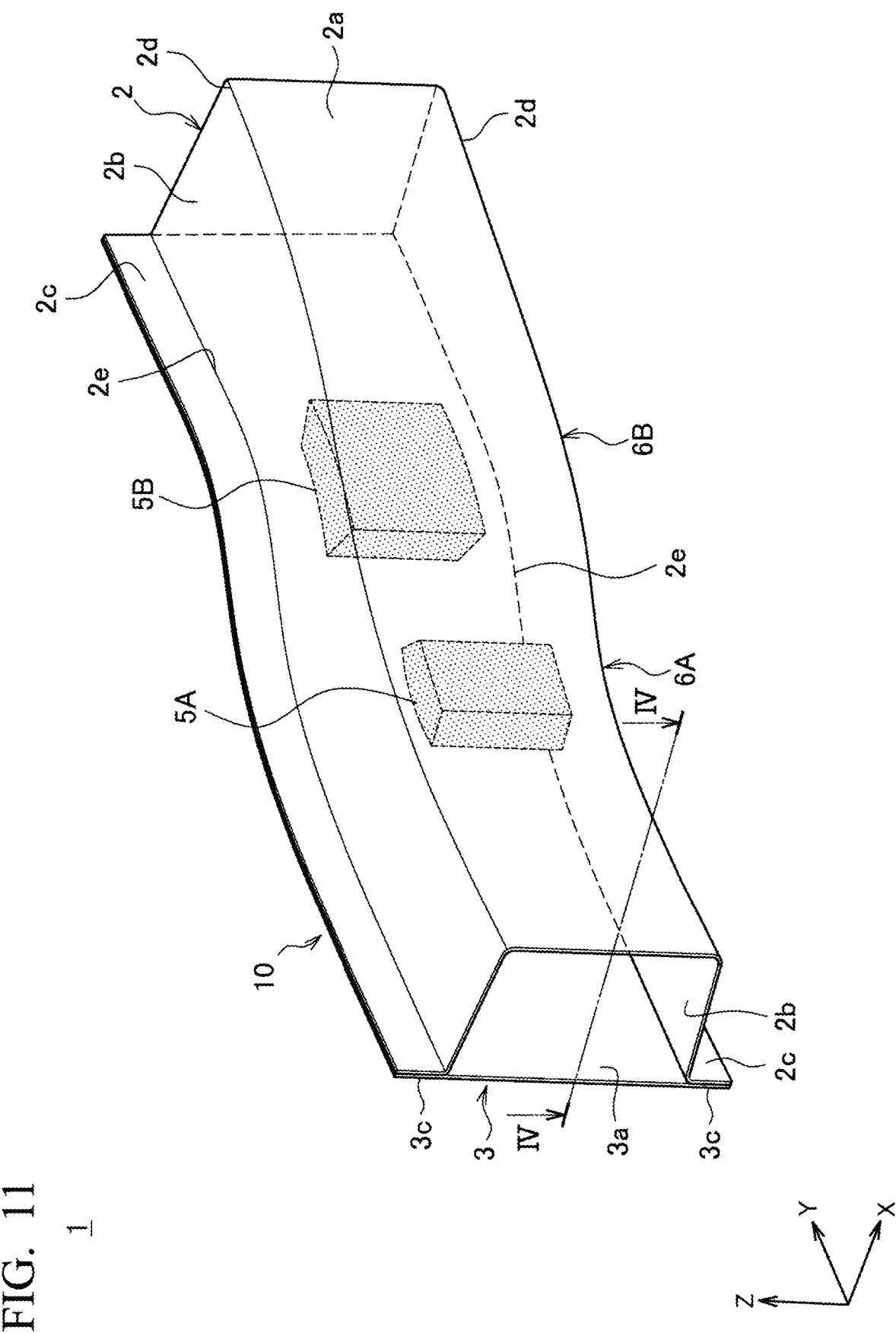
FIG. 11 is a perspective view showing a schematic configuration of an example of a frame according to a second embodiment of the present invention.

FIG. 11 is a perspective view showing a schematic configuration of an example of the frame 1 according to the second embodiment of the present invention. As shown in FIG. 11, the frame 1 according to the present embodiment includes the first structural member 2, the second structural member 3, and the filling members 5 (5A and 5B). The hollow member 10 according to the present embodiment is formed by the first structural member 2 and the second structural member 3. The configuration of the frame 1 shown in FIG. 11 is the same as that of the first embodiment described with reference to FIGS. 2 to 4 except for the absence of the reinforcement 4 and the disposition of the filling members 5. Hereinafter, an example of disposition of the filling members 5 inside the frame 1 according to the present embodiment will be described.

(Disposition of Filling Member)

Figure 12:
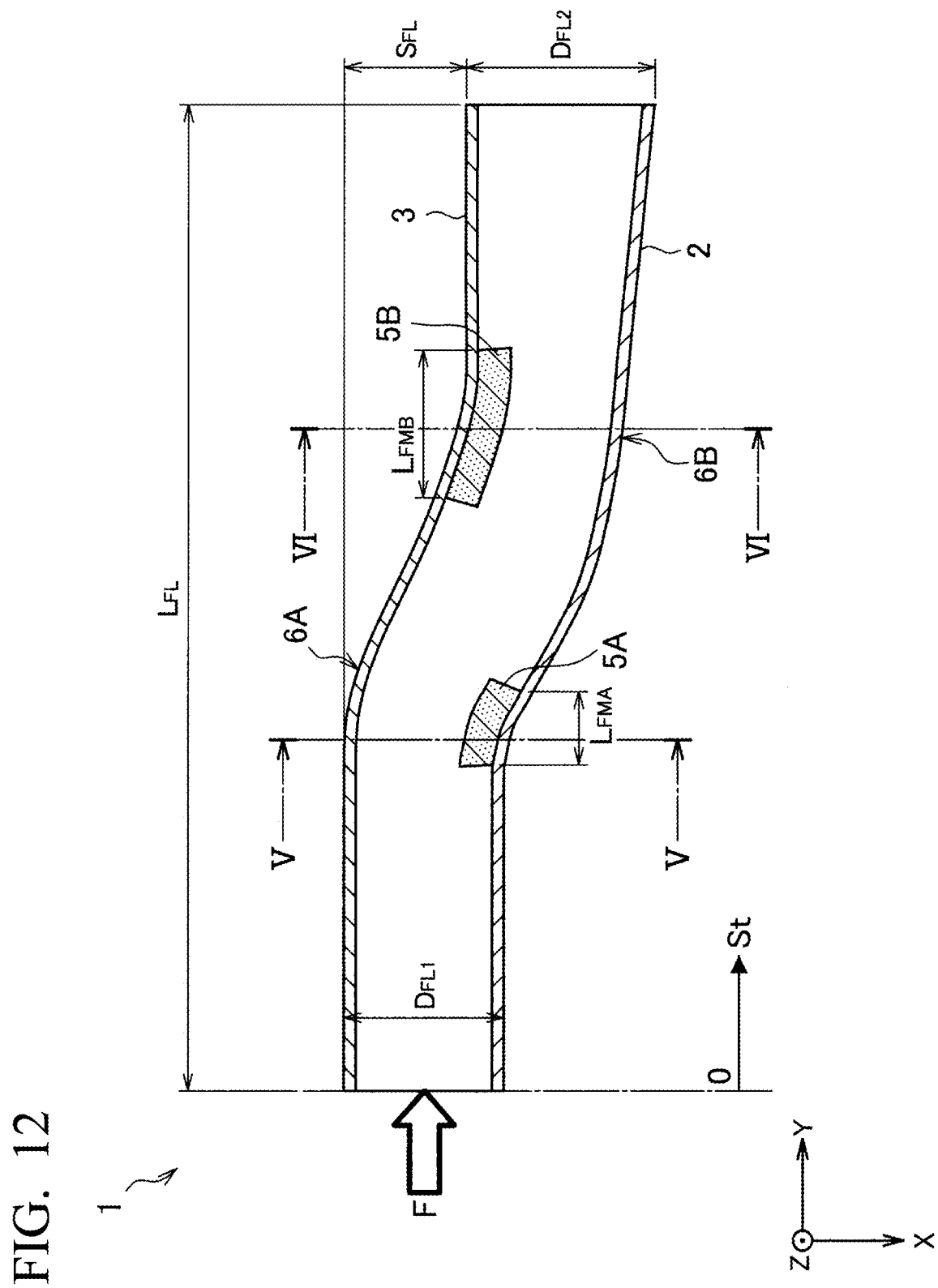
FIG. 12 is a sectional view showing a section orthogonal to the Z-axis direction of an example of the frame according to the embodiment.

FIG. 12 is a sectional view showing a section orthogonal to the Z-axis direction of an example of the frame 1 according to the present embodiment. The sectional view shown in FIG. 12 corresponds to a sectional view of the hollow member 10 taken along cutting-plane line IV-IV shown in FIG. 11. As shown in FIG. 12, the hollow member 10 is provided with the bent portion 6A that bends in a direction in which the bottom wall part 2a becomes a bend inside, and the bent portion 6B that bends in a direction in which the top wall part 3a becomes a bend inside. As shown in FIGS. 11 and 12, the filling members 5A and 5B according to the present embodiment are disposed in close contact with the inner surfaces of portions of the bottom wall part 2a or the top wall part 3a where the bent portions 6A and the bent portions 6B are provided. These bent portions 6 correspond to bending induction portions in the frame 1.

In addition, the definition of the symbol of each dimension attached regarding the frame 1 shown in FIG. 12 is as follows.

$L_{FL}$: Length of the hollow member 10 in the Y-axis direction (longitudinal direction).

$D_{FL1}$: Cross-sectional dimension in the X-axis direction at an end portion of the hollow member 10 on a collision side.

$D_{FL2}$: Cross-sectional dimension in the X-axis direction at the second end portion of the hollow member 10.

$S_{FL}$: Offset length of the second structural member 3 before and after the bent portion 6 in the longitudinal direction.

$L_{FMA}$, $L_{FMB}$: Lengths of the filling members 5A and 5B in the Y-axis direction.

Figure 13:
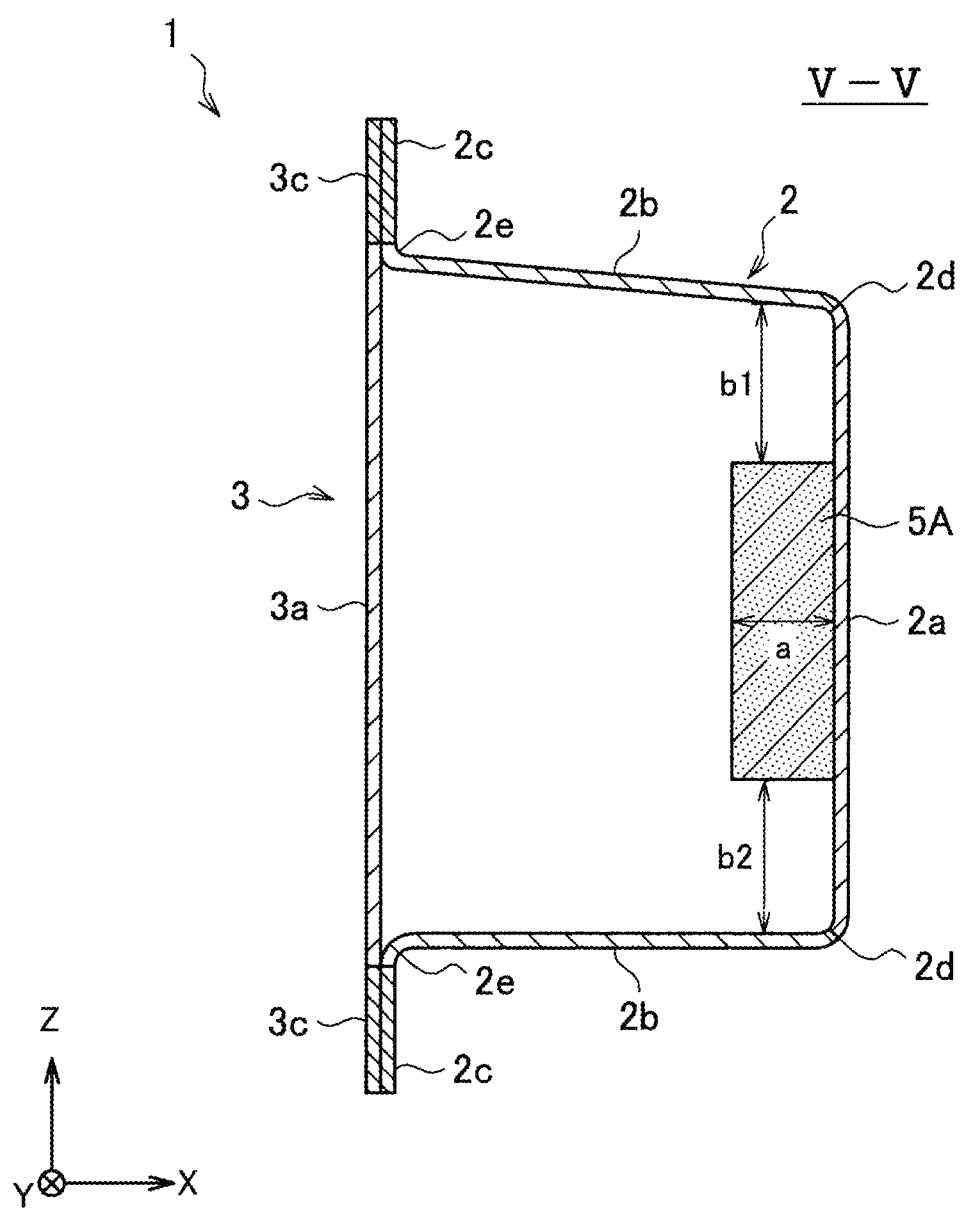
FIG. 13 is a cross-sectional view of the frame shown in FIG. 12 taken along cutting-plane line V-V.
Figure 14:
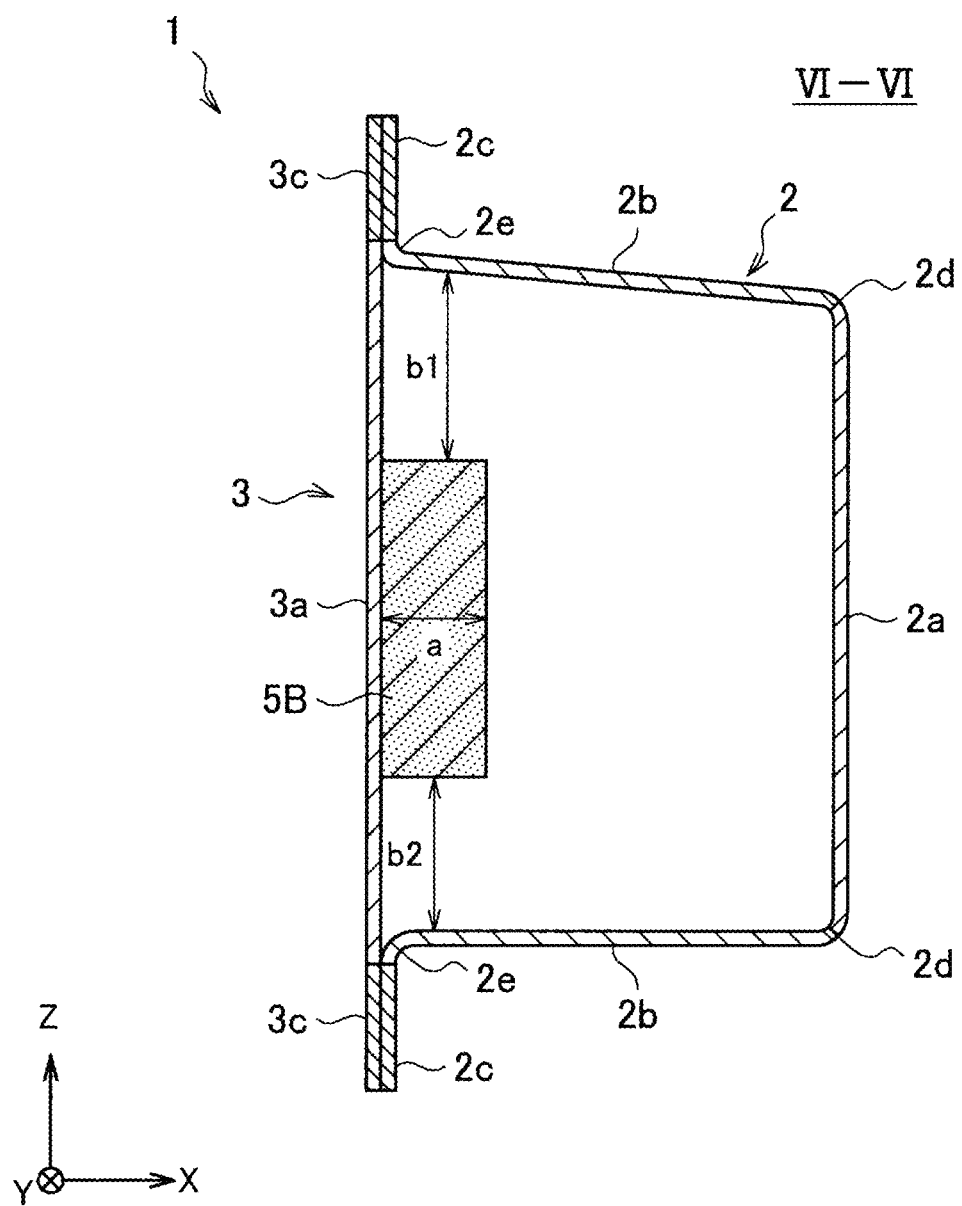
FIG. 14 is a cross-sectional view of the frame shown in FIG. 12 taken along cutting-plane line VI-VI.

FIG. 13 is a cross-sectional view of the frame 1 shown in FIG. 12 taken along cutting-plane line V-V. FIG. 14 is a cross-sectional view of the frame 1 shown in FIG. 12 taken along cutting-plane line VI-VI. As shown in FIG. 13, the filling member 5A is disposed in close contact with (preferably adhered to) the inner surface of the bottom wall part 2a. The inner surface of the bottom wall part 2a corresponds to a bend inside of the bent portion 6A. In particular, as shown in FIG. 13, the filling member 5A is disposed in close contact with the inner surface of the center portion of the bottom wall part 2a. Moreover, as shown in FIG. 14, the filling member 5B is disposed in close contact with the inner surface of the top wall part 3a. The inner surface of the top wall part 3a corresponds to a bend inside of the bent portion 6B.

With this disposition, in a case where a force in an out-of-plane direction due to bending compression of the frame 1 is applied to the bottom wall part 2a, deformation of the center portion of the bottom wall part 2a is restrained by the filling member 5A. Accordingly, the out-of-plane deformation of the bottom wall part 2a can be suppressed. That is, when a collision load is input to the frame 1, the out-of-plane deformation of the hollow member 10 in the portion where the filling member 5A is disposed can be suppressed. Accordingly, the cross-sectional deformation of the frame 1 is suppressed, so that the load bearing performance of the frame 1 can be improved. Therefore, the collision safety performance can be maintained at a high level while achieving a reduction in the weight of the frame 1.

A thickness a of the filling member 5A in the X-axis direction is not particularly limited, and the thickness a is appropriately set according to the load bearing performance and weight required for the frame 1. In order to control the thickness a of the filling member 5A, for example, a sheet material such as a reinforcement (not shown) may be provided inside the hollow member 10.

Furthermore, distances $b_1$ and $b_2$ from the side wall parts that determine the disposition position of the filling member 5A are not particularly limited. However, by disposing the filling member 5A in close contact with the inner surface of the center portion of the bottom wall part 2a, the out-of-plane deformation of the bottom wall part 2a can be efficiently suppressed. Furthermore, the width of the filling member 5A on the bottom wall part 2a is preferably 20% or more of the width of the bottom wall part 2a. The width thereof is preferably 30% or more. The distances $b_1$ and $b_2$ are preferably the same value. The magnitudes of the distances $b_1$ and $b_2$ are determined according to the thickness of the filling member 5A in the X-axis direction that is appropriately set according to the load bearing performance and weight required for the frame 1.

In FIG. 14, the filling member 5B is disposed on the top wall part 3a. The filling member 5B is the same as in FIG. 13 except that the filling member 5B is disposed on the top wall part 3a. However, the width of the filling member 5B on the top wall part 3a is desirably 20% or more of the width of the top wall part 3a in the closed cross section. The width thereof is preferably 30% or more.

In the present invention, close contact means arrangement with no gap. In particular, as the close contact, restrainable adhesion is most preferable. Even in a case where restraint is not achieved, the effect of the filling member 5 suppressing the out-of-plane deformation of at least one of the wall parts forming the hollow member 10 is exhibited. For example, it is assumed that a change in cross-sectional shape as shown in FIGS. 129 and 130 occurs in the frame 1 according to the present embodiment. In a case where the filling member 5 is adhered to the inner surface of at least one of the bottom wall part 2a and the top wall part 3a, when the bottom wall part 2a or the top wall part 3a undergoes out-of-plane deformation, the filling member 5 also follows the out-of-plane deformation of the inner surface. Therefore, the effect of suppressing the out-of-plane deformation of the bottom wall part 2a or the top wall part 3a by the filling member 5 is remarkably exhibited. In addition, in a case where the filling member 5 and the inner surface of at least one of the bottom wall part 2a and the top wall part 3a are disposed in close contact with each other without being restrained, when the bottom wall part 2a or the top wall part 3a undergoes out-of-plane deformation, there are cases where the filling member 5 and the inner surface are partially separated from each other. However, even in a case where the inner surface undergoes out-of-plane deformation, the inner surface is in a state of being in contact with at least a portion of the filling member 5. Therefore, even though the filling member 5 and the inner surface are in a state of being in close contact with each other without being restrained, the effect of suppressing the out-of-plane deformation of the bottom wall part 2a or the top wall part 3a by the filling member 5 is sufficiently exhibited.

Here, as the Young's modulus of the filling member 5 increases, the effect of suppressing the plastic deformation described above by the filling member 5 is increased. However, in order to increase the Young's modulus of the filling member 5, the resin needs to be formed at a high density. That is, when the Young's modulus of the filling member 5 is increased, the mass per unit volume of the filling member 5 increases. In the present embodiment, the place where the cross-sectional deformation occurs, that is, the place where the cross-sectional deformation has to be suppressed can be limited to the bent portion 6 or its periphery. For this reason, the place where the filling member 5 has to be disposed can be limited in anticipation of the place where the cross-sectional deformation occurs. That is, in the present embodiment, it is possible to reduce an increase in weight caused by the increase in the Young's modulus of the filling member 5. As described above, in the present embodiment, it is possible to improve the collision safety performance with high mass efficiency.

The disposition of the filling member 5A and the actions and effects of the disposition have been described above. The above-described actions and effects are similarly exhibited by the filling member 5B disposed inside the bent portion 6B as shown in FIG. 14.

As described above, in the frame 1 according to the present embodiment, the filling member 5A is disposed in close contact with the inner surface of the bottom wall part 2a included inside the bent portion 6 that is a bending induction portion, and the filling member 5B is disposed in close contact with the inner surface of the top wall part 3a included inside the bent portion 6B. With this configuration, when a collision load is input to the frame 1, out-of-plane deformation of the bottom wall part 2a and the top wall part 3a caused by bending compression of the frame 1 can be suppressed. Accordingly, the cross-sectional collapse of the frame 1 by the collision can be suppressed. Therefore, even in a case where the sheet thickness of the hollow member 10 is reduced in order to achieve a reduction in the weight of the vehicle body, by disposing the filling member 5 having a low mass density in the portion as described above, the load bearing performance of the frame 1 can be maintained at a high level without greatly increasing the weight of the frame 1. That is, for example, easy bending of the frame 1 at the bending induction portion can be prevented.

<3.2. Disposition Example of Filling Member>

The disposition of the filling members 5A and 5B according to the present embodiment has been described above. The disposition of the filling member 5 is not limited to the examples shown in FIGS. 11 to 14. Hereinafter, other disposition examples of the filling member 5 will be described.

In the following first to fourth disposition examples, a filling member connects the end portion of the side wall part 2b to the bottom wall part 2a or the top wall part 3a. That is, the filling member is disposed adjacent to the ridge portion 2d or the ridge portion 2e. The filling member suppresses a change in the angle formed between the side wall part 2b and the bottom wall part 2a or the top wall part 3a. That is, the filling member suppresses deformation of the ridge portion 2d or the ridge portion 2e. As a result, the cross-sectional deformation of the hollow member 10 can be suppressed.

(First Disposition Example)

Figure 15:
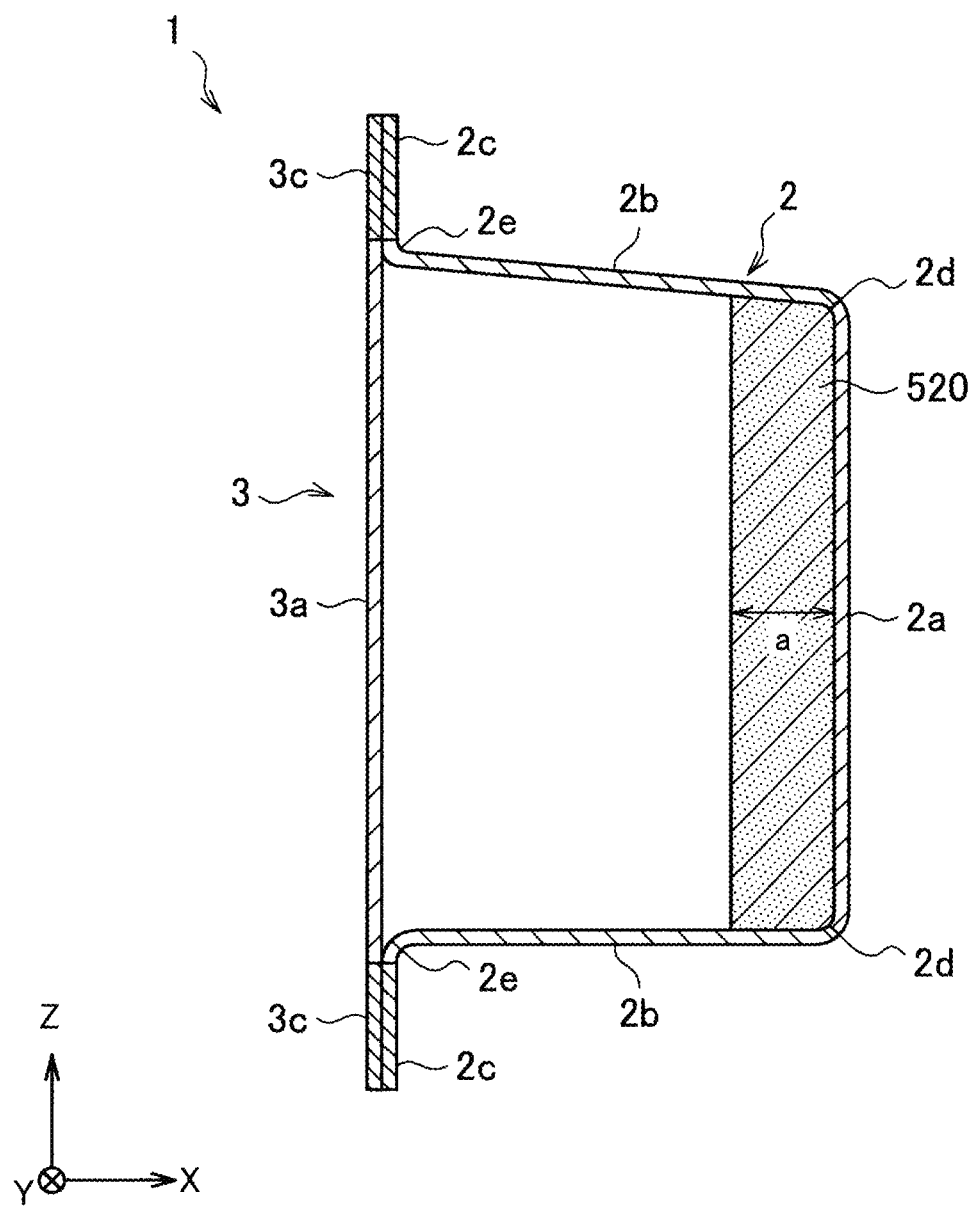
FIG. 15 is a cross-sectional view of the frame showing a first disposition example of a filling member according to the embodiment.

FIG. 15 is a cross-sectional view of the frame 1 showing the first disposition example of the filling member according to the present embodiment. The cross-sectional view shown in FIG. 15 corresponds to a cross section of the frame 1 taken along cutting-plane line V-V of the frame 1 shown in FIG. 12.

As shown in FIG. 15, a filling member 520 according to the present disposition example is disposed continuously in close contact with (preferably adhered to) the side wall parts 2b and the bottom wall part 2a. That is, the filling member 520 is disposed in close contact with the inner side of the ridge portion 2d. When a collision load is input to the frame 1 and bending occurs in the bent portion 6A, plastic deformation locally occurs in the ridge portion 2d. Due to this plastic deformation, falling of the side wall part 2b in the out-of-plane direction is promoted. Therefore, by disposing the filling member 520 in close contact at such a position, local plastic deformation occurring in the ridge portion 2d can be suppressed. Accordingly, falling of the side wall part $2b$ in the out-of-plane direction can be suppressed. Therefore, the cross-sectional deformation of the frame 1 can be more effectively suppressed.

A thickness a of the filling member 520 is appropriately set according to the load bearing performance and weight required for the frame 1.

The disposition of the filling member shown in FIG. 15 can be similarly applied to the cross section of the frame 1 taken along cutting-plane line VI-VI of the frame 1 shown in FIG. 12. In this case, the filling member 520 is disposed in close contact with the inner surface of the top wall part $3a$ and the inner side of the ridge portion $2e$.

(Second Disposition Example)

Figure 16:
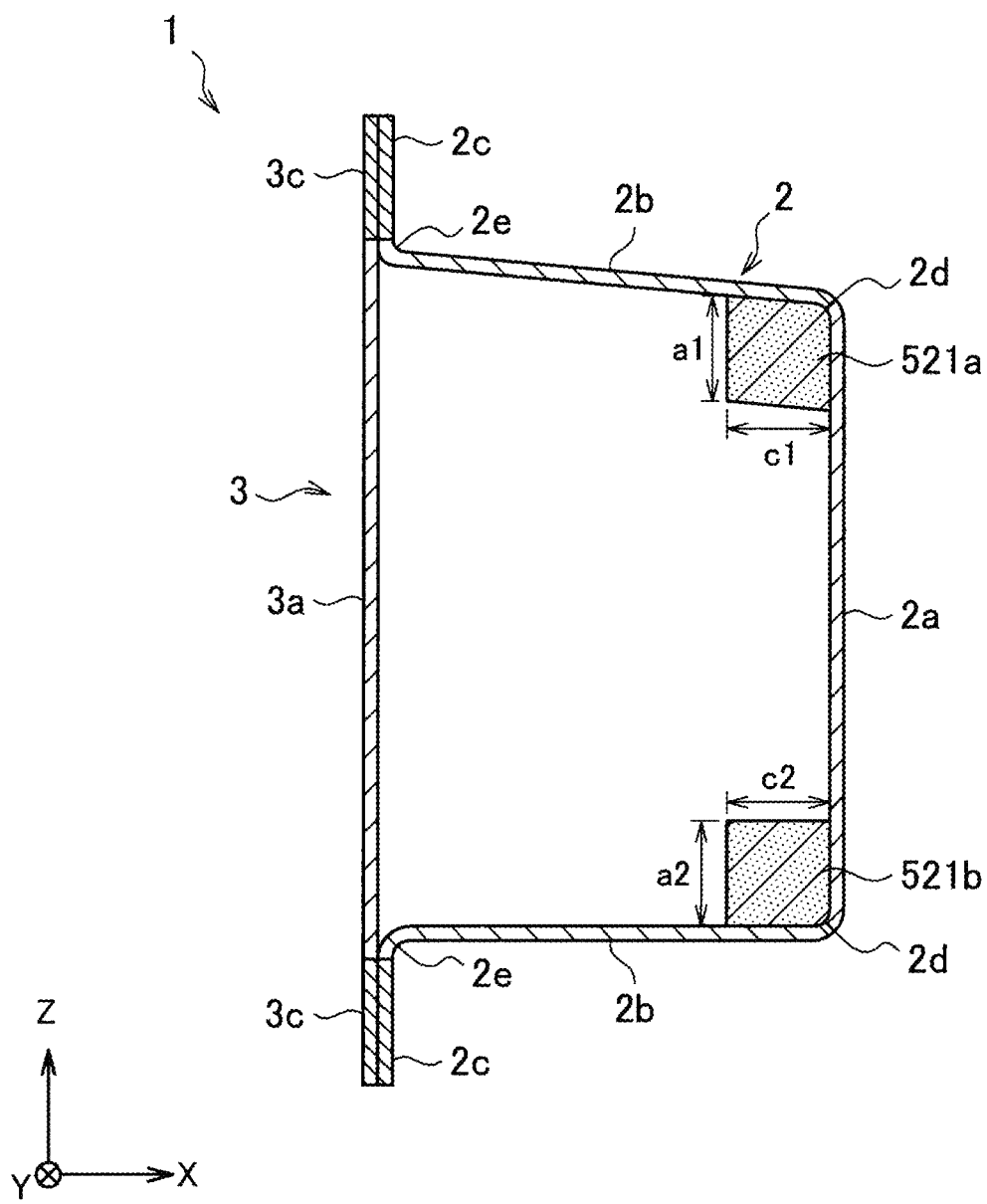
FIG. 16 is a cross-sectional view of the frame showing a second disposition example of the filling member according to the embodiment.

FIG. 16 is a cross-sectional view of the frame 1 showing the second disposition example of the filling member according to the present embodiment. The cross-sectional view shown in FIG. 16 corresponds to a cross section of the frame 1 taken along cutting-plane line V-V of the frame 1 shown in FIG. 12.

Filling members $521a$ and $521b$ according to the present disposition example are disposed locally in close contact with (preferably adhered to) the insides of the ridge portions $2d$, respectively. With this disposition, local plastic deformation occurring in the ridge portion $2d$ can be suppressed. Accordingly, falling of the side wall part $2b$ in the out-of-plane direction can be reduced. Therefore, cross-sectional deformation of the frame 1 can be suppressed. In the example shown in FIG. 16, since the filling members $521a$ and $521b$ are disposed locally in close contact with the inner sides of the ridge portions $2d$, the cross-sectional deformation of the frame 1 can be suppressed without substantially increasing the weight of the frame 1.

(Third Disposition Example)

Figure 17:
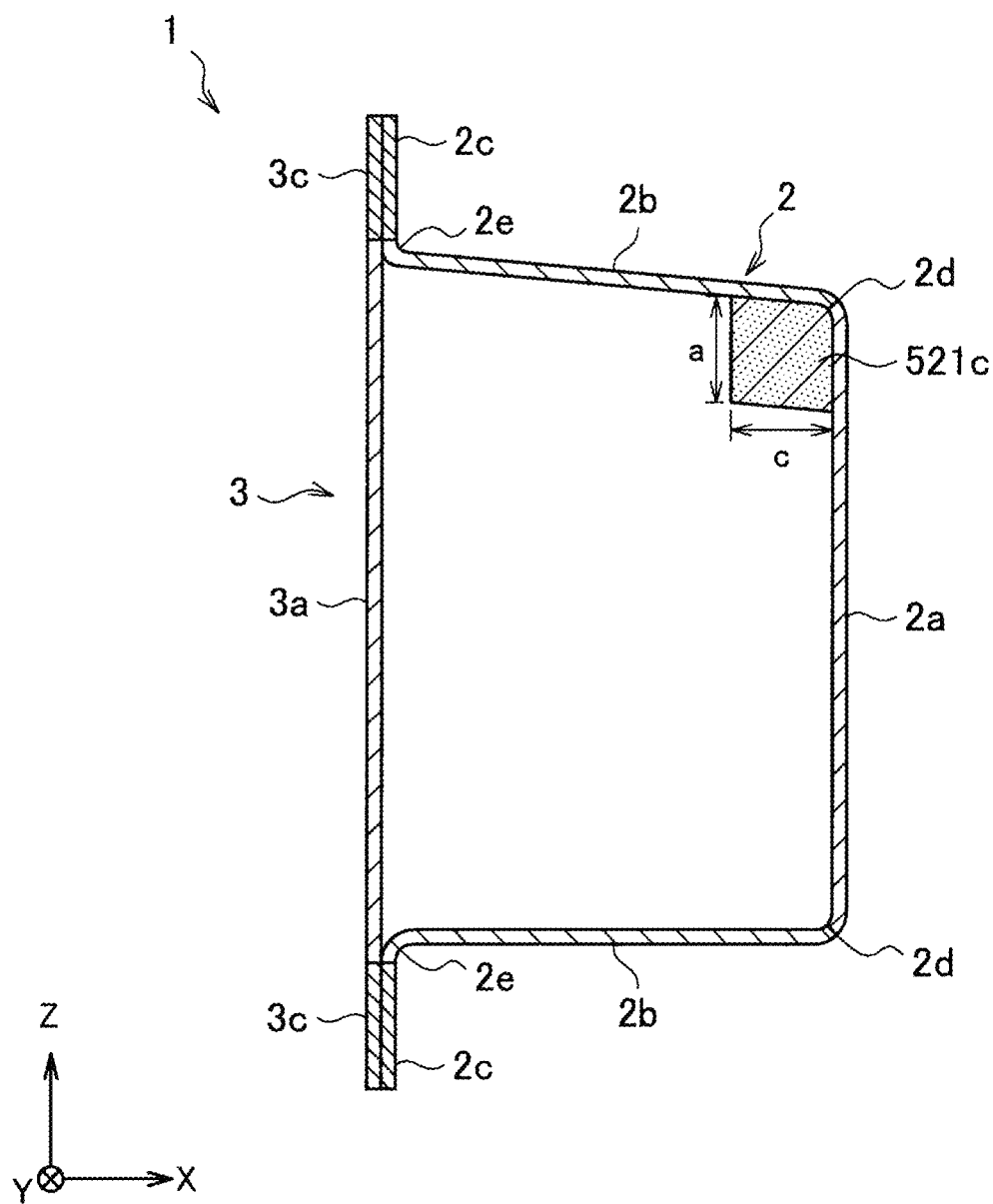
FIG. 17 is a cross-sectional view of the frame showing a third disposition example of the filling member according to the present embodiment.

The filling member according to the present embodiment may be disposed locally in close contact with (preferably adhered to) the inner side of at least one of the ridge portions $2d$. FIG. 17 is a cross-sectional view of the frame 1 showing the third disposition example of the filling member according to the present embodiment. The cross-sectional view shown in FIG. 17 corresponds to a cross section of the frame 1 taken along cutting-plane line V-V of the frame 1 shown in FIG. 12.

As shown in FIG. 17, a filling member $521c$ according to the present disposition example is disposed in close contact with the inner side of one of the ridge portions $2d$. Accordingly, local plastic deformation occurring in the ridge portion $2d$ on which the filling member $521c$ is disposed can be suppressed. Furthermore, the filling amount of the filling member can be reduced, so that the weight of the frame 1 can be prevented from increasing.

According to the disposition examples of the filling member shown in FIGS. 16 and 17, not only the out-of-plane deformation of the bottom wall part $2a$ but also local plastic deformation of the ridge portion $2d$ can be suppressed. In addition, it is preferable to determine whether the filling member is provided on the inner side of either one or both of the ridge portions $2d$ according to the collision safety performance and weight required for the frame 1. A thickness a ($a_1$ and $a_2$) in the Z-axis direction and a thickness c ($c_1$ and $c_2$) in the X-axis direction of the filling members $521a$, $521b$, and $521c$ are appropriately set.

Further, the filling members may be separately disposed to be in close contact with the inner surface of the center portion of the bottom wall part $2a$ and the insides of the ridge portions $2d$. When the filling members are disposed to be respectively in close contact with the inner surface of the center portion of the bottom wall part $2a$ and the insides of the ridge portions $2d$, the effect of suppressing the cross-sectional deformation of the frame 1 is sufficiently obtained.

In addition, the disposition of the filling members shown in FIGS. 16 and 17 can be similarly applied to the cross section of the frame 1 taken along cutting-plane line VI-VI of the frame 1 shown in FIG. 12. In this case, the filling members $521a$ to $521c$ are disposed in close contact with the insides of the ridge portions $2e$.

Figure 18:
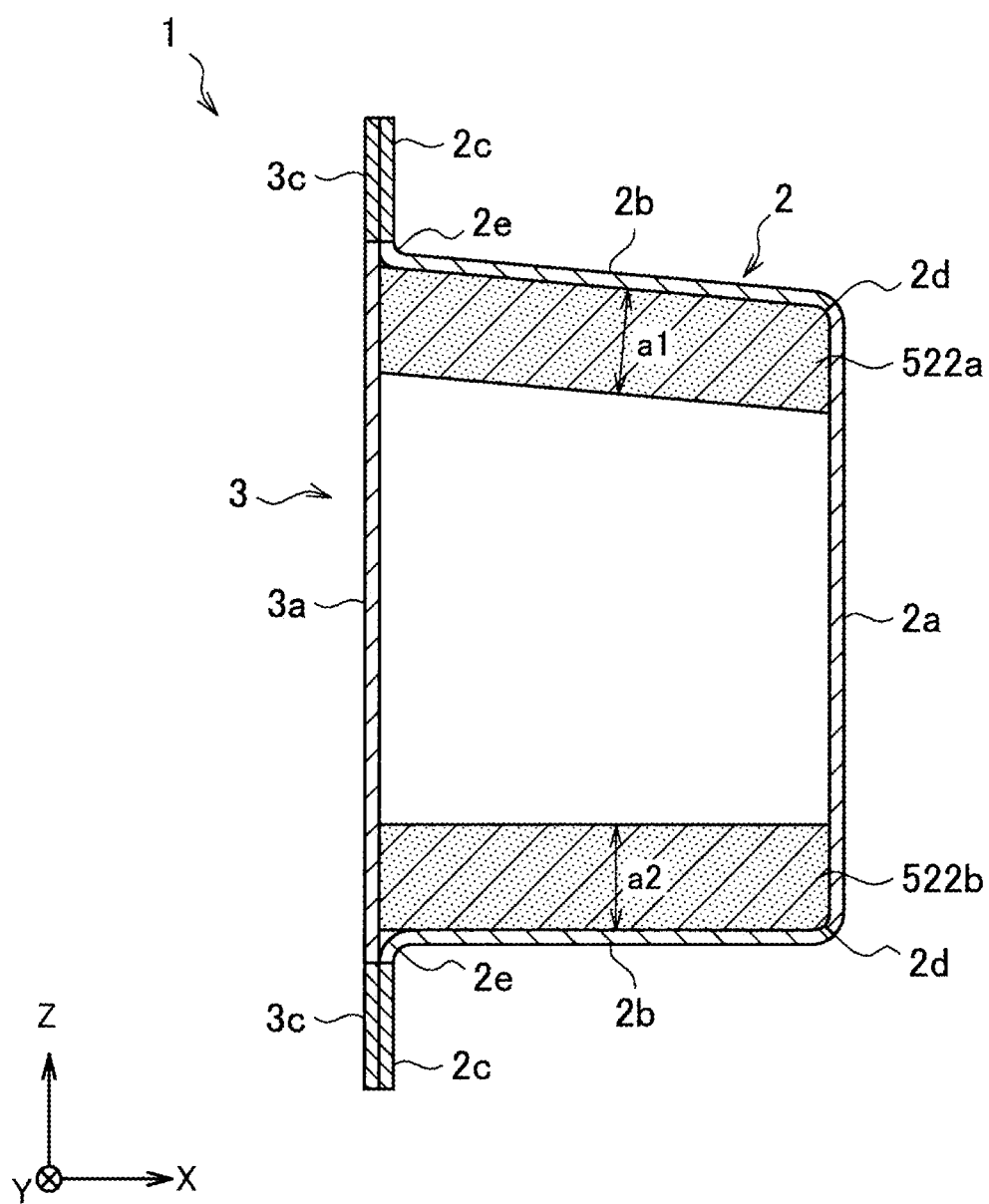
FIG. 18 is a cross-sectional view of the frame showing a modification example of the second disposition example of the filling member according to the embodiment.
Figure 19:
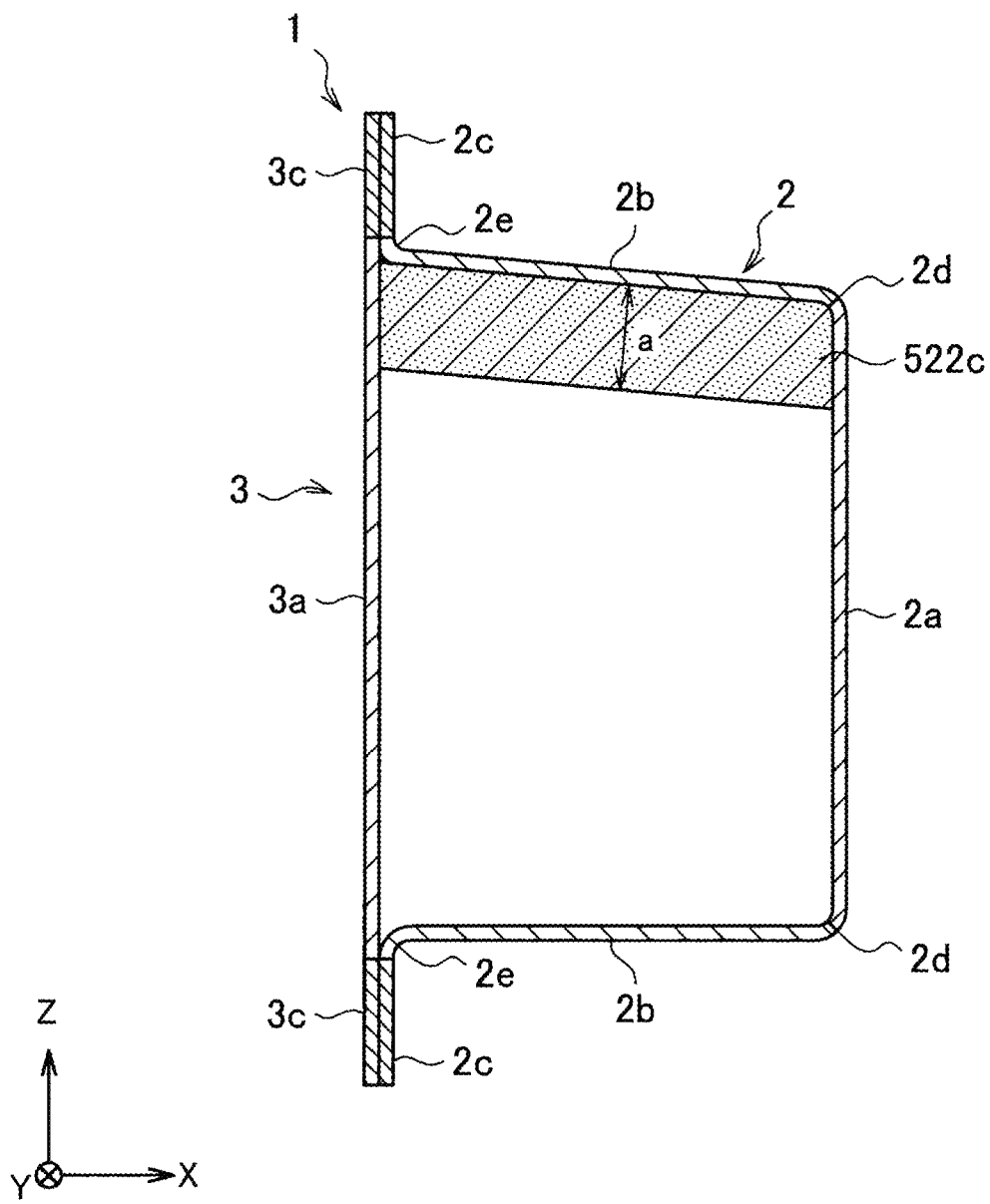
FIG. 19 is a cross-sectional view of the frame showing a modification example of the third disposition example of the filling member according to the embodiment.

The filling member may be disposed in close contact with not only the inner side of the ridge portion $2d$ but also the inner surface of the side wall part $2b$. FIGS. 18 and 19 are cross-sectional views of the frame 1 showing modification examples of the second disposition example and the third disposition example of the filling member according to the present embodiment. As shown in FIGS. 18 and 19, the filling members $522a$, $522b$, and $522c$ may be disposed in close contact with not only on the inner side of the ridge portion $2d$ but also the inner surfaces of the side wall parts $2b$. Furthermore, the filling members $522a$, $522b$, and $522c$ may be disposed in close contact with the inner sides of the ridge portions $2e$. Accordingly, the load bearing performance of the frame 1 can be made equal to or higher than that of the disposition examples shown in FIGS. 16 and 17. A thickness a ($a_1$ and $a_2$) of the filling members $522a$, $522b$, and $522c$ is appropriately set according to the load bearing performance and weight required for the frame 1.

(Fourth Disposition Example)

Figure 20:
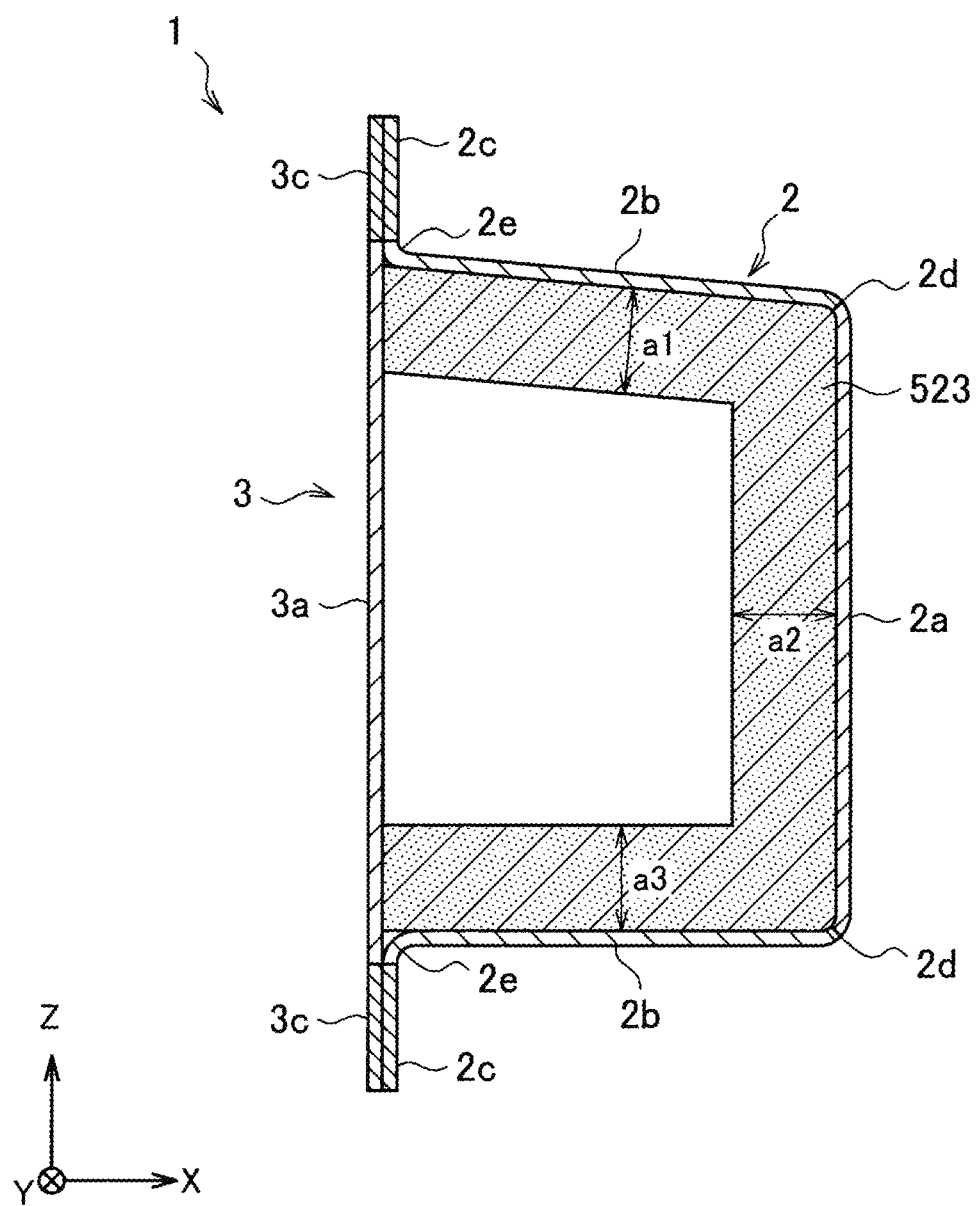
FIG. 20 is a cross-sectional view of the frame showing a fourth disposition example of the filling member according to the embodiment.

FIG. 20 is a cross-sectional view of the frame 1 showing the fourth disposition example of the filling member according to the present embodiment. The cross-sectional view shown in FIG. 20 corresponds to a cross section of the frame 1 taken along cutting-plane line V-V of the frame 1 shown in FIG. 12.

As shown in FIG. 20, a filling member 523 according to the present disposition example is disposed continuously in close contact with (preferably adhered to) the inner surfaces of the bottom wall part $2a$ and the pair of side wall parts $2b$. In the side wall part $2b$, falling in the out-of-plane direction is likely to occur due to bending of the frame 1. According to the disposition shown in FIG. 20, since the filling member 523 is disposed in close contact with the inner surface of the side wall part $2b$, the filling member 523 can suppress the out-of-plane deformation of the side wall parts $2b$. Even when bending occurs in the frame 1, since falling of the side wall part $2b$ in the out-of-plane direction is suppressed by the filling member 523 suppresses, collision energy is absorbed by collapse of the frame 1 while suppressing cross-sectional deformation of the frame 1. That is, not only the load bearing performance of the frame 1 but also the collision energy absorption properties of the frame 1 can be improved.

In addition, although the filling member 523 shown in FIG. 20 is disposed continuously in close contact with the pair of side wall parts $2b$ and the bottom wall part $2a$, the present invention is not limited to this example. For example, the filling member 523 may be separately disposed in close contact with the inner surfaces of the pair of side wall parts $2b$ and the bottom wall part $2a$, respectively. Alternatively, the filling member 523 may be disposed continuously in close contact with either one of the pair of side wall parts $2b$ and the bottom wall part $2a$. That is, the filling member 523 may be provided in an L-shape in a cross section orthogonal to the Y-axis direction. That is, as long as the filling member 523 is provided on either one of the pair of side wall parts $2b$ and the bottom wall part $2a$, not only the load bearing performance of the frame 1 but also the collision energy absorption properties of the frame 1 can be improved. The disposition position and the filling amount of the filling member can be appropriately set according to the collision safety performance and weight required for the frame 1. The thicknesses $a_1$, $a_2$, and $a_3$ of the filling member 523 shown in FIG. 20 can be appropriately set.

The disposition of the filling member shown in FIG. 20 can be similarly applied to the cross section of the frame 1 taken along cutting-plane line VI-VI of the frame 1 shown in FIG. 12. In this case, the filling member 523 is disposed continuously in close contact with the pair of side wall parts 2b and the top wall part 3a.

The disposition of the filling member according to the present embodiment shown in FIGS. 13 to 20 can also be applied to a frame formed by a hollow member that does not have a bending induction portion realized by a bent portion or a hole. For example, in a case where no bent portion is provided in the frame 1 shown in FIG. 11, the filling member 5 may be provided on the bottom wall part 2a and the top wall part 3a of the hollow member 10 along the longitudinal direction of the hollow member 10. Accordingly, even though bending occurs in the frame 1 such that the bottom wall part 2a or the top wall part 3a becomes a bend inside during a collision, the cross-sectional deformation of the frame 1 can be suppressed. That is, by disposing the filling member 5 in close contact with the inner surface of the hollow member 10 corresponding to a direction in which bending is not desirable, bending of the frame 1 at least in the direction can be suppressed.

4. Third Embodiment

A third embodiment is a form in which a resin material is disposed in a bending induction portion in close contact with the inner surface of at least one of a pair of side wall parts of a metal member.

<4.1. Configuration of Frame>

(Elements of Frame)

Figure 21:
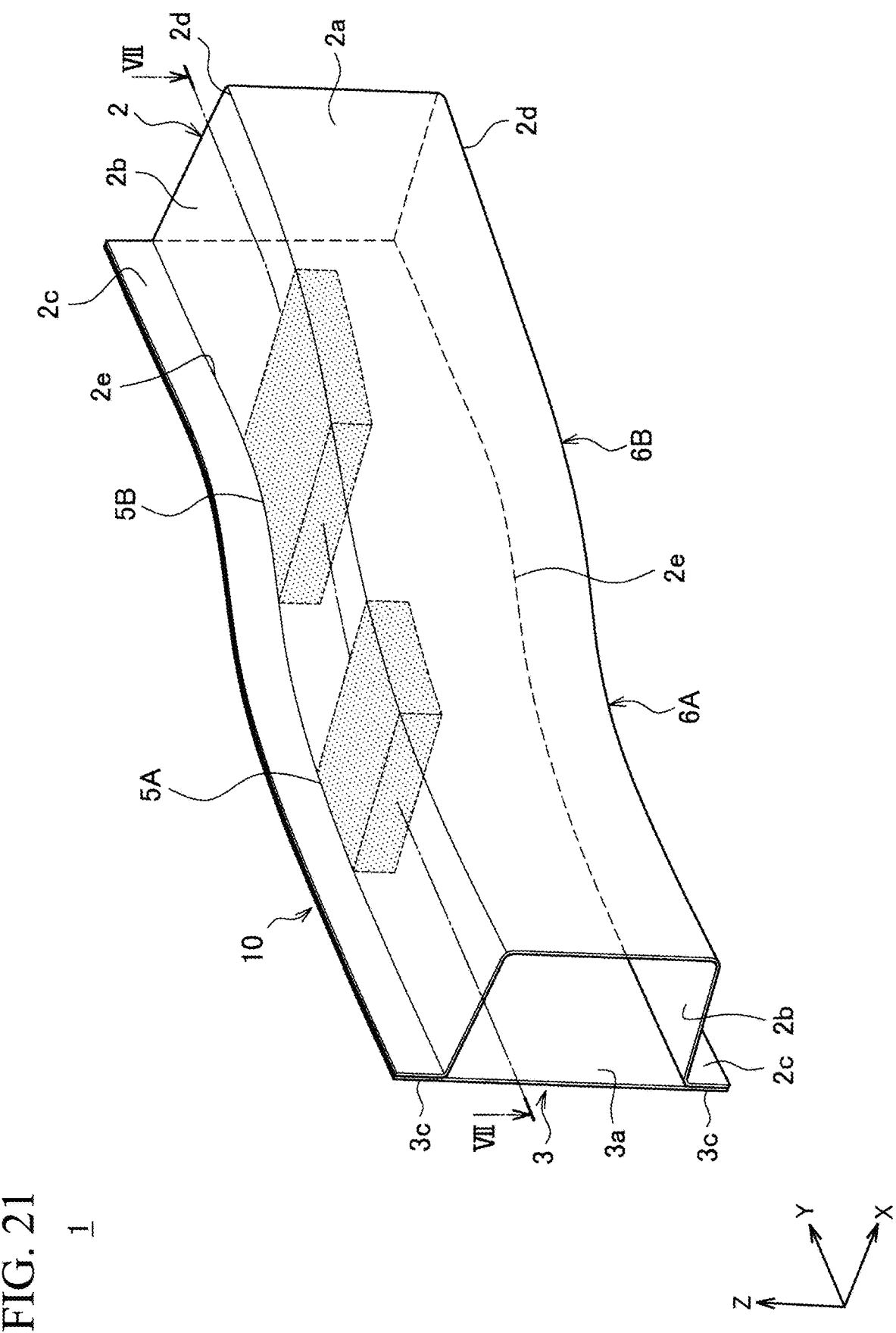
FIG. 21 is a perspective view showing a schematic configuration of an example of a frame according to a third embodiment of the present invention.

FIG. 21 is a perspective view showing a schematic configuration of an example of the frame 1 according to the third embodiment of the present invention. As shown in FIG. 21, the frame 1 according to the present embodiment includes the first structural member 2, the second structural member 3, and the filling member 5 (5A, 5B). The hollow member 10 according to the present embodiment is formed by the first structural member 2 and the second structural member 3. The configuration of the frame 1 shown in FIG. 21 is the same as that of the first embodiment described with reference to FIGS. 2 to 4 except for the absence of the reinforcement 4 and the disposition of the filling members 5. Hereinafter, an example of disposition of the filling members 5 inside the frame 1 according to the present embodiment will be described.

(Disposition of Filling Member)

Figure 22:
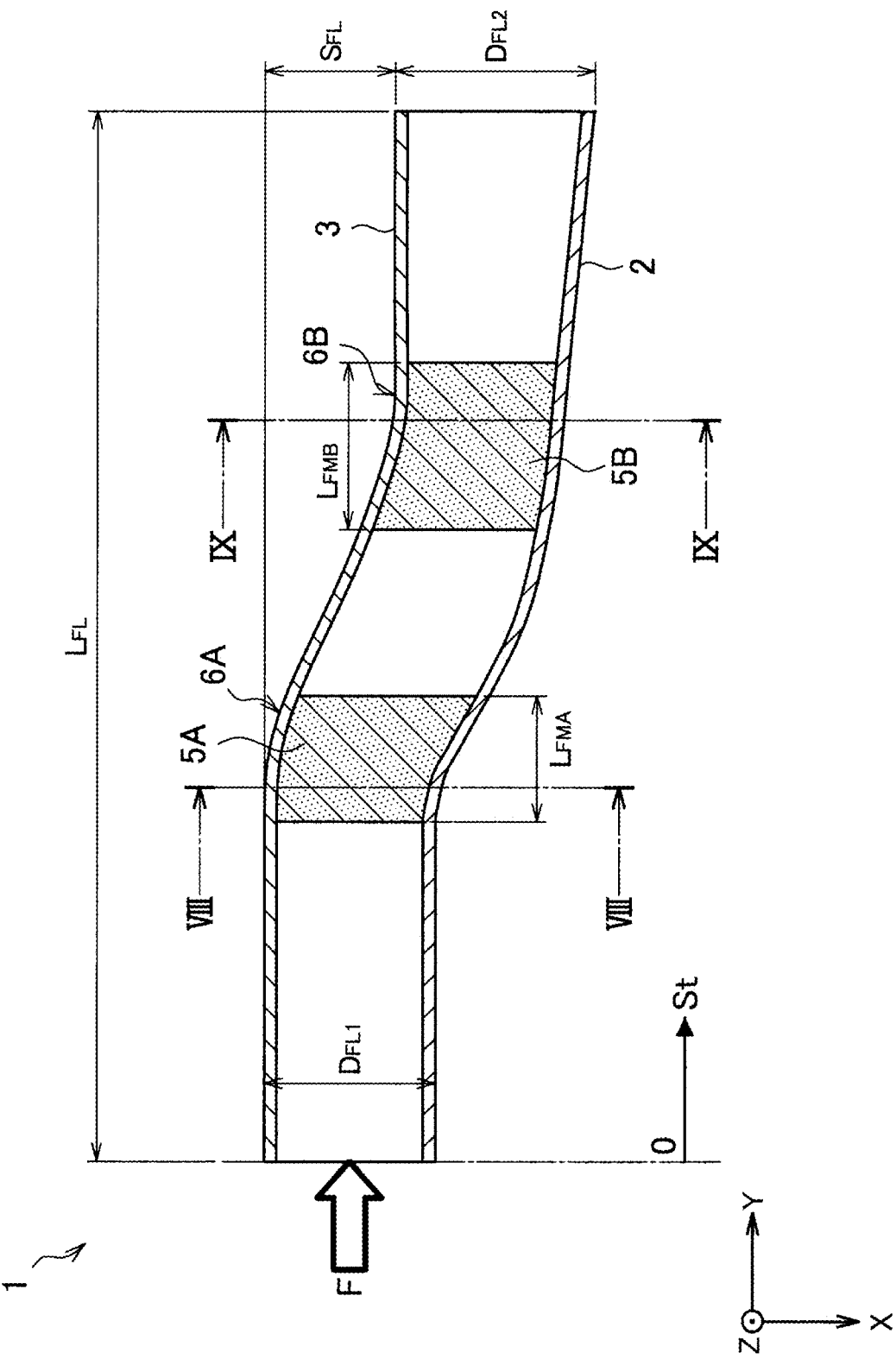
FIG. 22 is a sectional view showing a section orthogonal to the Z-axis direction of an example of the frame according to the embodiment.

FIG. 22 is a sectional view showing a section orthogonal to the Z-axis direction of an example of the frame 1 according to the present embodiment. The sectional view shown in FIG. 22 corresponds to a sectional view of the hollow member 10 taken along cutting-plane line VII-VII shown in FIG. 21. As shown in FIG. 22, the hollow member 10 is provided with the bent portion 6A that bends in a direction in which the bottom wall part 2a becomes a bend inside, and the bent portion 6B that bends in a direction in which the top wall part 3a becomes a bend inside. These bent portions 6 correspond to bending induction portions in the frame 1. As shown in FIGS. 21 and 22, the filling members 5A and 5B according to the present embodiment are disposed in close contact with the inner surfaces of portions of the side wall parts 2b where the bent portions 6A and the bent portions 6B are provided.

In addition, the definition of the symbol of each dimension attached regarding the frame 1 shown in FIG. 22 is as follows.

$L_{FL}$: Length of the hollow member 10 in the Y-axis direction (longitudinal direction).

$D_{FL1}$: Cross-sectional dimension in the X-axis direction at an end portion of the hollow member 10 on a collision side.

$D_{FL2}$: Cross-sectional dimension in the X-axis direction at the second end portion of the hollow member 10.

$S_{FL}$: Offset length of the second structural member 3 before and after the bent portion 6 in the longitudinal direction.

$L_{FMA}$, $L_{FMB}$: Lengths of the filling members 5A and 5B in the Y-axis direction.

Figure 23:
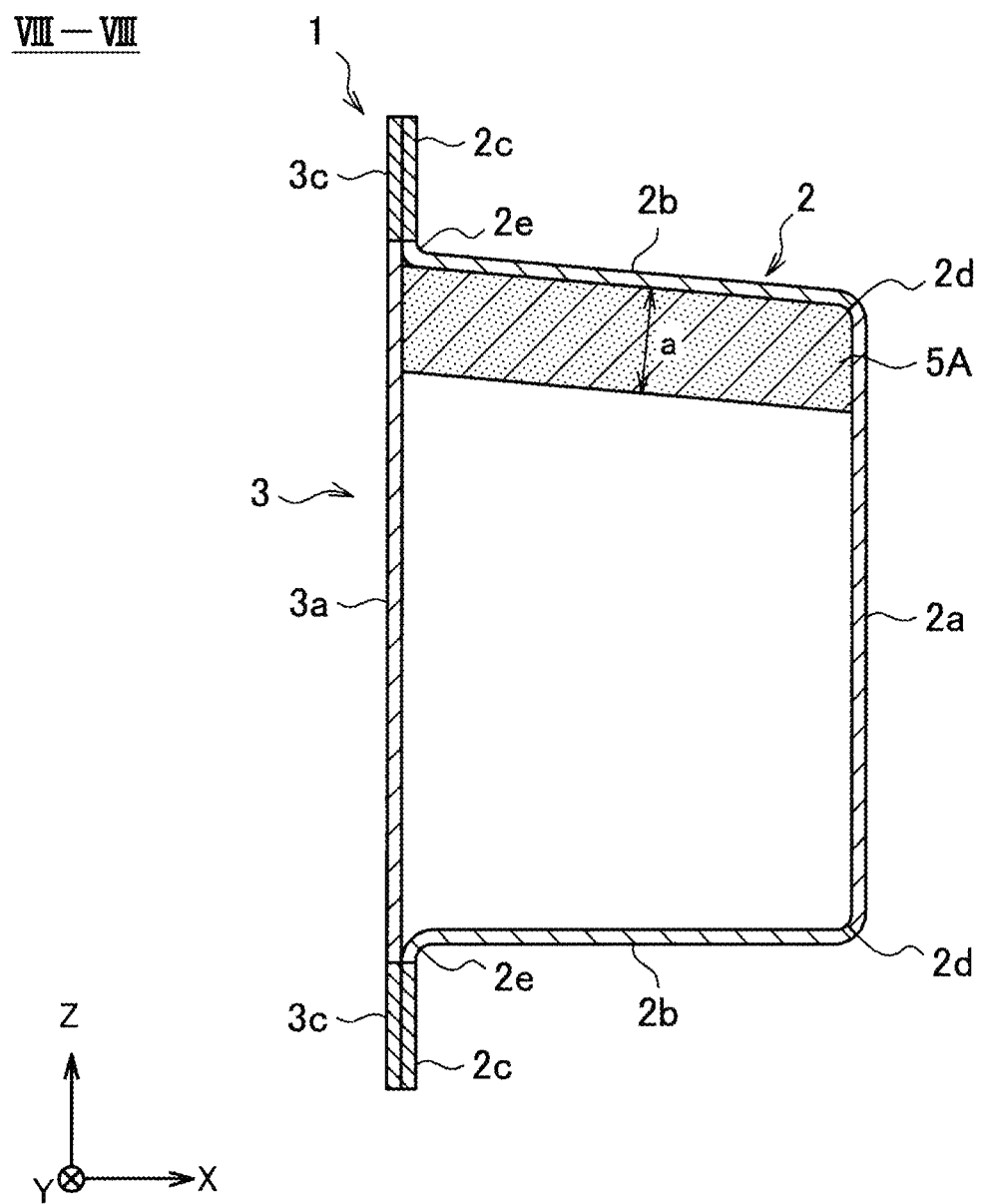
FIG. 23 is a cross-sectional view of the frame shown in FIG. 22 taken along cutting-plane line VIII-VIII.

FIG. 23 is a cross-sectional view of the frame 1 shown in FIG. 22 taken along cutting-plane line VIII-VIII. As shown in FIG. 23, the filling member 5A is disposed in close contact with (preferably adhered to) the inner surface of the side wall part 2b. Similarly, in the filling member 5B, in a cross section of the frame 1 shown in FIG. 22 taken along cutting-plane line IX-IX, the filling member 5B is disposed in close contact with the inner surface of the side wall part 2b.

With this disposition, the filling member 5A restrains the side wall part 2b, so that the out-of-plane deformation of the side wall part 2b can be suppressed. That is, in the bending deformation of the frame 1 occurring when a collision load is input to the frame 1, falling in the out-of-plane direction of the side wall part 2b on which the filling member 5A is disposed can be suppressed. Therefore, even after the bending deformation of the frame 1, the cross-sectional deformation of the frame 1 is suppressed, so that the collision energy absorption properties of the frame 1 can be enhanced. Furthermore, since the disposition of the filling member 5A is limited to the points that contribute to impact absorption, the hollow member does not become heavy.

In the example shown in FIG. 23, the filling member 5A is disposed continuously in close contact with the side wall part 2b and the bottom wall part 2a. That is, the filling member 5A is disposed in close contact with the inner side of the ridge portion 2d. When a collision load is input to the frame 1 and bending occurs in the bent portion 6A, plastic deformation locally occurs in the ridge portion 2d. Due to this plastic deformation, falling of the side wall part 2b in the out-of-plane direction is promoted. Therefore, by disposing the filling member 5A in close contact at such a position, local plastic deformation occurring in the ridge portion 2d can be suppressed. Accordingly, falling of the side wall part 2b in the out-of-plane direction can be suppressed. Accordingly, the collision energy absorption properties of the frame 1 can be improved more effectively.

As shown in FIG. 23, the filling member 5A may be disposed continuously in close contact with the side wall part 2b and the top wall part 3a. Accordingly, local plastic deformation occurring in the ridge portion 2e can be suppressed. As a result, the cross-sectional deformation of the hollow member 10 can be suppressed, and the collision safety performance of the frame 1 can be further enhanced. As shown in FIG. 23, the filling member 5A is preferably disposed in close contact with the inner side of at least one of the ridge portions 2d and 2e. At this time, the bent portion 6A is bent in a direction in which the bottom wall part 2a becomes a bend inside. On the bend inside, a force acts in a compression direction by the bending of the frame 1, so that plastic deformation is likely to occur in the ridge portion. Therefore, it is more preferable that the filling member 5A is disposed at least in close contact with the inner side of the ridge portion 2d present at the boundary between the bottom wall part 2a and the side wall part 2b.

In the example shown in FIG. 23, the filling member 5A is disposed on the inner surface of the side wall part 2b on the upper side in the figure, but may be disposed on the inner surface of the side wall part 2b on the lower side. A thickness a of the filling member 5A is not particularly limited, and the thickness a is appropriately set according to the collision energy absorption properties and weight required for the frame 1. In order to control the thickness a of the filling member 5A, for example, a sheet material such as a reinforcement (not shown) may be provided inside the hollow member 10.

In the present invention, close contact means arrangement with no gap. In particular, as the close contact, restrainable adhesion is most preferable. Even in a case where restraint is not achieved, the effect of the filling member 5 suppressing the out-of-plane deformation of at least one of the wall parts forming the hollow member 10 is exhibited. For example, it is assumed that a change in cross-sectional shape as shown in FIGS. 129 and 130 occurs in the frame 1 according to the present embodiment. In a case where the filling member 5 is adhered to the inner surface of the side wall part 2b, when the side wall part 2b undergoes out-of-plane deformation, the filling member 5 also follows the out-of-plane deformation of the inner surface. Therefore, the effect of suppressing the out-of-plane deformation of the side wall part 2b by the filling member 5 is remarkably exhibited. In addition, in a case where the filling member 5 and the inner surface of the side wall part 2b are disposed in close contact with each other without being restrained, when the side wall part 2b undergoes out-of-plane deformation, there are cases where the filling member 5 and the inner surface are partially separated from each other. However, even in a case where the inner surface undergoes out-of-plane deformation, the inner surface is in a state of being in contact with at least a portion of the filling member 5. Therefore, even though the filling member 5 and the inner surface are in a state of being in close contact with each other without being restrained, the effect of suppressing the out-of-plane deformation of the side wall part 2b by the filling member 5 is sufficiently exhibited.

Here, as the Young's modulus of the filling member 5 increases, the effect of suppressing the plastic deformation described above by the filling member 5 is increased. However, in order to increase the Young's modulus of the filling member 5, the resin needs to be formed at a high density. That is, when the Young's modulus of the filling member 5 is increased, the mass per unit volume of the filling member 5 increases. In the present embodiment, the place where the cross-sectional deformation occurs, that is, the place where the cross-sectional deformation has to be suppressed can be limited to the bent portion 6 or its periphery. For this reason, the place where the filling member 5 has to be disposed can be limited in anticipation of the place where the cross-sectional deformation occurs. That is, in the present embodiment, it is possible to reduce an increase in weight caused by the increase in the Young's modulus of the filling member 5. As described above, in the present embodiment, it is possible to improve the collision safety performance with high mass efficiency.

The disposition of the filling member 5A and the actions and effects of the disposition have been described above. The above-described actions and effects are similarly exhibited by the filling member 5B disposed inside the bent portion 6B.

As described above, in the frame 1 according to the present embodiment, the filling member 5 is disposed in close contact with the inner surface of the side wall part 2b included inside the bent portion 6 that is a bending induction portion. With this configuration, when a collision load is input to the frame 1 and bending deformation occurs in the frame 1, out-of-plane deformation of the side wall part 2b can be suppressed. Accordingly, even after the frame 1 is bent, the cross-sectional collapse of the frame 1 can be suppressed. Therefore, even in a case where the sheet thickness of the hollow member 10 is reduced in order to achieve a reduction in the weight of the vehicle body, by disposing the filling member 5 having a low mass density in the portion as described above, the collision energy absorption properties of the frame 1 can be maintained at a high level without greatly increasing the weight of the frame 1.

In the examples shown in FIGS. 21 and 22, the filling members 5A and 5B are separately provided in the bent portions 6A and 6B, respectively. However, one filling member 5 may be provided across the bent portions 6A and 6B. That is, as long as the filling member 5 is provided in close contact with the side wall part 2b included at least inside the bending induction portion, the disposition position and size of the filling member 5 in the longitudinal direction of the hollow member 10 are not particularly limited.

<4.2. Disposition Example of Filling Member>

The disposition of the filling members 5A and 5B according to the present embodiment has been described above. The disposition of the filling member 5 is not limited to the examples shown in FIGS. 21 to 23. Hereinafter, other disposition examples of the filling member 5 will be described.

In a first disposition example and a second disposition example described below, out-of-plane deformation of the side wall part 2b is suppressed by a filling member 530a or 531a disposed in close contact with the side wall part 2b. As a result, the cross-sectional deformation of the frame 1 can be suppressed.

(First Disposition Example)

Figure 24:
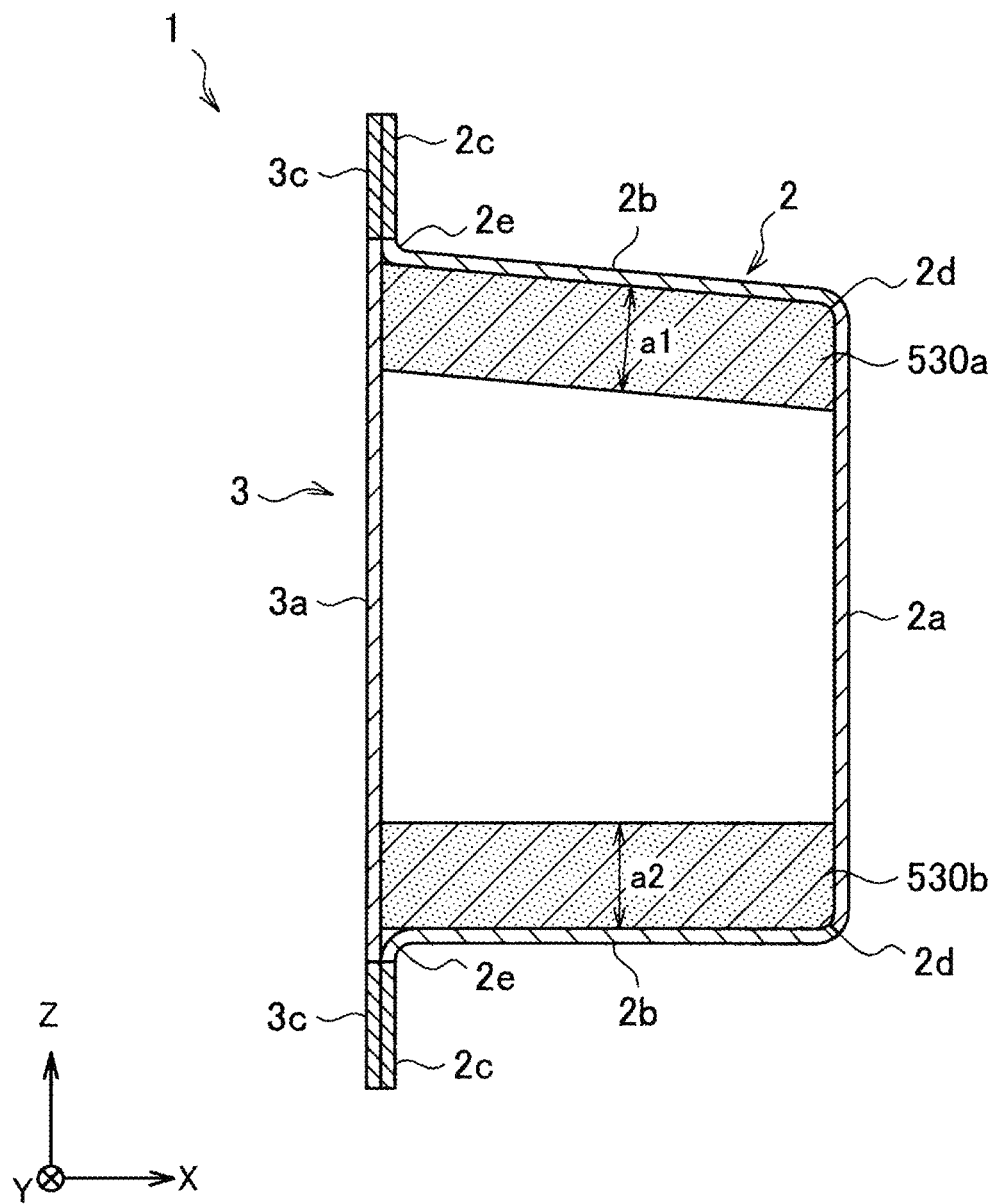
FIG. 24 is a cross-sectional view of the frame showing a first disposition example of a filling member according to the embodiment.

FIG. 24 is a cross-sectional view of the frame 1 showing the first disposition example of the filling member according to the present embodiment. The cross-sectional view shown in FIG. 24 corresponds to a cross section of the frame 1 taken along cutting-plane line VIII-VIII of the frame 1 shown in FIG. 22.

As shown in FIG. 24, the filling members 530a and 530b according to the present disposition example are disposed in close contact with (preferably adhered to) the inner surfaces of the pair of side wall parts 2b, respectively. With this disposition, the out-of-plane deformation of each of the side wall parts 2b can be suppressed, and falling of the side wall parts 2b in the out-of-plane direction can be prevented. That is, since the cross-sectional deformation of the frame 1 can be more reliably suppressed than the case where one filling member is disposed on one side wall part 2b, the collision energy absorption properties of the frame 1 can be further improved. Furthermore, the filling members 530a and 530b are disposed in close contact with the inner sides of the ridge portions 2d and 2e, respectively. Therefore, plastic deformation in each of the ridge portions can be suppressed, and the cross-sectional deformation of the frame 1 can be further suppressed.

However, providing the filling members 530a and 530b in the frame 1 increases the overall weight of the frame 1.

Therefore, it is preferable to determine whether the filling member is provided on the inner surface of one or both of the side wall part 2b according to the collision safety performance and weight required for the frame 1. A thickness $a_1$ of the filling member 530a and a thickness $a_2$ of the 530b are appropriately set.

The disposition of the filling member shown in FIG. 24 can be similarly applied to the cross section of the frame 1 taken along cutting-plane line IX-IX of the frame 1 shown in FIG. 22.

(Second Disposition Example)

Figure 25:
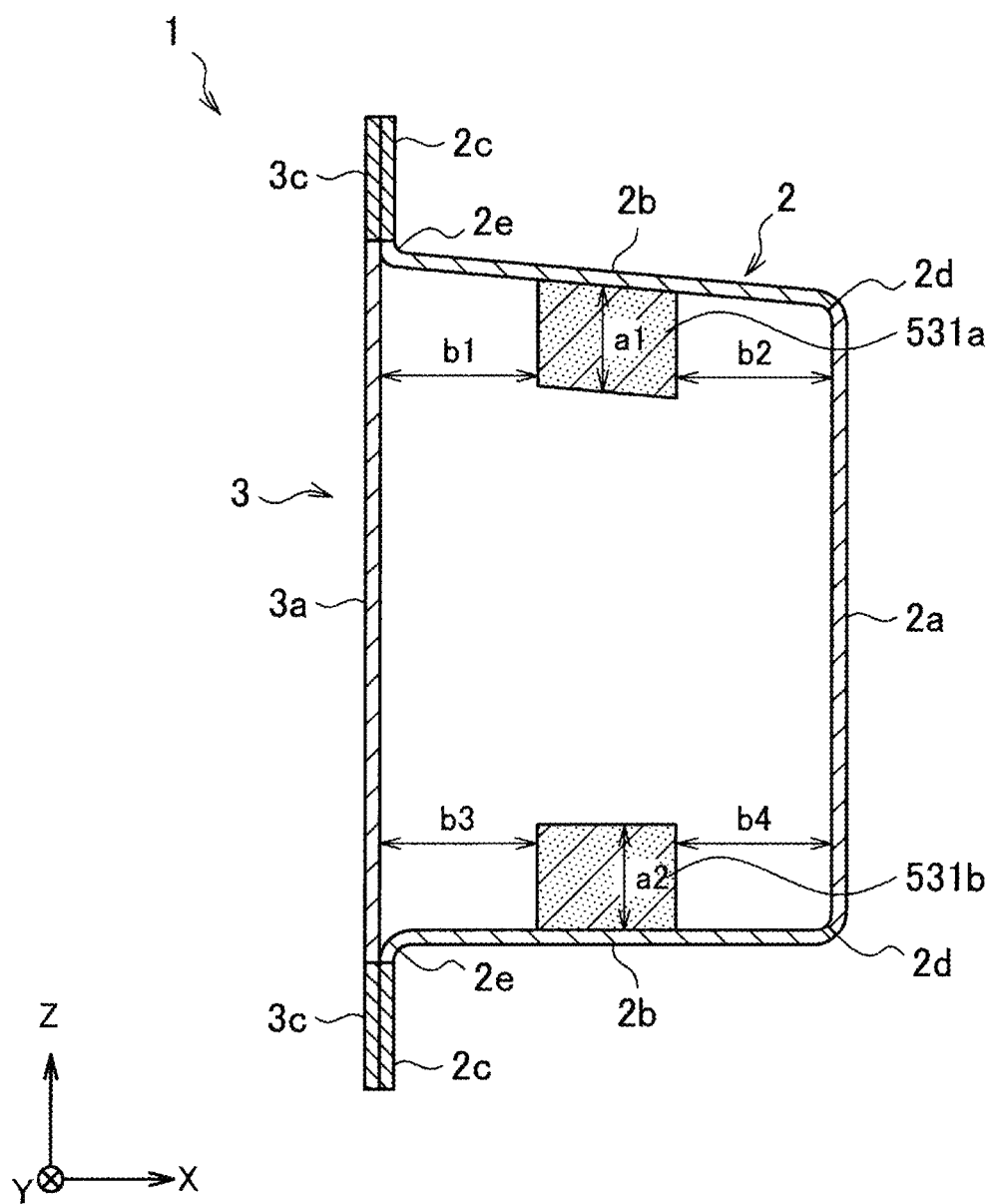
FIG. 25 is a cross-sectional view of the frame showing a second disposition example of the filling member according to the embodiment.

FIG. 25 is a cross-sectional view of the frame 1 showing the second disposition example of the filling member according to the present embodiment. The cross-sectional view shown in FIG. 25 corresponds to a cross section of the frame 1 taken along VIII-VIII of the frame 1 shown in FIG. 22.

As shown in FIG. 25, filling members 531a and 531b according to the present disposition example are disposed in close contact with (preferably adhered to) the center portions of the inner surfaces of the pair of side wall parts 2b, respectively. As described above, even if the filling members 531a and 531b are not disposed on the inner side of any of the ridge portions 2d and 2e, the out-of-plane deformation of each of the side wall parts 2b can be suppressed, and falling of the side wall parts 2b in the out-of-plane direction can be locally prevented. Therefore, the collision energy absorption properties of the frame 1 can be improved.

In the example shown in FIG. 25, the filling members 531a and 531b are disposed in close contact with the inner surfaces of the side wall parts 2b, respectively. However, the filling member may be disposed on the inner surface of only one of the side wall parts 2b. It is preferable to determine whether the filling member is provided on the inner surface of one or both of the side wall parts 2b according to the collision safety performance and weight required for the frame 1. A thickness $a_1$ of the filling member 531a and a thickness $a_2$ of the 531b, distances $b_1$ and $b_3$ of the filling member 531a on the side wall part 2b from the top wall part 3a, and distances $b_2$ and $b_4$ from the bottom wall part 2a can be appropriately set.

As described above, falling of the side wall part 2b in the out-of-plane direction is caused by plastic deformation of the ridge portion 2d (2e). Therefore, it is preferable that the filling member 5 disposed in close contact with the inner surface of the side wall part 2b is also disposed in close contact with the inner side of the ridge portion 2d (2e). Accordingly, the effect of suppressing the cross-sectional deformation of the frame 1 by the filling member can be further enhanced.

The disposition of the filling member shown in FIG. 25 can be similarly applied to the cross section of the frame 1 taken along cutting-plane line IX-IX of the frame 1 shown in FIG. 22.

The first disposition example and the second disposition example have been described above. In third to fifth disposition examples described below, the filling member is disposed in close contact with the side wall part 2b and the bottom wall part 2a to which the side wall part 2b is connected. Since the ridge portion 2d is restrained by the filling member, deformation of the ridge portion 2d is suppressed. As a result, the cross-sectional deformation of the frame 1 can be suppressed.

(Third Disposition Example)

Figure 26:
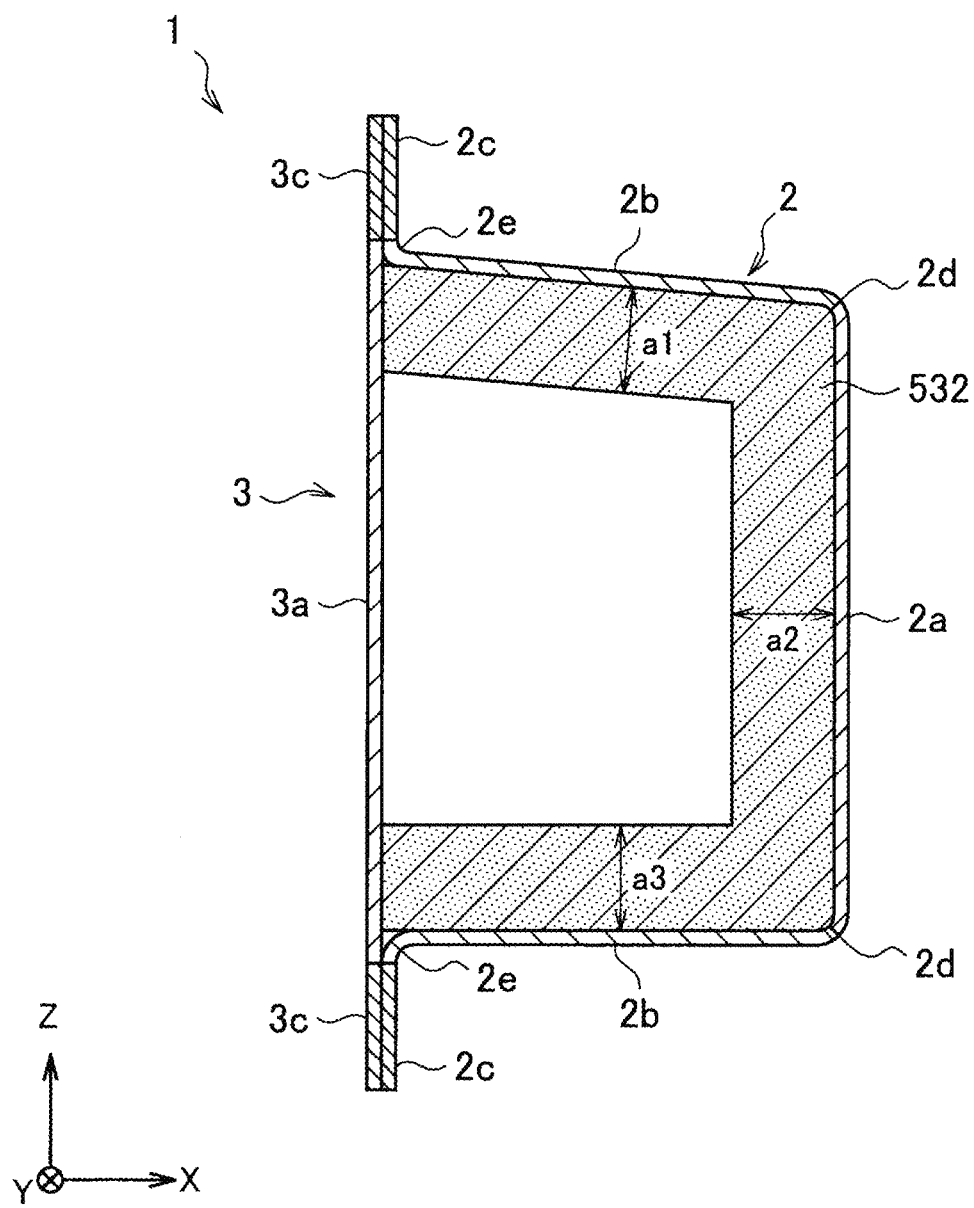
FIG. 26 is a cross-sectional view of the frame showing a third disposition example of the filling member according to the embodiment.

FIG. 26 is a cross-sectional view of the frame 1 showing the third disposition example of the filling member according to the present embodiment. The cross-sectional view shown in FIG. 26 corresponds to a cross section of the frame 1 taken along cutting-plane line VIII-VIII of the frame 1 shown in FIG. 22.

As shown in FIG. 26, a filling member 532 according to the present disposition example is disposed continuously in close contact with (preferably adhered to) the inner surfaces of the pair of side wall parts 2b and the bottom wall part 2a. At this time, since the bent portion 6A bends in a direction in which the bottom wall part 2a becomes a bend inside, the filling member 532 is disposed in a bend inside portion of the bent portion 6A. In the bottom wall part 2a that is the bend inside, a force acts in a compression direction by the bending of the frame 1, so that out-of-plane deformation is likely to occur. According to the disposition shown in FIG. 26, since the filling member 532 is also disposed in close contact with the inner surface of the bottom wall part 2a, the filling member 532 can suppress the out-of-plane deformation of the bottom wall part 2a. Accordingly, even if a high collision load acts on the frame 1, the cross-sectional collapse of the frame 1 can be suppressed. That is, not only the collision energy absorption properties of the frame 1 but also the load bearing performance of the frame 1 can be improved.

In addition, although the filling member 532 shown in FIG. 26 is disposed continuously in close contact with the pair of side wall parts 2b and the bottom wall part 2a, the present invention is not limited to this example. For example, the filling member 532 may be separately disposed in close contact with the inner surfaces of the pair of side wall parts 2b and the bottom wall part 2a, respectively. Alternatively, the filling member 532 may be disposed continuously in close contact with either one of the pair of side wall parts 2b and the bottom wall part 2a. That is, the filling member 532 may be provided in an L-shape in a cross section orthogonal to the Y-axis direction. That is, as long as the filling member 532 is provided on either one of the pair of side wall parts 2b and the bottom wall part 2a, not only the collision energy absorption properties of the frame 1 but also the load bearing performance of the frame 1 can be improved. The disposition position and the filling amount of the filling member can be appropriately set according to the collision safety performance and weight required for the frame 1. The thicknesses $a_1$, $a_2$, and $a_3$ of the filling member 532 shown in FIG. 26 can be appropriately set.

The disposition of the filling member shown in FIG. 26 can be similarly applied to the cross section of the frame 1 taken along cutting-plane line IX-IX of the frame 1 shown in FIG. 22. In this case, the filling member 532 is disposed continuously in close contact with the pair of side wall parts 2b and the top wall part 3a.

(Fourth Disposition Example)

Figure 27:
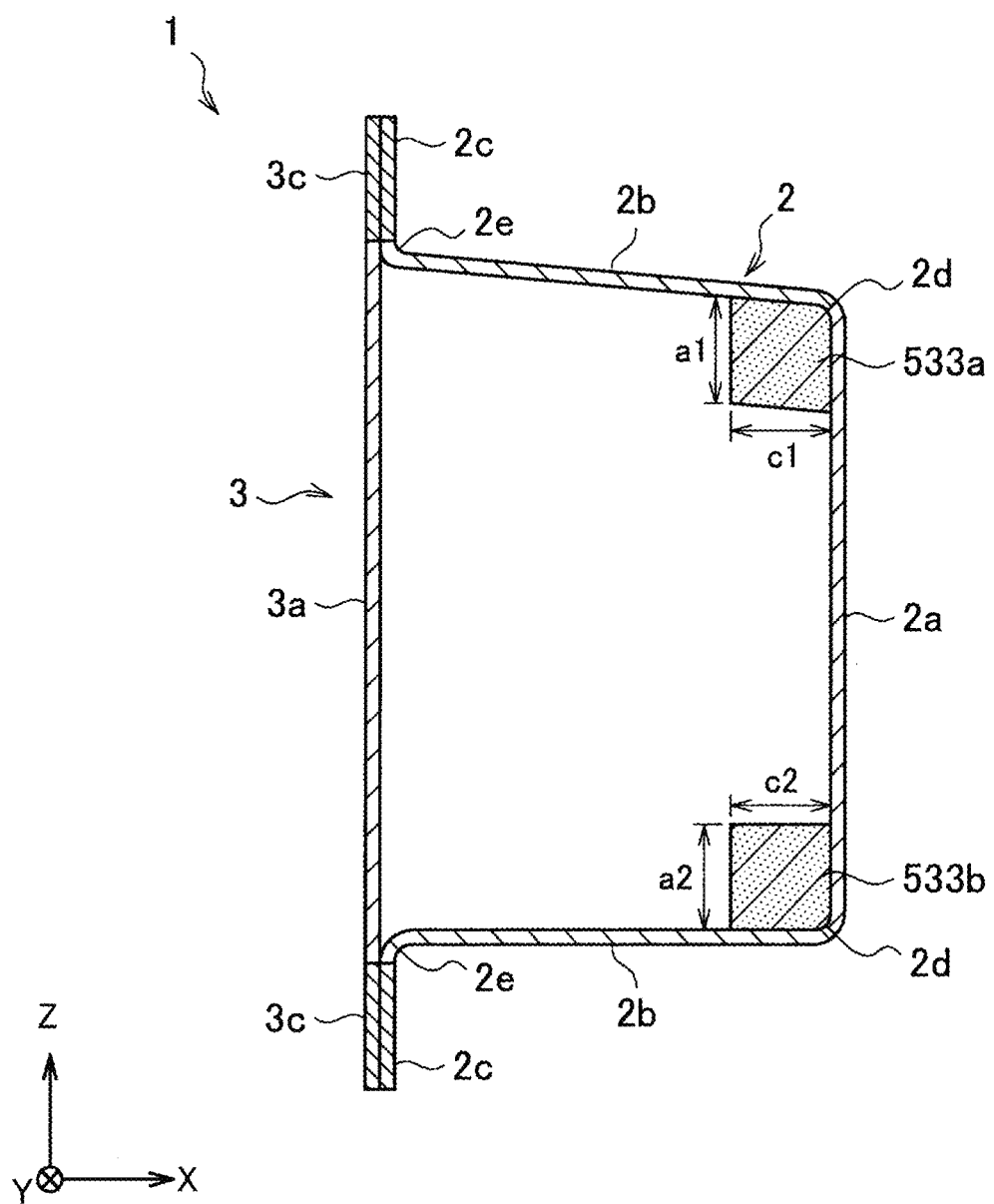
FIG. 27 is a cross-sectional view of the frame showing a fourth disposition example of the filling member according to the embodiment.

FIG. 27 is a cross-sectional view of the frame 1 showing the fourth disposition example of the filling member according to the present embodiment. The cross-sectional view shown in FIG. 27 corresponds to a cross section of the frame 1 taken along cutting-plane line VIII-VIII of the frame 1 shown in FIG. 22.

As shown in FIG. 27, the filling members 533a and 533b according to this disposition example are disposed in close contact (preferably bonded) inside each of the ridge portions 2d. With this disposition, local plastic deformation occurring in the ridge portion 2d can be suppressed. Accordingly, falling of the side wall part 2b in the out-of-plane direction can be reduced. Therefore, the cross-sectional deformation of the frame 1 can be suppressed, and the collision energy absorption properties of the frame 1 can be enhanced. In the example shown in FIG. 27, since the filling members 533a and 533b are disposed locally in close contact with the inner sides of the ridge portions 2d, the cross-sectional deformation of the frame 1 can be suppressed without substantially increasing the weight of the frame 1.

(Fifth Disposition Example)

Figure 28:
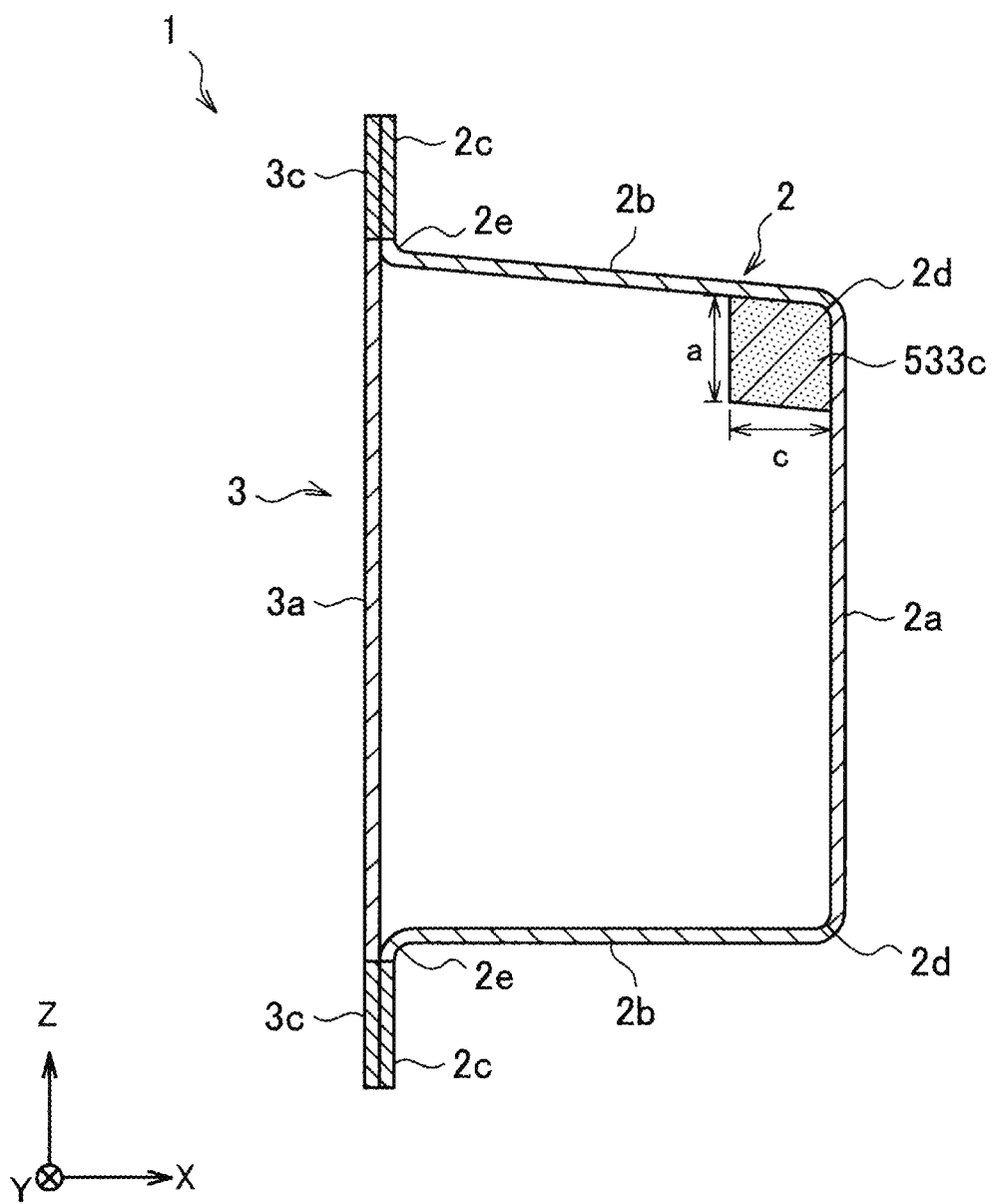
FIG. 28 is a cross-sectional view of the frame showing a fifth disposition example of the filling member according to the embodiment.

A filling member 533c according to the present embodiment may be disposed locally in close contact with (preferably adhered to) the inner side of at least one of the ridge portions 2d. FIG. 28 is a cross-sectional view of the frame 1 showing the fifth disposition example of the filling member according to the present embodiment. The cross-sectional view shown in FIG. 28 corresponds to a cross section of the frame 1 taken along cutting-plane line VIII-VIII of the frame 1 shown in FIG. 22.

As shown in FIG. 28, the filling member 533c according to the present disposition example is disposed locally in close contact with the inner side of one of the ridge portions 2d. Accordingly, local plastic deformation occurring in the ridge portion 2d on which the filling member 533c is disposed can be suppressed. Furthermore, the filling amount of the filling member can be reduced, so that the weight of the frame 1 can be prevented from increasing.

According to the disposition examples of the filling member shown in FIGS. 27 and 28, not only the out-of-plane deformation of the side wall part 2b but also local plastic deformation of the ridge portion 2d can be suppressed. Therefore, compared to the second disposition example shown in FIG. 25, falling of the side wall part 2b in the out-of-plane direction can be more effectively prevented.

In addition, it is preferable to determine whether the filling member is provided on the inner side of either one or both of the ridge portions 2d according to the collision safety performance and weight required for the frame 1. A thickness a ($a_1$ and $a_2$) in the Z-axis direction and a thickness c ($c_1$ and $c_2$) in the X-axis direction of the filling members 533a, 533b, and 533c are appropriately set.

Figure 29:
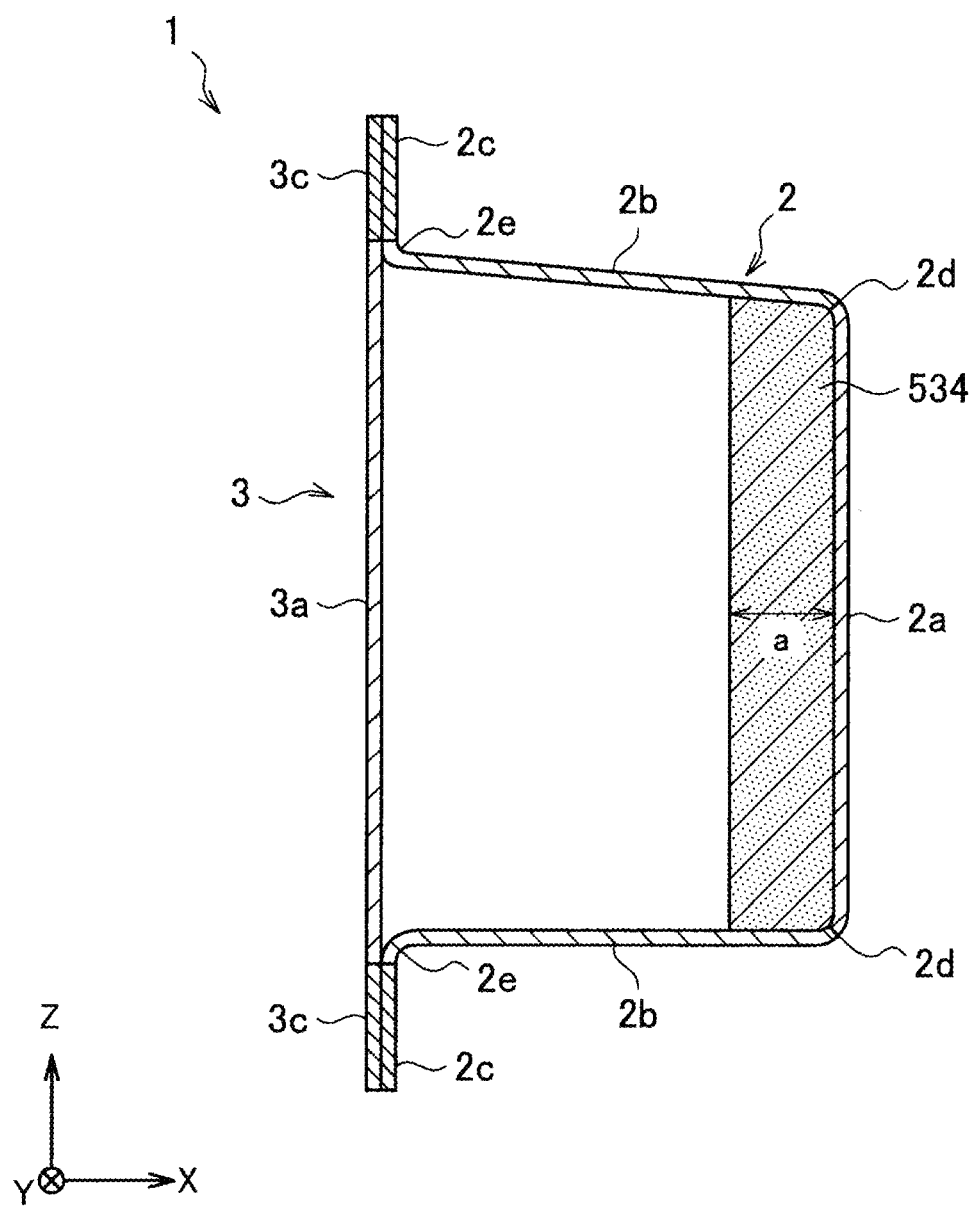
FIG. 29 is a cross-sectional view of the frame showing a modification example of the fourth disposition example and the fifth disposition example of the filling member according to the embodiment.

The filling member may be disposed in close contact with not only on the inner side of the ridge portion 2d but also the inner surface of the bottom wall part 2a. FIG. 29 is a cross-sectional view of the frame 1 showing a modification example of the fourth disposition example and the fifth disposition example of the filling member according to the present embodiment. As shown in FIG. 29, the filling member 534 may be disposed in close contact with not only the inner side of the ridge portion 2d but also the inner surface of the bottom wall part 2a. Accordingly, the collision energy absorption properties of the frame 1 can be made equal to or higher than those of the disposition examples shown in FIGS. 27 and 28. The magnitude of a thickness a of the filling member 534 are appropriately set according to the collision safety performance and weight required for the frame 1.

The dispositions of the filling members shown in FIGS. 27 to 29 can be similarly applied to the cross section of the frame 1 taken along cutting-plane line IX-IX of the frame 1 shown in FIG. 22. In this case, the filling members 533a, 533b, 533c, and 534 are disposed in close contact with the inner side of the ridge portion 2e (furthermore, the inner surface of the top wall part 3a regarding the filling member 534).

5. Fourth Embodiment

A fourth embodiment is a form in which a resin material is disposed in a bending induction portion through a hole provided in a first metal sheet forming the metal member.

As described in the first to third embodiments, by disposing the filling member 5 in the bending induction portion provided in the frame 1, it is possible to improve the amount of absorbed energy at the time of load input. However, in a case where bending deformation occurs in the frame 1, the frame 1 is likely to undergo out-of-plane deformation. Then, in a case where the adhesive force of the filling member 5 to the frame 1 is insufficient, there is concern that the filling member 5 may be peeled off from the inner wall of the frame 1 depending on the degree of deformation of the frame 1.

Figure 131:
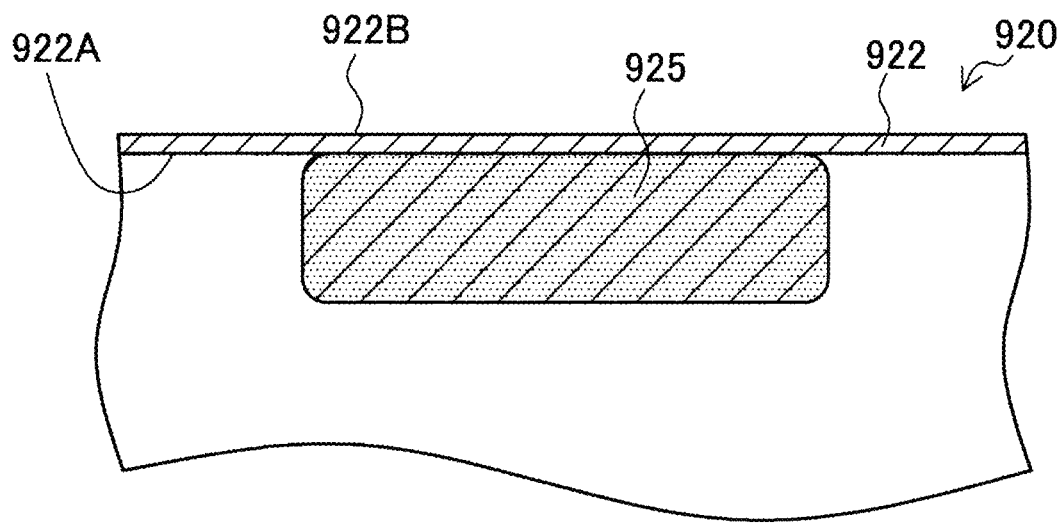

FIG. 131 is a partial cross-sectional view showing a configuration example of a frame 920 in which a filling member 925 is disposed. As shown in FIG. 131, the filling member 925 is disposed in close contact with an inner wall surface 922A of a wall part 922 of the frame 920. However, as shown in FIG. 132, when the wall part 922 is about to undergo out-of-plane deformation at a deformation position BP, if the adhesive force of the filling member 925 that has been filled and cured is insufficient, there is a possibility that the filling member 925 may be peeled off from the inner wall surface 922A due to the deformation of the wall part 922. In this case, the effect of suppressing the deformation of the wall part of the frame by the filling member is not sufficiently exhibited, and it becomes difficult to achieve the postulated collision performance.

Therefore, in the present embodiment, a technique is provided in which the filling member 5 can stably contribute to the collision safety performance.

5.1. First Example

Figure 30:
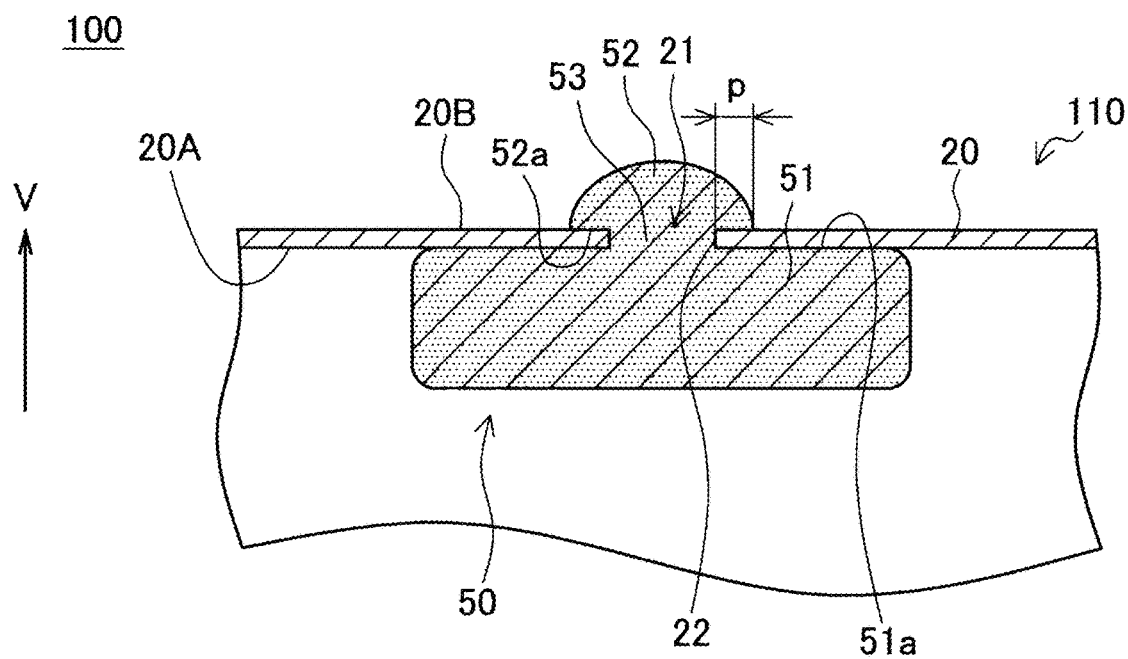
FIG. 30 is a partial cross-sectional view showing a configuration example of an example of a frame according to a fourth embodiment of the present invention.

FIG. 30 is a partial cross-sectional view showing a configuration example of an example of a frame 100 according to the fourth embodiment of the present invention.

As shown in FIG. 30, the frame 100 includes a hollow member 110 and a filling member 50.

Direction V (V1 and V2) shown in FIGS. 30 to 37 indicate the outside of the hollow member 110.

The hollow member 110 according to the present embodiment is an example of the metal member described above. Specifically, the hollow member 110 is a structural member having a wall part 20 extending in the longitudinal direction. The hollow member 110 has a so-called frame shape and is constituted by a plurality of wall parts 20. The wall part 20 according to the present embodiment is an example of the first metal sheet described above. The hollow member 110 may have a hollow closed cross-sectional structure, or may have an open cross-sectional structure such as a U-shape. Moreover, the shape of the cross section orthogonal to the longitudinal direction of the hollow member 110 is not particularly limited. For example, the cross-sectional shape of the hollow member 110 may be a rectangular cross section or a circular cross section.

The wall part 20 of the hollow member 110 is provided with at least one wall hole 21. A working method of the wall hole 21, and the number and shape of the wall hole 21 are not particularly limited. The wall hole 21 according to the present embodiment is an example of a hole.

The filling member 50 is an example of the resin material described above. The filling member 50 is made of a urethane-based, epoxy-based, or any other resin. The filling member 5 can be formed with a Young's modulus of a maximum of about 300 MPa in a case of a urethane-based resin, and a maximum of about 3000 MPa in a case of an epoxy-based resin. The filling member 50 may be a hard foamed filling member made of, for example, a foamed resin material. The foamed resin is installed inside the hollow member 110 and is cured by chemical changes. The Young's modulus of the filling member 50 is preferably 20 MPa or more. The Young's modulus of the filling member 50 can be changed according to the density of the resin forming the filling member 50. However, since formation becomes more difficult as the density is higher, the Young's modulus of the filling member 50 is preferably 300 to 400 MPa at the maximum.

When the filling member 50 is installed inside the hollow member 110, the filling member 50 is disposed so as to be in close contact with an inner wall surface 20A of the wall part 20. A portion of the filling member 50 that is in close contact with the inner wall surface 20A is referred to as a first filling portion 51. For example, the first filling portion 51 is formed by introducing a foamed resin to the inside of the hollow member 110. At this time, the first filling portion 51 is brought into close contact with the inner wall surface 20A at an abutting surface 51a. The first filling portion 51 is an example of a first reinforcing portion.

Furthermore, the filling member 50 is disposed to be in close contact with not only the inner side of the hollow member 110 but also an outer wall surface 20B of the wall part 20 through the wall hole 21. A portion of the filling member 50 that is in close contact with the outer wall surface 20B is referred to as a second filling portion 52. For example, the second filling portion 52 is formed by introducing a foamed resin to the inside of the hollow member 110 and allowing the foamed resin that has been foamed to swell through the wall hole 21 from the inside of the hollow member 110. At this time, the second filling portion 52 is brought into close contact with the outer wall surface 20B at an abutting surface 52a. The second filling portion 52 is an example of a second reinforcing portion.

Furthermore, a portion of the filling member 50 that is provided in close contact with the wall hole 21 is referred to as a third filling portion 53. That is, the filling member 50 is integrally formed by the first filling portion 51, the second filling portion 52, and the third filling portion 53. The first filling portion 51 and the second filling portion 52 are connected via the third filling portion 53. The third filling portion 53 is an example of a third reinforcing portion.

In addition, the second filling portion 52 in the filling member 50 is a portion of the filling member that has filled the inside of the hollow member 110, penetrated the wall hole 21, and leaked to the outside of the hollow member 110. For example, the second filling portion 52 is provided in close contact with the wall part 20 in a range of a distance p from a hole edge end 22 of the wall hole 21 in a cross-sectional view of the wall hole 21. In order to obtain sufficient adhesion of the second filling portion 52 to the outer wall surface 20B, for example, the distance p is preferably 5 mm or more.

With such a configuration, the filling member 50 passes through the wall hole 21 provided in the wall part 20 of the hollow member 110 and adheres to both surfaces of the wall part 20. Then, since the filling member 50 is mechanically caught in the wall hole 21, the filling member 50 is locked to the wall part 20. In this case, whether or not the filling member 50 falls off the wall part 20 is determined not by the adhesive force of the filling member 50 to the wall part 20 but by the tensile strength of the filling member 50. In general, since the tensile strength of the filling member 50 is significantly higher than the adhesive force of the filling member 50, the filling member 50 is less likely to fall off the wall part 20.

Figure 31:
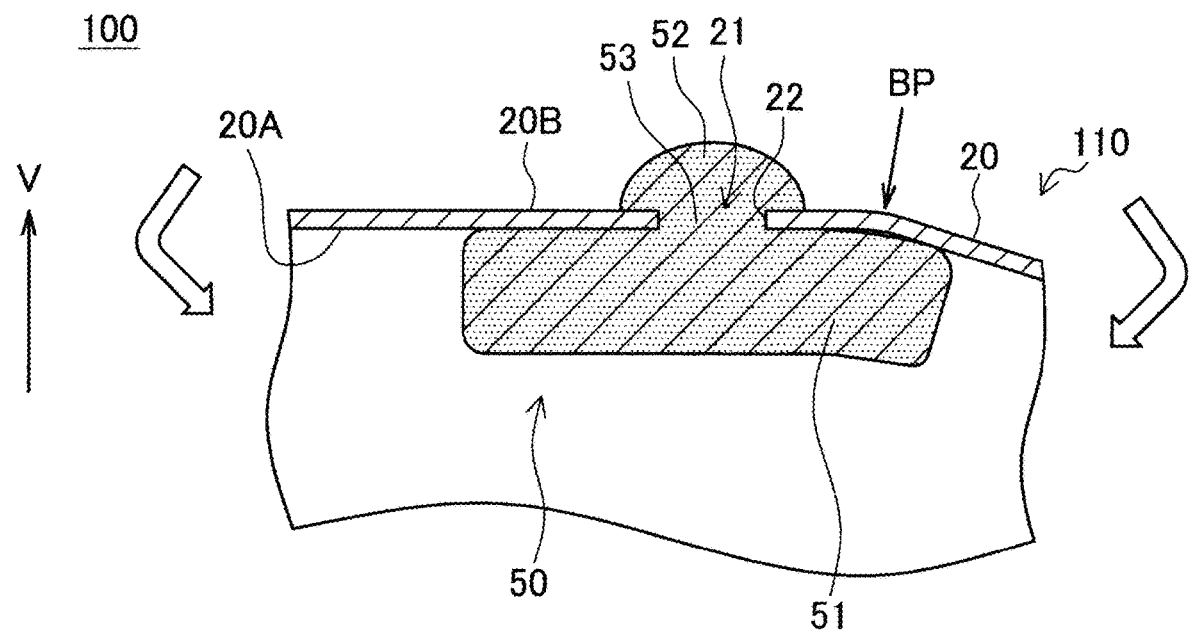
FIG. 31 is a partial cross-sectional view showing an example of an action of the frame according to the embodiment.

FIG. 31 is a partial cross-sectional view showing an example of an action of the frame 100 according to the present embodiment. In the configuration of the frame 100, it is assumed that a collision load is applied in the longitudinal direction of the hollow member 110. In this case, for example, as shown in FIG. 31, it is assumed that buckling that causes protrusion toward the outside of the hollow member 110 (direction V in the figure) occurs at the deformation position BP near the wall hole 21, and the wall part 20 acts to bend inward of the hollow member 110. In the present specification, inward is the direction opposite to the direction V in the figure, and means the direction toward the center of mass of the hollow member 110.

Here, the filling member 50 is locked to the wall part 20 by the second filling portion 52 that passes through the wall hole 21 and is connected to the first filling portion 51. Therefore, for example, even if the wall part 20 is to bend inward of the hollow member 110, since the first filling portion 51 follows the second filling portion 52, the first filling portion 51 is maintained in a state of being restrained by the wall part 20.

Then, even if the adhesive force of the filling member 50 to the wall part 20 on the inside of the hollow member 110 is not sufficiently secured, the filling member 50 is less likely to fall off the wall part 20. Accordingly, even if a force that causes out-of-plane deformation is exerted on the wall part 20 by a vehicle collision, the state in which the filling member 50 is in close contact with the wall part 20 of the hollow member 110 can be maintained. Accordingly, the first filling portion 51 of the filling member 50 restrains the deformation of the wall part 20 in the out-of-plane direction, so that the out-of-plane deformation of the wall part 20 can be suppressed. That is, the filling member 50 can stably contribute to the collision safety performance of the frame 100.

In addition, it is preferable that the third filling portion 53 which connects the first filling portion 51 to the second filling portion 52 is densely filled. This is because those densely filled suppress the displacement of the filling member 50 in the direction perpendicular to the axis of the wall hole 21 and contribute to prevention of peeling of the filling member 50. In addition, the third filling portion 53 that connects the first filling portion 51 to the second filling portion 52 may not necessarily fill the wall hole 21 densely. For example, the third filling portion 53 may not be in close contact with the hole edge end 22 of the wall hole 21. Even in this case, as long as the first filling portion 51 and the second filling portion 52 are connected, the state in which the filling member 50 is locked to the hollow member 110 is realized. Moreover, the inside of the filling member 50 may not necessarily be densely filled.

Modification Example

Next, a modification example of the configuration of the filling member 50 will be described.

Figure 32:
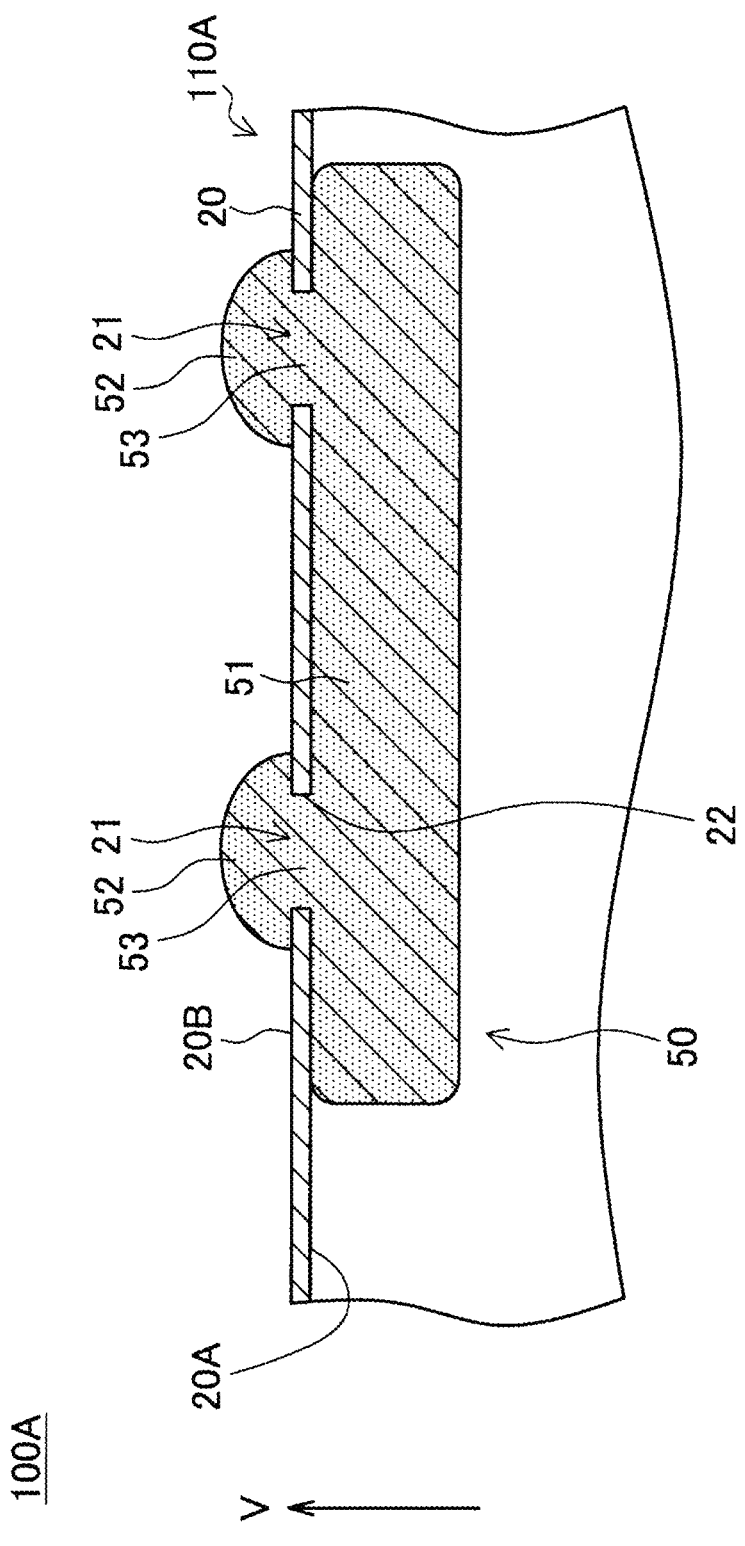
FIG. 32 is a partial cross-sectional view showing a configuration example of a frame according to a first modification example of the embodiment.

FIG. 32 is a partial cross-sectional view showing a configuration example of a frame 100A according to a first modification example of the present embodiment. As shown in FIG. 32, a plurality of wall holes 21 are provided in the wall part 20 of a hollow member 110A forming the frame 100A according to the present modification example. The filling member 50 is provided in close contact with the inner wall surface 20A and the outer wall surface 20B of the wall part 20 through the wall holes 21. That is, the filling member 50 is constituted by the first filling portion 51 that is in close contact with the inner wall surface 20A of the wall part 20, a plurality of the second filling portions 52 that are in close contact with the outer wall surface 20B of the wall part 20 at the positions of the plurality of wall holes 21, and the third filling portion 53 that is provided in close contact with each of the plurality of wall holes 21 and connects the first filling portion 51 to the plurality of second filling portions 52.

With this configuration, the number of portions for locking the filling member 50 to the wall part 20 increases according to the number of the wall holes 21 through which the filling member 50 passes. Accordingly, the filling member 50 can be more firmly fixed to the wall part 20.

Figure 33:
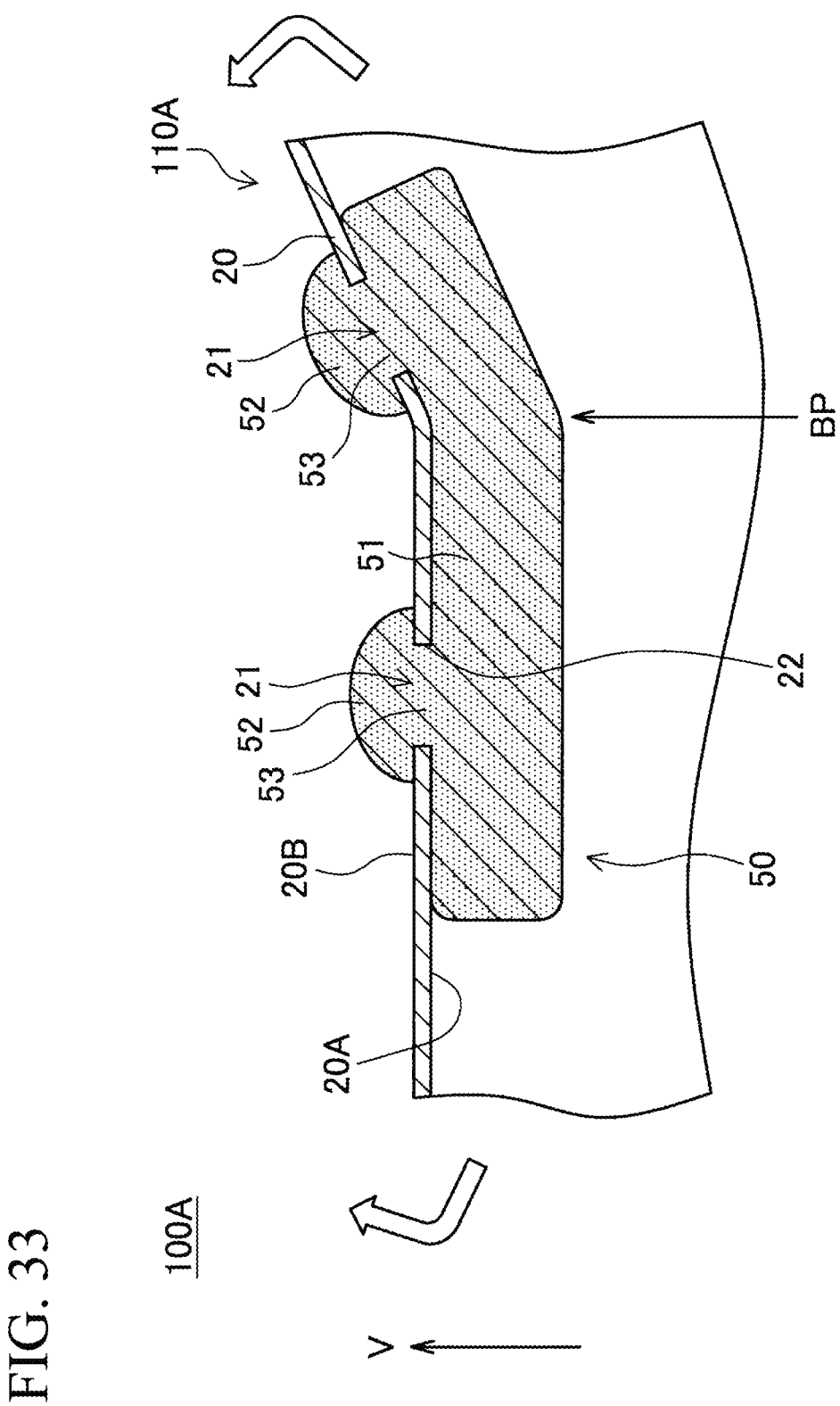
FIG. 33 is a partial cross-sectional view showing an example of an action of the frame according to the modification example.

Furthermore, with this configuration, the filling member 50 can follow the wall part 20 regardless of the direction in which the wall part 20 is about to bend. FIG. 33 is a partial cross-sectional view showing an example of an action of the frame 100A according to the present modification example. In the configuration of the frame 100A, it is assumed that a collision load is applied in the longitudinal direction of the hollow member 110A. In this case, for example, as shown in FIG. 33, buckling that causes protrusion inward of the hollow member 110A (the direction opposite to the direction V in the figure) occurs at the deformation position BP near the wall hole 21, and the wall part 20 is about to bend outward of the hollow member 11A.

In this case, in a case where the filling member 50 is simply brought into close contact with only the inner wall surface 20A of the wall part 20, as the wall part 20 tries to bend outward of the hollow member 110, the filling member 50 is peeled off from the inner wall surface 20A of the wall part 20. However, the filling member 50 is locked to the plurality of wall holes 21 by each of the second filling portions 52 connected through the plurality of wall holes 21. Then, in the example shown in FIG. 33, even if the wall part 20 is to bend outward, since the first filling portion 51 follows the second filling portion 52, the first filling portion 51 is maintained in a state of being restrained by the wall part 20.

Then, even if a force that causes out-of-plane deformation on the inside of the hollow member 110A is exerted by a vehicle collision, the state in which the filling member 50 is in close contact with the wall part 20 of the hollow member 110A can be maintained. Accordingly, the first filling portion 51 of the filling member 50 restrains the deformation of the wall part 20 in the out-of-plane direction, so that the out-of-plane deformation of the wall part 20 can be suppressed. That is, the filling member 50 can stably contribute to the collision safety performance of the frame 100A.

Figure 34:
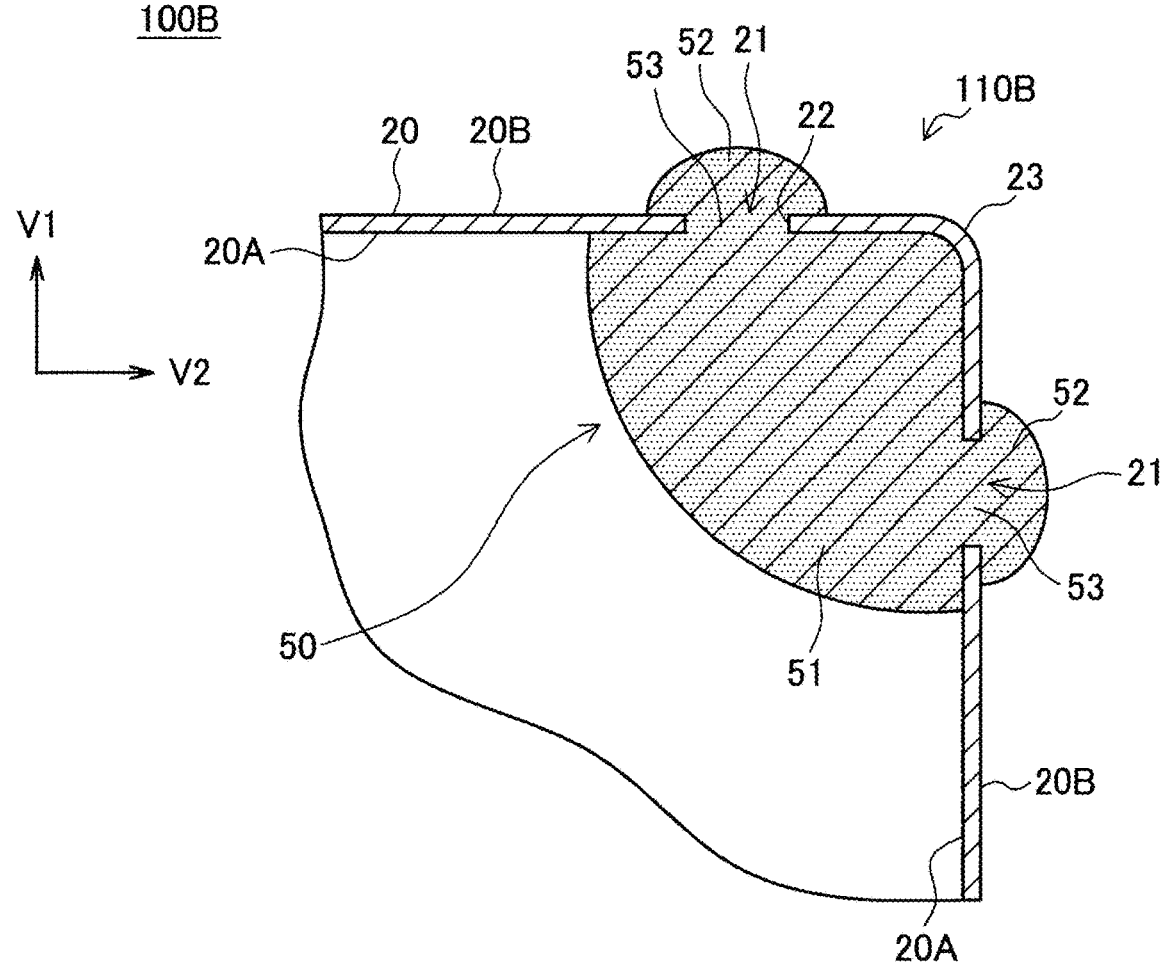
FIG. 34 is a partial cross-sectional view showing a configuration example of a frame according to a second modification example of the embodiment.

FIG. 34 is a partial cross-sectional view showing a configuration example of the frame 100B according to a second modification example of the present embodiment. As shown in FIG. 34, the first filling portion 51 of the filling member 50 according to the present modification example is disposed on the inner side of a ridge portion 23 of the wall part 20 of the hollow member 110A. In addition, the wall holes 21 are respectively provided on both sides of the ridge portion 23 of the wall part 20. The filling member 50 is provided in close contact with the inner wall surface 20A and the outer wall surface 20B of the wall part 20 through the wall holes 21.

When the wall part 20 of a hollow member 110B undergoes out-of-plane deformation, plastic deformation locally occurs in the ridge portion 23. Due to this plastic deformation, falling of the wall part 20 in the out-of-plane direction is promoted. Therefore, by disposing the filling member 50 in close contact with the inner side of the ridge portion 23, local plastic deformation occurring in the ridge portion 23 can be suppressed.

Furthermore, by fixing the filling member 50 to the wall part 20 with the above-described configuration, the filling member 50 can be prevented from falling off the wall part 20 due to plastic deformation occurring in the ridge portion 23. Therefore, the out-of-plane deformation of the wall part 20 can be more reliably suppressed.

The number of wall holes 21 provided in the wall part 20 is not particularly limited. It is desirable that the wall holes 21 are respectively provided the wall parts 20 with the ridge portion 23 interposed therebetween. Then, out-of-plane deformation of the hollow member 110B that causes the corner of the ridge portion 23 to open can be suppressed. By providing the wall holes 21 in the plurality of wall parts 20, the number of points where the first filling portion 51 and the second filling portion 52 of the filling member 50 are connected increases. Then, even though the first filling portion 51 and the second filling portion 52 are pulled by the deformation of the wall part 20, when the number of third filling portions 53 that are the connection portions is large, the load for each connection portion is distributed. Therefore, by increasing the number of wall holes 21, the fixing force of the filling member 50 to the wall part 20 can be increased. However, the rigidity of the hollow member 110 can be reduced by increasing the number of wall holes 21. Therefore, the number of wall holes 21 and the installation positions thereof may be appropriately determined according to the design.

Figure 35:
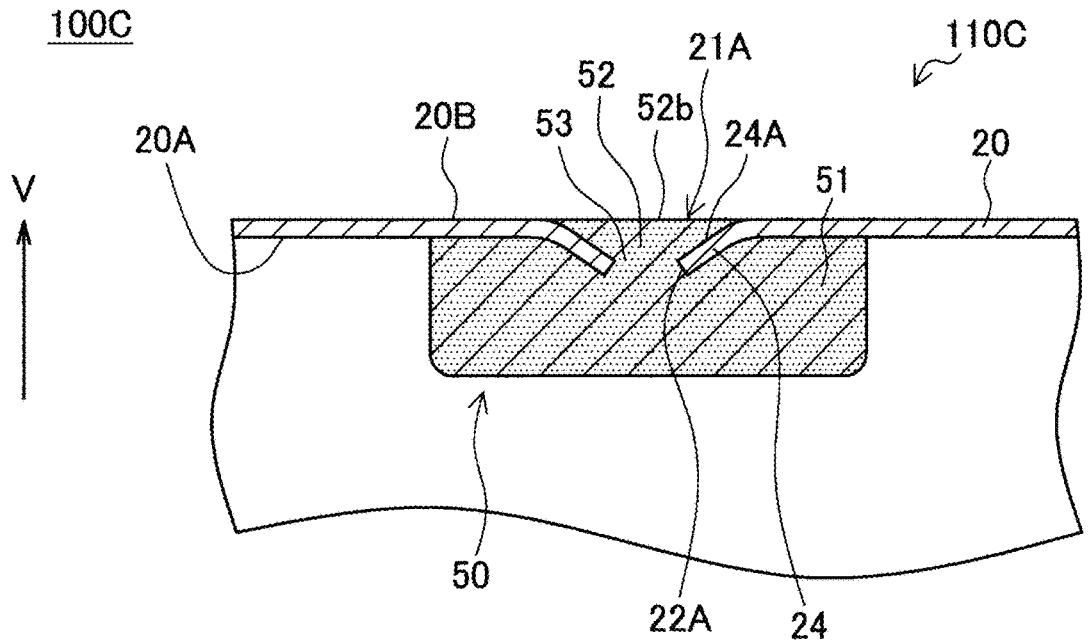
FIG. 35 is a partial cross-sectional view showing a configuration example of a frame according to a third modification example of the embodiment.

FIG. 35 is a partial cross-sectional view showing a configuration example of a frame 100C according to a third modification example of the present embodiment. As shown in FIG. 35, a hole edge end 22A of a wall hole 21A is located inward of a hollow member 110C from the wall part 20. Specifically, the wall part 20 includes an inclined portion 24 that is inclined inward of the hollow member 110C in the vicinity of the wall hole 21A.

Here, as shown in FIG. 35, the filling member 50 is disposed so as to be bitten by the inclined portion 24 and in close contact with the inner side and the outer side of the wall part 20. The second filling portion 52 is provided in close contact with an inclined surface 24A of the inclined portion 24 in the outer wall surface 20B of the wall part 20.

With this configuration, an outer side surface 52b of the second filling portion 52 and the outer wall surface 20B of the wall part 20 can be in a flush relationship. Then, even if the filling member 50 passes through the wall hole 21A from the inside of the wall part 20 and swells outward, the outer wall surface 20B of the wall part 20 can be made flat by removing the swollen portion. Therefore, interference with other members due to the swelling of the filling member 50 does not occur. Therefore, handling of the frame 100 is facilitated. For example, the second filling portion 52 is obtained by introducing a foamed resin to the inside of the hollow member 110C and cutting a portion of the foamed resin that passes through the wall hole 21A from the inside of the hollow member 110C and swells outward. Alternatively, the foamed resin protruding beyond the outer wall surface 20B may be pushed in by covering the wall hole 21A along the outer wall surface 20B before the foamed resin hardens. If there is no reason for cutting such as interference with other members, the portion of the second filling portion 52 swelling outward from the outer wall surface 20B of the wall part 20 may not be cut.

As shown in FIG. 35, since the filling member 50 is in close contact with the inclined portion 24 so as to cover the inclined portion 24, the inclined portion 24 exhibits a function of fixing the filling member 50 and the wall part 20 like an anchor bolt. Therefore, the filling member 50 is firmly fixed to the wall part 20.

Figure 36:
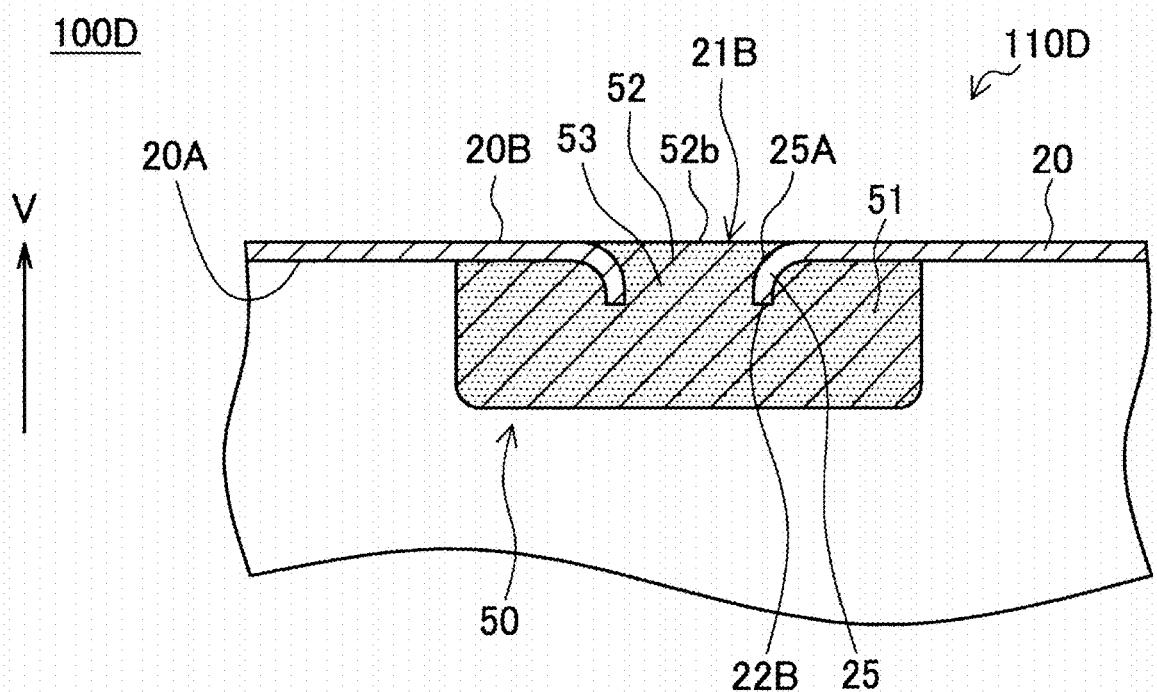
FIG. 36 is a partial cross-sectional view showing a configuration example of a frame according to a fourth modification example of the embodiment.

FIG. 36 is a partial cross-sectional view showing a configuration example of a frame 100D according to a fourth modification example of the present embodiment. As shown in FIG. 36, also in the present modification example, a hole edge end 22B of a wall hole 21B is located inward of a hollow member 110D from the wall part 20. Specifically, the wall part 20 includes a protrusion portion 25 from which a hole edge end 22B protrudes from the outside toward the inside of the wall part 20. That is, the wall hole 21 is a burring hole. Such a burring hole is formed by, for example, a known burring process.

Here, as shown in FIG. 36, the filling member 50 is disposed so as to be bitten by the protrusion portion 25 and in close contact with the inner side and the outer side of the wall part 20. The second filling portion 52 is provided in close contact with an outer surface 25A of the protrusion portion 25 in the outer wall surface 20B of the wall part 20.

With this configuration, as in the third modification example, the outer side surface 52b of the second filling portion 52 and the outer wall surface 20B of the wall part 20 can be in a flush relationship. That is, even if the filling member 50 passes through the wall hole 21B from the inside of the wall part 20 and swells outside, the outer wall surface 20B of the wall part 20 can be made flat. Then, interference with other members due to the swelling of the filling member 50 does not occur. Alternatively, the foamed resin protruding beyond the outer wall surface 20B may be pushed in by covering the wall hole 21B along the outer wall surface 20B before the foamed resin hardens. If there is no reason for cutting such as interference with other members, the portion of the second filling portion 52 swelling outward from the outer wall surface 20B of the wall part 20 may not be cut.

As shown in FIG. 36, since the filling member 50 is in close contact with the protrusion portion 25 so as to cover the protrusion portion 25, the protrusion portion 25 exhibits a function of fixing the filling member 50 and the wall part 20 like an anchor bolt. Therefore, the filling member 50 is firmly fixed to the wall part 20.

Figure 37:
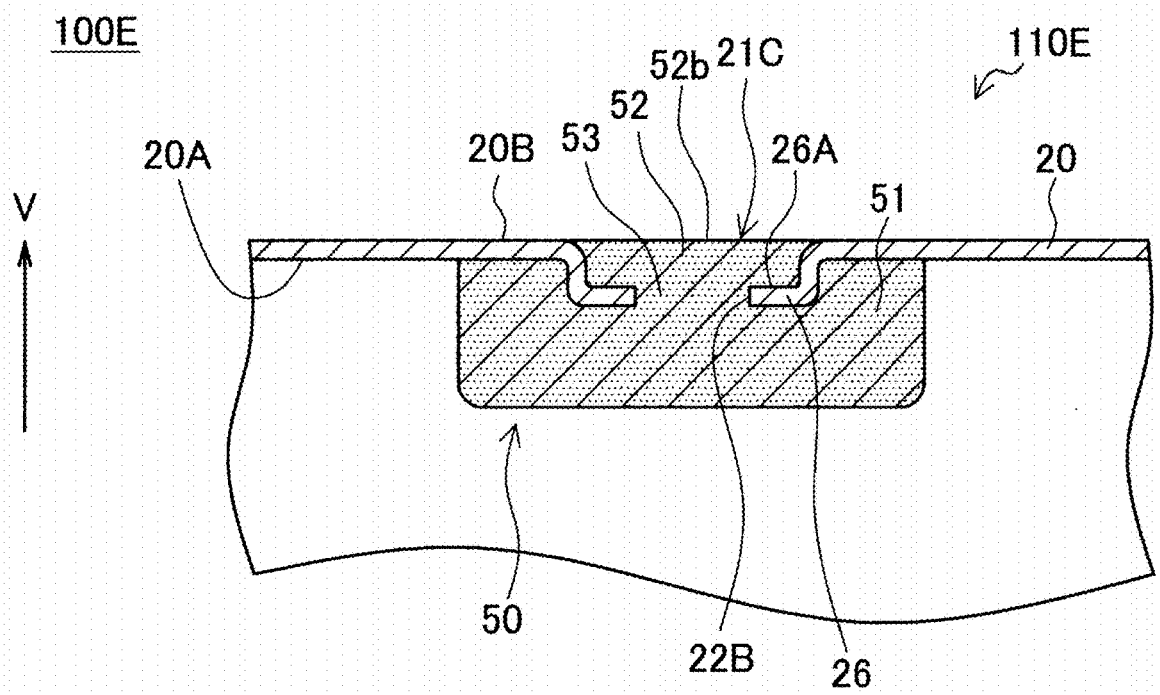
FIG. 37 is a partial cross-sectional view showing a configuration example of a frame according to a fifth modification example of the embodiment.

FIG. 37 is a partial cross-sectional view showing a configuration example of a frame 100E according to a fifth modification example of the present embodiment. As shown in FIG. 37, the wall part 20 according to the present modification example is provided with a recess portion 26 that is recessed inward of a hollow member 110E from the wall part 20. A wall hole 21C is provided in the inner portion of the recess portion 26.

Here, as shown in FIG. 37, the filling member 50 is disposed so as to be bitten by the recess portion 26 and in close contact with the inner side and the outer side of the wall part 20. The second filling portion 52 is provided in close contact with an outer surface 26A of the recess portion 26 in the outer wall surface 20B of the wall part 20.

With this configuration, as in the third and fourth modification examples, the outer side surface 52b of the second filling portion 52 and the outer wall surface 20B of the wall part 20 can be in a flush relationship. That is, even if the filling member 50 passes through the wall hole 21C from the inside of the wall part 20 and swells outside, the outer wall surface 20B of the wall part 20 can be made flat. Then, interference with other members due to the swelling of the filling member 50 does not occur. Alternatively, the foamed resin protruding beyond the outer wall surface 20B may be pushed in by covering the recess portion 26 along the outer wall surface 20B before the foamed resin hardens. If there is no reason for cutting such as interference with other members, the portion of the second filling portion 52 swelling outward from the outer wall surface 20B of the wall part 20 may not be cut.

As shown in FIG. 37, since the filling member 50 is in close contact with the recess portion 26 so as to cover the recess portion 26, the recess portion 26 exhibits a function of fixing the filling member 50 and the wall part 20 like an anchor bolt. Therefore, the filling member 50 is firmly fixed to the wall part 20.

The shapes of the wall parts 20 in the vicinity of the wall holes 21 according to the third to fifth modification examples may be combined with each other. For example, a recess portion may be provided in the wall part 20, a wall hole may be provided inside the recess portion, and burring may be performed on the wall hole. Furthermore, other components may be attached to the wall part 20 instead of the recess portion 26. Requirements for the other components are to provide a convex-recessed portion or a protrusion portion that meshes with the filling member 50, and to be disposed to be fixed to the hollow member 110 around the wall hole of the wall part 20 and inside the hollow member 110. For example, a wall hole may be provided in the wall part 20, and a nut may be disposed coaxially with a threaded hole and the wall hole and joined to the inside of the hollow member 110. In this case, the convex-recessed of the threaded hole mesh with the filling member 50, so that the filling member can be fixed. In addition, the hexagonal shape of the nut can prevent the filling member 50 from rotating around the nut.

5.2. Second Example

Next, as a second example of the present embodiment, a specific configuration of the frame 1 to which the configurations of the hollow member 110 and the filling member 50 according to the first example described above are applied will be described.

Figure 38:
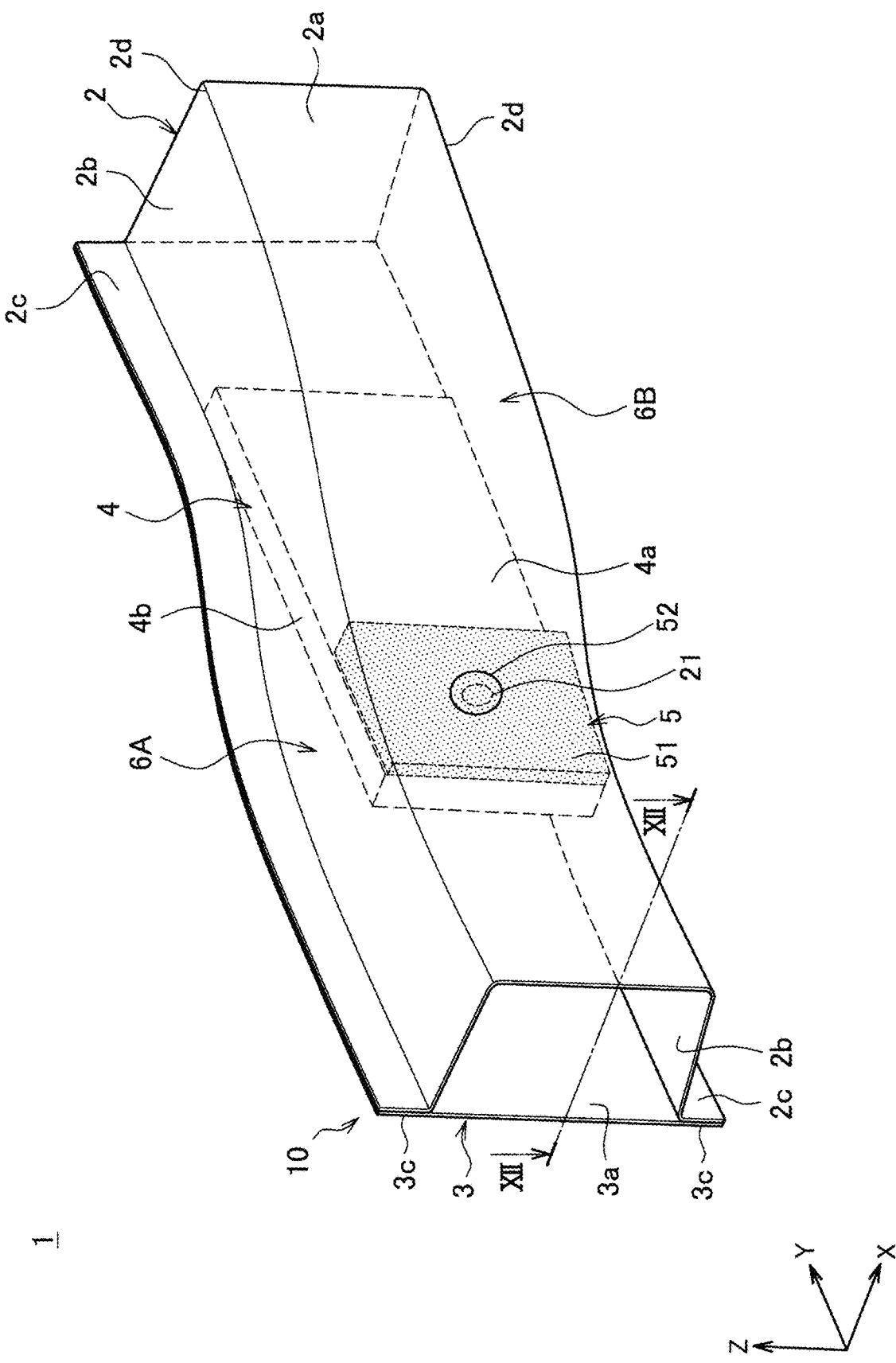
FIG. 38 is a perspective view showing a schematic configuration of an example of the frame according to the fourth embodiment of the present invention.

FIG. 38 is a perspective view showing a schematic configuration of an example of the frame 1 according to the fourth embodiment of the present invention. As shown in FIG. 38, the frame 1 according to the present embodiment includes the first structural member 2, the second structural member 3, the reinforcement 4, and the filling member 5. A hollow member 10 according to the present embodiment is formed by the first structural member 2 and the second structural member 3.

The configuration of the frame 1 shown in FIG. 38 is as described in the first embodiment with reference to FIGS. 2 to 4 except that the filling member 5 has the configuration of the filling member 50 described in the first example. Specifically, as shown in FIG. 38, the filling member 5 is disposed between the bottom wall part 2a of the hollow member 10 and the reinforcement 4 in the bent portion 6 that is the bending induction portion of the hollow member 10. Furthermore, as shown in FIG. 38, in the vicinity of the bent portion 6, the wall hole 21 is provided in the bottom wall part 2a, and the filling member 5 is configured to include the first filling portion 51 that passes through the wall hole 21 and is in close contact with the inner wall surface of the bottom wall part 2a, and the second filling portion 52 that is in close contact with the outer wall surface of the bottom wall part 2a.

Hereinafter, the configuration and actions of the filling member 5 will be described with reference to FIGS. 39 to 41.

Figure 39:
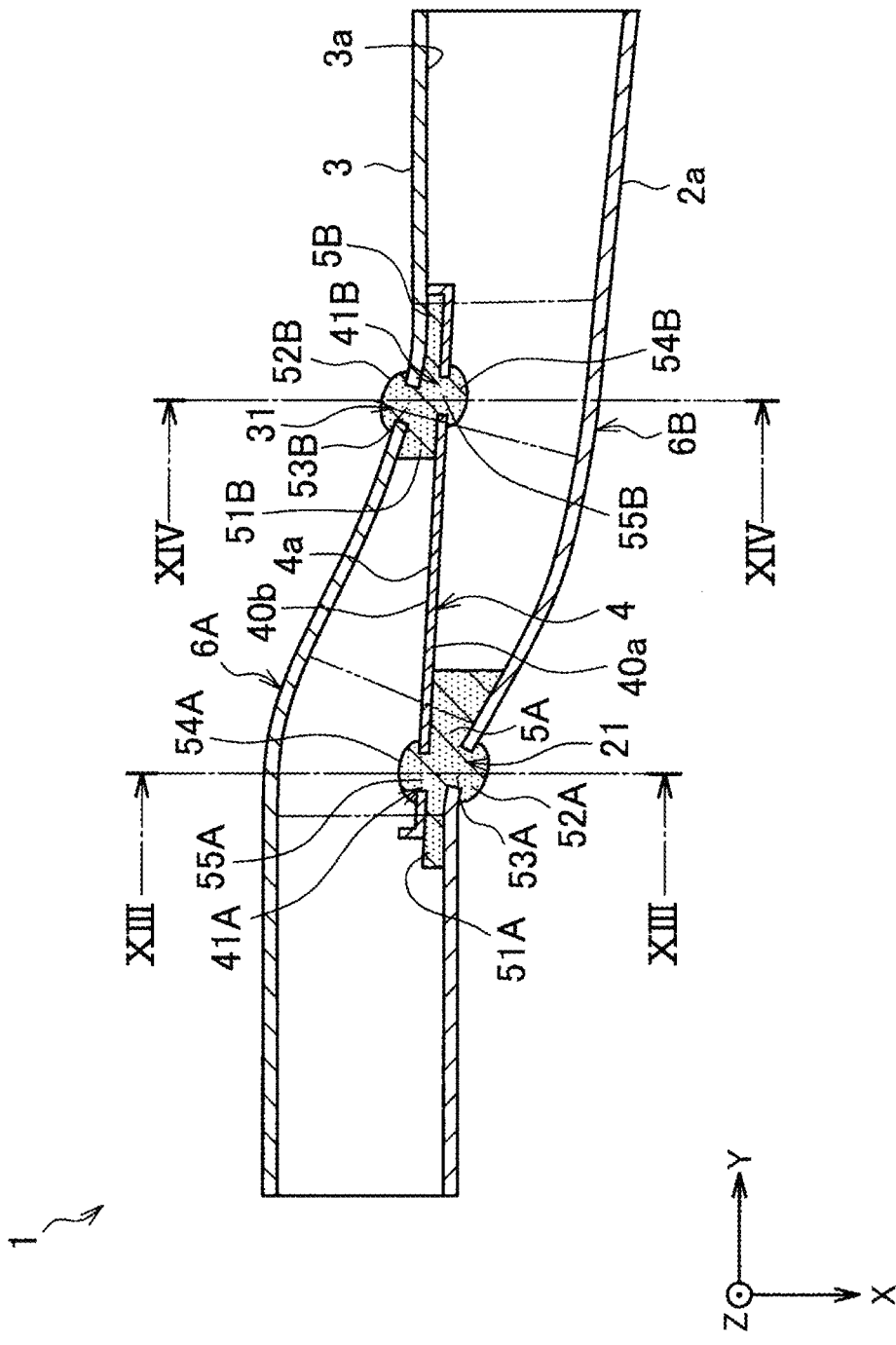
FIG. 39 is a sectional view of a section orthogonal to the Z-axis direction of an example of the frame according to the embodiment.

FIG. 39 is a sectional view of a section orthogonal to the Z-axis direction of an example of the frame 1 according to the present embodiment. The sectional view shown in FIG. 39 corresponds to a section of the frame 1 taken along cutting-plane line XII-XII of the hollow member 10 shown in FIG. 38. As shown in FIG. 39, the hollow member 10 is provided with the bent portions 6A and 6B along the longitudinal direction. The bent portion 6A is provided to be bent in a direction in which the bottom wall part 2a becomes a bend inside. The bent portion 6B is provided to be bent in a direction in which the top wall part 3a becomes a bend inside.

The filling member 5 according to the present embodiment is disposed in close contact with the main surface part 4a of the reinforcement 4. In the example shown in FIG. 39, the filling member 5A is provided in close contact with the bottom wall part 2a at the bent portion 6A. The filling member 5B is provided in close contact with the top wall part 3a at the bent portion 6B.

In the vicinity of the bent portion 6A, the wall hole 21 is provided in the bottom wall part 2a, and a hole 41A is provided in the main surface part 4a of the reinforcement 4. The filling member 5A is provided to pass through the wall hole 21 and the hole 41A, and in close contact with both surfaces of the bottom wall part 2a and both surfaces of the main surface part 4a. Specifically, the filling member 5A is constituted by a first filling portion 51A that is in close contact with the inner wall surface of the bottom wall part 2a and a first surface 40a of the main surface part 4a of the reinforcement 4, a second filling portion 52A that is in close contact the outer wall surface of the bottom wall part 2a, a third filling portion 53A that is provided in close contact with the wall hole 21 and connects the first filling portion 51A to the second filling portion 52A, a fourth filling portion 54A that is in close contact with a second surface 40b of the main surface part 4a, and a fifth filling portion 55A that is provided inside the hole 41A and connects the first filling portion 51A to the fourth filling portion 54A.

Similarly, in the vicinity of the bent portion 6B, a wall hole 31 is provided in the top wall part 3a, and a hole 41B is provided in the main surface part 4a of the reinforcement 4. The filling member 5B is provided to pass through the wall hole 31 and the hole 41B, and in close contact with both surfaces of the top wall part 3a and both surfaces of the main surface part 4a. Specifically, the filling member 5B is constituted by a first filling portion 51B that is in close contact with the inner wall surface of the top wall part 3a and the second surface 40b of the main surface part 4a of the reinforcement 4, a second filling portion 52B that is in close contact the outer wall surface of the top wall part 3a, a third filling portion 53B that is provided in close contact with the wall hole 31 and connects the first filling portion 51B to the second filling portion 52B, a fourth filling portion 54B that is in close contact with the first surface 40a of the main surface part 4a, and a fifth filling portion 55B that is provided inside the hole 41B and connects the first filling portion 51B to the fourth filling portion 54B.

Figure 40:
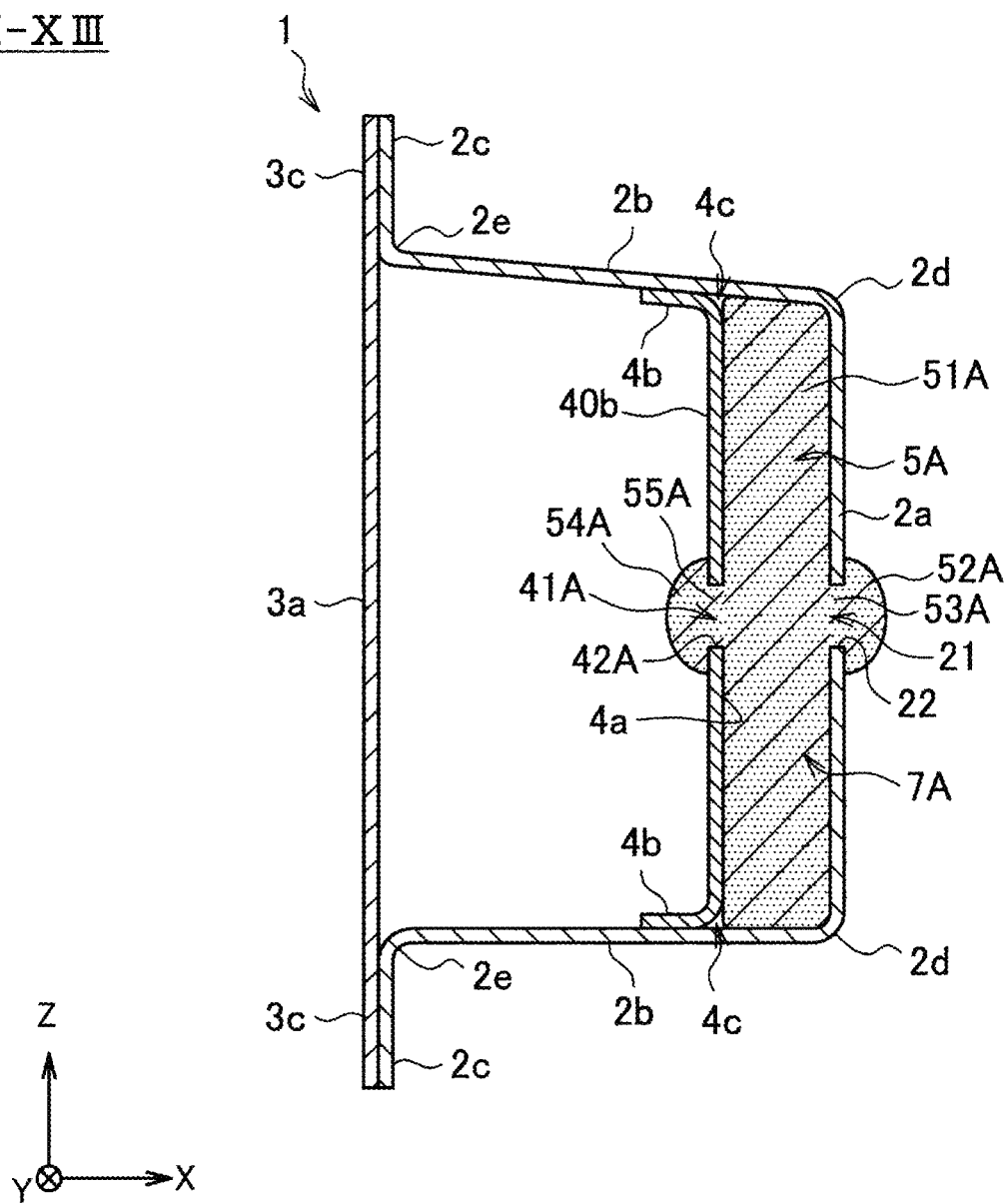
FIG. 40 is a cross-sectional view of the frame shown in FIG. 39 taken along cutting-plane line XIII-XIII.
Figure 41:
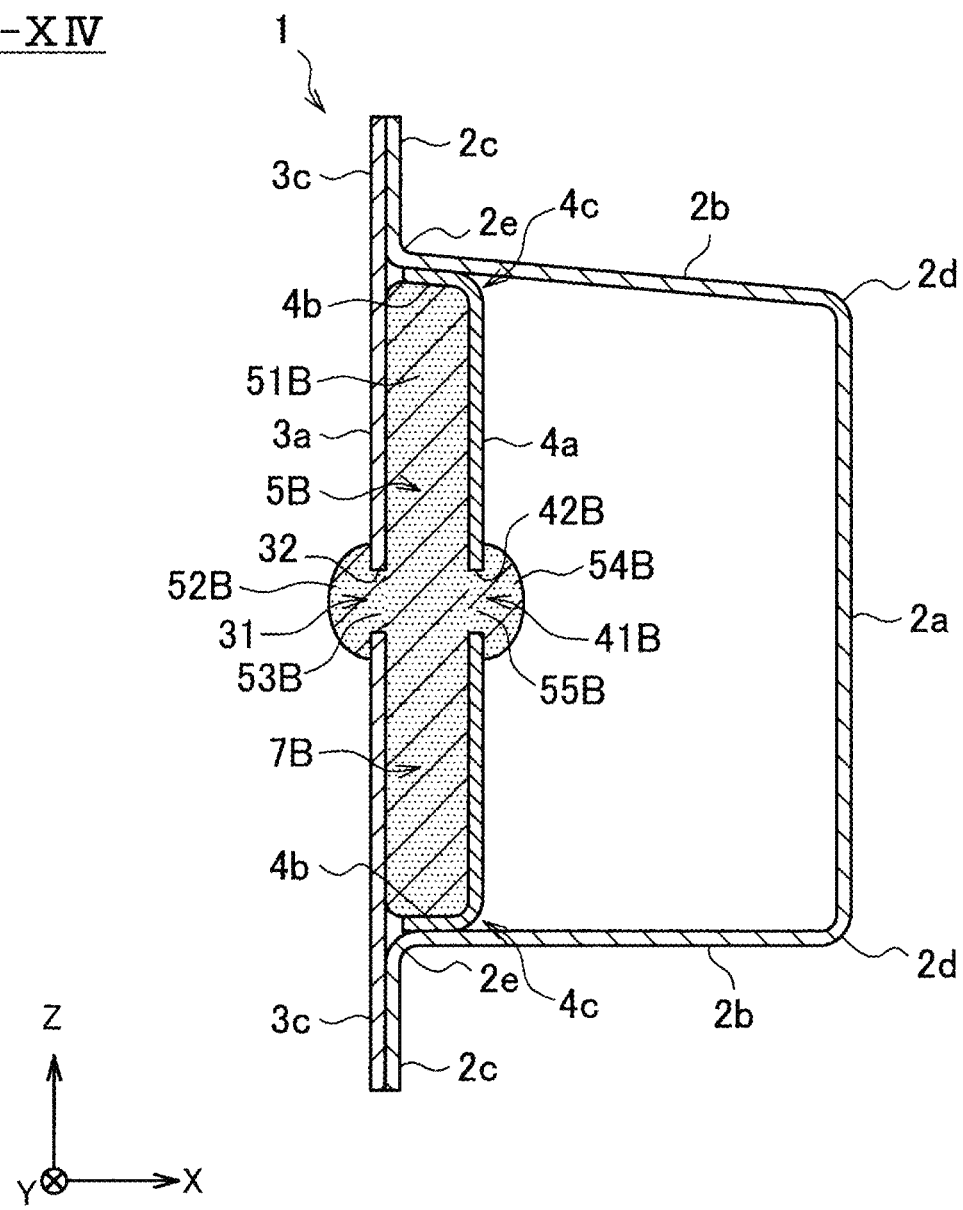
FIG. 41 is a cross-sectional view of the frame shown in FIG. 39 taken along cutting-plane line XIV-XIV.

FIGS. 40 and 41 are cross-sectional views of the frame 1 shown in FIG. 39 taken along cutting-plane lines XIII-XIII and XIV-XIV. As shown in FIG. 40, the filling member 5A is disposed in close contact with the bottom wall part 2a and the main surface part 4a in the space 7A formed by the bottom wall part 2a, the main surface part 4a, and the pair of side wall parts 2b.

The wall hole 21 is provided in the bottom wall part 2a, and the hole 41A is provided in the main surface part 4a. In the filling member 5A, the first filling portion 51A that is in close contact with each wall surface of the space 7A, the second filling portion 52A that is in close contact with the outer wall surface of the bottom wall part 2a, and the fourth filling portion 54A that is in close contact with the second surface 40b of the main surface part 4a are connected through the wall hole 21 and the hole 41A. Accordingly, the filling member 5A is locked to both the bottom wall part 2a and the main surface part 4a.

Then, for example, in a case where a collision load is input to the frame 1 and bending occurs in the bent portion 6A, a force that causes out-of-plane deformation in the bottom wall part 2a and the main surface part 4a acts due to the vehicle collision. In this case, the bottom wall part 2a and the main surface part 4a tend to deform in a direction away from each other, and a tensile force is exerted on the filling member 5A. Even in this state, since the filling member 5A is restrained by the bottom wall part 2a and the main surface part 4a, the state in which the filling member 5A is in close contact with the bottom wall part 2a and the main surface part 4a can be maintained. Therefore, the filling member 5A can suppress the out-of-plane deformation of the bottom wall part 2a and the reinforcement 4.

Furthermore, since the filling member 5A exhibits an ability as a joint between the bottom wall part 2a and the main surface part 4a, the forces respectively received by the deformations of the main surface part 4a and the bottom wall part 2a can be canceled out. Accordingly, not only can the out-of-plane deformation of the main surface part 4a be suppressed, but also the force itself that causes the out-of-plane deformation can be reduced. Therefore, the collision safety performance of the frame 1 can be further improved.

In the example shown in FIG. 40, the first filling portion 51A of the filling member 5A is disposed in close contact with the inner side of the ridge portion 2d and the connection portion 4c. Therefore, plastic deformation due to locally high stress applied to the ridge portion 2d and the connection portion 4c can be more reliably suppressed. Therefore, the collision safety performance of the frame 1 can be further improved.

As shown in FIG. 41, in the bent portion 6B, the filling member 5B is disposed in close contact with the top wall part 3a and the main surface part 4a in the space 7B formed by the top wall part 3a, the main surface part 4a, and the pair of side wall parts 2b. The disposition of the filling member 5B is the same as the disposition of the filling member 5A described above.

The actions and effects described above are also exhibited in the filling member 5B filled between the top wall part 3a and the main surface part 4a as shown in FIG. 41.

In the examples shown in FIGS. 40 and 41, the wall holes 21 and 31 are provided in the bottom wall part 2a and the top wall part 3a, but the present invention is not limited to this example. For example, the wall hole 21 may be provided in a wall part adjacent to the side wall part 2b or the ridge portions 2d and 2e. Even in this case, as long as the portion of the filling member 5 swelling outward of the side wall part 2b is provided so as to be in close contact with these outer wall surfaces, the state in which the filling member 5 is in close contact with each wall part of the hollow member 10 can be maintained.

Here, as the Young's modulus of the filling member 5 increases, the effect of suppressing the plastic deformation described above by the filling member 5 is increased. However, in order to increase the Young's modulus of the filling member 5, the resin needs to be formed at a high density. That is, when the Young's modulus of the filling member 5 is increased, the mass per unit volume of the filling member 5 increases. In the present embodiment, the place where the cross-sectional deformation occurs, that is, the place where the cross-sectional deformation has to be suppressed can be limited to the bent portion 6 or its periphery. For this reason, the place where the filling member 5 has to be disposed can be limited in anticipation of the place where the cross-sectional deformation occurs. That is, in the present embodiment, it is possible to reduce an increase in weight caused by the increase in the Young's modulus of the filling member 5. As described above, in the present embodiment, it is possible to improve the collision safety performance with high mass efficiency.

As described above, in the frame 1 according to the present embodiment, the reinforcement 4 is provided inside the bent portion 6 that is the bending induction portion. The filling member 5 is disposed to pass through the holes provided in the wall part of the hollow member 10 and the reinforcement 4 through the hole so as to be in close contact with both surfaces thereof. As a result, even when a collision load is input to the frame 1, the filling member 5 does not fall off either the hollow member 10 or the reinforcement 4, and can maintain a state of being restrained by these members. Then, the out-of-plane deformation of the wall part of the hollow member 10 and the reinforcement 4 due to the filling member 5 can be suppressed. Accordingly, the filling member 5 can stably contribute to the collision safety performance of the frame 1.

Furthermore, the filling member 5 may be disposed in close contact only with the reinforcement 4. For example, in a case where the spaces 7A and 7B shown in FIGS. 40 and 41 are large and it is difficult for the filling member 5 to cross the spaces 7A and 7B and be disposed in close contact with both the bottom wall part 2a or the top wall part 3a and the reinforcement 4, the filling member 5 may be disposed in close contact only with the reinforcement 4. In this case, the reinforcement 4 is provided with holes as shown in FIGS. 30 to 37, and the filling member 5 is disposed in close contact with both surfaces of the reinforcement 4 through the holes. Then, even when a collision load is input to the frame 1, the filling member 5 does not fall off the reinforcement 4 and can maintain the state of being restrained by the reinforcement 4.

The reinforcement 4 shown in FIG. 39 is formed of a single member and is provided so as to face each of the bottom wall part 2a and the top wall part 3a in the bent portion 6, but the present invention is not limited to this example. For example, a plurality of reinforcements 4 may be provided to face the bottom wall part 2a or the top wall part 3a in the bending induction portion such as the bent portion 6. In addition, the reinforcement 4 may be provided entirely along the longitudinal direction of the hollow member 10. That is, as long as the reinforcement 4 is provided inside the bending induction portion, the position and length of the reinforcement 4 in the longitudinal direction of the hollow member 10 are not particularly limited.

6. Examples of Bending Induction Portion

Next, examples of the bending induction portion provided in the hollow member 10 will be described. In each of the above embodiments, the bent portion 6 that is the bending induction portion has been described, but the present invention is not limited to this example. The bending induction portion has at least one of two features.

The first feature is a feature in which the full plastic moment of a cross section perpendicular to the axial direction of the hollow member 10 is lower than the periphery. In a portion having this feature, bending of the hollow member 10 is induced. More specifically, in a portion of the hollow member 10 having a relatively small full plastic moment in the longitudinal direction, bending occurs at the portion. A bending induction portion having this feature is called a full plastic moment changing portion. For example, a different strength portion is the full plastic moment changing portion.

The second feature is a feature in which the ridge line or the surface along the axial direction of the hollow member 10 changes in shape such as bending, disconnection, or thickness change along the axial direction. A bending induction portion having this feature is called a shape changing portion. For example, a hole, a recessed part, a protrusion, and a sheet thickness changing portion provided in the surface of the hollow member 10 (for example, the bottom wall part 2a, the side wall part 2b, or the top wall part 3a) are shape changing portions.

The bending induction portion often has both the first feature and the second feature. In a case where only one feature is provided, the bending induction portion is often a shape changing portion. This is because the shape changing portion can induce a direction in which the hollow member 10 bends. In the longitudinal direction of the hollow member 10, there is a shape changing portion in a cross section perpendicular to the longitudinal direction of a region corresponding to the bending induction portion. When the hollow member 10 bends, the shape changing portion buckles, so that the direction in which the hollow member 10 bends can be induced by the disposition of the shape changing portion. In a case where the present invention is employed for a frame member of a vehicle, the direction in which the hollow member 10 is bent is determined in advance. It is required that there are no occupants and important components ahead of the direction in which the hollow member 10 bends. Therefore, it is desirable that the bending induction portion has at least the features of the shape changing portion. In a case where the bending induction portion has the features of the full plastic moment changing portion, even a small shape changing portion located in the same place as the full plastic moment changing portion in the longitudinal direction of the hollow member 10 functions. For this reason, it is desirable that the bending induction portion has the features of both the full plastic moment changing portion and the shape changing portion.

(Hole)

Figure 42:
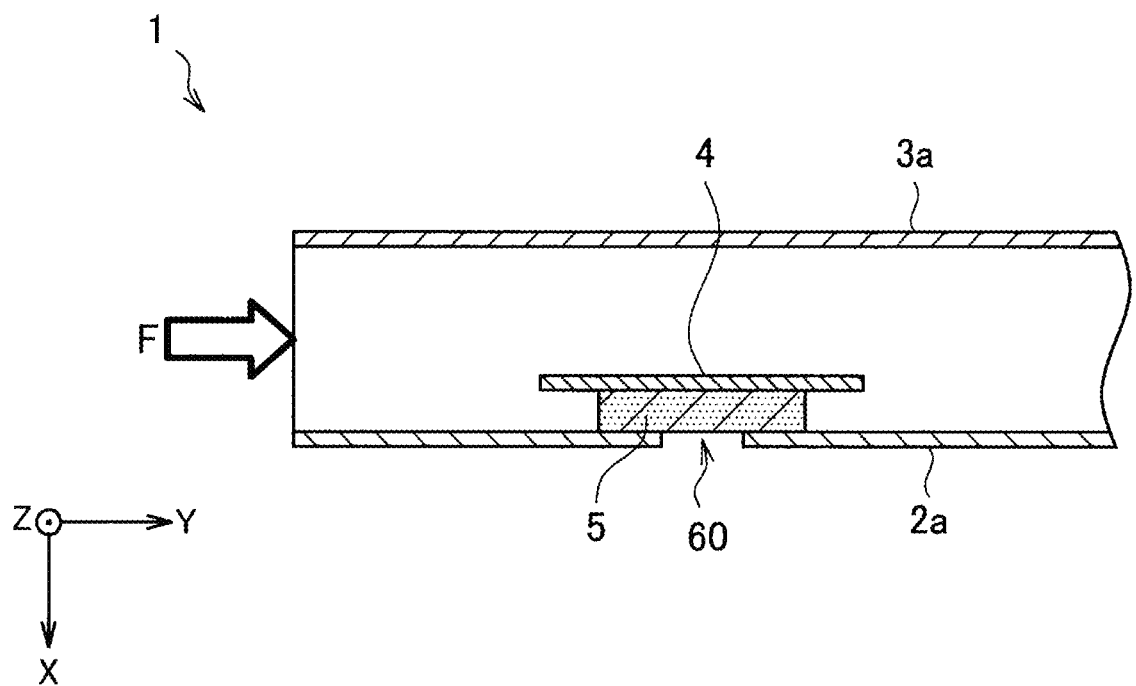
FIG. 42 is a sectional view of the frame showing an example of a hole provided in a hollow member according to an embodiment.

A hole has the features of both the full plastic moment changing portion and the shape changing portion. FIG. 42 is a sectional view of the frame 1 showing an example of the hole provided in a hollow member according to an embodiment. As shown in FIG. 42, a hole 60 is provided in the bottom wall part 2a. The full plastic moment of the hollow member 10 in the portion provided with the hole 60 is lower than the full plastic moment of the hollow member 10 in portions before and after the portion provided with the hole 60 (in the longitudinal direction of the hollow member 10). In addition, since a portion of the surface (bottom wall part 2a) is disconnected at the hole 60, the bending strength is low. Therefore, in a case where a collision load F shown in FIG. 42 is input to the hollow member 10, the frame 1 bends at the portion provided with the hole 60 so that the hole 60 becomes a bend inside. Therefore, the reinforcement 4 is provided at a position facing at least the bottom wall part 2a provided with the hole 60, and the filling member 5 is disposed in close contact with the reinforcement 4. Accordingly, in a case where bending occurs in the vicinity of the hole 60 due to the input of the collision load F, the out-of-plane deformation of the reinforcement 4 can be suppressed, and buckling of the reinforcement 4 can be suppressed.

Figure 43:
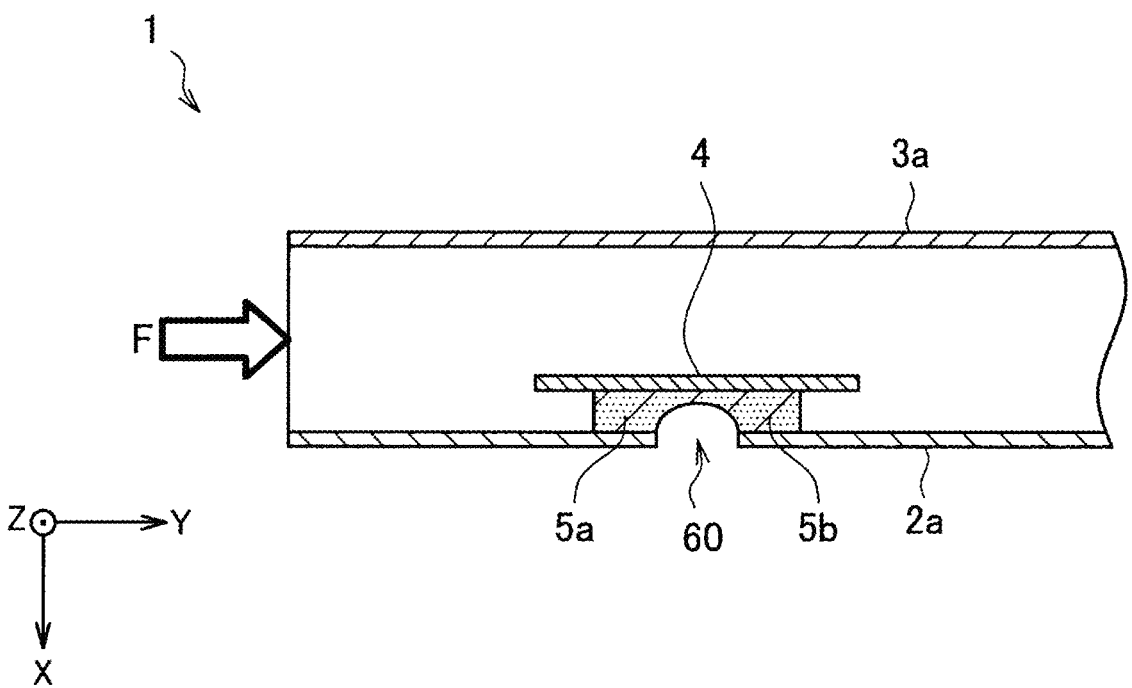
FIG. 43 is a sectional view of the frame showing a modification example of the filling member provided to face the hole according to an embodiment.

In the example shown in FIG. 42, the filling member 5 is disposed in the portion of the bottom wall part 2a where the hole 60 is provided. However, the present invention is not limited to this example. FIG. 43 is a sectional view of the frame 1 showing a modification example of the filling member provided to face the hole according to the embodiment. As shown in FIG. 43, the filling member 5 may not be disposed in a space inside the hole 60. Accordingly, bending deformation of the bottom wall part 2a in the hole 60 can be more reliably performed. Similarly, in other examples of the bending induction portion described below, bending deformation in the bending induction portion can be more reliably performed by not disposing the filling member 5 in a space near the bending induction portion.

Here, FIGS. 42 and 43 show examples of the hole in the case where the frame 1 has the reinforcement 4 as in the first embodiment and the second example of the fourth embodiment. As another example, FIGS. 44 and 45 show examples of the hole in a case where the frame 1 does not have the reinforcement 4.

Figure 44:
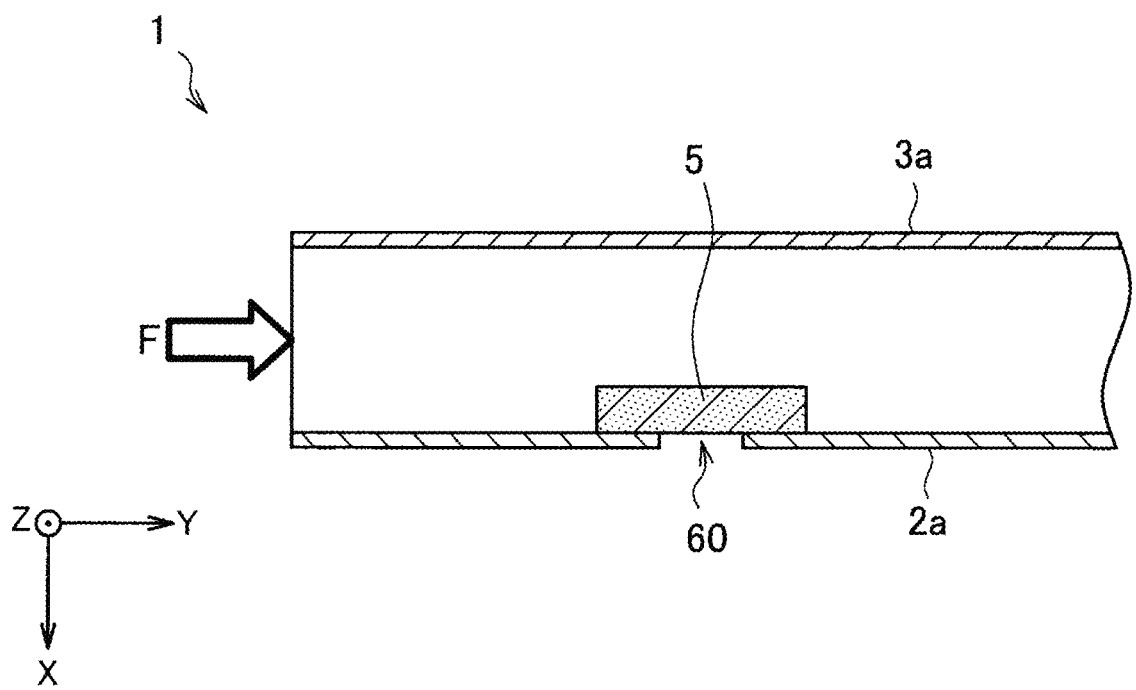
FIG. 44 is a sectional view of the frame showing an example of the hole provided in the hollow member according to an embodiment.

FIG. 44 is a sectional view of the frame 1 showing an example of the hole provided in the hollow member according to the embodiment. The frame 1 shown in FIG. 44 is the frame 1 according to the second embodiment. As shown in FIG. 44, the hole 60 is provided in the bottom wall part 2a. The full plastic moment of the hollow member 10 in the portion provided with the hole 60 is lower than the full plastic moment of the hollow member 10 in portions before and after the portion provided with the hole 60 (in the longitudinal direction of the hollow member 10). In addition, since a portion of the surface (bottom wall part 2a) is disconnected at the hole 60, the bending strength is low. Therefore, in a case where a collision load F shown in FIG. 44 is input to the hollow member 10, the frame 1 bends at the portion provided with the hole 60 so that the hole 60 becomes a bend inside. That is, in the longitudinal direction of the hollow member 10, the portion of the hollow member 10 where the hole 60 is provided becomes a bending induction portion provided in the hollow member 10. Therefore, the filling member 5 is disposed in close contact with the inner surface of the bottom wall part 2a at least in the portion provided with the hole 60. Accordingly, in a case where bending occurs in the vicinity of the hole 60 due to the input of the collision load F, the out-of-plane deformation of the frame 1 can be suppressed, and the load bearing performance of the frame 1 can be maintained at a high level.

Figure 45:
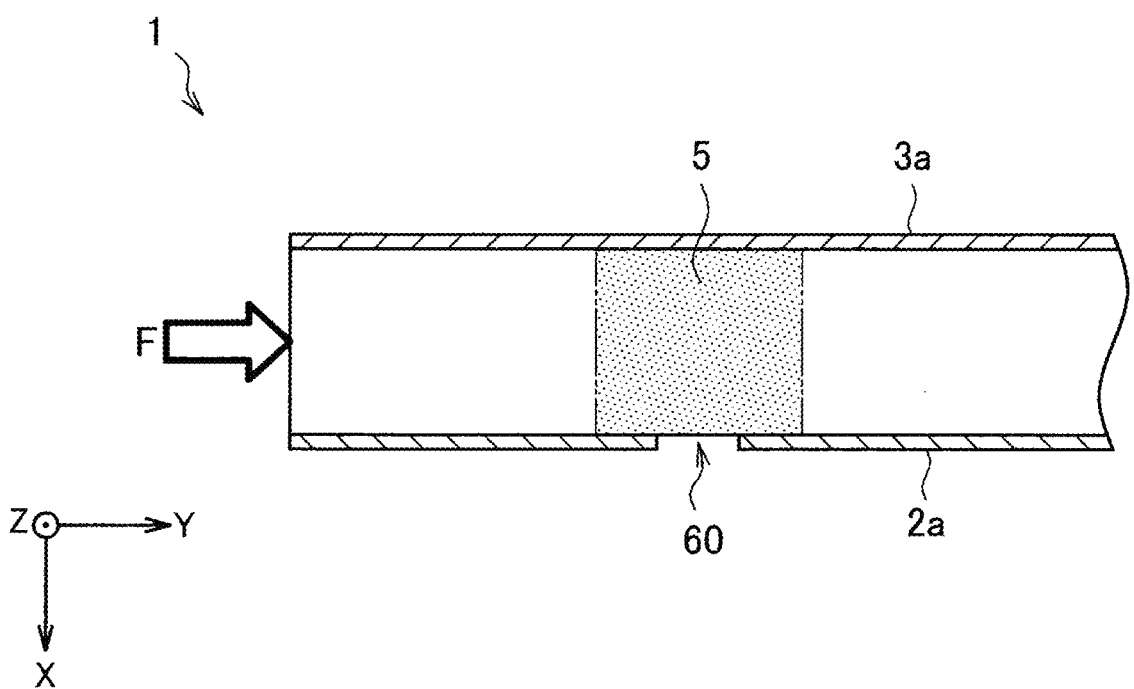
FIG. 45 is a sectional view of the frame showing an example of the hole provided in the hollow member according to an embodiment.

FIG. 45 is a sectional view of the frame 1 showing an example of the hole provided in the hollow member according to the embodiment. The frame 1 shown in FIG. 45 is the frame 1 according to the third embodiment. As shown in FIG. 45, the hole 60 is provided in the bottom wall part 2a. The full plastic moment of the hollow member 10 in the portion provided with the hole 60 is lower than the full plastic moment of the hollow member 10 in portions before and after the portion provided with the hole 60 (in the longitudinal direction of the hollow member 10). In addition, since a portion of the surface (bottom wall part 2a) is disconnected at the hole 60, the bending strength is low. Therefore, in a case where a collision load F shown in FIG. 45 is input to the hollow member 10, the frame 1 bends at the portion provided with the hole 60 so that the hole 60 becomes a bend inside. That is, in the longitudinal direction of the hollow member 10, the portion of the hollow member 10 where the hole 60 is provided becomes a bending induction portion provided in the hollow member 10. Therefore, the filling member 5 is disposed in close contact with the inner surface of the side wall part 2b at least in the portion provided with the hole 60. Accordingly, in a case where bending occurs in the vicinity of the hole 60 due to the input of the collision load F, the out-of-plane deformation of the frame 1 can be suppressed, and the collision energy absorption properties of the frame 1 can be maintained at a high level.

Figure 46:
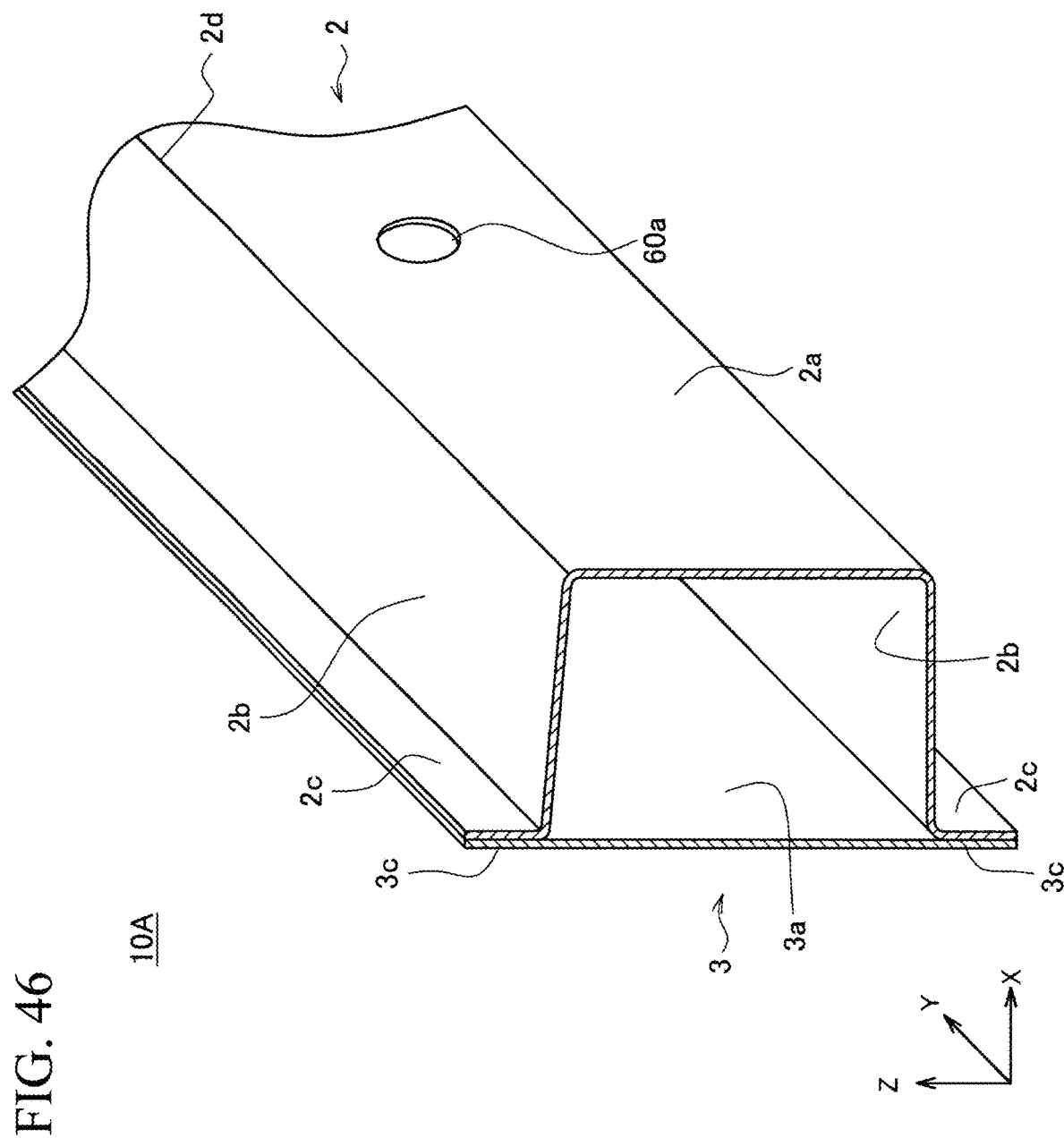
FIG. 46 is a schematic view showing another example of the hole provided in the hollow member according to an embodiment.
Figure 47:
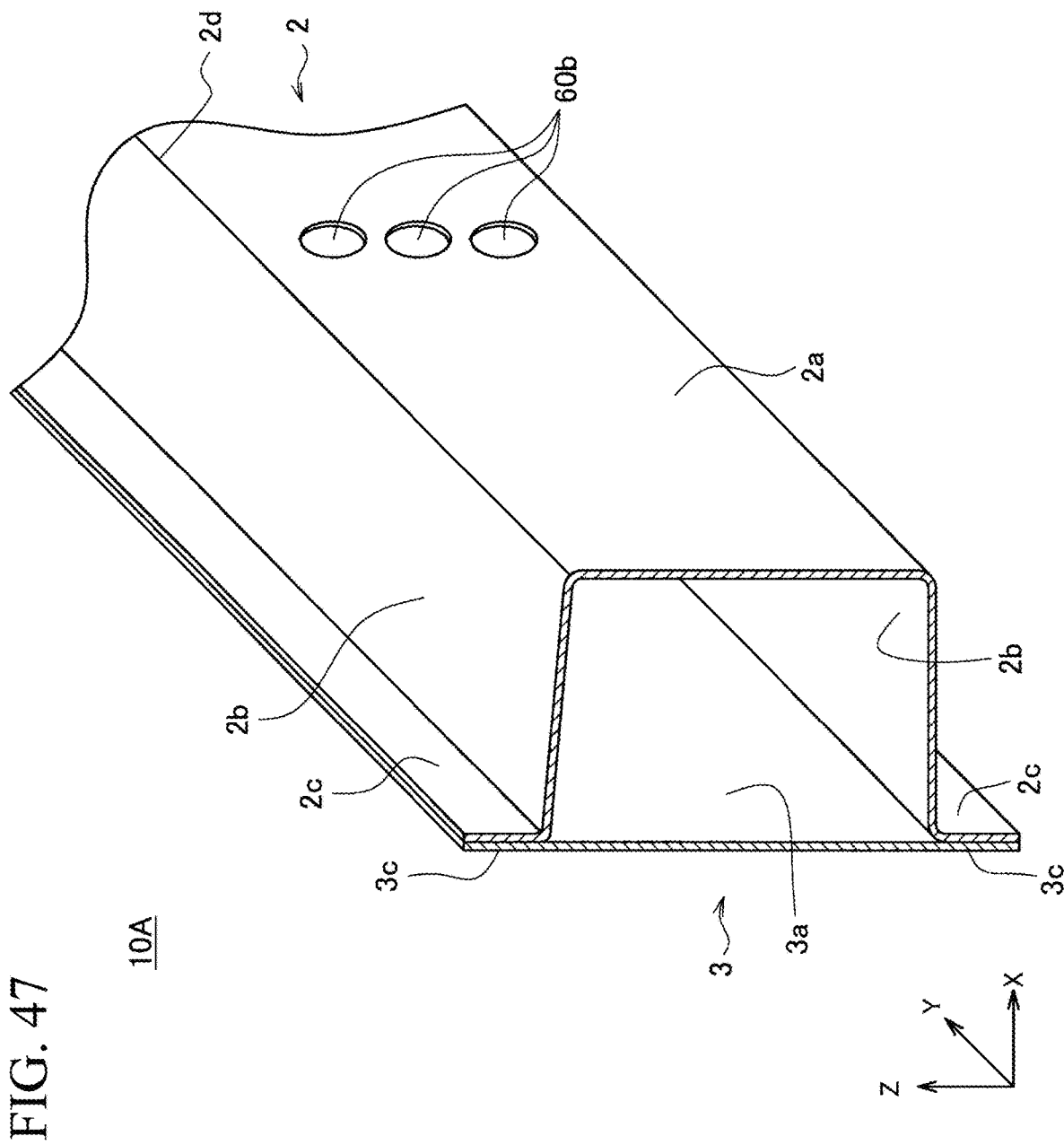
FIG. 47 is a schematic view showing another example of the hole provided in the hollow member according to an embodiment.

The shape and disposition of the hole are not limited to the examples described above. FIGS. 46 to 49 are schematic views showing other examples of the hole provided in the hollow member according to an embodiment. As shown in FIG. 46, a circular hole 60a may be provided in the bottom wall part 2a. In addition, as shown in FIG. 47, a plurality of the holes 60b may also be provided in the bottom wall part 2a. In this case, for example, the plurality of hole 60b may be arranged in a direction transverse to the longitudinal direction of a hollow member 10A. In this case, when a collision load is input, the hollow member 10A tends to undergo bending deformation toward the bottom wall part 2a with the holes 60b as a bending origin.

Figure 48:
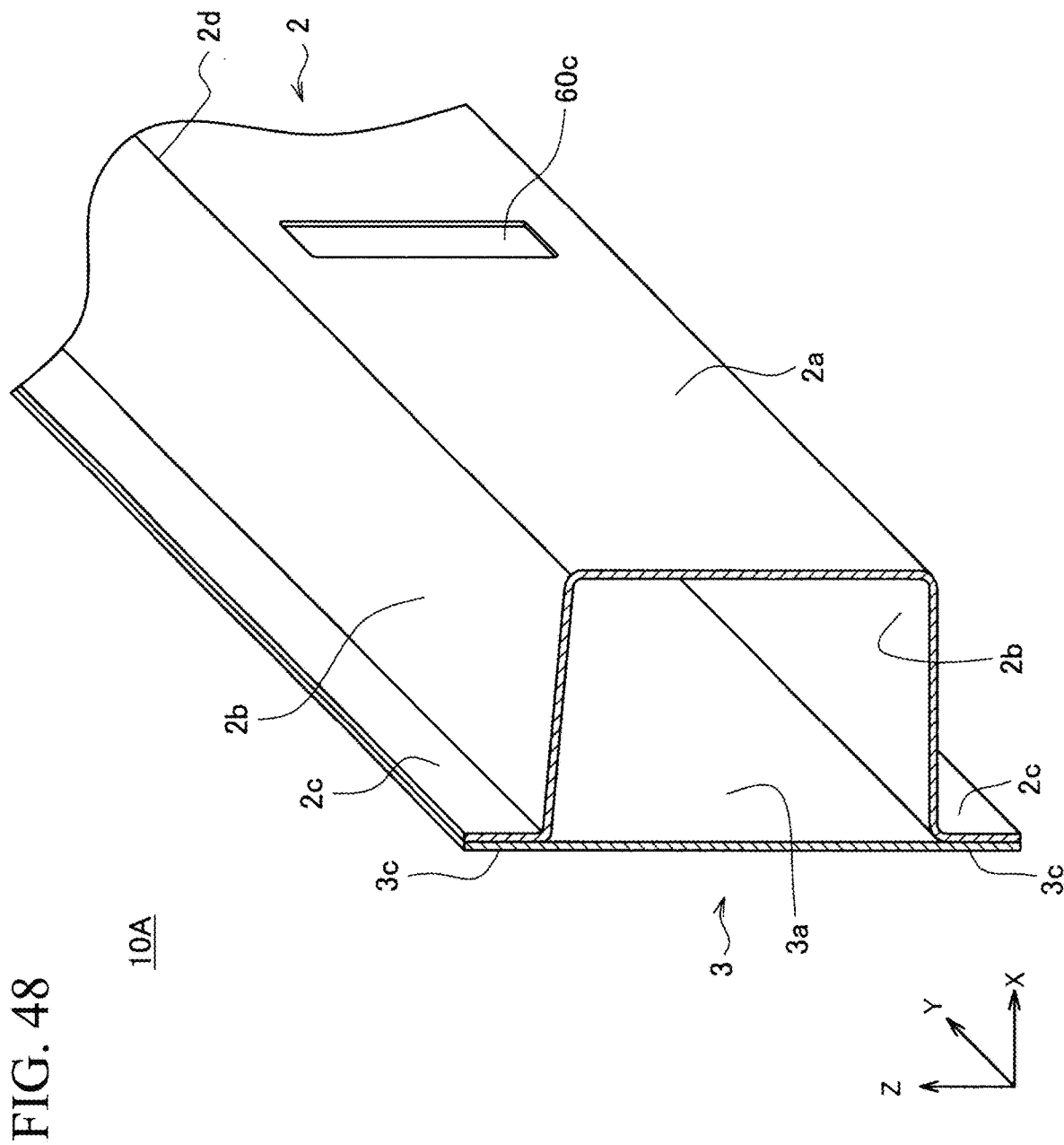
FIG. 48 is a schematic view showing another example of the hole provided in the hollow member according to an embodiment.

In addition, as shown in FIG. 48, a hole 60c extending in a direction transverse to the longitudinal direction of the hollow member 10A may also be provided in the bottom wall part 2a. In this case, when a collision load is input, the hollow member 10A undergoes bending deformation toward the bottom wall part 2a with the hole 60c as a bending origin. The shape of the hole 60c is not limited to the rounded rectangle shown in FIG. 48, and may be any shape.

The direction transverse to the longitudinal direction of the hollow member 10A described above is not limited to the direction orthogonal to the longitudinal direction of the hollow member 10A as shown in FIGS. 46 to 48. For example, the angle formed by the longitudinal direction of the hollow member 10A and the transverse direction is 45 degrees or more and 90 degrees or less at the surface of the portion provided with the hole 60. Accordingly, stable bending deformation can be induced.

The portion provided with the hole 60 is not limited to the bottom wall part 2a. For example, the hole 60 may be provided in the side wall part 2b or the top wall part 3a. Moreover, it is preferable that the hole 60 and the like are not provided in a portion facing the portion provided with the hole 60. For example, in a case where the hole 60 is provided in the bottom wall part 2a, it is preferable that the top wall part 3a is not provided with a portion that induces bending deformation of another hole 60. This is to induce bending deformation on the side where the hole 60 is provided, when a collision load is input.

Figure 49:
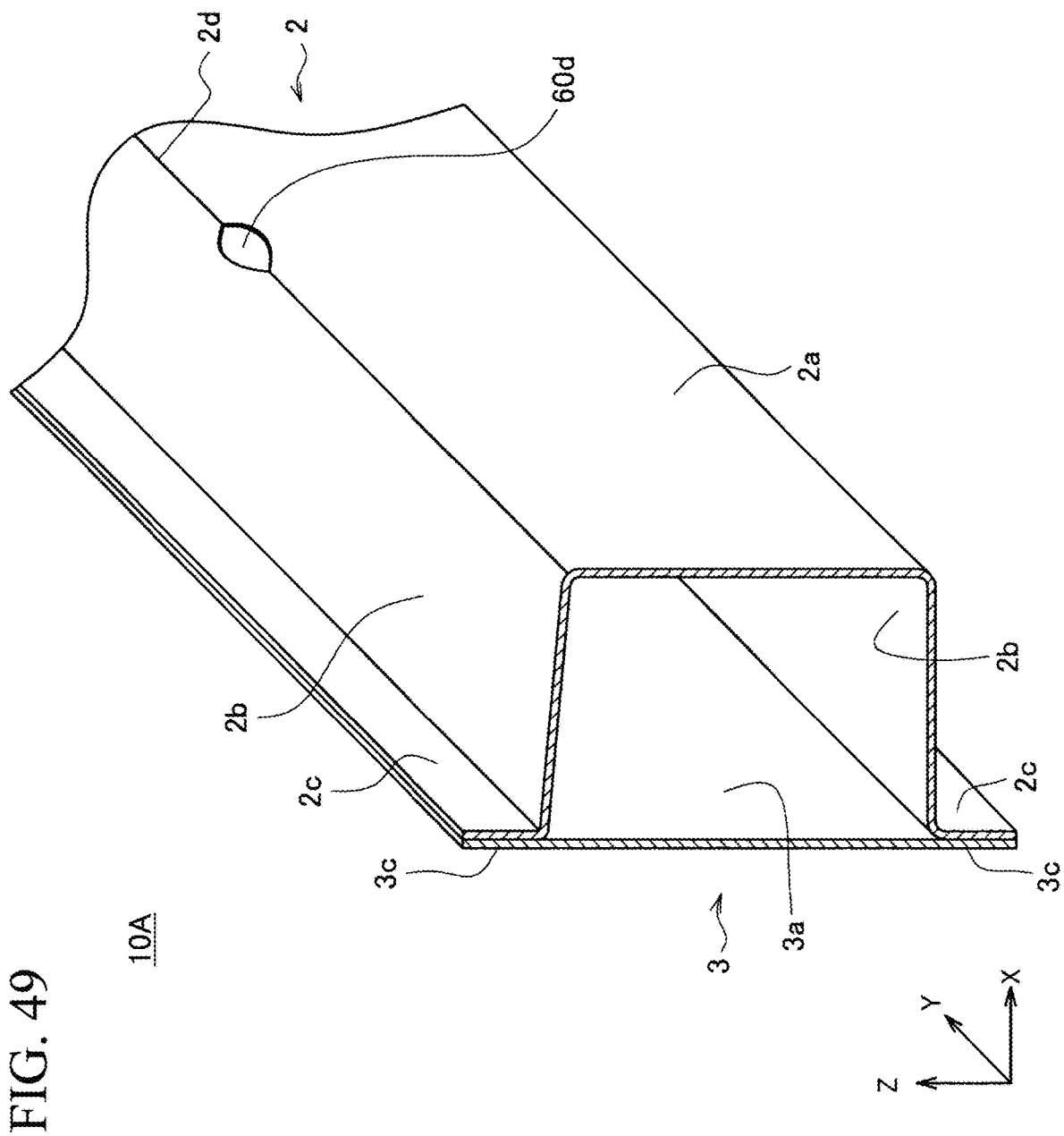
FIG. 49 is a schematic view showing another example of the hole provided in the hollow member according to an embodiment.

Moreover, as shown in FIG. 49, a hole 60d may be provided in the ridge portion 2d. Accordingly, the full plastic moment of the portion of the hollow member 10A where the hole 60d is provided in the longitudinal direction is significantly reduced, so that the bending deformation with the portion provided with the hole 60d as a bending origin can be more reliably induced.

The wall hole 21 described above in the fourth embodiment may also be regarded as an example of the bending induction portion.

(Recessed Part)

Figure 50:
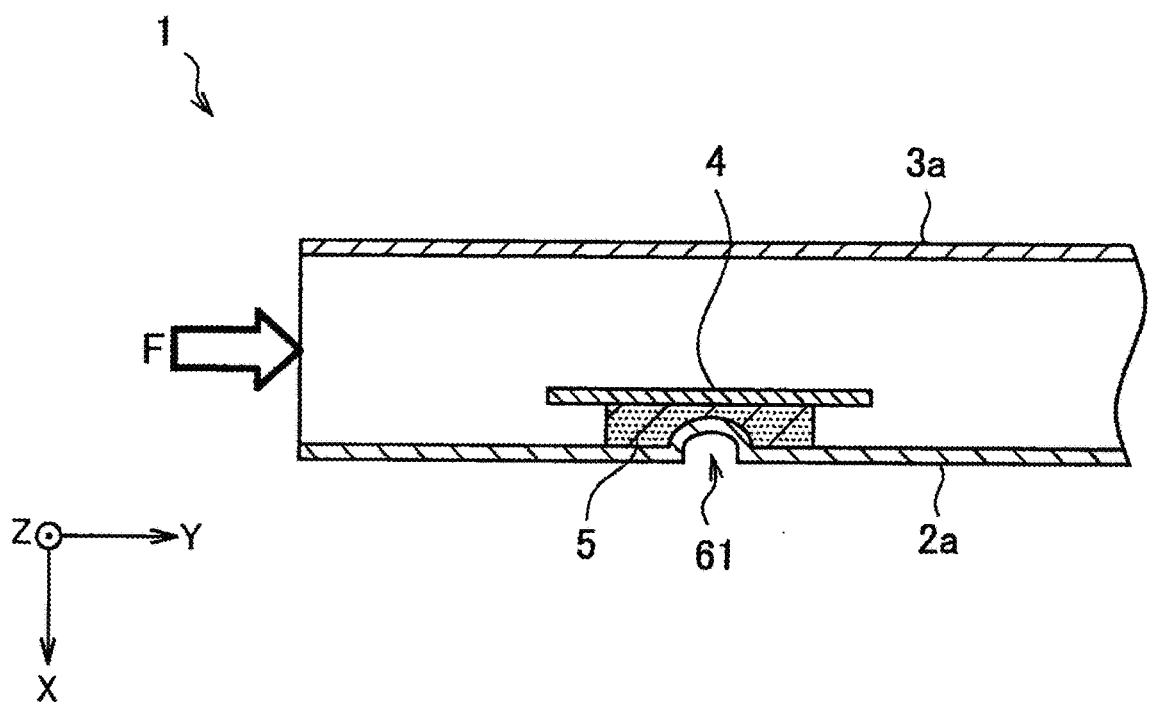
FIG. 50 is a sectional view of the frame showing an example of a bead portion provided in the hollow member according to an embodiment.

A hole has the features of both the full plastic moment changing portion and the shape changing portion. FIG. 50 is a sectional view of the frame 1 showing an example of a bead portion provided in the hollow member according to an embodiment. A bead portion 61 is an example of the recessed part in an embodiment. As shown in FIG. 50, the bead portion 61 is provided in the bottom wall part 2a. The full plastic moment of the hollow member 10 at the portion provided with the bead portion 61 is lower than the full plastic moment of the hollow member 10 in portions before and after the portion provided with the bead portion 61 (in the longitudinal direction of the hollow member 10). Furthermore, the recessed part tends to be collapsed and become a bending origin. Therefore, in a case where a collision load F shown in FIG. 50 is input to the hollow member 10, the frame 1 bends at the portion provided with the bead portion 61 so that the bead portion 61 becomes a bend inside. Therefore, the reinforcement 4 is provided at a position facing at least the bottom wall part 2a provided with the bead portion 61, and the filling member 5 is disposed in close contact with the reinforcement 4. Accordingly, in a case where bending occurs in the vicinity of the bead portion 61 due to the input of the collision load F, the out-of-plane deformation of the reinforcement 4 can be suppressed, and buckling of the reinforcement 4 can be suppressed.

Here, FIG. 50 shows an example of the recessed part in a case where the frame 1 has the reinforcement 4 as in the first embodiment and the second example of the fourth embodiment. As another example, FIGS. 51 and 52 show examples of the hole in a case where the frame 1 does not have the reinforcement 4.

Figure 51:
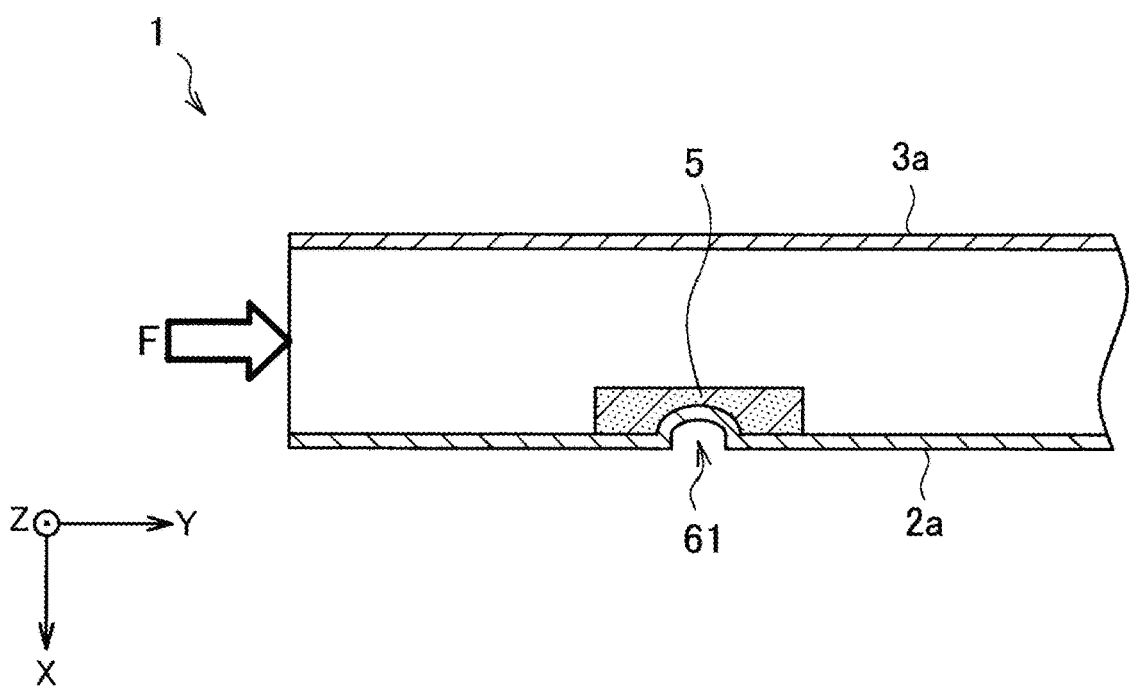
FIG. 51 is a sectional view of the frame showing an example of the bead portion provided in the hollow member according to an embodiment.

FIG. 51 is a sectional view of the frame 1 showing an example of the bead portion provided in the hollow member according to an embodiment. The frame 1 shown in FIG. 51 is the frame 1 according to the second embodiment. A bead portion 61 is an example of the recessed part in an embodiment. As shown in FIG. 51, the bead portion 61 is provided in the bottom wall part 2a. The full plastic moment of the hollow member 10 at the portion provided with the bead portion 61 is lower than the full plastic moment of the hollow member 10 in portions before and after the portion provided with the bead portion 61 (in the longitudinal direction of the hollow member 10). Furthermore, the recessed part tends to be collapsed and become a bending origin. Therefore, in a case where a collision load F shown in FIG. 51 is input to the hollow member 10, the frame 1 bends at the portion provided with the bead portion 61 so that the bead portion 61 becomes a bend inside. That is, in the longitudinal direction of the hollow member 10, the portion of the hollow member 10 where the bead portion 61 is provided becomes a bending induction portion provided in the hollow member 10. Therefore, the filling member 5 is disposed in close contact with the inner surface of the bottom wall part 2a at least in the portion provided with the bead portion 61. Accordingly, in a case where bending occurs in the vicinity of the bead portion 61 due to the input of the collision load F, the out-of-plane deformation of the frame 1 can be suppressed, and the load bearing performance of the frame 1 can be maintained at a high level.

Figure 52:
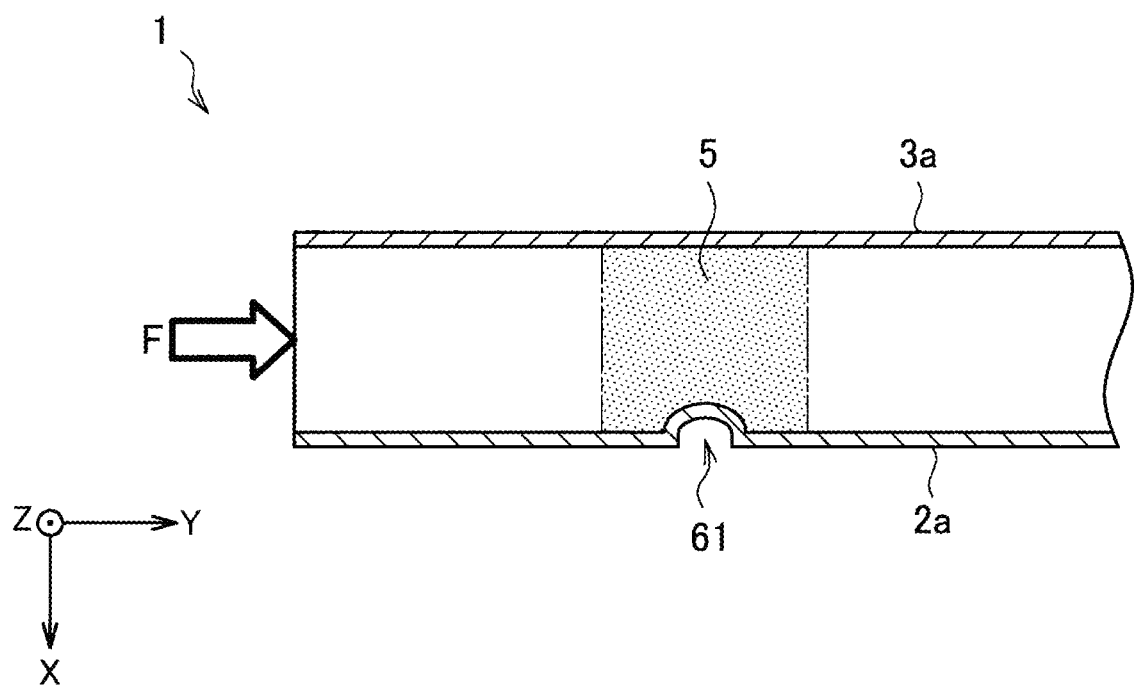
FIG. 52 is a sectional view of the frame showing an example of the bead portion provided in the hollow member according to an embodiment.

FIG. 52 is a sectional view of the frame 1 showing an example of the bead portion provided in the hollow member according to an embodiment. The frame 1 shown in FIG. 52 is the frame 1 according to the third embodiment. A bead portion 61 is an example of the recessed part in an embodiment. As shown in FIG. 52, the bead portion 61 is provided in the bottom wall part 2a. The full plastic moment of the hollow member 10 at the portion provided with the bead portion 61 is lower than the full plastic moment of the hollow member 10 in portions before and after the portion provided with the bead portion 61 (in the longitudinal direction of the hollow member 10). Furthermore, the recessed part tends to be collapsed and become a bending origin. Therefore, in a case where a collision load F shown in FIG. 52 is input to the hollow member 10, the frame 1 bends at the portion provided with the bead portion 61 so that the bead portion 61 becomes a bend inside. That is, in the longitudinal direction of the hollow member 10, the portion of the hollow member 10 where the bead portion 61 is provided becomes a bending induction portion provided in the hollow member 10. Therefore, the filling member 5 is disposed in close contact with the inner surface of the side wall part 2b at least in the portion provided with the bead portion 61. Accordingly, in a case where bending occurs in the vicinity of the bead portion 61 due to the input of the collision load F, the out-of-plane deformation of the frame 1 can be suppressed, and the collision energy absorption properties of the frame 1 can be maintained at a high level.

Figure 53:
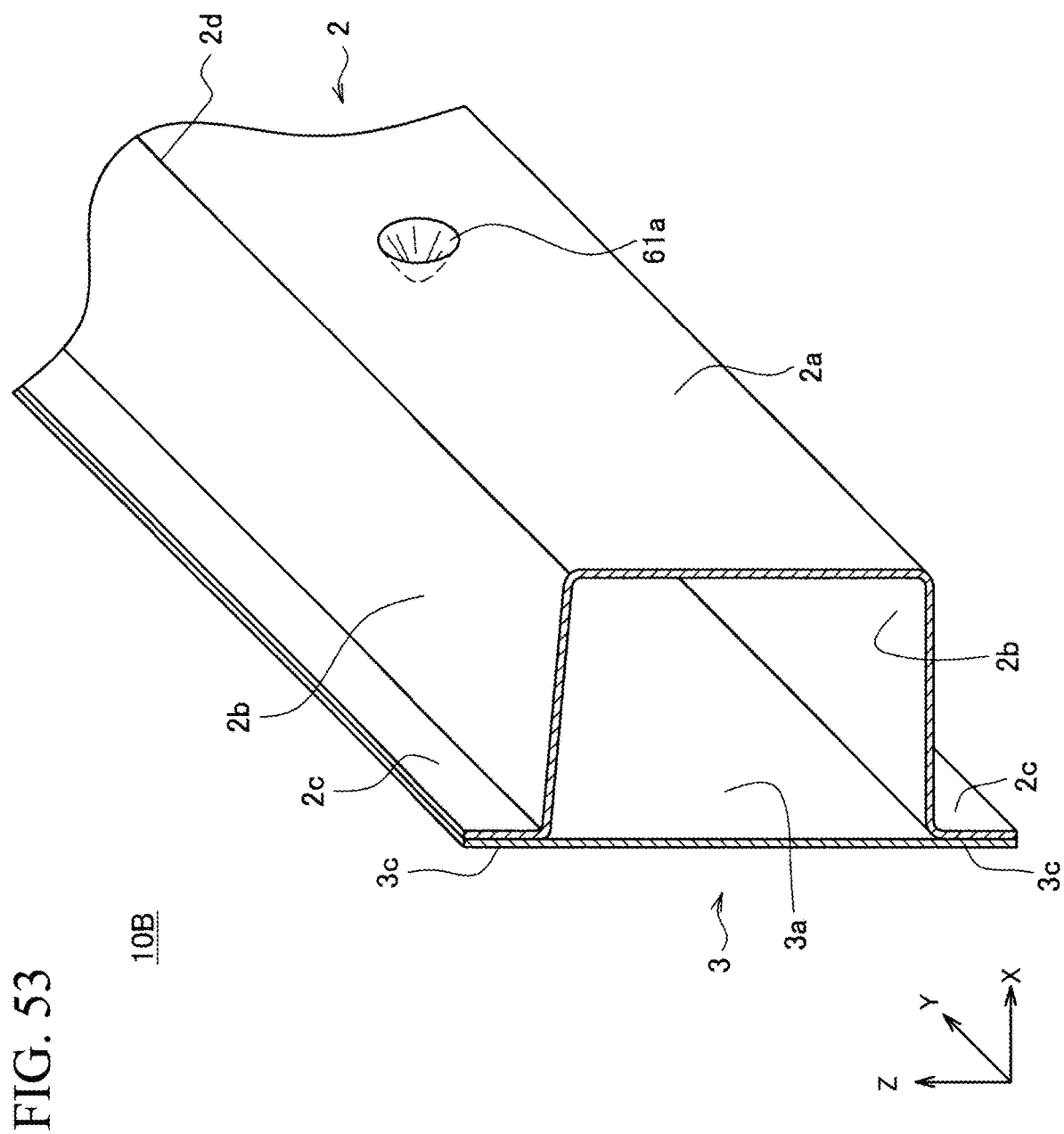
FIG. 53 is a schematic view showing another example of a recessed part provided in the hollow member according to an embodiment.

The shape and disposition of the recessed part are not limited to the examples described above. FIGS. 53 to 56 are schematic views showing other examples of the recessed part provided in the hollow member according to an embodiment. The recessed part mentioned here means a recess part provided in the bottom wall part 2a of a hollow member 10B, such as an embossed portion or a bead. As shown in FIG. 53, a circular recessed part 61a may be provided in the bottom wall part 2a.

Figure 54:
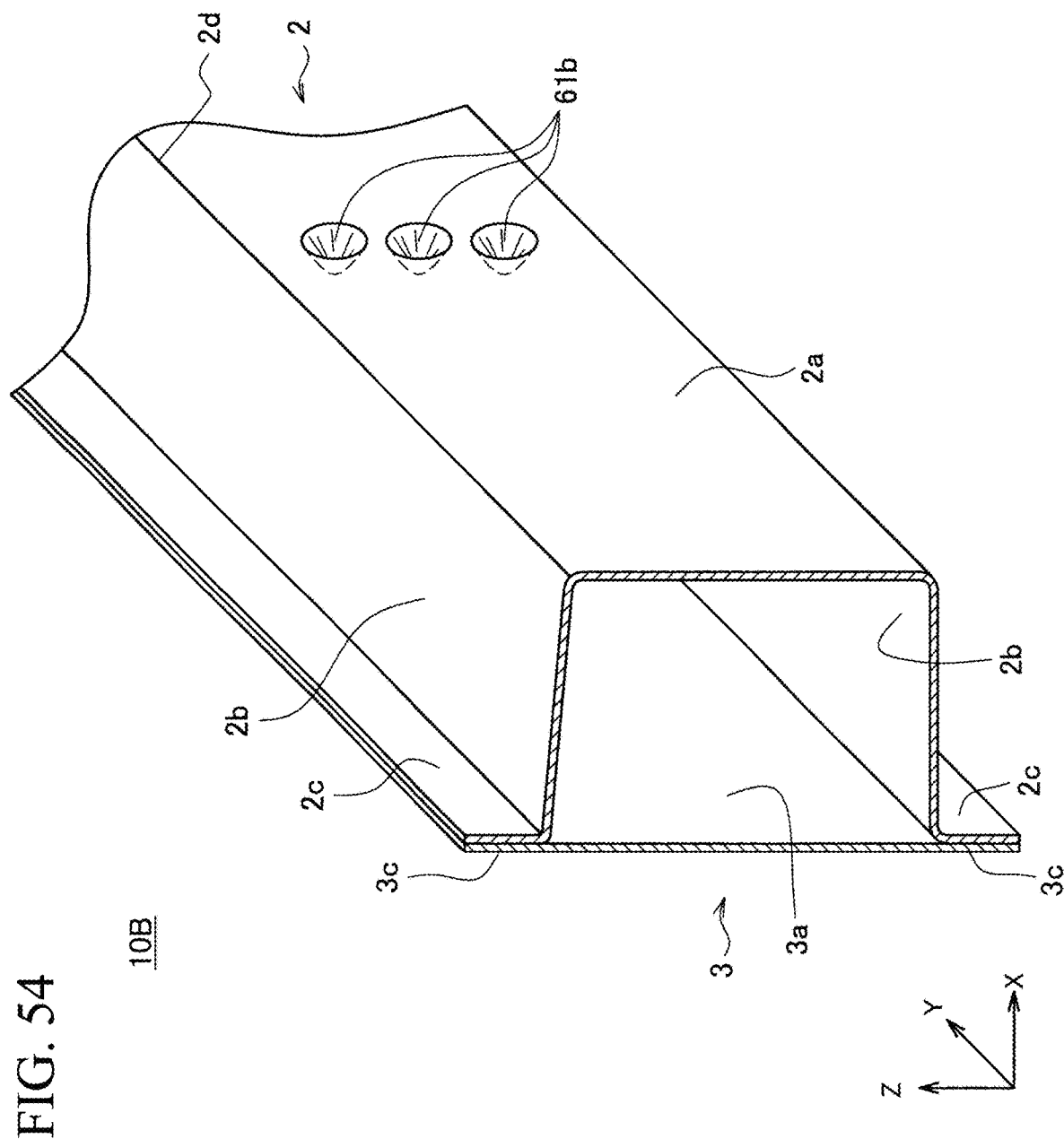
FIG. 54 is a schematic view showing another example of the recessed part provided in the hollow member according to an embodiment.

In addition, as shown in FIG. 54, a plurality of the recessed parts 61b may also be provided in the bottom wall part 2a. In this case, for example, the plurality of recessed parts 61b may be arranged in a direction transverse to the longitudinal direction of the hollow member 10B. In this case, when a collision load is input, the hollow member 10B tends to undergo bending deformation toward the bottom wall part 2a with the plurality of recessed parts 61b as a bending origin.

Figure 55:
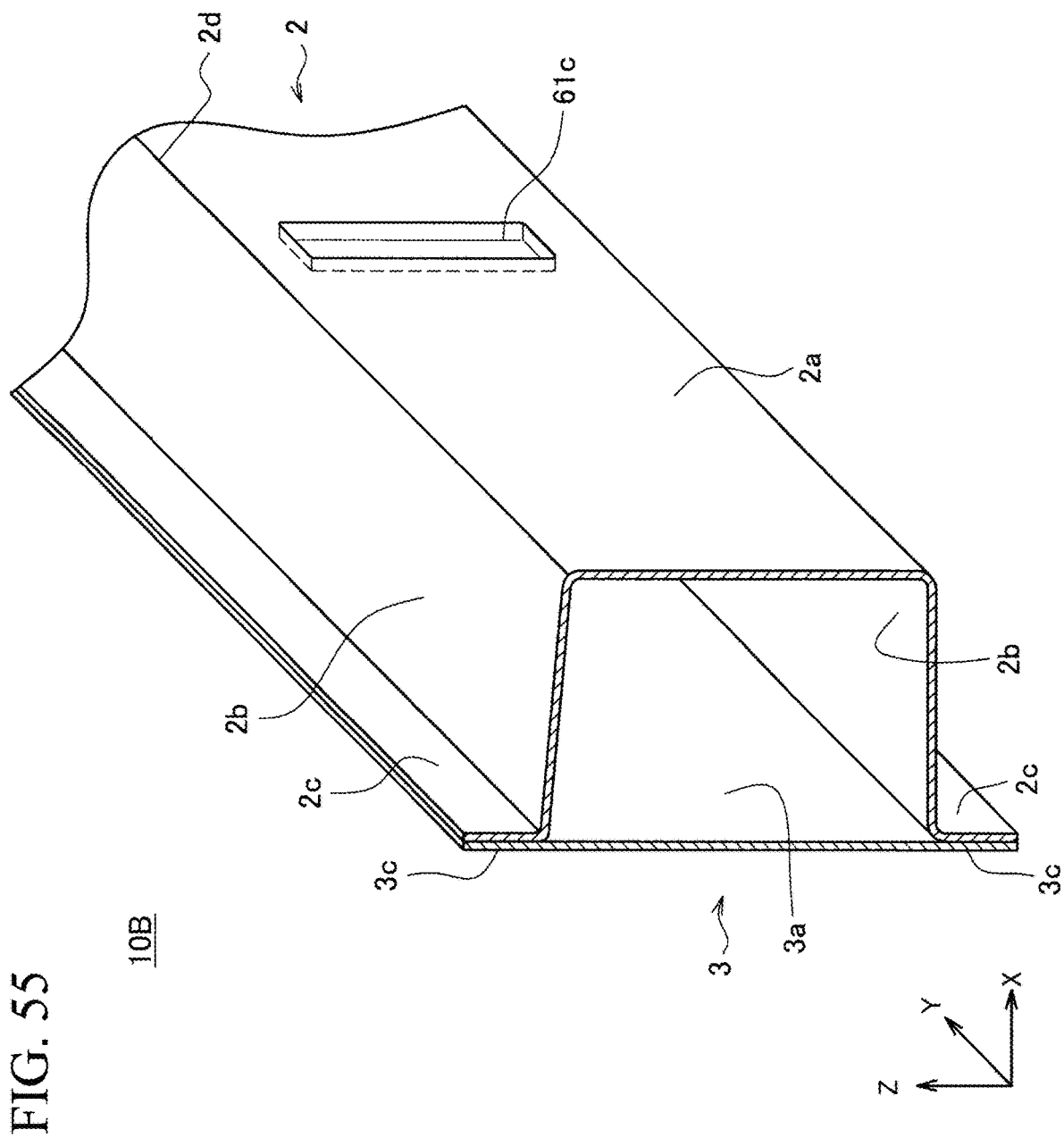
FIG. 55 is a schematic view showing another example of the recessed part provided in the hollow member according to an embodiment.

In addition, as shown in FIG. 55, a bead portion 61c extending in a direction transverse to the longitudinal direction of the hollow member 10B may be provided in the bottom wall part 2a. In this case, when a collision load is input, the hollow member 10B undergoes bending deformation toward the bottom wall part 2a side with the bead portion 61c as a bending origin. The shape of the bead portion 61c is not limited to the rounded rectangle shown in FIG. 55, and may be any shape.

The direction transverse to the longitudinal direction of the hollow member 10B described above is not limited to the direction orthogonal to the longitudinal direction of the hollow member 10B as shown in FIG. 55. For example, the angle formed by the longitudinal direction of the hollow member 10B and the transverse direction is 45 degrees or more and 90 degrees or less at the surface of the portion provided with the recessed part 61.

The portion provided with the recessed part 61 is not limited to the bottom wall part 2a. For example, the recessed part 61 may be provided in the side wall part 2b or the top wall part 3a. Moreover, it is preferable that the recessed part 61 and the like are not provided in a portion facing the portion provided with the recessed part 61. For example, in a case where the recessed part 61 is provided in the bottom wall part 2a, it is preferable that the top wall part 3a is not provided with a portion that induces bending deformation of another recessed part 61. This is to induce bending deformation on the side where the recessed part 61 is provided, when a collision load is input.

Figure 56:
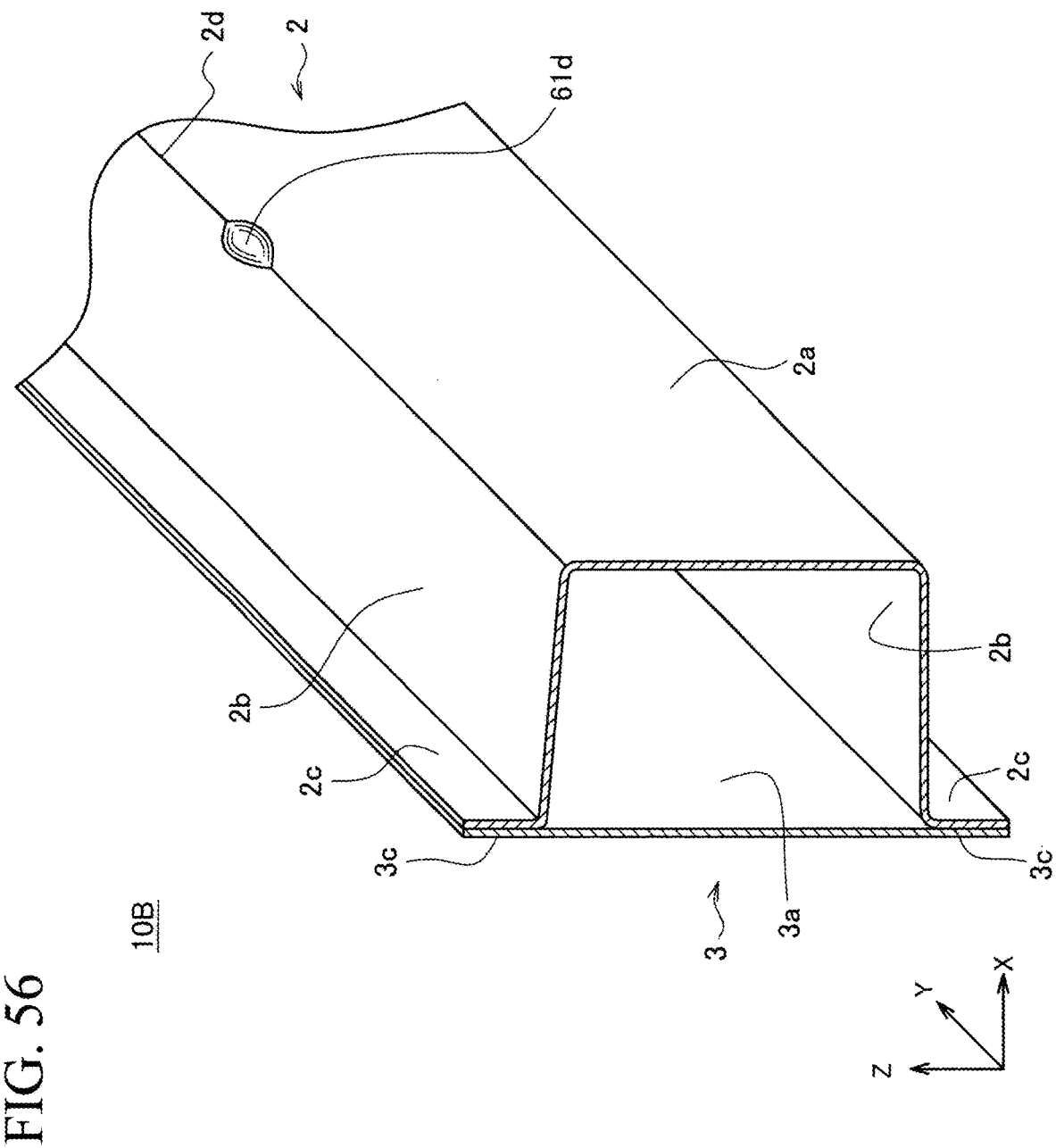
FIG. 56 is a schematic view showing another example of the recessed part provided in the hollow member according to an embodiment.

Moreover, as shown in FIG. 56, a recessed part 61d may be provided in the ridge portion 2d. Accordingly, the full plastic moment of the portion of the hollow member 10B where the recessed part 61d is provided in the longitudinal direction is significantly changed, so that the bending deformation with the portion provided with the recessed part 61d as a bending origin can be more reliably induced.

Figure 57:
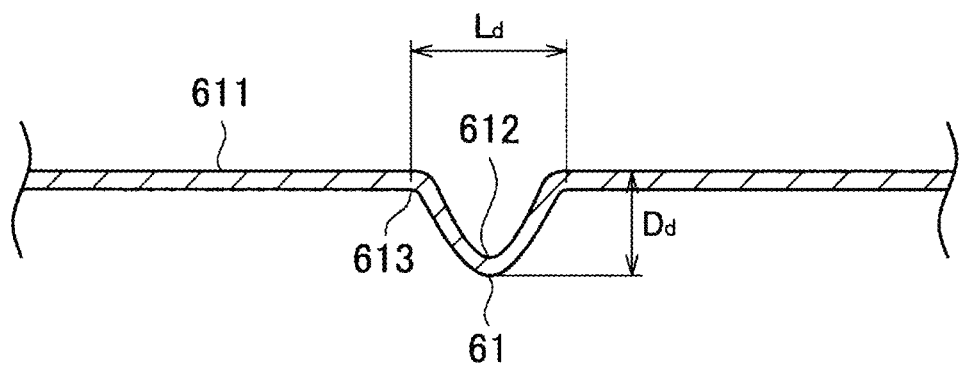
FIG. 57 is a schematic view showing an example of the shape and size of the recessed part according to an embodiment.

In the case where the recessed part 61 as described above is provided, the form of the recessed part 61 is not particularly limited, but the recessed part 61 preferably has the forms described below. For example, in a case where the hollow member 10B is formed of a high strength steel sheet, from the viewpoint of formability, as shown in FIG. 57, a depth $D_d$ of the recessed part 61 (the length in the direction orthogonal to the plane between a surface 611 of the portion provided with the recessed part 61 and a bottom 612 of the recessed part 61, see FIG. 57) is preferably three times the sheet thickness of the hollow member 10B or more. In addition, a distance $L_d$ (see FIG. 57) between edges 613 of the recessed part 61 in the longitudinal direction of the hollow member 10B is preferably 50 mm or less.

Figure 58:
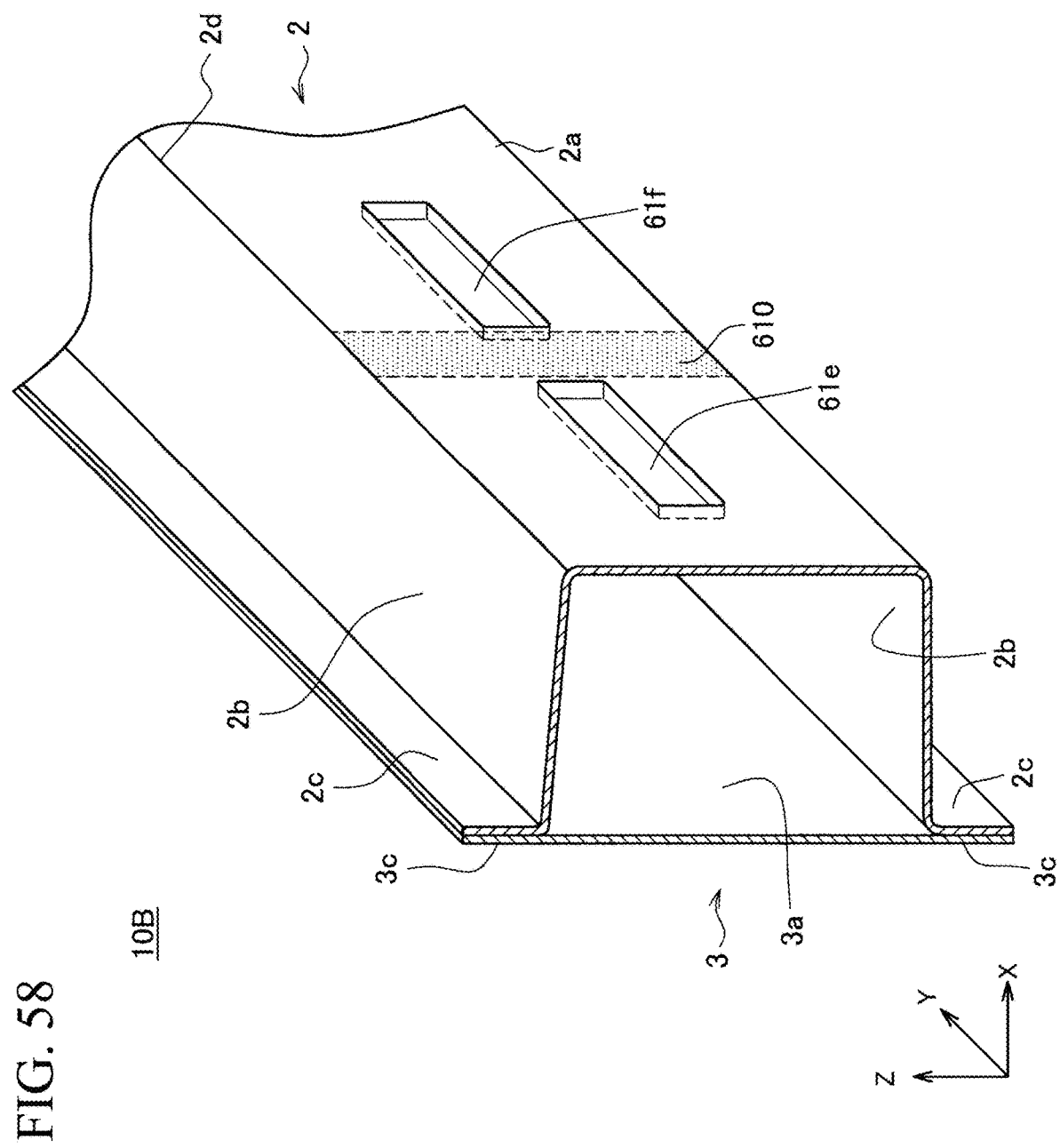
FIG. 58 is a schematic view showing another example of the recessed part provided in the hollow member according to an embodiment.

FIG. 58 is a schematic view showing another example of the recessed part provided in the hollow member according to an embodiment. As shown in FIG. 58, recessed parts 61e and 61f extending in the longitudinal direction of the hollow member 10B are arranged along the longitudinal direction of the hollow member 10B. There are ridge lines along the longitudinal direction at the edges of the recessed parts in the recessed parts 61e and 61f. In this case, in the hollow member 10B, bending occurs at a portion 610 between the recessed part 61e and the recessed part 61f in the longitudinal direction. This is because the ridge lines are disconnected at the portion 610 between the recessed part 61e and the recessed part 61f in the longitudinal direction. That is, the portion 610 between the recessed part 61e and the recessed part 61f in the longitudinal direction is a shape changing portion. Even in this case, in a case where the hollow member 10B is formed of a high strength steel sheet, from the viewpoint of formability, the depth $D_d$ of the recessed parts 61e and 61f is preferably three times the sheet thickness of the hollow member 10B or more. In addition, in the portion 610, a recessed part, a protrusion, a thin portion, or a different strength portion, which will be described later, may be formed.

The recessed parts 61e and 61f may not necessarily be arranged in series as shown in FIG. 58. Moreover, the recessed parts 61e and 61f may not necessarily extend in the longitudinal direction of the hollow member 10B. For example, in the surface of the portions where the recessed parts 61e and 61f are provided, the angle formed by the longitudinal direction of the hollow member 10B and the extension direction of the recessed parts 61e and 61f may be 0° or more and 45° or less.

(Protrusion)

Figure 59:
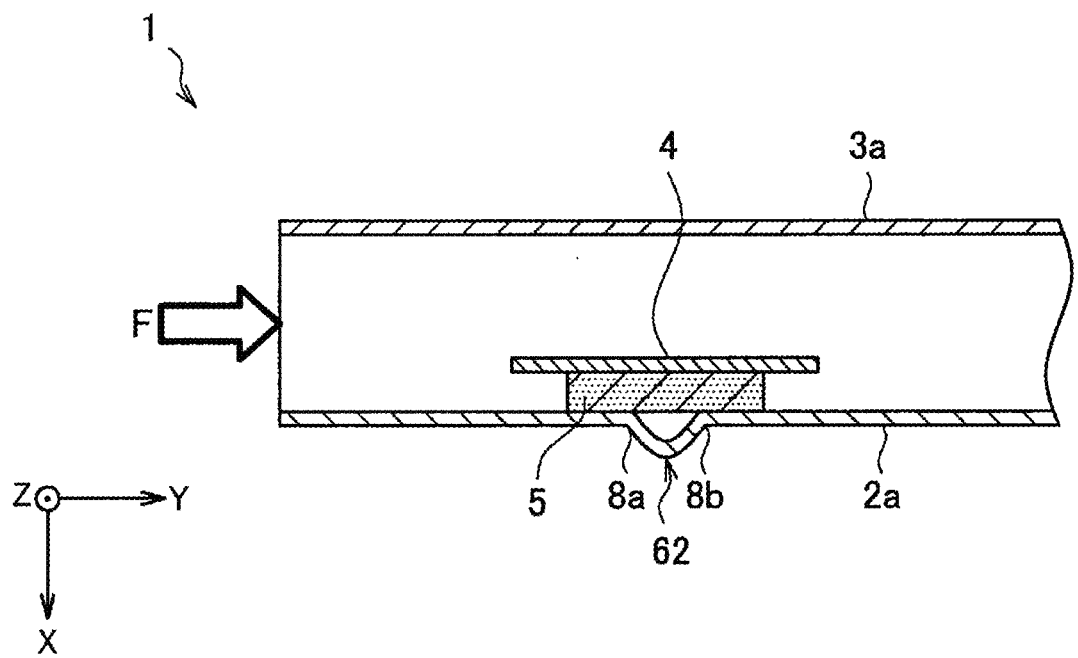
FIG. 59 is a sectional view of the frame showing an example of a protrusion provided in the hollow member according to an embodiment.

A protrusion has the features of a shape changing portion. FIG. 59 is a sectional view of the frame 1 showing an example of a protrusion provided in the hollow member according to an embodiment. As shown in FIG. 59, a protrusion 62 is provided in the bottom wall part 2a. The portion provided with the protrusion 62 is a shape changing portion. In a case where a collision load F shown in FIG. 59 is input to the hollow member 10, bending occurs at any of edges 8a and 8b of the protrusion 62 in the longitudinal direction of the hollow member 10 so that the protrusion 62 becomes a bend inside. Therefore, the reinforcement 4 is provided at a position facing at least the protrusion 62 and the regions 8a and 8b before and after the protrusion 62, and the filling member 5 is disposed in close contact with the reinforcement 4. Accordingly, in a case where bending occurs in the vicinity of the protrusion 62 due to the input of the collision load F, the out-of-plane deformation of the reinforcement 4 can be suppressed, and buckling of the reinforcement 4 can be suppressed.

Here, FIG. 59 shows an example of the protrusion in a case where the frame 1 has the reinforcement 4 as in the first embodiment and the second example of the fourth embodiment. As another example, FIGS. 60 and 61 show examples of the hole in a case where the frame 1 does not have the reinforcement 4.

Figure 60:
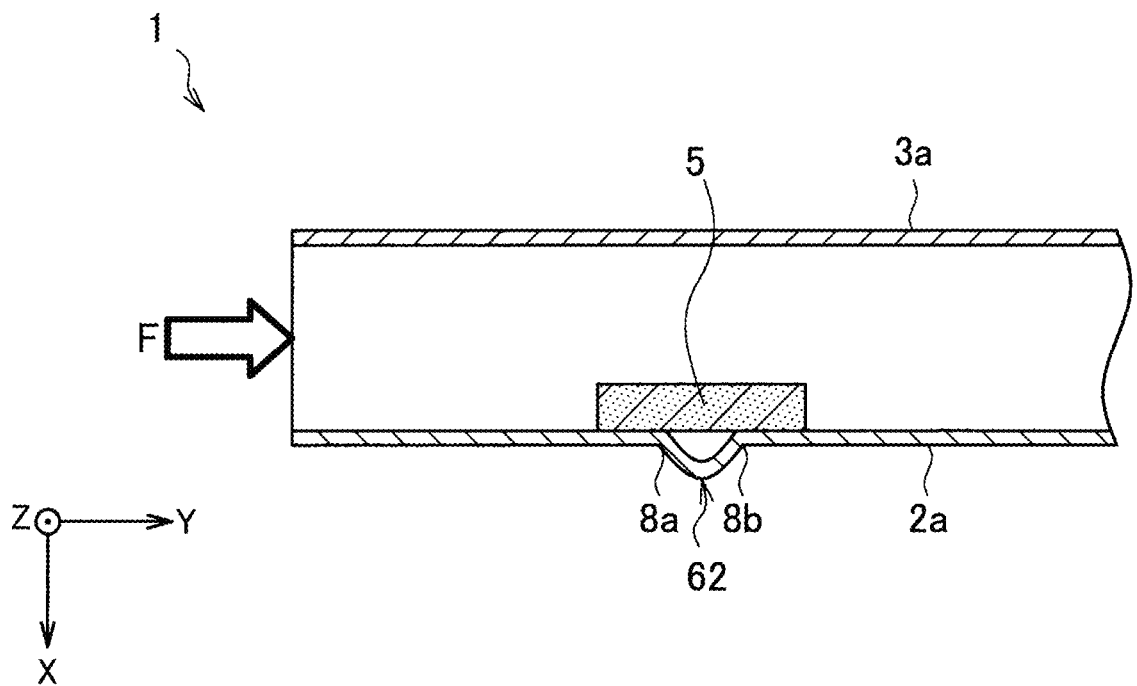
FIG. 60 is a sectional view of the frame showing an example of the protrusion provided in the hollow member according to an embodiment.

FIG. 60 is a sectional view of the frame 1 showing an example of the protrusion provided in the hollow member according to the embodiment. The frame 1 shown in FIG. 60 is the frame 1 according to the second embodiment. As shown in FIG. 60, the protrusion 62 is provided in the bottom wall part 2a. The portion provided with the protrusion 62 is a shape changing portion. In a case where a collision load F shown in FIG. 60 is input to the hollow member 10, bending occurs at a portion where the full plastic moment is the lowest in the edges 8a and 8b before and after the protrusion 62 in the longitudinal direction of the hollow member 10 so that the protrusion 62 becomes a bend inside. That is, in the longitudinal direction of the hollow member 10, the portion including the protrusion 62 and the edges 8a and 8b before and after the protrusion 62 in the hollow member 10 becomes a bending induction portion provided in the hollow member 10. Therefore, the filling member 5 is disposed in close contact with the inner surface of the bottom wall part 2a at least in the portion provided with the protrusion 62 and the edges 8a and 8b before and after the protrusion 62. Accordingly, in a case where bending occurs in the vicinity of the protrusion 62 due to the input of the collision load F, the out-of-plane deformation of the frame 1 can be suppressed, and the load bearing performance of the frame 1 can be maintained at a high level.

Figure 61:
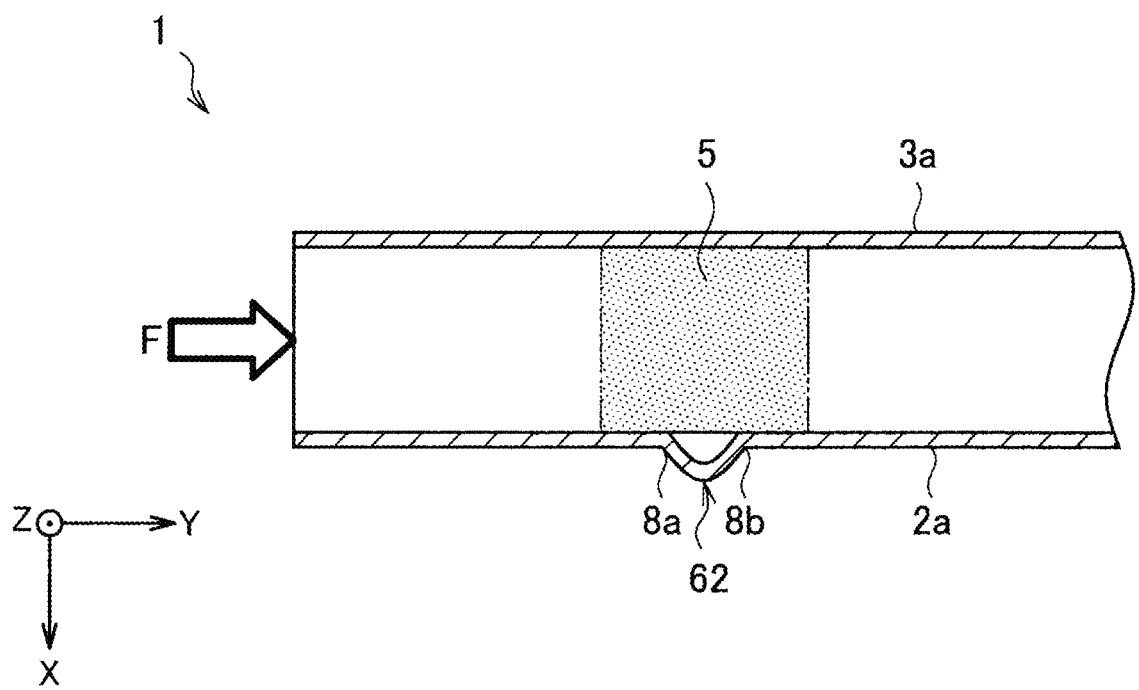
FIG. 61 is a sectional view of the frame showing an example of the protrusion provided in the hollow member according to an embodiment.

FIG. 61 is a sectional view of the frame 1 showing an example of the protrusion provided in the hollow member according to an embodiment. The frame 1 shown in FIG. 61 is the frame 1 according to the third embodiment. As shown in FIG. 61, the protrusion 62 is provided in the bottom wall part 2a. The portion provided with the protrusion 62 is a shape changing portion. In a case where a collision load F shown in FIG. 61 is input to the hollow member 10, bending occurs at a portion where the full plastic moment is the lowest in the edges 8a and 8b before and after the protrusion 62 in the longitudinal direction of the hollow member 10 so that the protrusion 62 becomes a bend inside. That is, in the longitudinal direction of the hollow member 10, the portion including the protrusion 62 and the edges 8a and 8b before and after the protrusion 62 in the hollow member 10 becomes a bending induction portion provided in the hollow member 10. Therefore, the filling member 5 is disposed in close contact with the inner surface of the side wall part 2b at least in the portion provided with the protrusion 62 and the edges 8a and 8b before and after the protrusion 62. Accordingly, in a case where bending occurs in the vicinity of the protrusion 62 due to the input of the collision load F, the out-of-plane deformation of the frame 1 can be suppressed, and the collision energy absorption properties of the frame 1 can be maintained at a high level.

Figure 62:
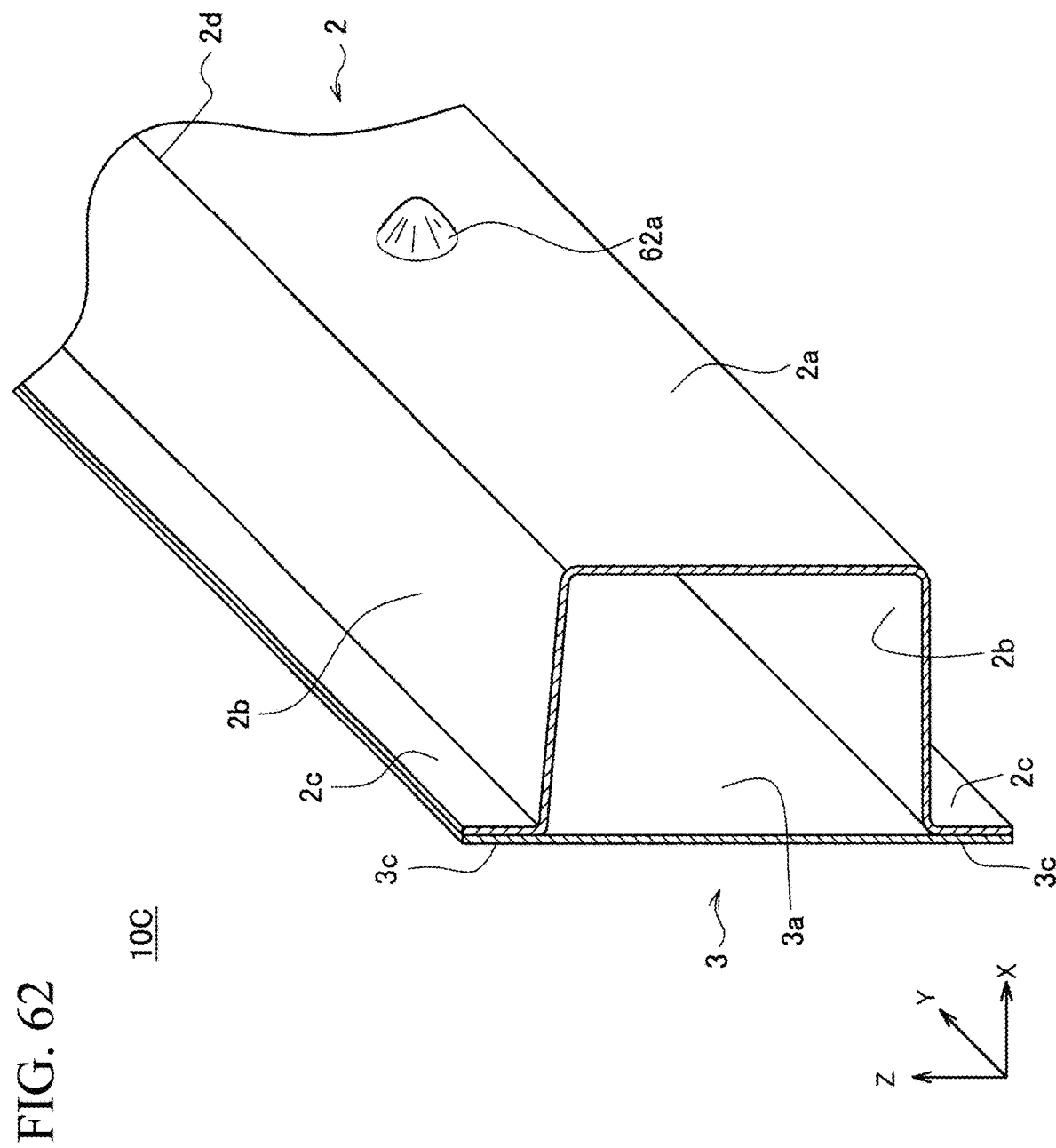
FIG. 62 is a schematic view showing another example of the protrusion provided in the hollow member according to an embodiment.

The shape and disposition of the protrusion are not limited to the examples described above. FIGS. 62 to 65 are schematic views showing other examples of the protrusion provided in the hollow member according to the embodiment. For example, the protrusion mentioned here is realized by processing the hollow member 10. That is, the protrusion may be provided by deforming a portion of the steel sheet constituting a hollow member 10C. As shown in FIG. 62, a circular protrusion 62a may be provided in the bottom wall part 2a.

Figure 63:
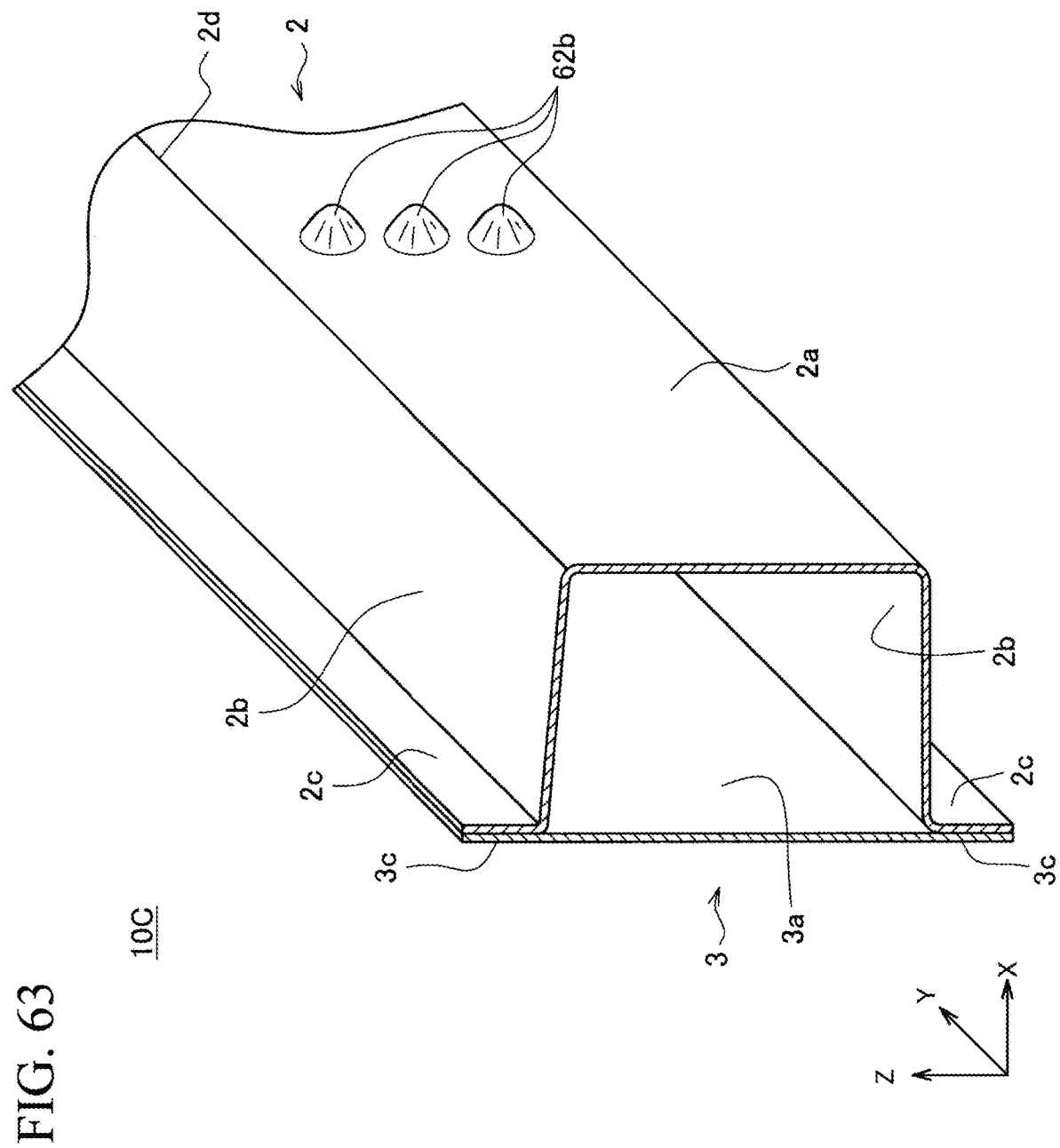
FIG. 63 is a schematic view showing another example of the protrusion provided in the hollow member according to an embodiment.

In addition, as shown in FIG. 63, a plurality of the protrusions 62b may also be provided in the bottom wall part 2a. In this case, for example, the plurality of protrusions 62b may be arranged in a direction transverse to the longitudinal direction of the hollow member 10C. In this case, when a collision load is input, the hollow member 10C tends to undergo bending deformation toward the bottom wall part 2a with any of regions before and after the plurality of protrusions 62b in the longitudinal direction of the hollow member 10C as a bending origin.

Figure 64:
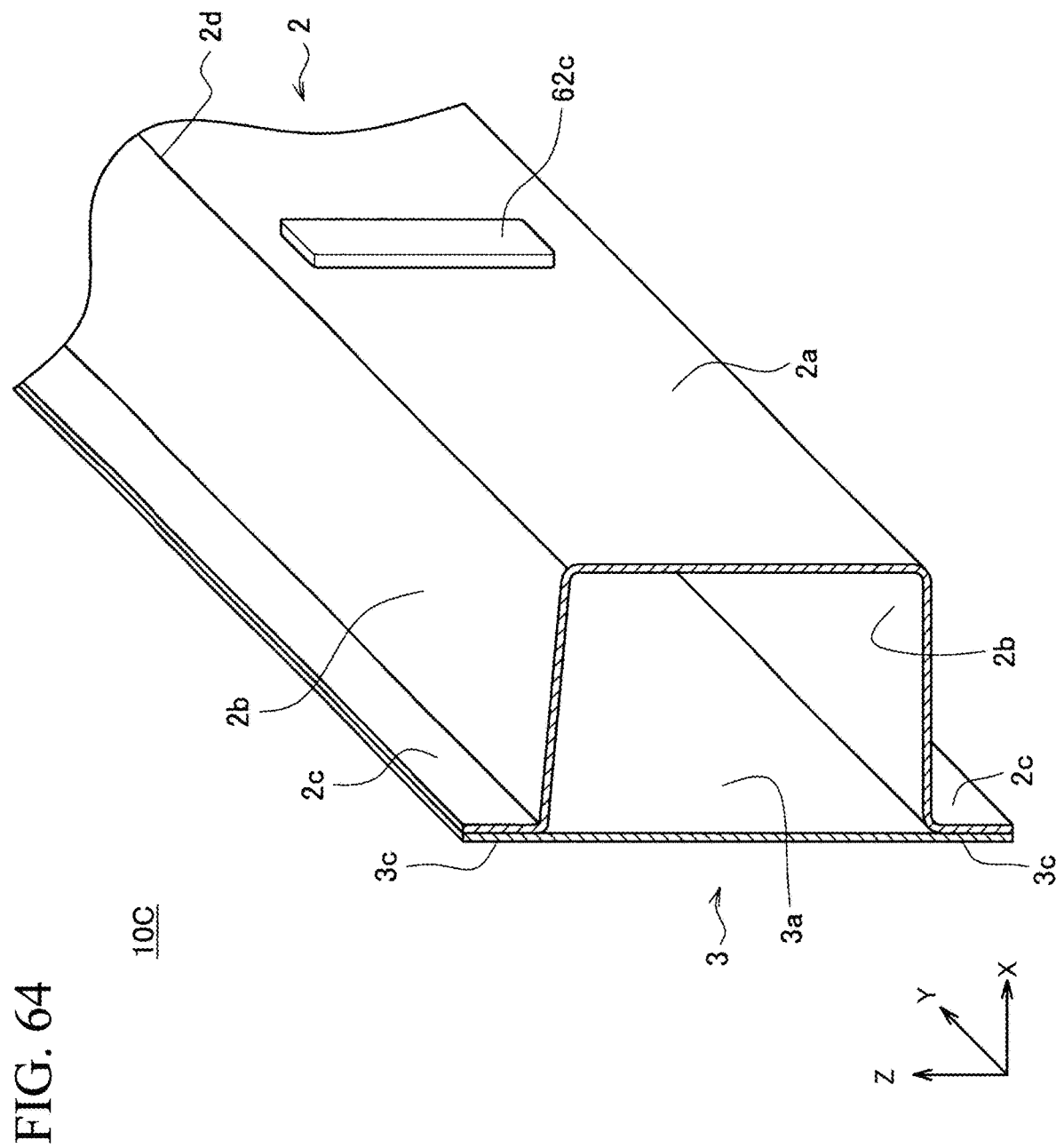
FIG. 64 is a schematic view showing another example of the protrusion provided in the hollow member according to an embodiment.

In addition, as shown in FIG. 64, a protrusion 62c extending in a direction transverse to the longitudinal direction of the hollow member 10C may be provided in the bottom wall part 2a. In this case, when a collision load is input, the hollow member 10C undergoes bending deformation toward the bottom wall part 2a with any of regions before and after the protrusion 62c in the longitudinal direction of the hollow member 10C as a bending origin. The shape of the protrusion 62c is not limited to the rounded rectangle shown in FIG. 64, and may be any shape.

The direction transverse to the longitudinal direction of the hollow member 10C described above is not limited to the direction orthogonal to the longitudinal direction of the hollow member 10C as shown in FIG. 64. For example, the angle formed by the longitudinal direction of the hollow member 10C and the transverse direction is 45 degrees or more and 90 degrees or less at the surface of the portion provided with the protrusion 62.

The portion provided with the protrusion 62 is not limited to the bottom wall part 2a. For example, the protrusion 62 may be provided in the side wall part 2b or the top wall part 3a. Moreover, it is preferable that the protrusion 62 and the like are not provided in a portion facing the portion provided with the protrusion 62. For example, in a case where the protrusion 62 is provided in the bottom wall part 2a, it is preferable that the top wall part 3a is not provided with a portion that induces bending deformation such as another protrusion 62. This is to induce bending deformation on the side where the protrusion 62 is provided, when a collision load is input.

Figure 65:
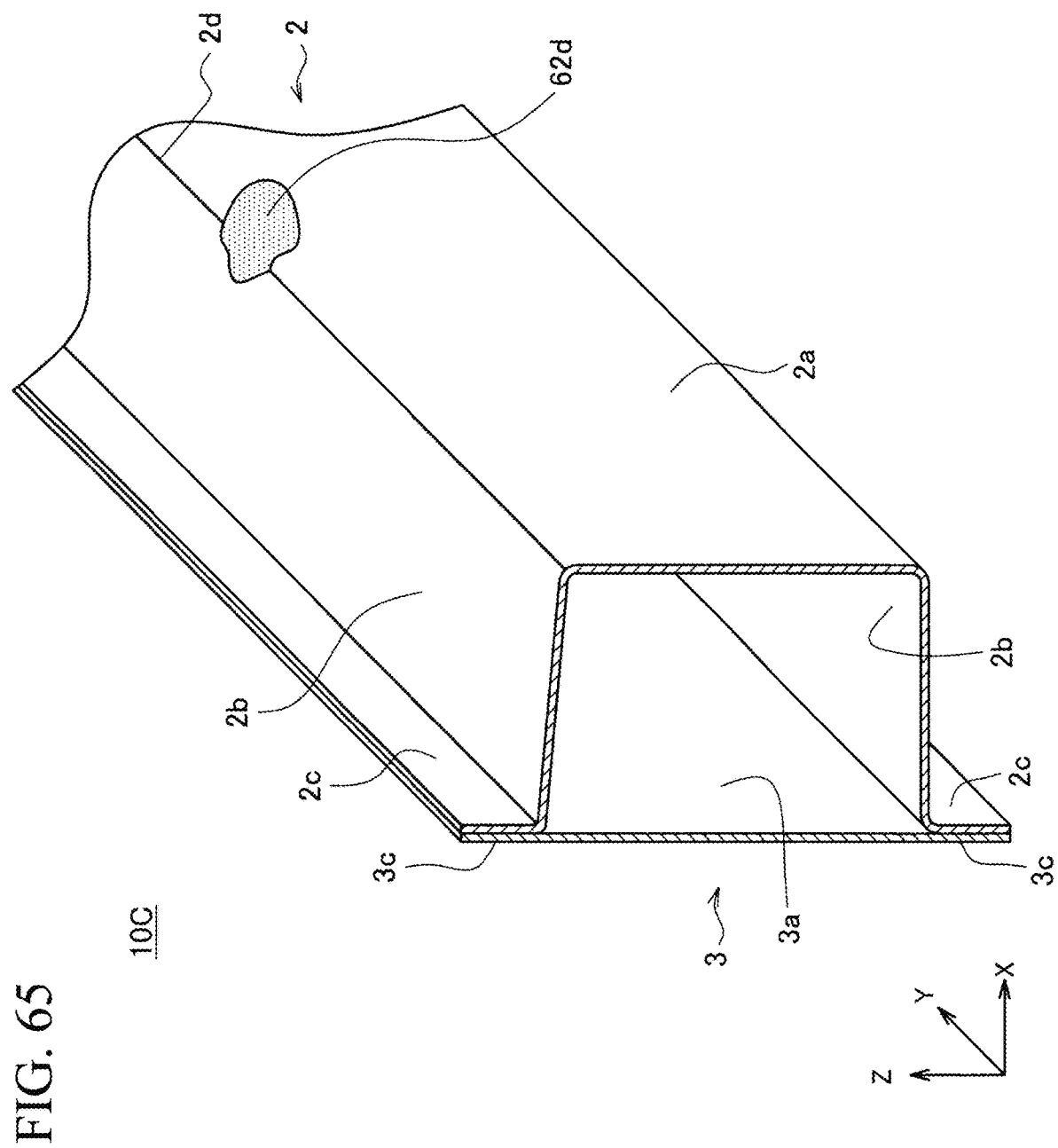
FIG. 65 is a schematic view showing another example of the protrusion provided in the hollow member according to an embodiment.

Moreover, as shown in FIG. 65, a protrusion 62d may be provided in the ridge portion 2d. Accordingly, the ridge line is disconnected at the portion provided with the protrusion 62d in the longitudinal direction in the hollow member 10C, so that the bending deformation with the portion provided with the protrusion 62d as a bending origin can be more reliably induced.

Figure 66:
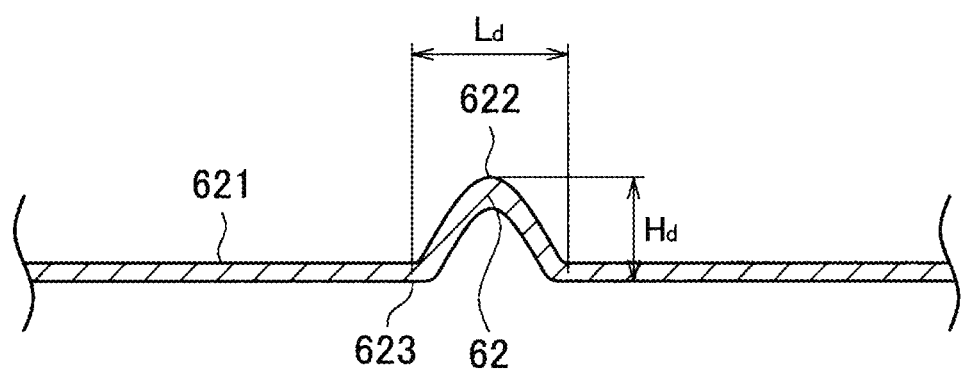
FIG. 66 is a schematic view showing an example of the shape and size of the protrusion according to an embodiment.

In the case where the protrusion 62 as described above is provided, the form of the protrusion 62 is not particularly limited, but the protrusion 62 preferably has the forms described below. For example, in a case where the hollow member 10C is formed of a high strength steel sheet, from the viewpoint of formability, as shown in FIG. 66, a height $H_d$ of the protrusion 62 (the length in the direction orthogonal to the plane between a surface 621 of the portion provided with the protrusion 62 and a top 622 of the protrusion 62, see FIG. 66) is preferably three times the sheet thickness of the hollow member 10C or more. In addition, a distance $L_d$ (see FIG. 66) between edges 623 of the protrusion 62 in the longitudinal direction of the hollow member 10C is preferably 50 mm or less.

Figure 67:
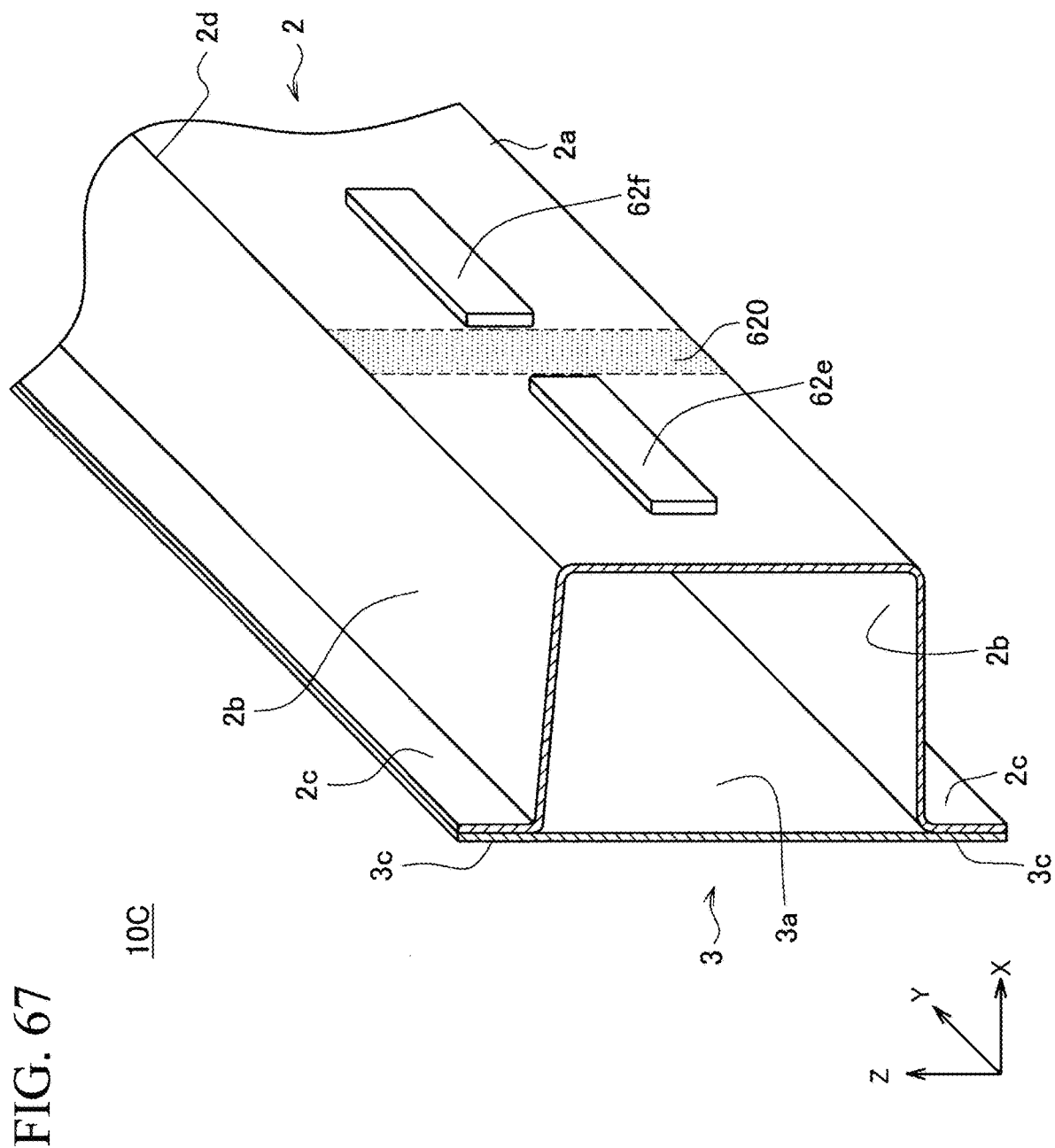
FIG. 67 is a schematic view showing another example of the protrusion provided in the hollow member according to an embodiment.

FIG. 67 is a schematic view showing another example of the protrusion provided in the hollow member according to the embodiment. As shown in FIG. 67, protrusions 62e and 62f extending in the longitudinal direction of the hollow member 10C are arranged along the longitudinal direction of the hollow member 10C. There are ridge lines along the longitudinal direction at the edges of the protrusions in the protrusions 62e and 62f. In this case, in the hollow member 10C, bending occurs at a portion 620 between the protrusion 62e and the protrusion 62f in the longitudinal direction. This is because the ridge lines are disconnected at the portion 620 between the protrusion 62e and the protrusion 62f in the longitudinal direction. That is, the portion 620 between the protrusion 62e and the protrusion 62f in the longitudinal direction is a shape changing portion. Even in this case, in a case where the hollow member 10C is formed of a high strength steel sheet, from the viewpoint of formability, the height (Hd) of the protrusions 62e and 62f is preferably three times the sheet thickness of the hollow member 10C or more. In addition, in the portion 620, the recessed part and the protrusion described above, or a thin portion or a different strength portion, which will be described later, may be formed.

The protrusions 62e and 62f may not necessarily be arranged in series as shown in FIG. 67. Moreover, the protrusions 62e and 62f may not necessarily extend in the longitudinal direction of the hollow member 10C. For example, in the surface of the portions where the protrusions 62e and 62f are provided, the angle formed by the longitudinal direction of the hollow member 10C and the extension direction of the protrusions 62e and 62f may be 0° or more and 45° or less.

(Sheet Thickness Changing Portion or Thin Portion)

Figure 68:
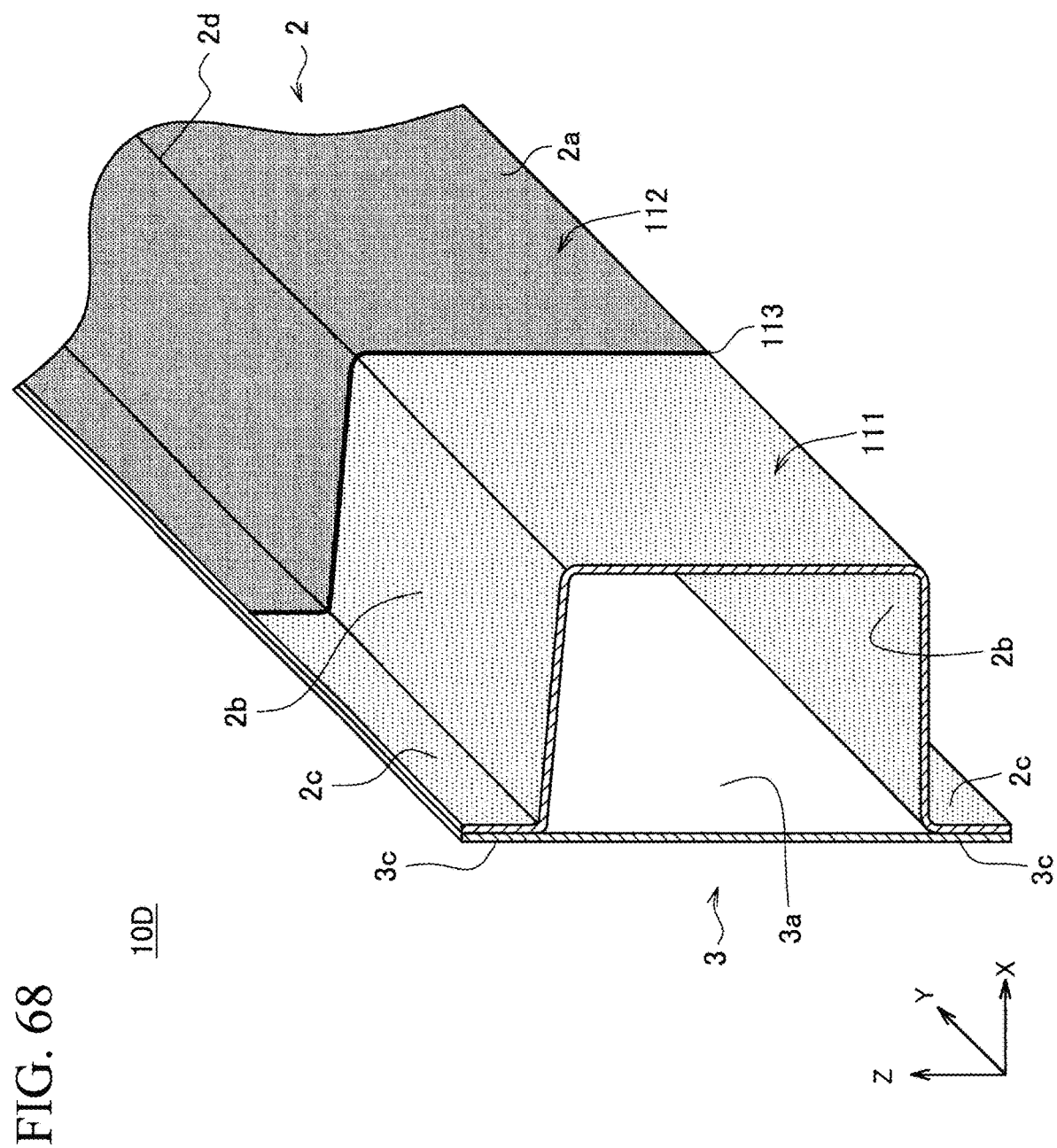
FIG. 68 is a schematic view showing an example of a sheet thickness changing portion provided in the hollow member according to an embodiment.

A sheet thickness changing portion or thin portion has the features of both the full plastic moment changing portion and the shape changing portion. FIG. 68 is a schematic view showing an example of the sheet thickness changing portion provided in the hollow member according to an embodiment. The sheet thickness changing portion mentioned here means a portion where the sheet thickness changes in the longitudinal direction of a hollow member 10D. As shown in FIG. 68, the hollow member 10D includes a first sheet thickness portion 111 and a second sheet thickness portion 112. The first sheet thickness portion 111 is provided on an end portion side of the hollow member 10D, and the second sheet thickness portion 112 is provided continuously with the first sheet thickness portion 111 along the longitudinal direction of the hollow member 10D. The sheet thickness of the steel sheet is different between the first sheet thickness portion 111 and the second sheet thickness portion 112. The magnitude relationship of the sheet thickness is not particularly limited, but from the viewpoint of securing the bending rigidity of the entire hollow member 10D, it is preferable that the sheet thickness of the second sheet thickness portion 112 is larger than the sheet thickness of the first sheet thickness portion 111.

In this case, as shown in FIG. 68, the boundary portion between the first sheet thickness portion 111 and the second sheet thickness portion 112 becomes a sheet thickness changing portion 113. In the sheet thickness changing portion 113, the full plastic moment in the longitudinal direction of the hollow member 10D changes. The sheet thickness changing portion 113 is also a shape changing portion. That is, the sheet thickness changing portion 113 corresponds to a bending induction portion. Therefore, in a case where a collision load is input to the hollow member 10D, the frame 1 bends at the sheet thickness changing portion 113. Therefore, the filling member 5 is disposed in close contact with at least the bottom wall part 2a provided with the sheet thickness changing portion 113 or the side wall part 2b in a portion provided with the sheet thickness changing portion 113. In a case where the frame 1 has the reinforcement 4, it is desirable that the reinforcement 4 is provided at a position facing at least the bottom wall part 2a provided with the sheet thickness changing portion 113, and the filling member 5 is disposed in close contact with the reinforcement 4.

Accordingly, in a case where bending occurs in the vicinity of the sheet thickness changing portion 113 due to the input of the collision load F, the out-of-plane deformation of the reinforcement 4 can be suppressed, and buckling of the reinforcement 4 can be suppressed.

Figure 69:
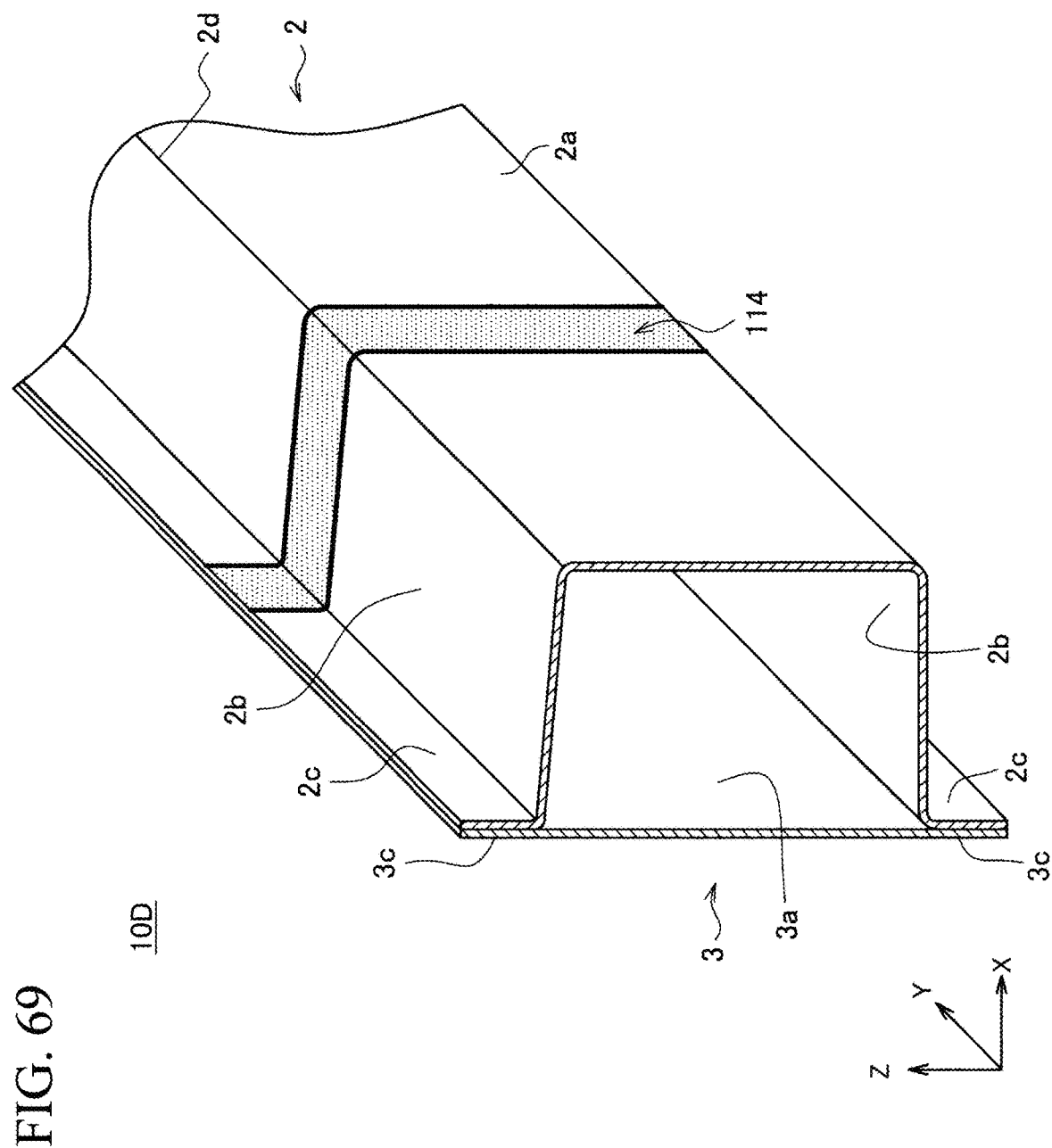
FIG. 69 is a schematic view showing an example of a thin portion provided in the hollow member according to an embodiment.

The bending induction portion may also be realized by, for example, a thin portion. FIG. 69 is a schematic view showing an example of the thin portion provided in the hollow member according to an embodiment. As shown in FIG. 69, the bottom wall part 2a is provided with a thin portion 114 having a smaller sheet thickness than other portions before and after the thin portion 114 in the longitudinal direction of the hollow member 10D. The full plastic moment of the hollow member 10 in the portion provided with the thin portion 114 is lower than the full plastic moment of the hollow member 10D in portions before and after the portion provided with the thin portion 114 (in the longitudinal direction of the hollow member 10D). The thin portion 114 has the features of both the full plastic moment changing portion and the shape changing portion. That is, the portion of the hollow member 10D where the thin portion 114 is provided corresponds to a bending induction portion. Therefore, in a case where a collision load is input to the hollow member 10D, the frame 1 bends at the portion provided with the thin portion so that the thin portion becomes a bend inside.

The hollow member 10D having such a sheet thickness changing portion may be formed of a processed sheet made by, for example, cutting, pressing, and tailored blanks. The processed sheet may be a tailor welded blank (TWB) having a weld line. The processed sheet may also be a tailor rolled blank (TRB) provided with different sheet thicknesses by a rolling roll. In the TWB, the thickness difference at the sheet thickness changing portion can be 0.2 mm or more. In the TRB, the sheet thickness change amount at the sheet thickness changing portion per member longitudinal direction can be 0.1 mm/100 mm or more.

(Different Strength Portion and Strength Changing Portion)

A different strength portion and a strength changing portion have the features of the full plastic moment changing portion. The different strength portion is a portion where the yield strength of the hollow member 10 changes in the longitudinal direction of the hollow member 10. For example, in the portion where the yield strength changes in the longitudinal direction of the hollow member 10, there is a point where the full plastic moment is smaller than the periphery. That is, the different strength portion is a full plastic moment changing portion. Therefore, plastic deformation of the hollow member 10 is induced at the point. The strength changing portion is a boundary portion where the yield strength of the hollow member 10 changes in the longitudinal direction of the hollow member 10. That is, the strength changing portion is a full plastic moment changing portion.

Figure 70:
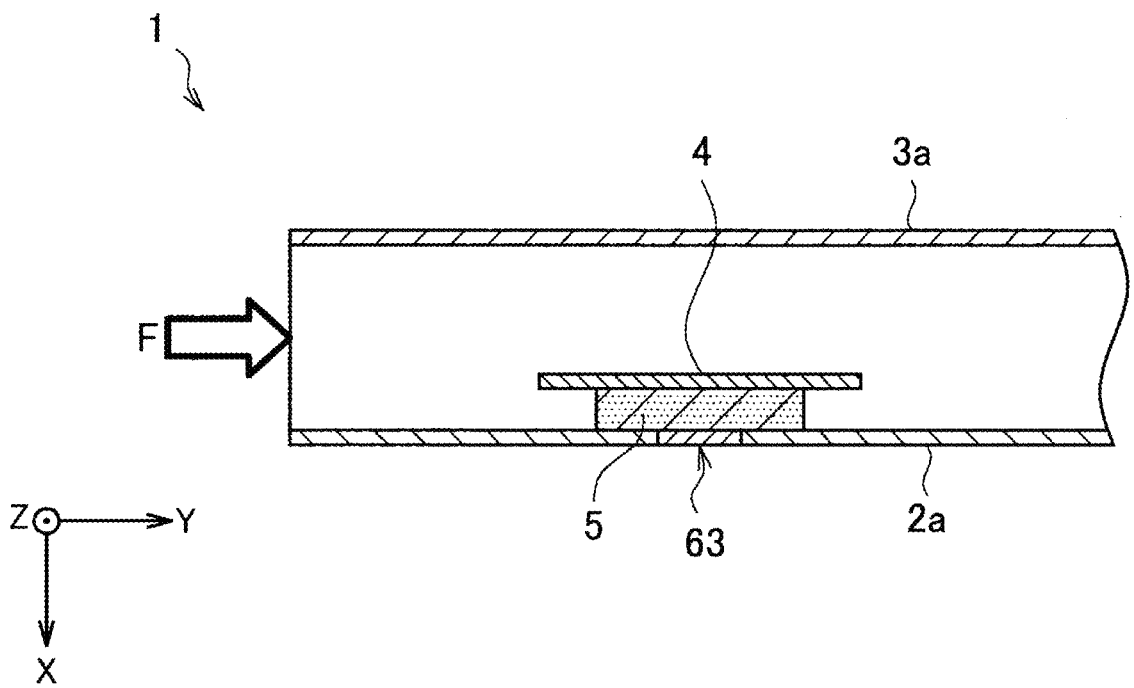
FIG. 70 is a sectional view of the frame showing an example of a different strength portion provided in the hollow member according to an embodiment.

FIG. 70 is a sectional view of the frame 1 showing an example of the different strength portion provided in the hollow member according to an embodiment. As shown in FIG. 70, a different strength portion 63 is provided in the bottom wall part 2a. The different strength portion 63 is provided, for example, by partially performing a heat treatment such as welding, hardening, or tempering on the hollow member 10. The yield strength of the hollow member 10 in the portion provided with the different strength portion 63 is different from the yield strength of the hollow member 10 in portions before and after the portion provided with the different strength portion 63 (in the longitudinal direction of the hollow member 10). Therefore, in a case where a collision load F shown in FIG. 70 is input to the hollow member 10, bending occurs at the different strength portion 63 or in the vicinity of the different strength portion 63 so that the different strength portion 63 becomes a bend inside. This bending is a bending caused by plastic deformation of the different strength portion 63 or a region in the vicinity of the different strength portion 63. Therefore, the reinforcement 4 is provided at a position facing at least the different strength portion 63 or the region in the vicinity of the different strength portion 63, and the filling member 5 is disposed in close contact with the reinforcement 4. Accordingly, in a case where bending occurs at the different strength portion 63 or in the vicinity of the different strength portion 63 due to the input of the collision load F, the out-of-plane deformation of the reinforcement 4 can be suppressed, and buckling of the reinforcement 4 can be suppressed.

Here, FIG. 70 shows an example of the different strength portion in a case where the frame 1 has the reinforcement 4 as in the first embodiment and the second example of the fourth embodiment. As another example, FIGS. 71 and 72 show examples of the hole in a case where the frame 1 does not have the reinforcement 4.

Figure 71:
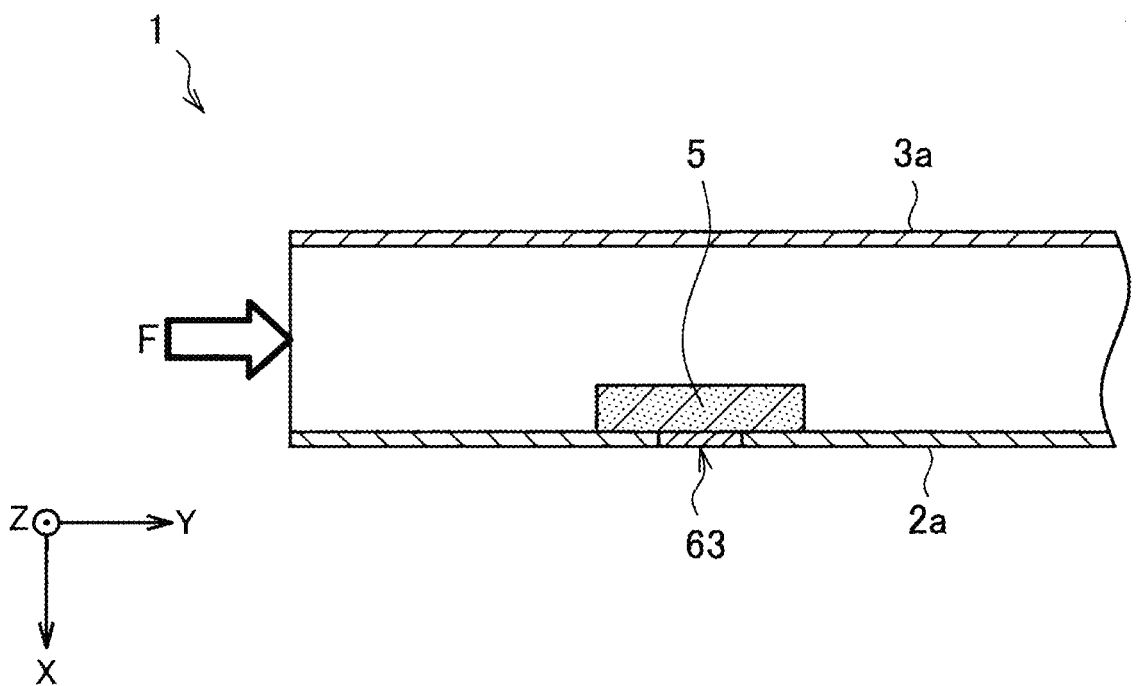
FIG. 71 is a sectional view of the frame showing an example of the different strength portion provided in the hollow member according to an embodiment.

FIG. 71 is a sectional view of the frame 1 showing an example of the different strength portion provided in the hollow member according to an embodiment. The frame 1 shown in FIG. 71 is the frame 1 according to the second embodiment. As shown in FIG. 71, the different strength portion 63 is provided in the bottom wall part 2a. The different strength portion 63 is provided, for example, by partially performing a heat treatment such as welding, hardening, or tempering on the hollow member 10. The yield strength of the hollow member 10 in the portion provided with the different strength portion 63 is different from the yield strength of the hollow member 10 in portions before and after the portion provided with the different strength portion 63 (in the longitudinal direction of the hollow member 10). Therefore, in a case where a collision load F shown in FIG. 71 is input to the hollow member 10, bending occurs at the different strength portion 63 or in the vicinity of the different strength portion 63 so that the different strength portion 63 becomes a bend inside. That is, in the longitudinal direction of the hollow member 10, the portion including the different strength portion 63 in the hollow member 10 becomes a bending induction portion provided in the hollow member 10. This bending is a bending caused by plastic deformation of the different strength portion 63 or a region in the vicinity of the different strength portion 63. Therefore, the filling member 5 is disposed in close contact with the inner surface of the bottom wall part 2a at least in the portion including the vicinity of the different strength portion 63. Accordingly, in a case where bending occurs in the vicinity of the different strength portion 63 due to the input of the collision load F, the out-of-plane deformation of the frame 1 can be suppressed, and the load bearing performance of the frame 1 can be maintained at a high level.

Figure 72:
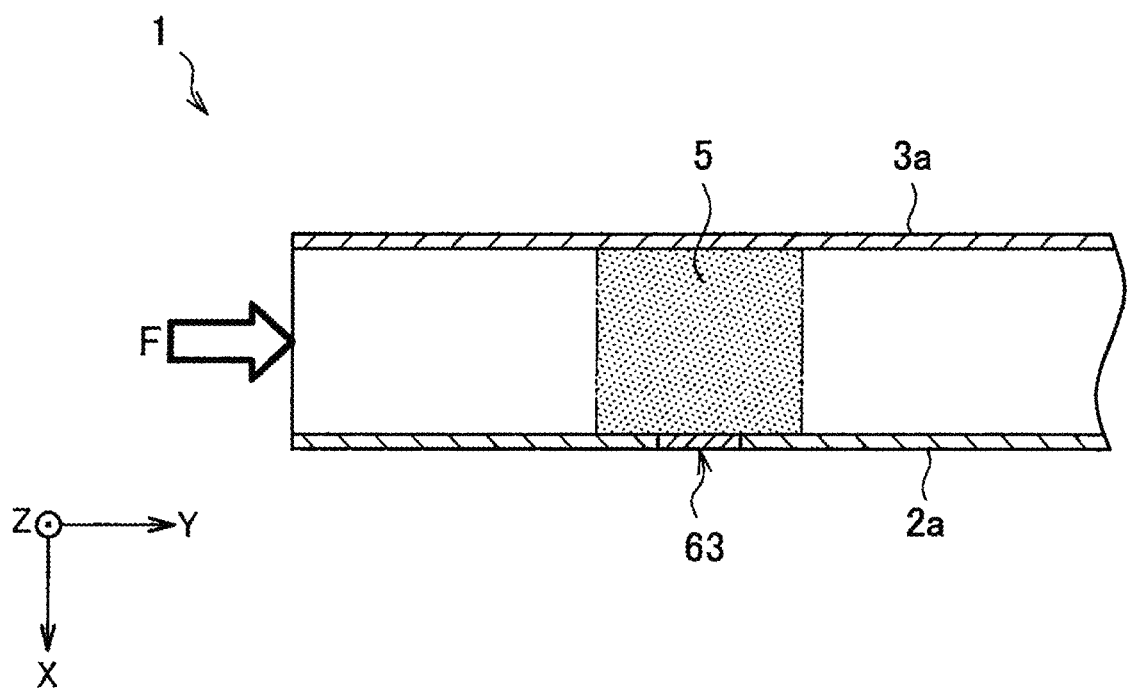
FIG. 72 is a sectional view of the frame showing an example of the different strength portion provided in the hollow member according to an embodiment.

FIG. 72 is a sectional view of the frame 1 showing an example of the different strength portion provided in the hollow member according to an embodiment. The frame 1 shown in FIG. 72 is the frame 1 according to the third embodiment. As shown in FIG. 72, the different strength portion 63 is provided in the bottom wall part 2a. The different strength portion 63 is provided, for example, by partially performing a heat treatment such as welding, hardening, or tempering on the hollow member 10. The yield strength of the hollow member 10 in the portion provided with the different strength portion 63 is different from the yield strength of the hollow member 10 in portions before and after the portion provided with the different strength portion 63 (in the longitudinal direction of the hollow member 10). Therefore, in a case where a collision load F shown in FIG. 72 is input to the hollow member 10, bending occurs at the different strength portion 63 or in the vicinity of the different strength portion 63 so that the different strength portion 63 becomes a bend inside. That is, in the longitudinal direction of the hollow member 10, the portion including the different strength portion 63 in the hollow member 10 becomes a bending induction portion provided in the hollow member 10. This bending is a bending caused by plastic deformation of the different strength portion 63 or a region in the vicinity of the different strength portion 63. Therefore, the filling member 5 is disposed in close contact with the inner surface of the side wall part 2b at least in the portion including the vicinity of the different strength portion 63. Accordingly, in a case where bending occurs in the vicinity of the different strength portion 63 due to the input of the collision load F, the out-of-plane deformation of the frame 1 can be suppressed, and the collision energy absorption properties of the frame 1 can be maintained at a high level.

Figure 73:
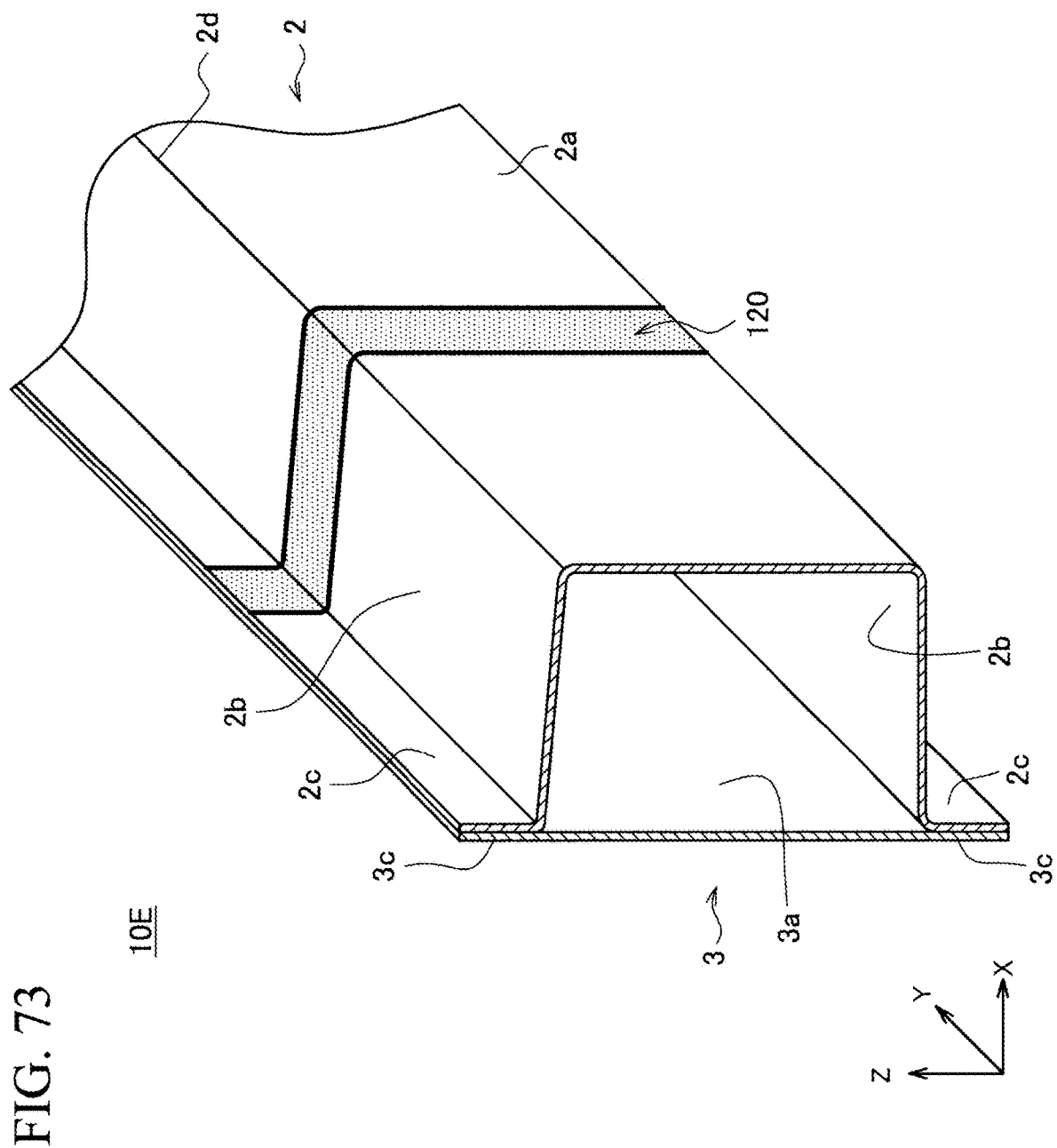
FIG. 73 is a schematic view showing another example of the different strength portion provided in the hollow member according to an embodiment.
Figure 74:
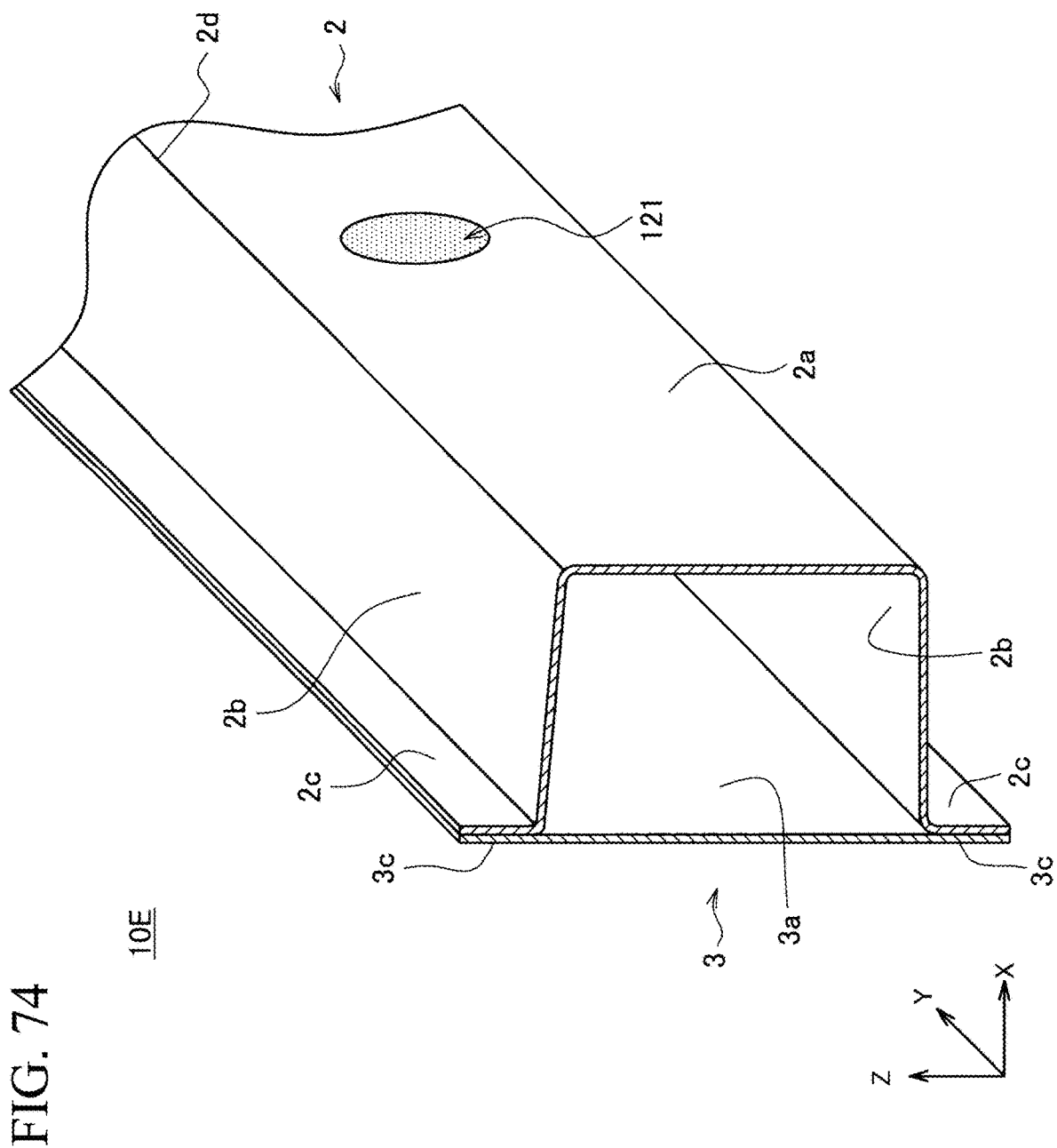
FIG. 74 is a schematic view showing another example of the different strength portion provided in the hollow member according to an embodiment.

The shape and disposition of the different strength portion are not limited to the examples described above. FIGS. 73 and 74 are schematic views showing other examples of the different strength portion provided in the hollow member according to an embodiment. The different strength portion mentioned here is realized by welding or a heat treatment performed on a processed sheet which is to form a hollow member 10E.

As shown in FIG. 73, a different strength portion 120 is provided along the circumferential direction of the cross section with respect to the longitudinal direction of the hollow member 10E. Also in this case, the portion of the hollow member 10E where the different strength portion 120 is provided corresponds to a bending induction portion. Therefore, in a case where a collision load is input to the hollow member 10E, the frame 1 bends at the portion provided with the different strength portion 120 so that the different strength portion 120 becomes a bend inside.

In addition, for example, as shown in FIG. 74, the different strength portion may be partially provided in at least one of the wall parts constituting the cross section of the hollow member 10E such as the bottom wall part 2a. Even in this case, in a case where a collision load is input to the hollow member 10E, the frame 1 bends at the portion provided with a different strength portion 121 so that the different strength portion 121 becomes a bend inside.

Figure 75:
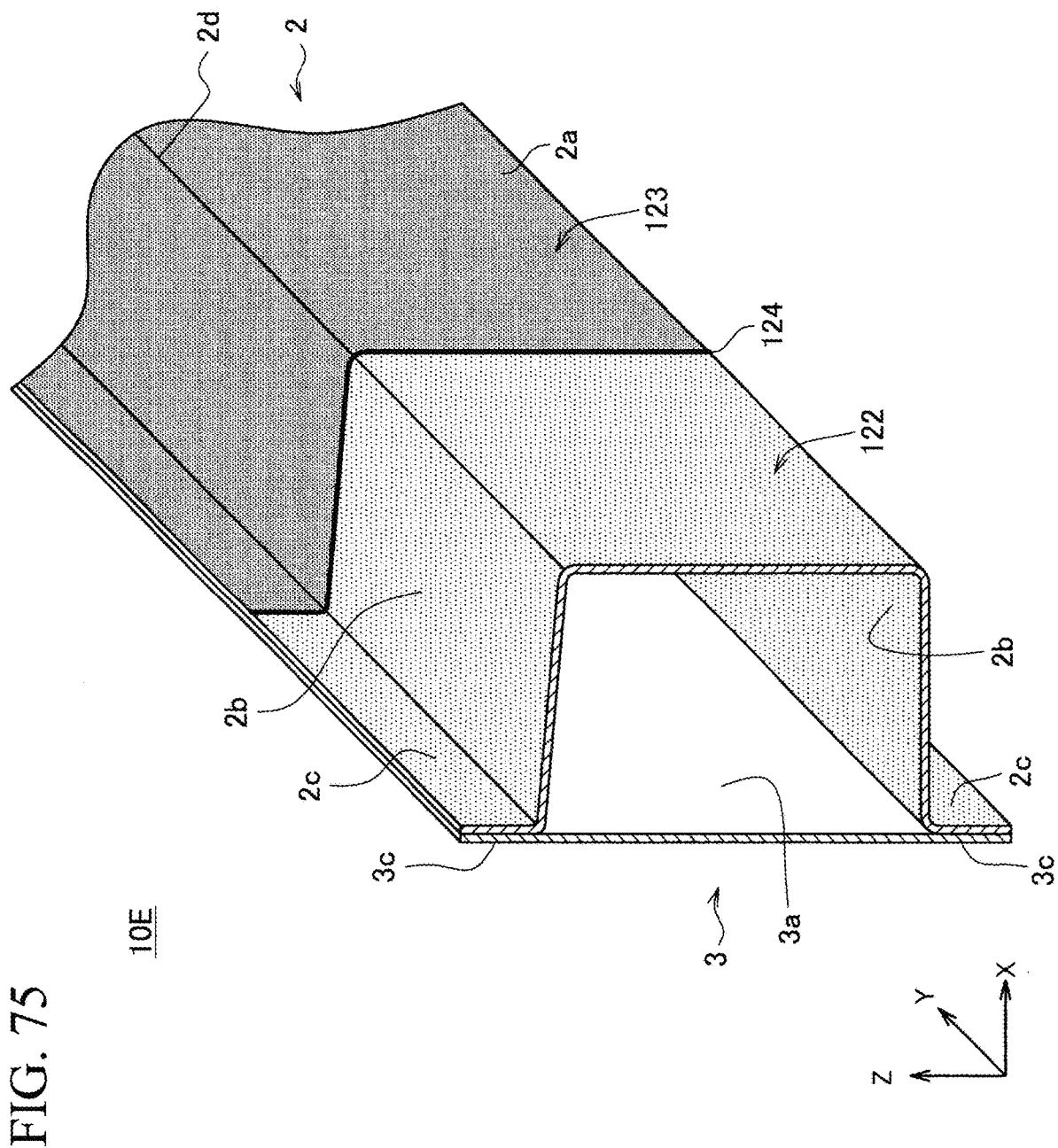
FIG. 75 is a schematic view showing an example of a strength changing portion provided in the hollow member according to an embodiment.

The bending induction portion may be realized by, for example, a strength changing portion. FIG. 75 is a schematic view showing an example of the strength changing portion provided in the hollow member according to an embodiment. As shown in FIG. 75, the hollow member 10E includes a first strength portion 122 and a second strength portion 123. The first strength portion 122 is provided on an end portion side of the hollow member 10E, and the second strength portion 123 is provided continuously with the first strength portion 122 along the longitudinal direction of the hollow member 10E. The yield strength of the steel sheet is different between the first strength portion 122 and the second strength portion 123. The magnitude relationship of the yield strength is not particularly limited, but from the viewpoint of securing the bending rigidity of the entire hollow member 10E, it is preferable that the yield strength of the second strength portion 123 is greater than the yield strength of the first strength portion 122.

In this case, as shown in FIG. 75, the boundary portion between the first strength portion 122 and the second strength portion 123 becomes a strength changing portion 124. In the strength changing portion 124, the yield strength in the longitudinal direction of the hollow member 10E changes. That is, the strength changing portion 124 corresponds to a bending induction portion. Therefore, in a case where a collision load is input to the hollow member 10E, the frame 1 bends at the strength changing portion 124.

(Combination)

Figure 76:
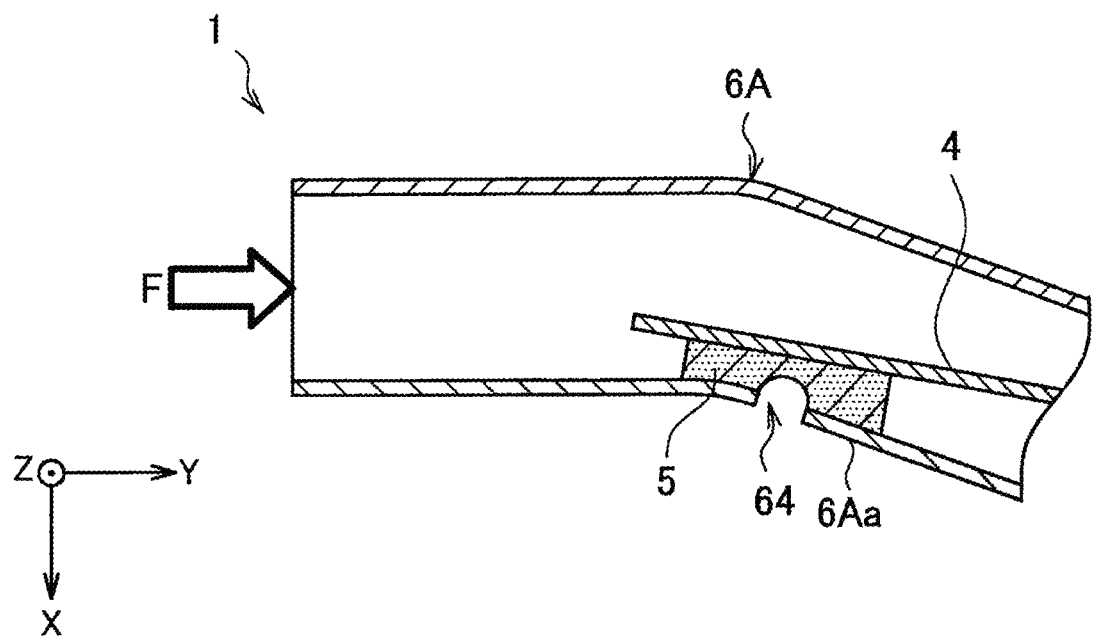
FIG. 76 is a sectional view of the frame showing an example of a combination of a bent portion and a hole provided in the hollow member according to an embodiment.

A hollow member having a bent portion may be further provided with a portion for inducing bending, such as the hole described in the above examples, in a bend inside portion of the bent portion. FIG. 76 is a sectional view of the frame 1 showing an example of a combination of a bent portion and a hole provided in the hollow member according to an embodiment. As shown in FIG. 76, the hollow member 10 is provided with the bent portion 6A, and a bend inside portion 6Aa of the bottom wall part 2a is provided with the hole 64. The reinforcement 4 is provided at least at a position facing the bend inside portion 6Aa and the hole 64, and the filling member 5 is disposed in close contact with the reinforcement 4. Accordingly, the hollow member 10 can be more reliably bent at the bent portion 6A by the input of a collision load F.

Here, FIG. 76 shows an example of the different strength portion in a case where the frame 1 has the reinforcement 4 as in the first embodiment and the second example of the fourth embodiment. As another example, FIGS. 77 and 78 show examples of the hole in a case where the frame 1 does not have the reinforcement 4.

Figure 77:
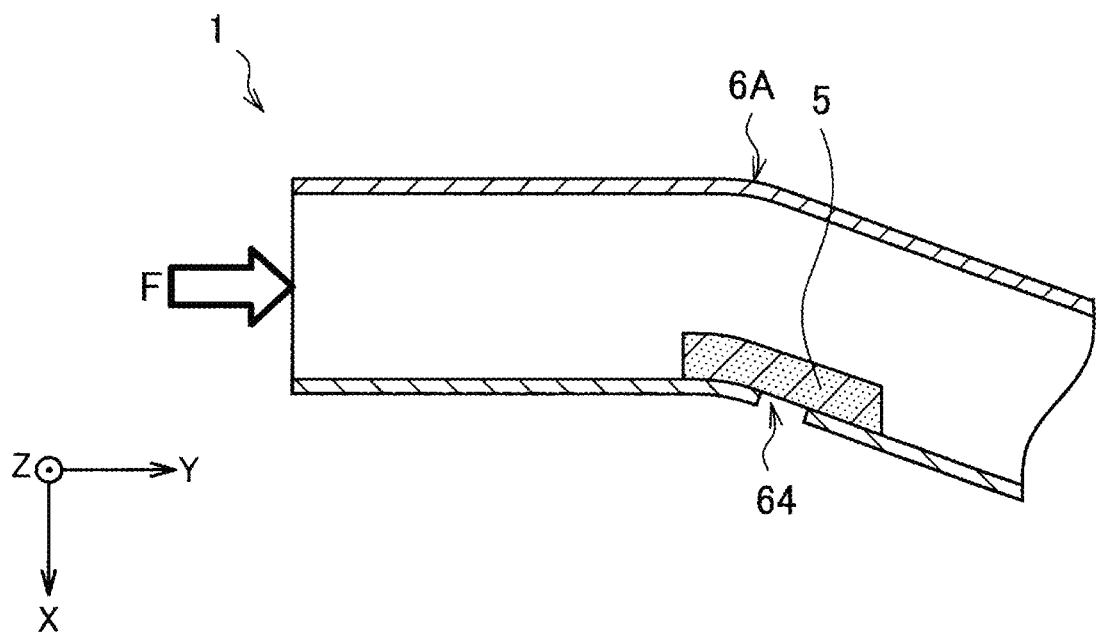
FIG. 77 is a sectional view of the frame showing an example of the combination of the bent portion and the hole provided in the hollow member according to an embodiment.
Figure 78:
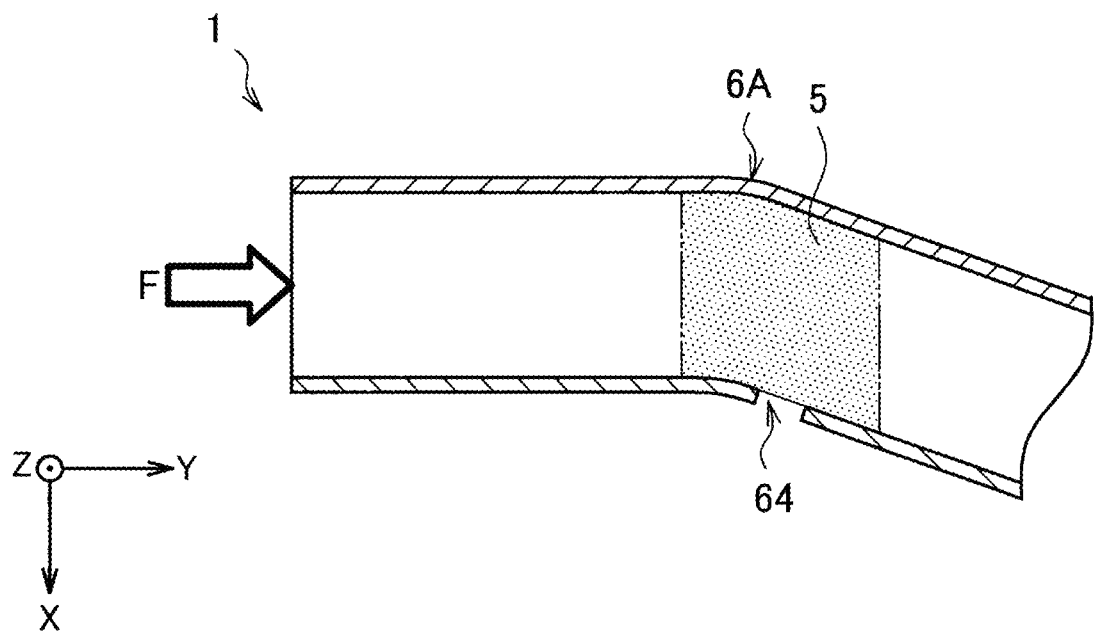
FIG. 78 is a sectional view of the frame showing an example of the combination of the bent portion and the hole provided in the hollow member according to an embodiment.

FIGS. 77 and 78 are sectional views of the frame 1 showing examples of the combination of the bent portion and the hole provided in the hollow member according to an embodiment. The frame 1 shown in FIG. 77 is the frame 1 according to the second embodiment. The frame 1 shown in FIG. 78 is the frame 1 according to the third embodiment. As shown in FIGS. 77 and 78, the hollow member 10 is provided with the bent portion 6A, and the bend inside portion of the bottom wall part 2a is provided with the hole 64. The filling member 5 is disposed in close contact with the inner surface of the bottom wall part 2a or the side wall part 2b in the bent portion 6A. Accordingly, the hollow member 10 can be more reliably bent at the bent portion 6 by the input of a collision load F.

The combination of the bending induction portions is not limited to the example shown in FIG. 76, and the bending of the hollow member 10 in the bending induction portion can be more reliably caused by combining a plurality of examples of the bending induction portion described above. For example, the bending induction portion may be realized by a combination of at least two or more of the above-described bent portion, recessed part, protrusion, hole, sheet thickness changing portion, thin portion, different strength portion, and strength changing portion. In particular, the combination of the shape changing portion and the full plastic moment changing portion among the bending induction portions is useful for bending of the hollow member 10 in a desired direction by causing a small shape changing portion to function.

The installation positions of the reinforcement 4 shown in FIGS. 42, 43, 50, 59, 70, and 76 are only the inside of the bending induction portion, but the present invention is not limited to this example. The length in the longitudinal direction and the installation position of the reinforcement 4 are not particularly limited as long as the reinforcement 4 is provided at least inside the bending induction portion. The size, material, and installation position of the reinforcement 4 are appropriately adjusted according to the collision safety performance and weight required for the frame 1.

(Another Example of Bending Induction Portion)

Even in a case where the hollow member 10 is not provided with an effective bending induction portion, when the reinforcement 4 is provided with a bent portion, a recessed part, a protrusion, a hole, a sheet thickness changing portion, a thin portion, a different strength portion, and a strength changing portion, the bent portion, the recessed part, the protrusion, the hole, the sheet thickness changing portion, the thin portion, the different strength portion, and the strength changing portion of the reinforcement 4 become bending induction portions. However, even if the reinforcement 4 is provided with the bending induction portions, it is difficult to obtain the effects as the bending induction portion under the same conditions compared to the bending induction portion of the hollow member 10. This is because the reinforcement 4 is located inside the hollow member 10 and thus has little influence on the bending deformation behavior.

Therefore, the bending induction portion provided in the hollow member 10 is treated as a main bending induction portion. In addition, when the hollow member 10 is not provided with a bending induction portion and the reinforcement 4 has a recessed part, a protrusion, a hole, a sheet thickness changing portion, a thin portion, a different strength portion, and a strength changing portion, these are regarded as bending induction portions.

In this case, for example, regarding the bent portion, a portion having a radius of curvature of 260 mm or less of a locus of the center of mass along the longitudinal direction formed by the center of mass of cross sections of the hollow member 10 and the reinforcement 4 combined (that is, the cross sections of the frame 1 excluding the filling member 5) is regarded as a bent portion serving as a bending induction portion.

Figure 79:
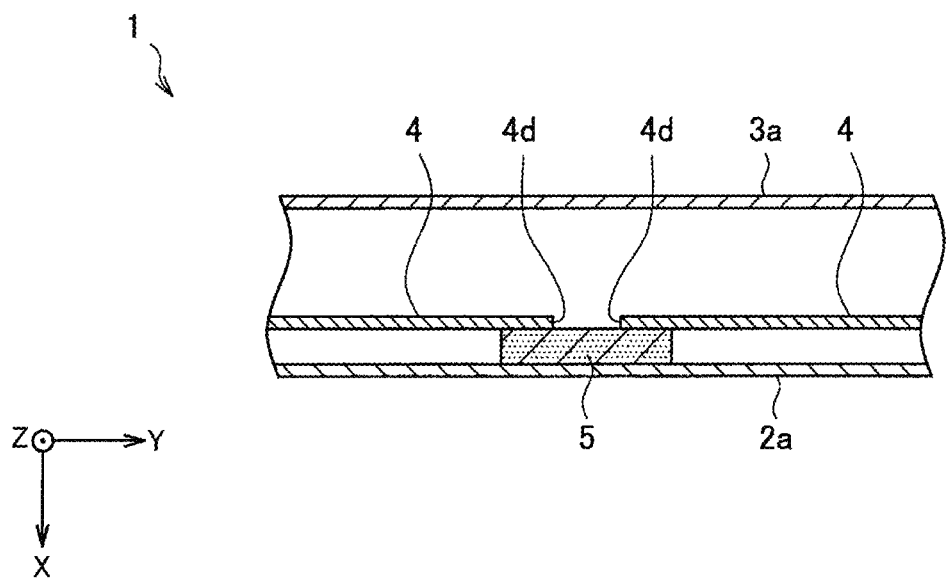
FIG. 79 is a sectional view of the frame showing a configuration example in which reinforcements are arranged apart from each other in a longitudinal direction inside the hollow member according to an embodiment.

Furthermore, even in a case where the reinforcement 4 is not provided with a bending induction portion based on the above-described configuration, an end portion of the reinforcement 4 may become a bending induction portion. This is because the full plastic moment changes depending on the presence or absence of the reinforcement 4 in the longitudinal direction of the frame 1. FIG. 79 is a sectional view of the frame 1 showing a configuration example in which the reinforcements 4 are arranged apart from each other in the longitudinal direction inside the hollow member 10 according to an embodiment. For example, as shown in FIG. 79, in a case where the reinforcements 4 are arranged apart from each other in the longitudinal direction, when the filling member 5 is disposed at the positions of the end portions of the reinforcements 4 in the longitudinal direction of the member, the deformation of the member can be relieved. As described above, a portion where the full plastic moment changes in the longitudinal direction in the frame 1 excluding the filling member 5 is regarded as a bending induction portion.

As described above, the bending induction portion in the longitudinal direction can be specified. Furthermore, if it is necessary to define a bending induction portion in a cross section perpendicular to the longitudinal direction among the bending induction portions in the longitudinal direction, the bending induction portion is regarded as follows. In a case where the bending induction portion is a shape changing portion, the shape changing portion is a bending induction portion in a cross section. In a case where the bending induction portion is a bent portion, the direction from the center of mass toward the center of curvature of the locus of the center of mass along the longitudinal direction is the direction in which the hollow member 10 is bent. In the outer circumferential portion of the cross section of the hollow member 10, a portion that intersects a line connecting the center of mass to the center of curvature of the locus of the center of mass is regarded as a bending induction portion in the cross section.

7. Examples of Shape of Closed Cross Section of Hollow Member

Figure 80:
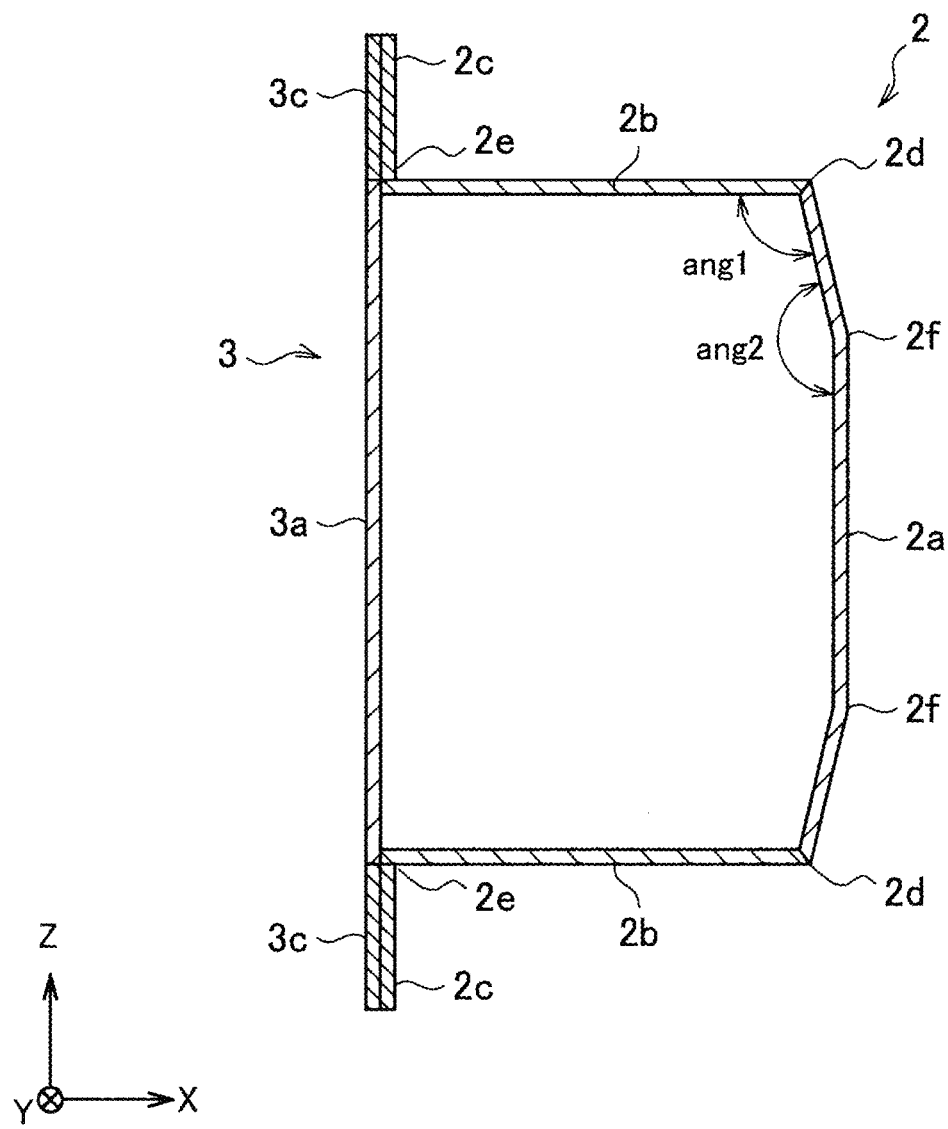
FIG. 80 is a cross-sectional view showing a cross section orthogonal to the longitudinal direction of a first example of the hollow member according to another embodiment of the present invention.

Example of the shape of the closed cross section of the hollow member 10 will be described. FIG. 80 is a cross-sectional view showing a cross section orthogonal to the longitudinal direction of a first example of the hollow member 10 according to another embodiment of the present invention. As shown in FIG. 80, the closed cross section of the hollow member 10 has a substantially hexagonal shape symmetrical about the X axis. Particularly, four vertices 2d, 2d, 2f, and 2f are present in portions of the first structural member 2 substantially orthogonal to the X-axis direction. Here, in a case where an internal angle ang1 of the vertex 2d is smaller than an internal ang2 of the vertex 2f, the vertex 2d is defined as the ridge portion 2d. That is, a portion which includes the vertices 2f and 2f and is interposed between the pair of ridge portions 2d is defined as the bottom wall part 2a.

Figure 81:
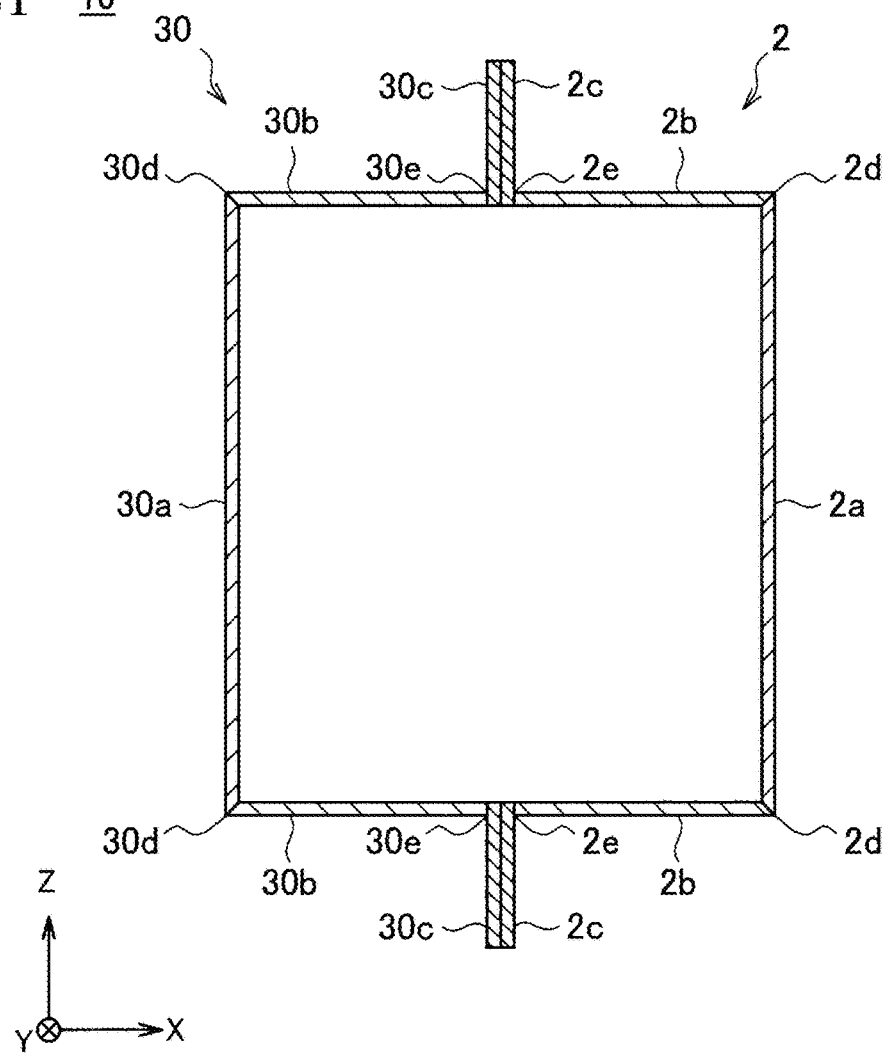
FIG. 81 is a cross-sectional view showing a cross section orthogonal to the longitudinal direction of a second example of the hollow member according to another embodiment of the present invention.

FIG. 81 is a cross-sectional view showing a cross section orthogonal to the longitudinal direction of a second example of the hollow member 10 according to another embodiment of the present invention. As shown in FIG. 81, the first structural member 2 and a second structural member 30 have a hat-shaped cross-sectional shape. That is, the hollow member 10 is formed by two structural members having a hat-shaped cross-sectional shape. In this case, the side wall part 2b of the first structural member 2 and a side wall part 30b of the second structural member 30 are defined as a single continuous side wall part (continuous side wall part) via the ridge portion 2e of the first structural member 2 and a ridge portion 30e of the second structural member 30. That is, the closed cross section of the hollow member 10 is formed by the bottom wall part 2a, a pair of the continuous side wall parts, and a bottom wall part 30a (corresponding to the top wall part).

The shapes of the hollow member 10 and the closed cross section of the hollow member 10 are not limited to the examples shown in FIGS. 3, 80, and 81. As long as the shape of the closed cross section of the hollow member 10 is substantially polygonal and the portions corresponding to the bottom wall part, the pair of side wall parts, and the top wall part forming the closed cross section can be defined, the technique according to the present invention is applicable to the hollow member 10. For example, the hollow member may be a hollow member having a closed cross section obtained by overlapping two structural members having a U-shaped cross-sectional shape so as to cause the opening parts thereof to face each other. Further, the hollow member may be a hollow member formed by hydroforming or bending a circular pipe.

Figure 82:
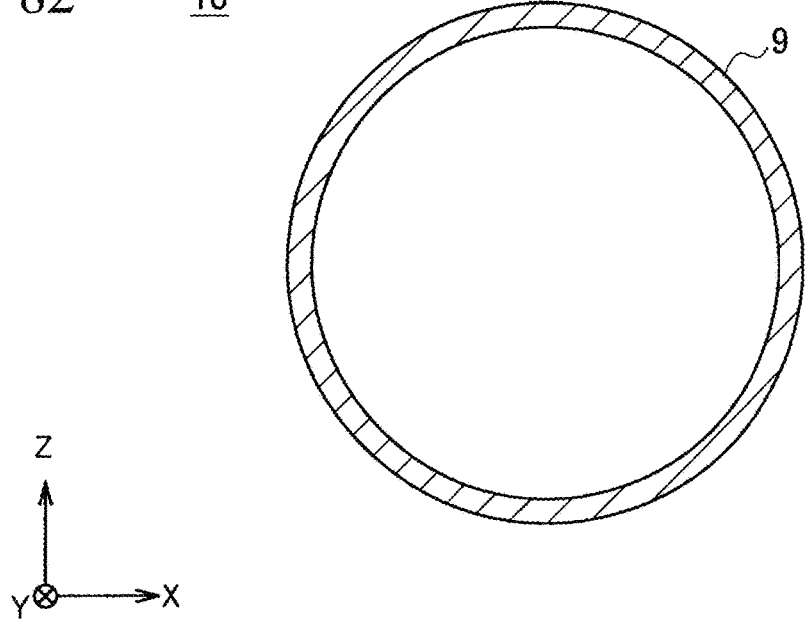
FIG. 82 is a cross-sectional view showing a cross section orthogonal to the longitudinal direction of a third example of the hollow member according to another embodiment of the present invention.

Moreover, even if the shape of the closed cross section of the hollow member 10 is any shape other than a substantially polygonal shape, the technique according to the present invention is applicable to the hollow member 10. FIG. 82 is a cross-sectional view showing a cross section orthogonal to the longitudinal direction of a third example of the hollow member 10 according to another embodiment of the present invention. As shown in FIG. 82, the hollow member 10 is formed of a third structural member 9 having a circular cross-sectional shape. The hollow member 10 is a circular tube extending in the longitudinal direction.

The third structural member 9 is an example of the first metal sheet. The third structural member 9 is formed of a metal sheet such as a steel sheet. The strength of the third structural member 9 is not particularly limited. However, in order to compensate for the overall strength of the frame that can be reduced by a reduction in weight, the tensile strength of the third structural member 9 is preferably 780 MPa or more. The tensile strength of the third structural member 9 is more preferably 980 MPa or more.

FIG. 82 shows an example in which the hollow member 10 is formed of a single structural member, but the hollow member 10 may also be formed by joining two or more structural members to each other. The cross-sectional shape of the hollow member 10 may be a perfect circle or an ellipse.

8. Disposition Range of Filling Member

As described in the first to fourth embodiments, the filling member 5 is an example of a resin material and is disposed at a point corresponding to the bending induction portion of the frame 1. Hereinafter, specific examples of the disposition range of the bending induction portion and the filling member 5 will be described.

First Viewpoint

First, the disposition range of the filling member 5 when the frame 1 (hollow member 10) is viewed in the Z-axis direction will be described with reference to FIGS. 83 to 91. In the following description, there are cases where the longitudinal direction (Y-axis direction) of the frame 1 is referred to as "longitudinal direction Y", and the height direction (X-axis direction) of the frame 1 is referred to as "height direction X", and the width direction (Z-axis direction) of the frame 1 is referred to as "width direction Z".

(Specific Example 1 of Bent Portion)

Figure 83:
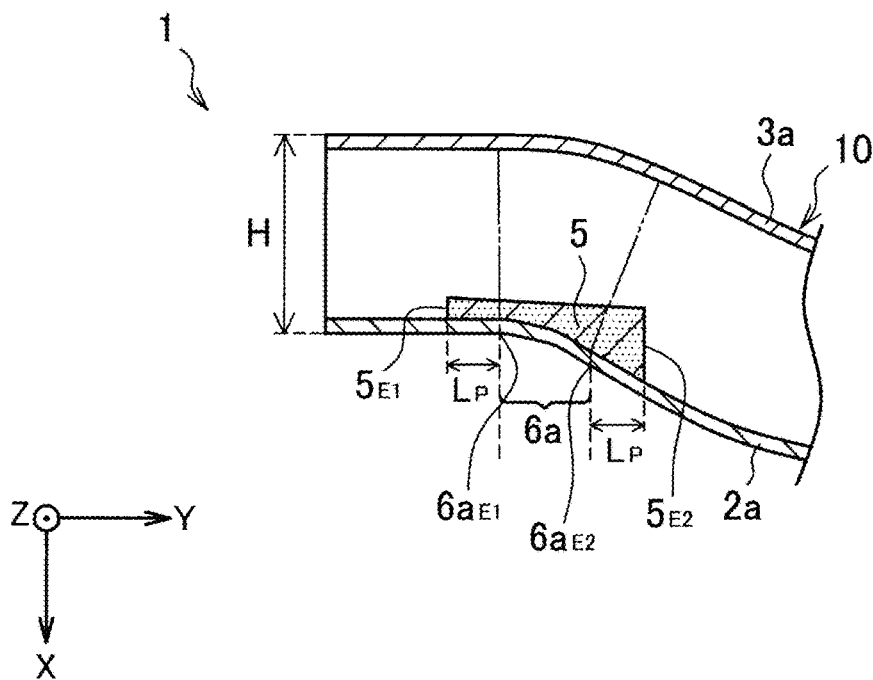
FIG. 83 is a sectional view showing a specific example of a bending induction portion (bent portion) provided in the frame and the filling member.

FIG. 83 shows a specific example of the bending induction portion (bent portion) provided in the frame 1 and the filling member 5. As shown in FIG. 83, a curved bent portion 6a as the bending induction portion is provided in the bottom wall part 2a of the frame 1. The bent portion 6a is a region in which the bottom wall part 2a of the frame 1 is curved along the longitudinal direction Y, and bending deformation of the frame 1 is induced at the position of the bent portion 6a.

The filling member 5 is provided on the inner side of the bent portion 6a of the frame 1 in close contact with the inner surface of the bottom wall part 2a. The filling member 5 is disposed so as to cover the entire bent portion 6a in the longitudinal direction Y and the bottom wall part 2a of the peripheral portion thereof, and both end portions $5_{E1}$ and $5_{E2}$ of the filling member 5 in the longitudinal direction Y respectively extend outward in the longitudinal direction Y beyond both end portions $6a_{E1}$ and $6a_{E2}$ of the bent portion 6a in the longitudinal direction Y. The length of the extending portion of the filling member 5 in the longitudinal direction Y is referred to as an extension length $L_P$. As shown in FIG. 83, the extension length $L_P$ on one side corresponds to the distance between the first end portion $5_{E1}$ of the filling member 5 in the longitudinal direction Y and the first end portion $6a_{E1}$ of the bent portion 6a in the longitudinal direction Y. Similarly, the extension length $L_P$ on the other side corresponds to the distance between the second end portion $5_{E2}$ of the filling member 5 in the longitudinal direction Y and the second end portion $6a_{E2}$ of the bent portion 6a in the longitudinal direction Y. In the example shown in FIG. 83, the extension lengths $L_P$ and $L_P$ on both sides are the same, but any one of the extension lengths $L_P$ may be longer than the other extension length $L_P$.

In addition, it is preferable that the filling member 5 is disposed so as to cover the entire bent portion 6a (bending induction portion) and the bottom wall part 2a in the periphery thereof in a range in which the extension length Le of the filling member 5 is equal to or less than ½ of a cross-sectional height H of the frame 1 (hollow member 10). That is, it is preferable that $L_P \leq H/2$ is satisfied. Accordingly, when a load is input to the frame 1, the amount of energy absorbed by the bent portion 6a (bending induction portion) and the filling member 5 can be improved with high mass efficiency. Furthermore, although the energy absorption properties are low in portions of the frame 1 which are separated from the bent portion 6a (bending induction portion), by causing $L_P \leq H/2$ to be satisfied as described above, it is not necessary to wastefully dispose the filling member 5 in the separated portions. Therefore, an unnecessary increase in the weight of the frame 1 due to the disposition of the filling member 5 can be suppressed.

(Specific Example 2 of Bent Portion)

Figure 84:
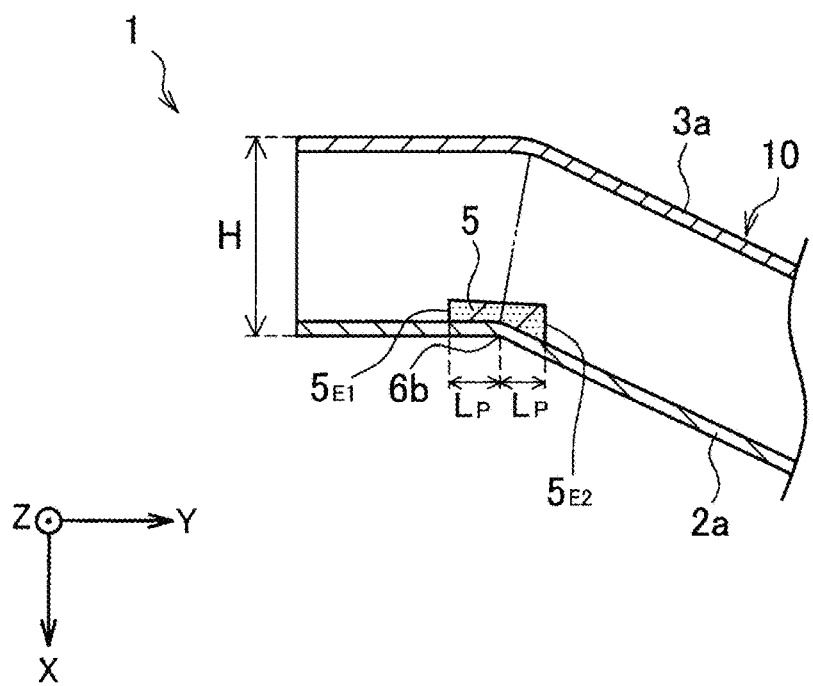
FIG. 84 is a sectional view showing another specific example of the bending induction portion (bent portion) provided in the frame and the filling member.

FIG. 84 shows another specific example of the bending induction portion (bent portion) provided in the frame 1 and the filling member 5. As shown in FIG. 84, an angular bent portion 6b as the bending induction portion is provided in the bottom wall part 2a of the frame 1. The bent portion 6b is a portion where the frame 1 is bent into an angular shape at a predetermined position. The bottom wall parts 2a on both sides of the bent portion 6b in the longitudinal direction Y are flat, and the ridge portion where the flat bottom wall parts 2a intersect at an angle forms the bent portion 6b. Bending deformation of the frame 1 is induced at the bending position of the bent portion 6b.

The filling member 5 is provided on the inner side of the bent portion 6b of the frame 1 in close contact with the inner surface of the bottom wall part 2a. The filling member 5 is disposed so as to cover the entire bent portion 6b and the bottom wall part 2a of the peripheral portion thereof, and both end portions $5_{E1}$ and $5_{E2}$ of the filling member 5 in the longitudinal direction Y respectively extend beyond both sides of the bent portion 6b in the longitudinal direction Y by the extension lengths $L_P$ and $L_P$. As shown in FIG. 84, the extension length $L_P$ on one side corresponds to the distance between the first end portion $5_{E1}$ of the filling member 5 in the longitudinal direction Y and the bent portion 6b. Similarly, the extension length $L_P$ on the other side corresponds to the distance between the second end portion $5_{E2}$ of the filling member 5 in the longitudinal direction Y and the bent portion 6b. In the example shown in FIG. 84, the extension lengths $L_P$ and $L_P$ on both sides are the same, but any one of the extension lengths $L_P$ may be longer than the other extension length $L_P$.

In addition, the filling member 5 is disposed in a range in which the extension length $L_P$ of the filling member 5 is equal to or less than ½ of the cross-sectional height H of the frame 1 (hollow member 10) ($L_P \leq H/2$). Accordingly, also in the example of the bent portion 6b shown in FIG. 84, the same effect as in the case of the bent portion 6a in the example of FIG. 83 can be obtained.

Here, the cross-sectional height H of the hollow member 10 will be described with reference to FIGS. 85 and 86.

Figure 85:
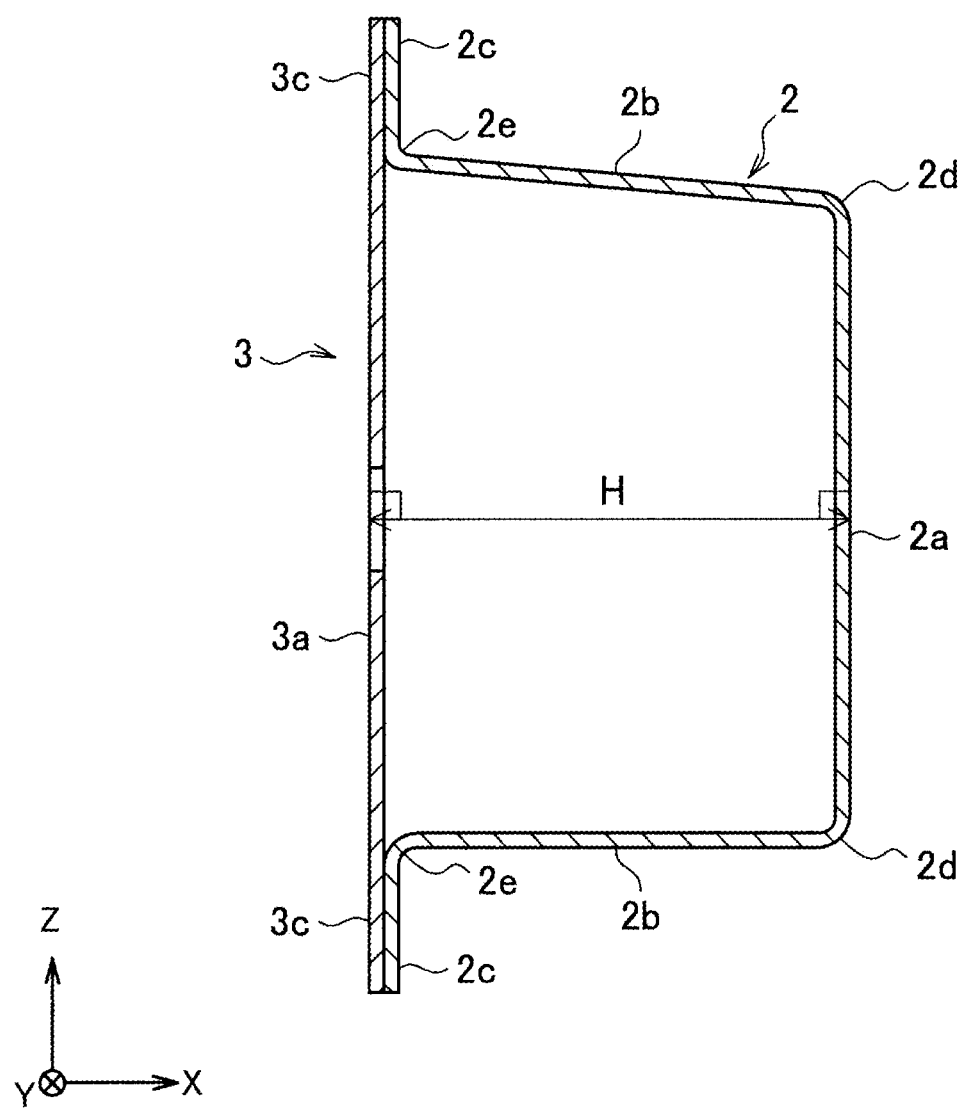
FIG. 85 is a cross-sectional view showing an example of the hollow member.

FIG. 85 is a cross-sectional view showing an example of the hollow member 10, and shows a cross section orthogonal to the longitudinal direction X of the hollow member 10. As shown in FIG. 85, the hollow member 10 includes the first structural member 2 having a hat-shaped cross-sectional shape and the second structural member 3 having a flat shape. The first structural member 2 includes the bottom wall part 2a, the pair of side wall parts 2b and 2b provided on both sides of the bottom wall part 2a in the width direction Z, the pair of flange portions 2c and 2c respectively provided at the end portions of the side wall parts 2b and 2b, and the ridge portions 2d, 2d, 2e, and 2e. The lengths of the pair of side wall parts 2b and 2b are equal to each other. The second structural member 3 includes the top wall part 3a disposed to face the bottom wall part 2a and the pair of joint portions 3c and 3c joined to the flange portions 2c and 2c.

Here, the cross-sectional height H of the hollow member 10 is the maximum length in the height direction X of the hollow member 10 in a cross section orthogonal to the longitudinal direction Y of the hollow member 10. That is, the cross-sectional height H is the maximum distance among the distances between a surface (bend inside surface) which becomes the inside during bending deformation of the hollow member 10 and a surface (bend outside surface) facing the surface. In the example of the hollow member 10 shown in FIG. 85, the top wall part 3a corresponds to the bend inside surface, and the bottom wall part 2a corresponds to the bend outside surface. The top wall part 3a and the bottom wall part 2a face each other and are parallel to each other. Therefore, the cross-sectional height H of the hollow member 10 in the example of FIG. 85 is the distance in the height direction X between the outer wall surface of the top wall part 3a and the outer wall surface of the bottom wall part 2a facing the top wall part 3a.

Figure 86:
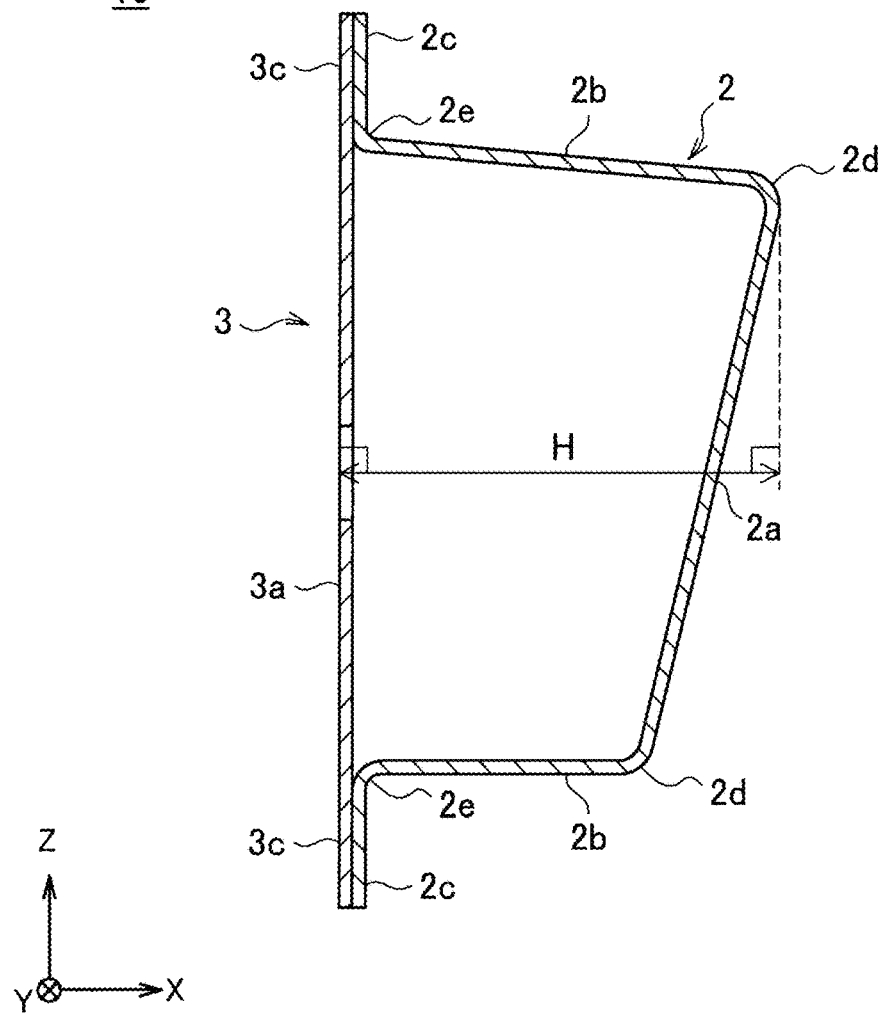
FIG. 86 is a cross-sectional view showing another example of the hollow member.

FIG. 86 is a cross-sectional view showing another example of the hollow member 10, and shows a cross section orthogonal to the longitudinal direction X of the hollow member 10. Also in the example of the hollow member 10 shown in FIG. 86, the top wall part 3a corresponds to a bend inside surface and the bottom wall part 2a corresponds to a bend outside surface as in the example of FIG. 85. On the other hand, in the example of the hollow member 10 shown in FIG. 86, the bottom wall part 2a of the first structural member 2 and the top wall part 3a of the second structural member 3 are not parallel to each other but are disposed in directions intersecting each other. Therefore, the cross-sectional height H of the hollow member 10 in the example of FIG. 86 is the maximum distance among the distances in the height direction X between the outer wall surface of the top wall part 3a and the outer wall surface of the bottom wall part 2a, that is, the distance between the outer wall surface of the top wall part 3a and the outer wall surface of the bottom wall part 2a at the position of the ridge portion 2d.

(Specific Example of Hole)

Figure 87:
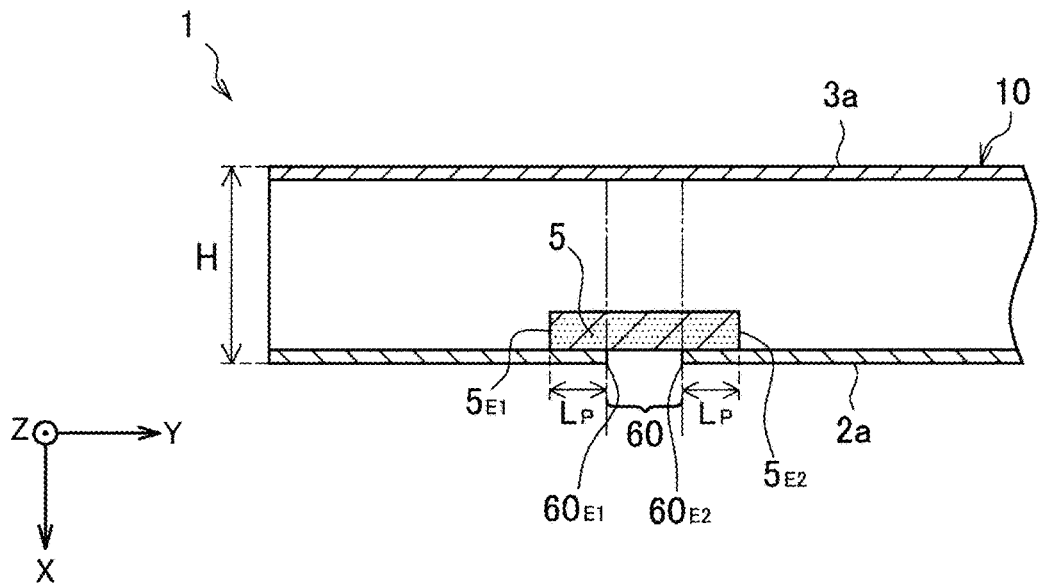
FIG. 87 is a sectional view showing a specific example of the bending induction portion (hole) provided in the frame and the filling member.

FIG. 87 shows a specific example of the bending induction portion (hole) provided in the frame 1 and the filling member 5. As shown in FIG. 87, the hole 60 as the bending induction portion is provided in the bottom wall part 2a of the frame 1. The hole 60 is an opening formed through the bottom wall part 2a of the frame 1. In a YZ plan view, for example, the shape of the hole 60 is appropriately a vertically elongated rectangular shape extending in the width direction Z, but may also be any other shape such as a rectangular shape, a polygonal shape, a circular shape, or an elliptical shape. Bending deformation of the frame 1 is induced at the hole 60.

As shown in FIG. 87, the filling member 5 is provided on the inner side of the hole 60 of the frame 1 in close contact with the inner surface of the bottom wall part 2a in the periphery the hole 60. The filling member 5 is disposed so as to cover the entire hole 60 and the bottom wall part 2a of the peripheral portion thereof. Both end portions $5_{E1}$ and $5_{E2}$ of the filling member 5 in the longitudinal direction Y respectively extend beyond both end portions $60_{E1}$ and $60_{E2}$ of the hole 60 in the longitudinal direction Y by the extension lengths $L_P$ and $L_P$. The extension lengths $L_P$ and $L_P$ respectively correspond to the distances between the first end portion $5_{E1}$ or the second end portion $5_{E2}$ of the filling member 5 in the longitudinal direction Y and the first end portion $60_{E1}$ or the second end portion $60_{E2}$ of the hole 60. As described above, the extension lengths $L_P$ and $L_P$ on both sides may be the same, or any one of the extension lengths $L_P$ may be longer than the other extension length $L_P$. Furthermore, similarly to the above, the filling member 5 is disposed in a range in which $L_P \leq H/2$ is satisfied. Accordingly, also in the example of the hole 60 shown in FIG. 87, the same effect as in the case of the bent portion 6a in the example of FIG. 83 can be obtained.

(Specific Example of Recessed Part)

Figure 88:
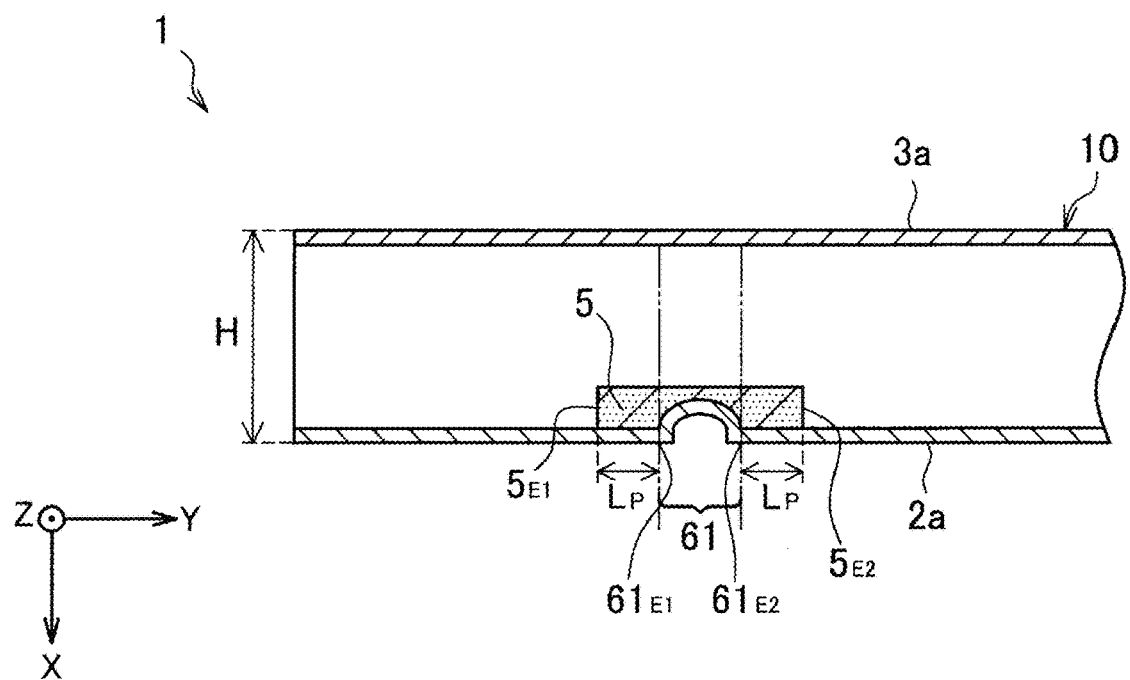
FIG. 88 is a sectional view showing a specific example of the bending induction portion (recessed part) provided in the frame and the filling member.

FIG. 88 shows a specific example of the bending induction portion (recessed part) provided in the frame 1 and the filling member 5. As shown in FIG. 88, the recessed part 61 as the bending induction portion is provided in the bottom wall part 2a of the frame 1. The recessed part 61 is a part in which a portion of the bottom wall part 2a of the frame 1 is recessed toward the inside. In the YZ plan view, for example, the shape of the recessed part 61 is appropriately a vertically elongated rectangular shape extending in the width direction Z, but may also be any other shape such as a rectangular shape, a polygonal shape, a circular shape, or an elliptical shape. Bending deformation of the frame 1 is induced at the recessed part 61.

As shown in FIG. 88, the filling member 5 is provided on the inner side of the recessed part 61 of the frame 1 in close contact with the inner surface of the bottom wall part 2a. The filling member 5 is disposed so as to cover the entire recessed part 61 and the bottom wall part 2a of the peripheral portion thereof, and both end portions $5_{E1}$ and $5_{E2}$ of the filling member 5 in the longitudinal direction Y respectively extend beyond both end portions $61_{E1}$ and $61_{E2}$ of the recessed part 61 in the longitudinal direction Y by the extension lengths $L_P$ and $L_P$. The extension lengths $L_P$ and $L_P$ respectively correspond to the distances between the first end portion $5_{E1}$ or the second end portion $5_{E2}$ of the filling member 5 in the longitudinal direction Y and the first end portion $61_{E1}$ or the second end portion $61_{E2}$ of the recessed part 61. As described above, the extension lengths $L_P$ and $L_P$ on both sides may be the same, or any one of the extension lengths $L_P$ may be longer than the other extension length $L_P$. Furthermore, similarly to the above, the filling member 5 is disposed in a range in which $L_P \leq H/2$ is satisfied. Accordingly, also in the example of the recessed part 61 shown in FIG. 88, the same effect as in the case of the bent portion 6a in the example of FIG. 83 can be obtained.

(Specific Example of Protrusion)

Figure 89:
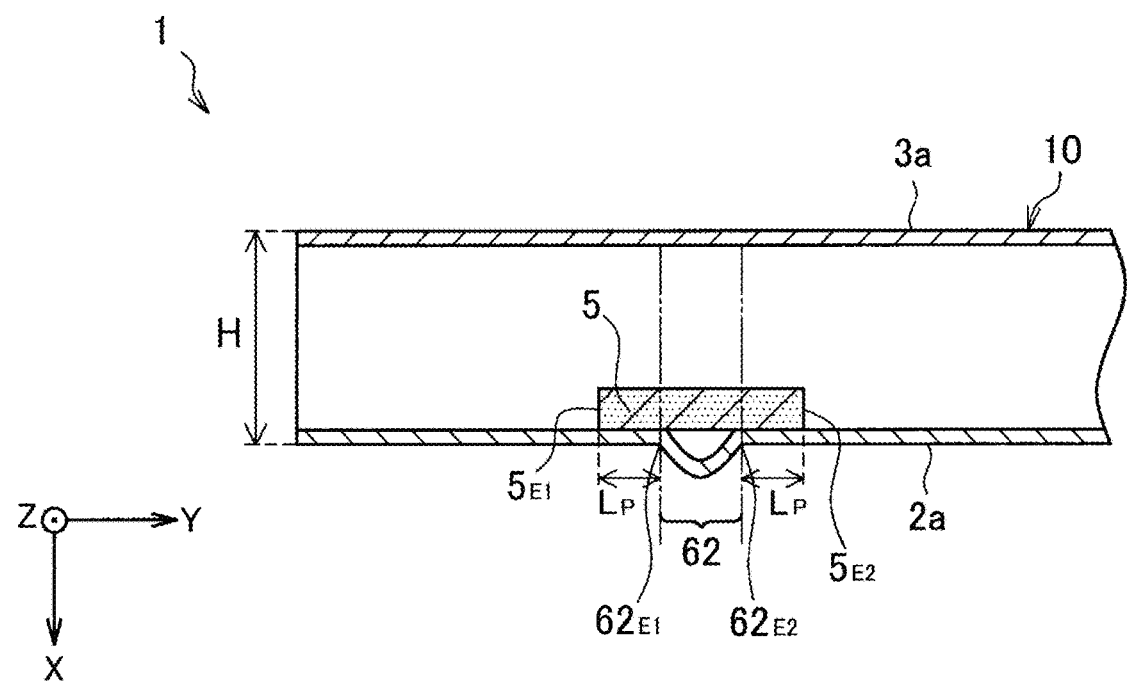
FIG. 89 is a sectional view showing a specific example of the bending induction portion (protrusion) provided in the frame and the filling member.

FIG. 89 shows a specific example of the bending induction portion (protrusion) provided in the frame 1 and the filling member 5. As shown in FIG. 89, the protrusion 62 as the bending induction portion is provided in the bottom wall part 2a of the frame 1. The protrusion 62 is a part in which a portion of the bottom wall part 2a of the frame 1 is formed to protrude outward. In the YZ plan view, for example, the shape of the protrusion 62 is appropriately a vertically elongated rectangular shape extending in the width direction Z, but may also be any other shape such as a rectangular shape, a polygonal shape, a circular shape, or an elliptical shape. Bending deformation of the frame 1 is induced at the protrusion 62.

As shown in FIG. 89, the filling member 5 is provided on the inner side of the protrusion 62 of the frame 1 in close contact with the inner surface of the bottom wall part 2a. The filling member 5 is disposed so as to cover the entire protrusion 62 and the bottom wall part 2a of the peripheral portion thereof, and both end portions $5_{E1}$ and $5_{E2}$ of the filling member 5 in the longitudinal direction Y respectively extend beyond both end portions $62_{E1}$ and $62_{E2}$ of the protrusion 62 in the longitudinal direction Y by the extension lengths $L_P$ and $L_P$. The extension lengths $L_P$ and $L_P$ respectively correspond to the distances between the first end portion $5_{E1}$ or the second end portion $5_{E2}$ of the filling member 5 in the longitudinal direction Y and the first end portion $62_{E1}$ or the second end portion $62_{E2}$ of the protrusion 62. As described above, the extension lengths $L_P$ and $L_P$ on both sides may be the same, or any one of the extension lengths $L_P$ may be longer than the other extension length $L_P$. Furthermore, similarly to the above, the filling member 5 is disposed in a range in which $L_P \leq H/2$ is satisfied. Accordingly, also in the example of the protrusion 62 shown in FIG. 89, the same effect as in the case of the bent portion 6a in the example of FIG. 83 can be obtained.

(Specific Example of Sheet Thickness Changing Portion or Thin Portion)

Figure 90:
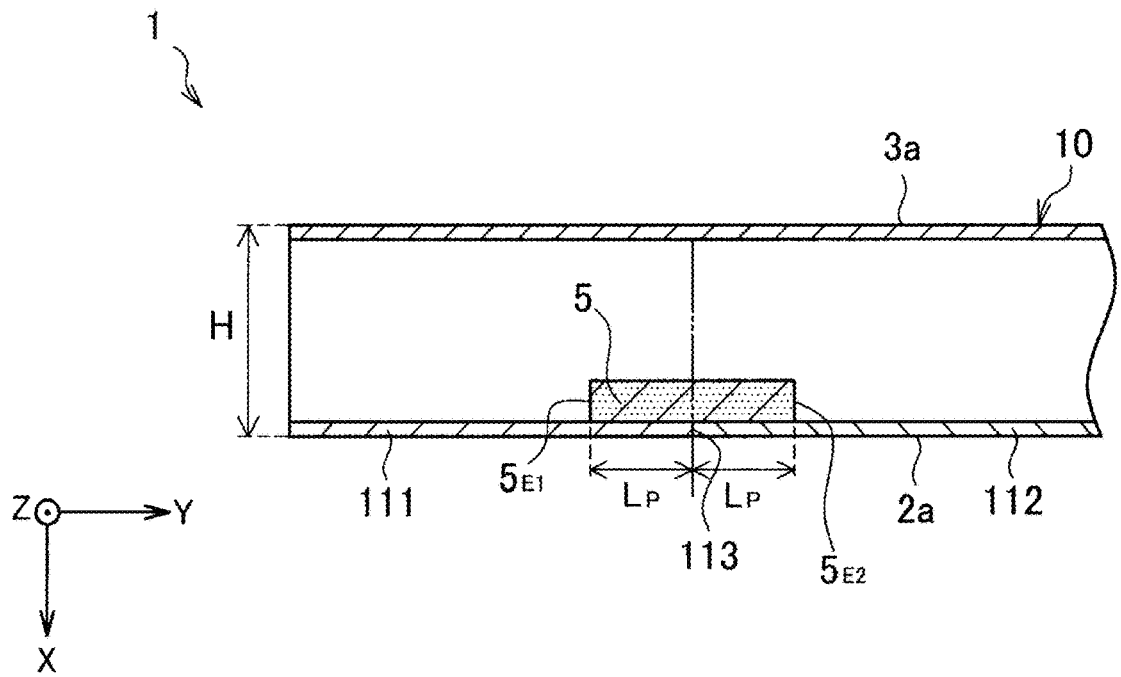
FIG. 90 is a sectional view showing a specific example of the bending induction portion (sheet thickness changing portion) provided in the frame and the filling member.

FIG. 90 shows a specific example of the bending induction portion (sheet thickness changing portion) provided in the frame 1 and the filling member 5. As shown in FIG. 90, the sheet thickness changing portion 113 as the bending induction portion is provided in the bottom wall part 2a of the frame 1. The sheet thickness changing portion 113 is a boundary portion between the first sheet thickness portion 111 and the second sheet thickness portion 112 which are different in steel sheet thickness, and are provided, for example, linearly in the width direction Z. Bending deformation of the frame 1 is induced at the sheet thickness changing portion 113.

As shown in FIG. 90, the filling member 5 is provided on the inner side of the sheet thickness changing portion 113 of the frame 1 in close contact with the inner surface of the bottom wall part 2a. The filling member 5 is disposed so as to cover the entire sheet thickness changing portion 113 and the bottom wall part 2a of the peripheral portion thereof, and both end portions $5_{E1}$ and $5_{E2}$ of the filling member 5 in the longitudinal direction Y respectively extend beyond the sheet thickness changing portion 113 on both sides in the longitudinal direction Y by the extension lengths $L_P$ and $L_P$. The extension lengths $L_P$ and $L_P$ respectively correspond to the distances between the first end portion $5_{E1}$ or the second end portion $5_{E2}$ of the filling member 5 in the longitudinal direction Y and the sheet thickness changing portion 113. As described above, the extension lengths $L_P$ and $L_P$ on both sides may be the same, or any one of the extension lengths $L_P$ may be longer than the other extension length $L_P$. Furthermore, similarly to the above, the filling member 5 is disposed in a range in which $L_P \leq H/2$ is satisfied. Accordingly, also in the example of the sheet thickness changing portion 113 shown in FIG. 90, the same effect as in the case of the bent portion 6a in the example of FIG. 83 can be obtained.

(Specific Example of Different Strength Portion or Strength Changing Portion)

Figure 91:
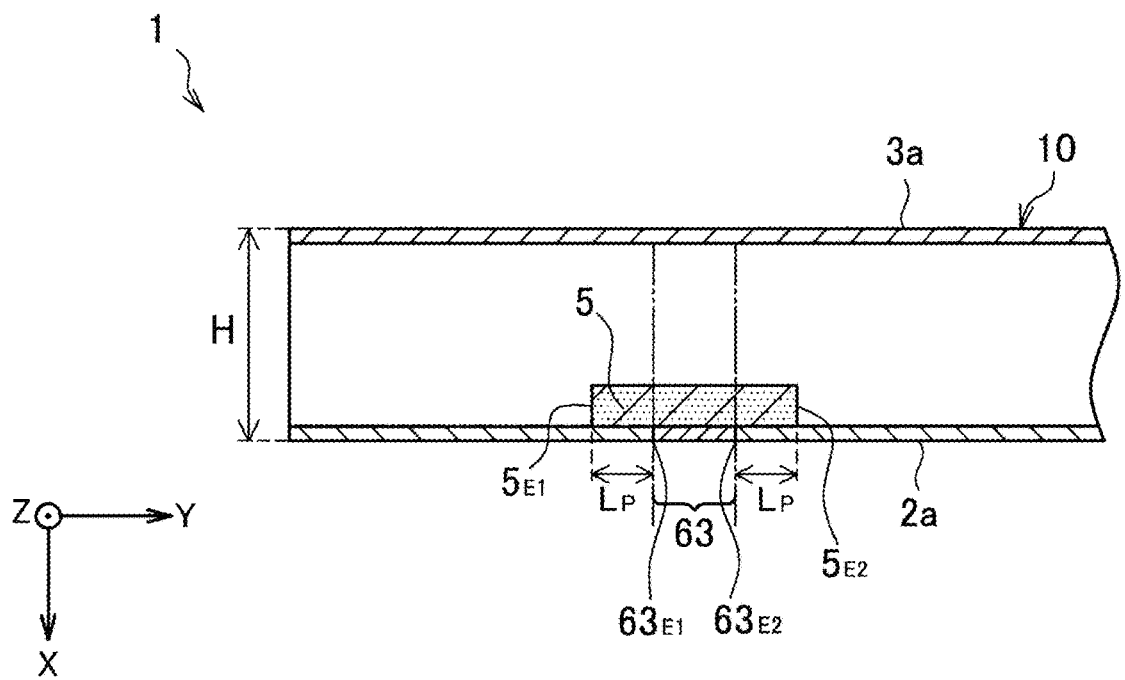
FIG. 91 is a sectional view showing a specific example of the bending induction portion (different strength portion) provided in the frame and the filling member.

FIG. 91 shows a specific example of the bending induction portion (different strength portion) provided in the frame 1 and the filling member 5. As shown in FIG. 91, the different strength portion 63 as the bending induction portion is provided in the bottom wall part 2a of the frame 1. The different strength portion 63 is a portion where the strength of the bottom wall part 2a of the frame 1 is partially reduced, and is provided in a strip shape extending in the width direction Z, for example. Bending deformation of the frame 1 is induced at the different strength portion 63.

As shown in FIG. 91, the filling member 5 is provided on the inner side of the different strength portion 63 of the frame 1 in close contact with the inner surface of the bottom wall part 2a. The filling member 5 is disposed so as to cover the entire different strength portion 63 and the bottom wall part 2a of the peripheral portion thereof, and both end portions $5_{E1}$ and $5_{E2}$ of the filling member 5 in the longitudinal direction Y respectively extend beyond both end portions $63_{E1}$ and $63_{E2}$ of the different strength portion 63 in the longitudinal direction Y by the extension lengths $L_P$ and $L_P$. The extension lengths $L_P$ and $L_P$ respectively correspond to the distances between the first end portion $5_{F1}$ or the second end portion $5_{E2}$ of the filling member 5 in the longitudinal direction Y and the first end portion $63_{E1}$ or the second end portion $61_{E2}$ of the different strength portion 63. As described above, the extension lengths $L_P$ and Le on both sides may be the same, or any one of the extension lengths $L_P$ may be longer than the other extension length $L_P$. Furthermore, similarly to the above, the filling member 5 is disposed in a range in which $L_P \leq H/2$ is satisfied. Accordingly, also in the example of the different strength portion 63 shown in FIG. 91, the same effect as in the case of the bent portion 6a in the example of FIG. 83 can be obtained.

The disposition range of the filling member 5 in each of the examples of the bending induction portion has been described above from the first viewpoint.

By disposing the filling member 5 at least in the bending induction portion, the cross-sectional deformation of the frame 1 that occurs at the time of bending deformation induced by the bending induction portion can be suppressed, and the load bearing performance of the frame 1 can be maintained at a high level. Furthermore, by disposing the filling member 5 so as to cover the bending induction portion and the peripheral portion thereof, the out-of-plane deformation of the frame 1 that occurs at the time of bending deformation induced by the bending induction portion can be further suppressed, and the load bearing performance of the frame 1 can be maintained at a high level. Therefore, the amount of absorbed energy of the frame 1 at the time of load input can be further improved.

Moreover, the filling member 5 is disposed so as to cover the entire bending induction portion in the longitudinal direction Y and the peripheral portion thereof in a range in which the extension lengths $L_P$ and $L_P$ of the filling member 5 from the bending induction portion or from the end portions of the bending induction portion is equal to or less than ½ of the cross-sectional height H of the frame 1 (hollow member 10) ($L_P \leq H/2$). Accordingly, the filling member 5 is not disposed in a range in which the effect of improving the collision safety performance of the frame 1 is low. Therefore, it is possible to reduce an unnecessary increase in the weight of the frame 1 due to the disposition of the filling member 5. As described above, by disposing the filling member 5 so as to satisfy $L_P \leq H/2$, the amount of absorbed energy at the time of load input can be improved with high mass efficiency.

Second Viewpoint

Subsequently, the disposition range of the filling member 5 when the frame 1 (hollow member 10) is viewed in the X-axis direction will be described with reference to FIGS. 92 to 94.

Figure 92:
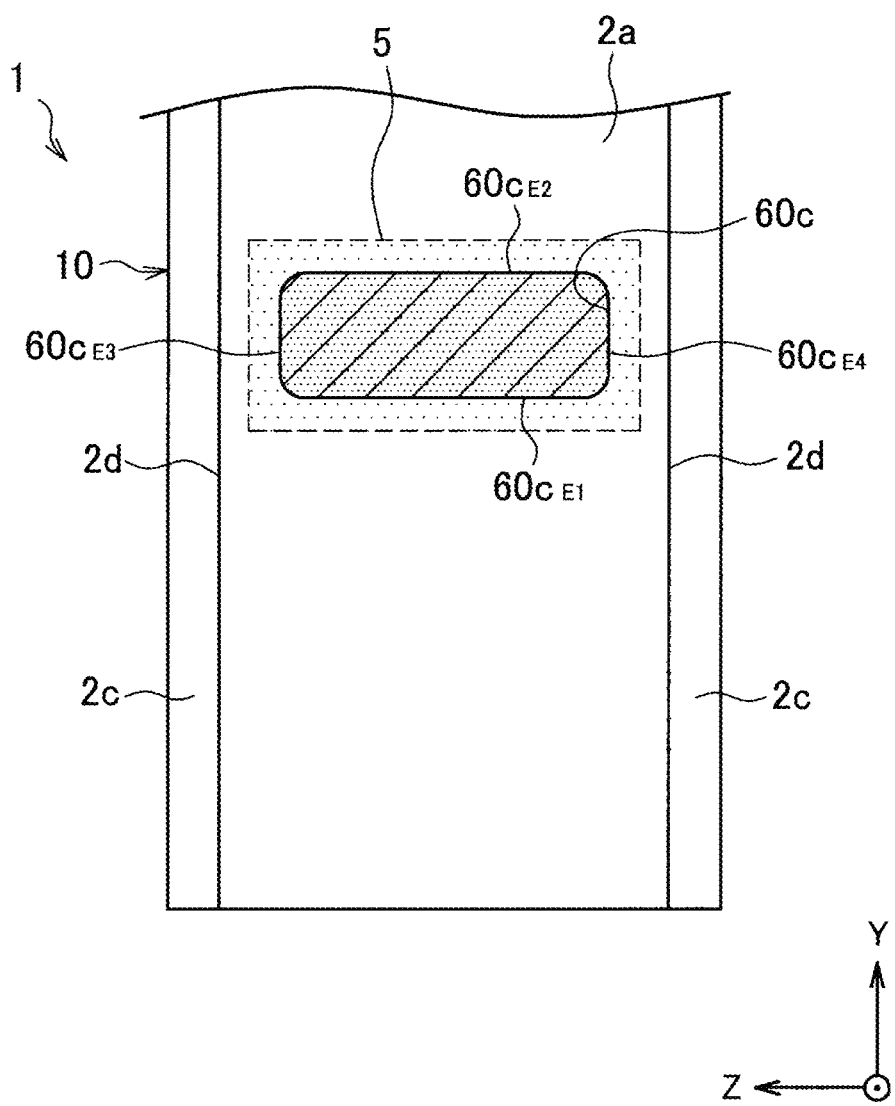
FIG. 92 is a plan view showing a specific example of the frame when viewed in the X-axis direction.

FIG. 92 is a plan view showing a specific example of the frame 1 when viewed in the X-axis direction. In the example shown in FIG. 92, the hole 60c as the bending induction portion is provided in the frame 1. As described with reference to FIG. 48, the hole 60c is provided in a vertically long, substantially rectangular shape extending along the width direction Z in the bottom wall part 2a of the hollow member 10.

The filling member 5 is provided in close contact with the hollow member 10 in the hole 60c. Specifically, in the longitudinal direction Y, the filling member 5 is disposed over a range reaching the bottom wall part 2a of the peripheral portion of the hole 60c beyond the entire hole 60c and an end portion $60c_{E1}$ or an end portion $60c_{E2}$ of the hole 60c. The portion of the filling member 5 that exceeds the end portion $60c_{E1}$ or the end portion $60c_{E2}$ of the hole 60c is disposed in close contact with the inner surface of the bottom wall part 2a. Furthermore, in the width direction Z, the filling member 5 is disposed over a range reaching the bottom wall part 2a of the peripheral portion of the hole 60c beyond the entire hole 60c and an end portion $60c_{E3}$ or an end portion $60c_{E4}$ of the hole 60c. The portion of the filling member 5 that exceeds the end portion $60C_{E3}$ or the end portion $60c_{E4}$ of the hole 60c is disposed in close contact with the inner surface of the bottom wall part 2a.

In the example shown in FIG. 92, the filling member 5 is disposed so as to cover the entire hole 60c. Therefore, even in a case where bending occurs in any region in the longitudinal direction Y in the hole 60c, bending deformation occurs at least in the region where the filling member 5 is disposed. Therefore, even in a case where bending occurs in any region in the longitudinal direction Y in the hole 60c, the out-of-plane deformation of the frame 1 can be suppressed and the load bearing performance of the frame 1 can be maintained at a high level. Therefore, the amount of absorbed energy of the frame 1 at the time of load input can be improved.

Figure 93:
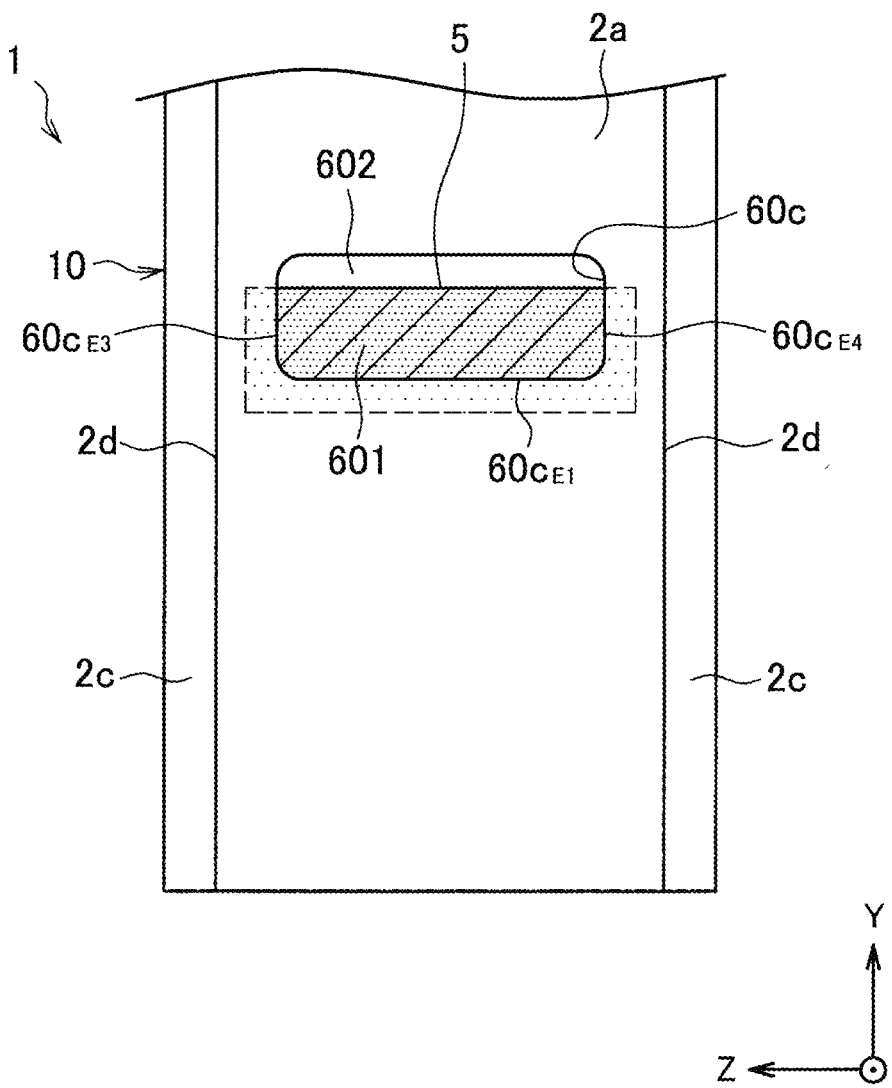
FIG. 93 is a plan view showing another specific example of the frame when viewed in the X-axis direction.

FIG. 93 is a plan view showing another specific example of the frame 1 when viewed in the X-axis direction. The hole 60c is provided in a vertically long, substantially rectangular shape extending along the width direction Z in the bottom wall part 2a of the hollow member 10. The hole 60c corresponds to a bending induction portion in the frame 1 shown in FIG. 93.

The filling member 5 is provided in close contact with the inner surface of the bottom wall part 2a of the hollow member 10 so as to cover a portion of the hole 60c. Specifically, in the longitudinal direction Y, the filling member 5 is disposed so as to cover one side portion (region 601) of the hole 60c in the longitudinal direction Y and not cover the other side portion (region 602), and is disposed over a range reaching the bottom wall part 2a beyond a first end portion $60c_{E1}$ of the hole 60c in the longitudinal direction Y. The portion of the filling member 5 that exceeds the end portion $60c_{E1}$ of the hole 60c is disposed in close contact with the inner surface of the bottom wall part 2a. On the other hand, in the width direction Z, the filling member 5 covers the entire hole 60c (region 601) and is disposed over a range reaching the bottom wall part 2a beyond the end portion $60c_{E3}$ or the end portion $60c_{E4}$ of the hole 60c. The portion of the filling member 5 that exceeds the end portion $60c_{E3}$ or the end portion $60c_{E4}$ of the hole 60c is disposed in close contact with the inner surface of the bottom wall part 2a.

In the example shown in FIG. 93, the filling member 5 is disposed in the portion (region 601) of the hole 60c in the longitudinal direction Y and is not disposed in another portion (region 602) of the hole 60c. Since the filling member 5 is not disposed at least in the region 602, an increase in the weight of the frame 1 due to the disposition of the filling member 5 can be reduced. On the other hand, since the filling member 5 is not disposed in the region 602, a resistance effect against deformation of the frame 1 by the filling member 5 is not obtained. Accordingly, the region 602 is more easily bent than the region 601. Here, the filling member 5 is disposed in the region 601 in the vicinity of the region 602. Therefore, in a case where bending occurs in the region 602, the filling member 5 disposed in the region 601 can suppress the out-of-plane deformation of the frame 1 caused by the bending in the vicinity of the portion where the bending occurs. On the other hand, in a case where bending occurs in the region 601, the filling member 5 can suppress the out-of-plane deformation of the frame 1 in the portion. As described above, even in a case where bending occurs in any region of the hole 60c in the longitudinal direction Y, the out-of-plane deformation of the frame 1 can be suppressed and the load bearing performance of the frame 1 can be maintained at a high level. Therefore, the amount of absorbed energy of the frame 1 at the time of load input can be improved.

Figure 94:
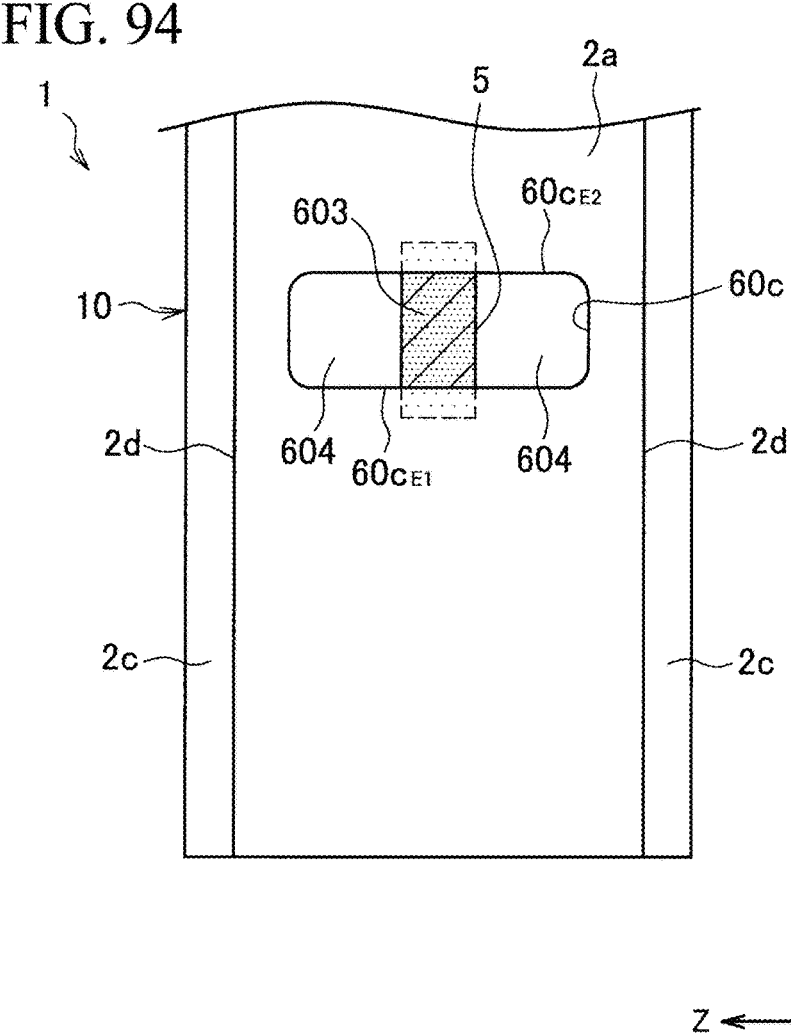
FIG. 94 is a plan view showing another specific example of the frame when viewed in the X-axis direction.

FIG. 94 is a plan view showing another specific example of the frame 1 when viewed in the X-axis direction. The hole 60c is provided in a vertically long, substantially rectangular shape extending along the width direction Z in the bottom wall part 2a of the hollow member 10. The hole 60c corresponds to a bending induction portion in the frame 1 shown in FIG. 94.

The filling member 5 is provided in close contact with the inner surface of the bottom wall part 2a of the hollow member 10 so as to cover a portion of the hole 60c. Specifically, the filling member 5 is disposed so as to cover the central part (region 603) of the hole 60c in the width direction Z and not to cover both side portions (regions 604 and 604) in the width direction Z. Furthermore, the filling member 5 is disposed over a range reaching the bottom wall part 2a of the peripheral portion of the hole 60c beyond the end portion $60c_{E1}$ or the end portion $60c_{E2}$ of the hole 60c in the longitudinal direction Y. The portion of the filling member 5 that exceeds the end portion $60c_{E1}$ or the end portion $60c_{E2}$ of the hole 60c is disposed in close contact with the inner surface of the bottom wall part 2a.

In the example shown in FIG. 94, the filling member 5 is disposed in the portion (region 603) of the hole 60c in the width direction Z and is not disposed in another portion (region 604) of the hole 60c. Since the filling member 5 is not disposed at least in the region 604, an increase in the weight of the frame 1 due to the disposition of the filling member 5 can be reduced. On the other hand, the filling member 5 is disposed in the region 603 that occupies the entire hole 60c in the longitudinal direction Y. Therefore, even in a case where bending occurs in any region of the hole 60c in the longitudinal direction Y, bending deformation occurs at least in the region 603 where the filling member 5 is disposed. Therefore, even in a case where bending occurs in any region in the longitudinal direction Y in the hole 60c, the out-of-plane deformation of the frame 1 can be suppressed and the load bearing performance of the frame 1 can be maintained at a high level. Therefore, the amount of absorbed energy of the frame 1 at the time of load input can be improved.

Third Viewpoint

Subsequently, the disposition range of the filling member 5 when the frame 1 (hollow member 10) is viewed in the Y-axis direction will be described with reference to FIGS. 95 to 98. Hereinafter, as an example, a case where the cross-sectional shape of the hollow member 10 is circular or elliptical will be described. FIGS. 95 to 98 are cross-sectional views respectively showing specific examples of the frame 1 and the filling member 5 in cross sections orthogonal to the Y-axis direction.

Figure 95:
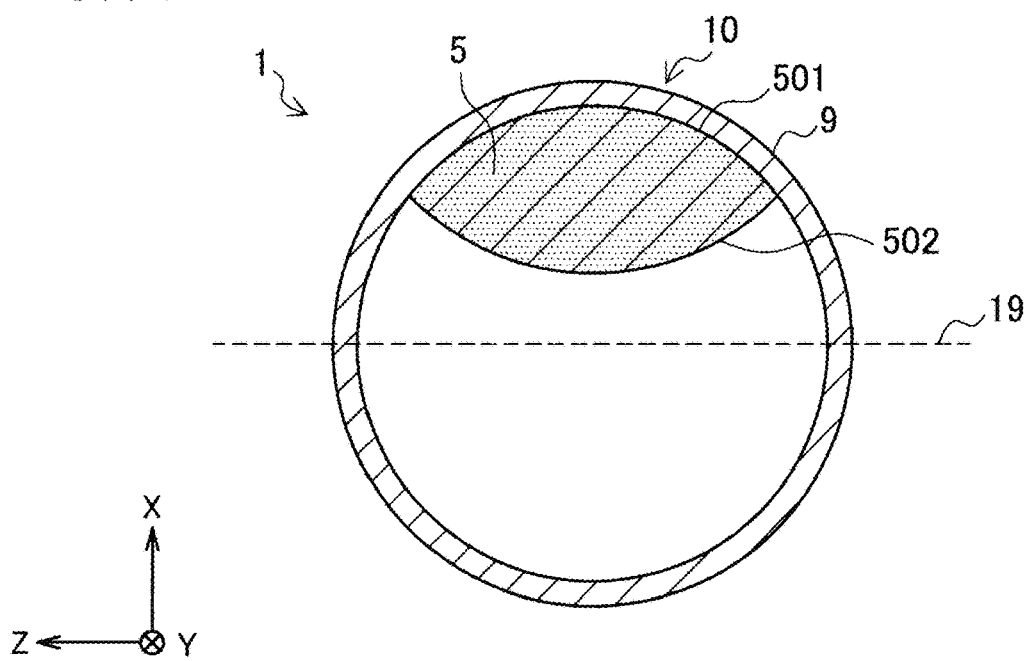
FIG. 95 is a cross-sectional view showing a specific example of the frame and the filling member in a cross section orthogonal to the Y-axis direction.

In the example shown in FIG. 95, the cross-sectional shape of the hollow member 10 is circular. The filling member 5 is disposed in close contact with the inner surface of the hollow member 10 in a bending induction portion (for example, the hole 60) (not shown). The filling member 5 includes an arc-shaped close contact surface 501 that is in close contact with the inner surface of the hollow member 10 and a curved release surface 502 that is not in contact with the inner surface of the hollow member 10. In the cross section of the hollow member 10, the filling member 5 is desirably disposed on the side where the bending induction portion is located (for example, the side where the hole 60 is formed) from a boundary 19 of the hollow member 10. Furthermore, the filling member 5 is desirably disposed in a range in which the release surface 502 does not exceed the boundary 19.

The boundary is a plane which halves the height of the cross section in a bending direction in half. In other words, the boundary is a plane defined at the center of the height in the bending direction in the cross section. The boundary 19 is a plane on which stress applied during bending deformation is substantially zero. When the plane where the stress applied during bending deformation is zero is defined as a bending neutral plane, the bending neutral plane and the boundary 19 are strictly different from each other. The reason why the bending neutral plane and the boundary 19 are not coincident with each other is as follows. The rigidity of a structural material in compression and tension is different, the sheet thickness of the structural material is not always the same, the side where the filling member 5 is present is less likely to deform and the neutral plane moves toward the filling member 5, bending deformation is accompanied by compressive or tensile deformation in an axial direction, and the like. However, since the bending neutral plane and the boundary 19 are not greatly different from each other, the boundary 19 is regarded as the bending neutral plane. The bending direction is a direction from the center of mass of the cross section toward the bending induction portion. This is because the hollow member 10 is buckled and bent at the bending induction portion. In a case where there are a plurality of bending induction portions in one cross section, the bending direction is a direction in which the bending vectors of the respective bending induction portions are combined. The magnitude of the bending vector varies depending on the kind, position, size, and the like of the bending induction portion. For example, in a case where the bending induction portion is small, the bending vector by the bending induction portion is small. In an actual design of the hollow member 10, the bending induction portion is provided so as to be surely buckled at a point where bending is desired. Therefore, when one or two of the largest bending induction portions are considered, the bending direction can be estimated. For example, in a case where a certain surface is bent, bending induction portions are provided at the ridge lines on both sides of the surface. In this case, by viewing the two bending induction portions provided at the ridge lines, it can be easily understood that the bending direction is the direction from the center of mass to the surface.

The Young's modulus of the filling member 5 is lower than that of the metal sheet constituting the hollow member 10. Therefore, the filling member 5 is easily deformed when stress is applied. The reason why the filling member 5 suppresses deformation of the hollow member 10 is that out-of-plane deformation of a point of the hollow member 10 to which compressive stress is applied is suppressed. That is, the filling member 5 inhibits the out-of-plane deformation of the hollow member 10. Therefore, it is effective that the filling member 5 is disposed in close contact with a surface that undergoes compressive deformation when the hollow member 10 is deformed. Furthermore, from the viewpoint of the effect of the filling member 5 with regard to mass, it is most desirable that the entire filling member 5 is disposed in close contact with the surface that is compressed and deformed when the hollow member 10 is deformed. The surface that is compressed and deformed when the hollow member 10 is deformed is a surface (the metal sheet constituting the hollow member 10) on the side where the bending induction portion is located with respect to the boundary 19 of the hollow member 10.

From this, it is desirable that in the cross section of the hollow member 10 with the bending induction portion, the filling member 5 is disposed in close contact with the side where the bending induction portion is present with respect to the boundary 19 that halves the cross section in the height direction of the cross section defined by the direction from the center of mass of the cross section toward the bending induction portion.

Figure 96:
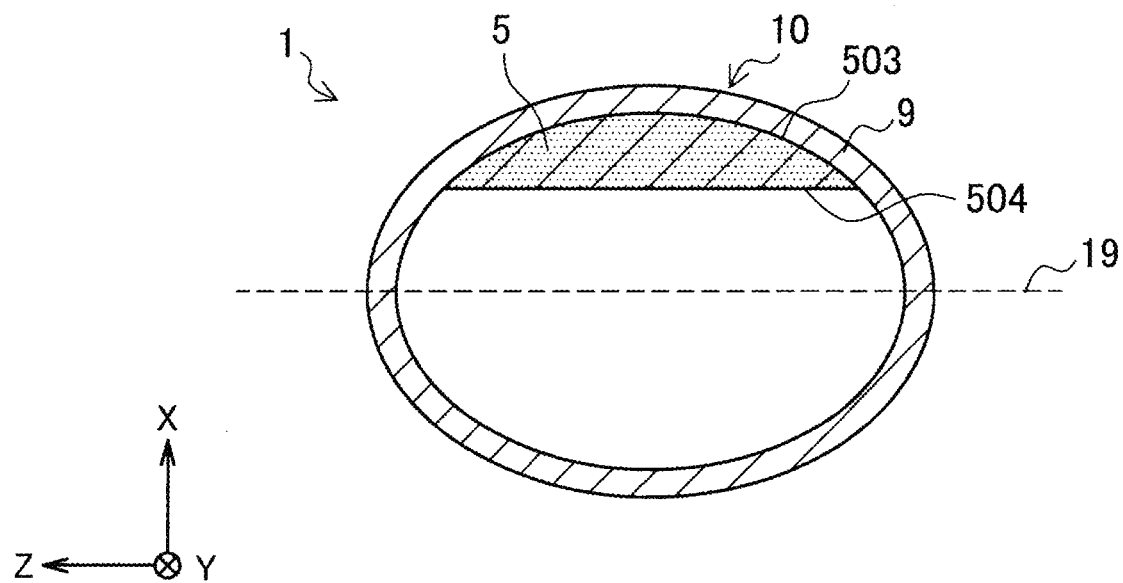
FIG. 96 is a cross-sectional view showing a specific example of the frame and the filling member in a cross section orthogonal to the Y-axis direction.

In the example shown in FIG. 96, the cross-sectional shape of the hollow member 10 is elliptical. The filling member 5 is disposed in close contact with the inner surface of the hollow member 10 in a bending induction portion (not shown). The filling member 5 includes a curved close contact surface 503 that is in close contact with the inner surface of the hollow member 10 and a linear release surface 504. The filling member 5 is disposed on the bend inside with respect to the boundary 19 of the hollow member 10 in the cross section of the hollow member 10. That is, the filling member 5 is disposed in a range in which the release surface 504 does not exceed the boundary 19.

Figure 97:
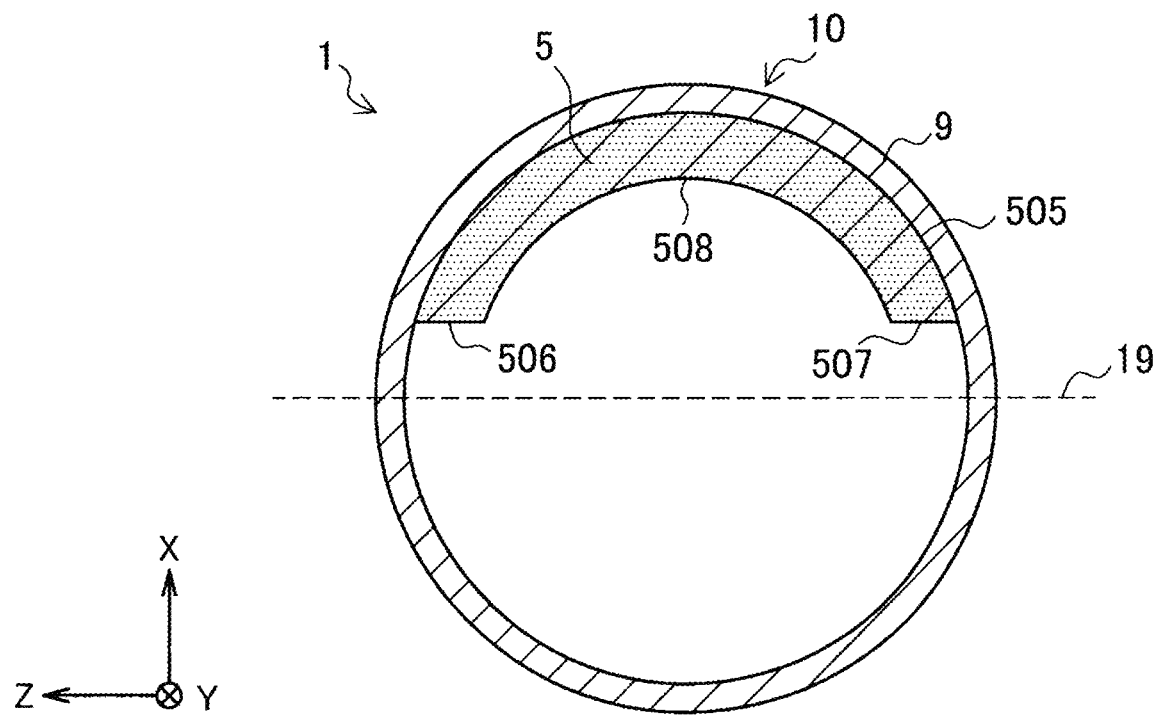
FIG. 97 is a cross-sectional view showing a specific example of the frame and the filling member in a cross section orthogonal to the Y-axis direction.

In the example shown in FIG. 97, the cross-sectional shape of the hollow member 10 is circular. The filling member 5 is disposed in close contact with the inner surface of the hollow member 10 in a bending induction portion (not shown). The filling member 5 includes an arc-shaped close contact surface 505 that is in close contact with the inner surface of the hollow member 10, a pair of linear first release surfaces 506 and 507, and an arc-shaped second release surface 508. The filling member 5 is disposed on the bend inside with respect to the boundary 19 of the hollow member 10 in the cross section of the hollow member 10. That is, the filling member 5 is disposed in a range in which the first release surfaces 506 and 507 do not exceed the boundary 19.

Figure 98:
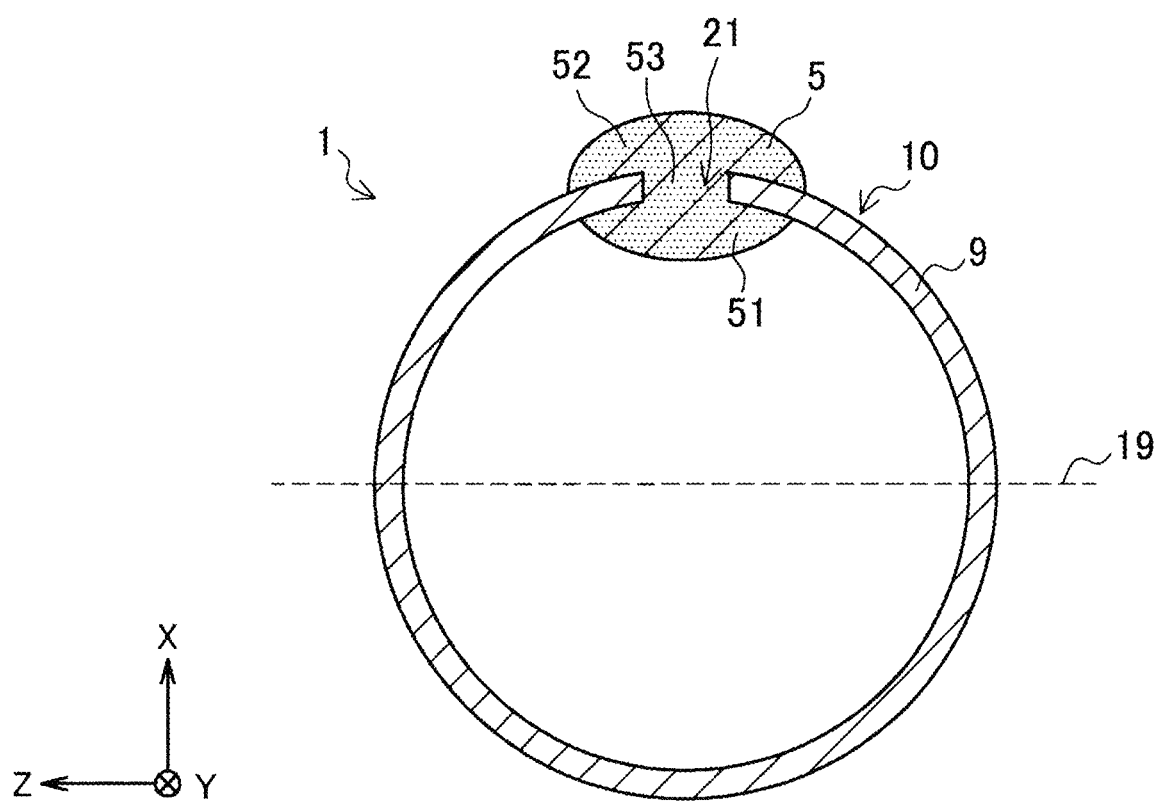
FIG. 98 is a cross-sectional view showing a specific example of the frame and the filling member in a cross section orthogonal to the Y-axis direction.

In the example shown in FIG. 98, the cross-sectional shape of the hollow member 10 is circular. The filling member 5 is disposed in close contact with the inner surface of the hollow member 10 in a bending induction portion (not shown). The wall hole 21 is provided in the vicinity of a bending induction portion (not shown) of the hollow member 10. As described in the fourth embodiment, the filling member 5 passes through the wall hole 21 and is in close contact with the hollow member 10. Specifically, the filling member 5 includes the first filling portion 51 that is in close contact with the inner wall surface of the hollow member 10, the second filling portion 52 that is in close contact with the outer wall surface of the hollow member 10, and the third filling portion 53 that is provided in close contact with the wall hole 21 and connects the first filling portion 51 to the second filling portion 52. The filling member 5 is disposed on the bend inside with respect to the boundary 19 of the hollow member 10 in the cross section of the hollow member 10. That is, the filling member 5 is disposed in a range in which the first filling portion 51 does not exceed the boundary 19.

As shown in FIGS. 95 to 98, the filling member 5 is disposed on the bend inside induced by the bending induction portion with respect to the boundary 19 of the hollow member 10 in the cross section of the hollow member 10. The stress applied to the boundary 19 at the time of bending deformation is zero, and the stress applied to the vicinity of the boundary 19 at the time of bending deformation is small. Therefore, the hollow member 10 is unlikely to undergo out-of-plane deformation at the boundary 19. Since the disposition range of the filling member is limited to the bend inside with respect to the boundary 19, the filling member 5 is not disposed at least in a region in the vicinity of the boundary 19 where out-of-plane deformation is less likely to occur on the bend outside with respect to the boundary 19. Therefore, the mass efficiency of the collision safety performance by the filling member 5 can be maintained. On the other hand, referring to FIGS. 129 and 130, the out-of-plane deformation occurring on the bend inside is greater than on the bend outside. Therefore, by disposing the filling member 5 on the bend inside with respect to the boundary 19 of the hollow member 10, it is possible to effectively suppress large out-of-plane deformation occurring on the bend inside. As described above, the collision safety performance of the frame 1 can be improved with high mass efficiency.

EXAMPLES

9. Examples

Next, examples of the present invention will be described.

9.1. Examples Regarding First Embodiment

In order to confirm the effects of the present invention, in the examples described below, the effect of improving the collision safety performance of the frame by the reinforcement and the filling member was verified. The following examples are merely for verification of the effects of the present invention, and the present invention is not limited to the following examples.

In order to verify the effect of improving the collision safety performance of the frame by the reinforcement and the filling member, the present inventors calculated a stroke St (mm) in a collision with respect to a collision energy absorption amount (E.A. (kJ)) of various frames using a simulation. As shown in FIG. 5, the stroke St indicates the amount of movement of a collision object from an end surface of the frame 1 on the collision side. That is, it can be said that the shorter the stroke St, the higher the collision safety performance for the same E.A.

As a sample in the present example, a frame in the related art (Reference Example 1), a frame composed only of the hollow member 10 according to the present embodiment (Comparative Example 1), a frame in which only the reinforcement 4 was provided inside the hollow member 10 according to the present embodiment (Comparative Example 2), a frame in which only the filling member 5 was provided inside the hollow member 10 according to the present embodiment with no gap (Comparative Example 3), and a frame in which the reinforcement 4 and the filling member 5 fixed by adhesion were provided inside the hollow member 10 according to the present embodiment (Example 1) were prepared. In addition, the disposition positions of the reinforcement 4, the filling member 5, and the bent portion 6 inside the hollow member 10 in Reference Example 1, each of the comparative examples, and Example 1 are the same as the disposition positions shown in FIGS. 5, 6, and 7. An example in which the filling member 5 is excluded from the configuration shown in FIGS. 5, 6, and 7 is Comparative Example 2, an example in which the reinforcement 4 is excluded is Comparative Example 3, and examples in which both the reinforcement 4 and the filling member 5 are excluded are Reference Example 1 and Comparative Example 1.

In addition, each dimension (see FIG. 5) of each of the frames used in the present example is as follows (unit is mm).

$L_{FL}=500$
$D_{FL1}=70$
$D_{FL2}=90$
$L_R=240$
$S_{FL}=60$
$L_{FMA}=70$
$L_{FMB}=70$

The parameters regarding each of the frames are as shown in Table 1 below.

TABLE 1

| | Sheet thickness (mm)/strength (MPa) of hollow member | | Sheet thickness (mm)/strength (MPa) of reinforcement | Presence or absence of filling member | Member weight (kg) | Weight reduction ratio (compared to Reference Example 1) (%) |
|---|---|---|---|---|---|---|
| | First structural member | Second structural member | | | | |
| Example 1 | 1.4/1180 | 1.0/1180 | 0.6/270 | Present | 2.47 | 27 |
| Comparative Example 1 | 1.4/1180 | 1.0/1180 | — | Absent | 2.32 | 31 |
| Comparative Example 2 | 1.4/1180 | 1.0/1180 | 0.6/270 | Absent | 2.43 | 28 |
| Comparative Example 3 | 1.4/1180 | 1.0/1180 | — | Present | 2.36 | 30 |
| Reference Example 1 | 2.0/780 | 1.5/690 | — | Absent | 3.37 | — |

The first structural member, the second structural member, and the reinforcement are all formed of steel sheets. The material of the filling member is polyurethane (Young's modulus=100 MPa).

A collision load was input to an end portion of the frame according to each sample in the longitudinal direction, and the E.A. for the stroke of a collision object was calculated. In addition, the cross-sectional shapes in the bent portions of the frames according to Comparative Example 2 and Example 1 after a collision simulation were compared.

Figure 99:
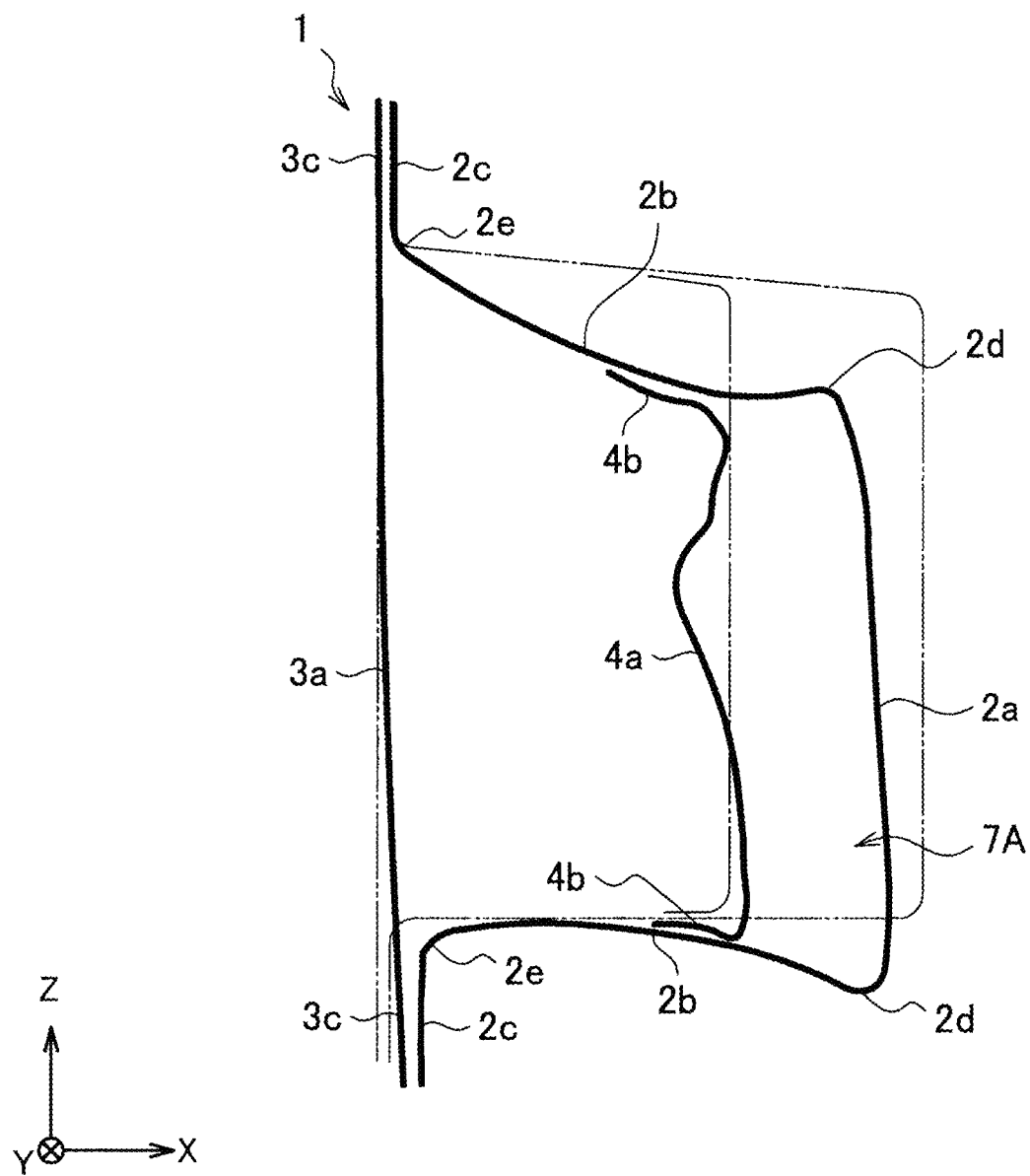
FIG. 99 is a view showing changes in the cross-sectional shapes in bent portions of frames according to Comparative Example 2 and Example 1 according to the first embodiment of the present invention before and after a collision simulation.
Figure 100:
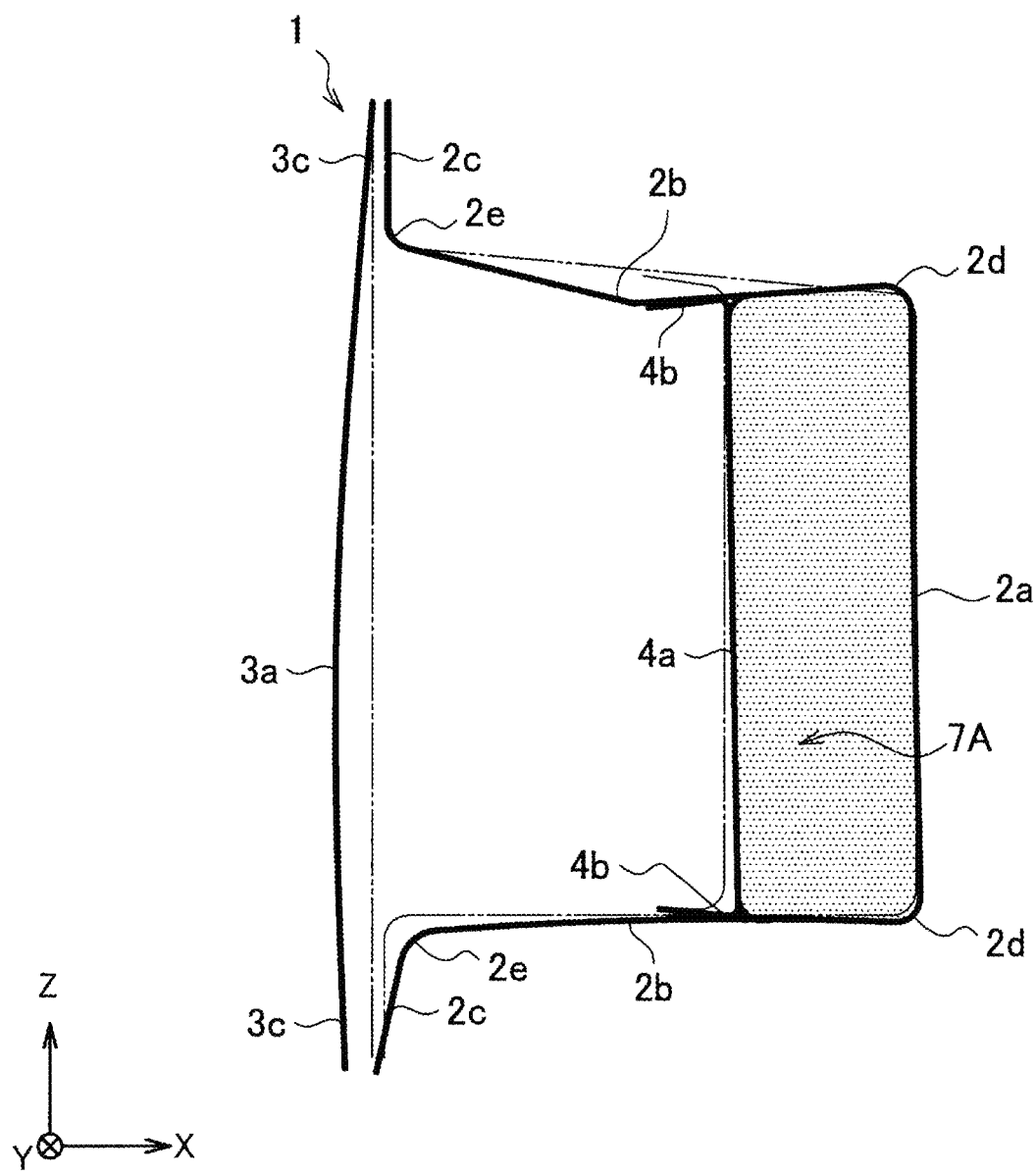
FIG. 100 is a view showing changes in the cross-sectional shapes in the bent portions of the frames according to Comparative Example 2 and Example 1 according to the embodiment before and after the collision simulation.

First, the cross-sectional shapes in the bent portions of the frames according to Comparative Example 2 and Example 1 after the collision simulation will be described. FIGS. 99 and 100 are views showing changes in the cross-sectional shapes in the bent portions of the frames according to Comparative Example 2 and Example 1 before and after the collision simulation. As shown in FIG. 99, in the main surface part 4*a* of the reinforcement 4 of the frame 1 according to Comparative Example 2, out-of-plane deformation had occurred in the X-axis direction, buckling had occurred. In addition, out-of-plane deformation had also occurred in each of the bottom wall part 2*a*, the side wall part 2*b*, and the ridge portion 2*d*. Therefore, the cross-sectional shape of the hollow member 10 was greatly changed. It is considered that this is because the effect of suppressing the cross-sectional deformation of the hollow member 10 by the reinforcement 4 was lost due to the out-of-plane deformation of the main surface part 4*a*.

On the other hand, as shown in FIG. 100, out-of-plane deformation had not occurred in the main surface part 4*a* of the reinforcement 4 of the frame 1 according to Example 1. In addition, the cross-sectional shape of the hollow member 10 had not changed before and after the collision. It is considered that this is because the effect of suppressing the out-of-plane deformation of the reinforcement 4 is exhibited by the filling member 5A disposed in close contact with the reinforcement 4. Therefore, it is considered that the effect of suppressing the cross-sectional deformation of the hollow member 10 by the reinforcement 4 is exhibited.

Figure 101:
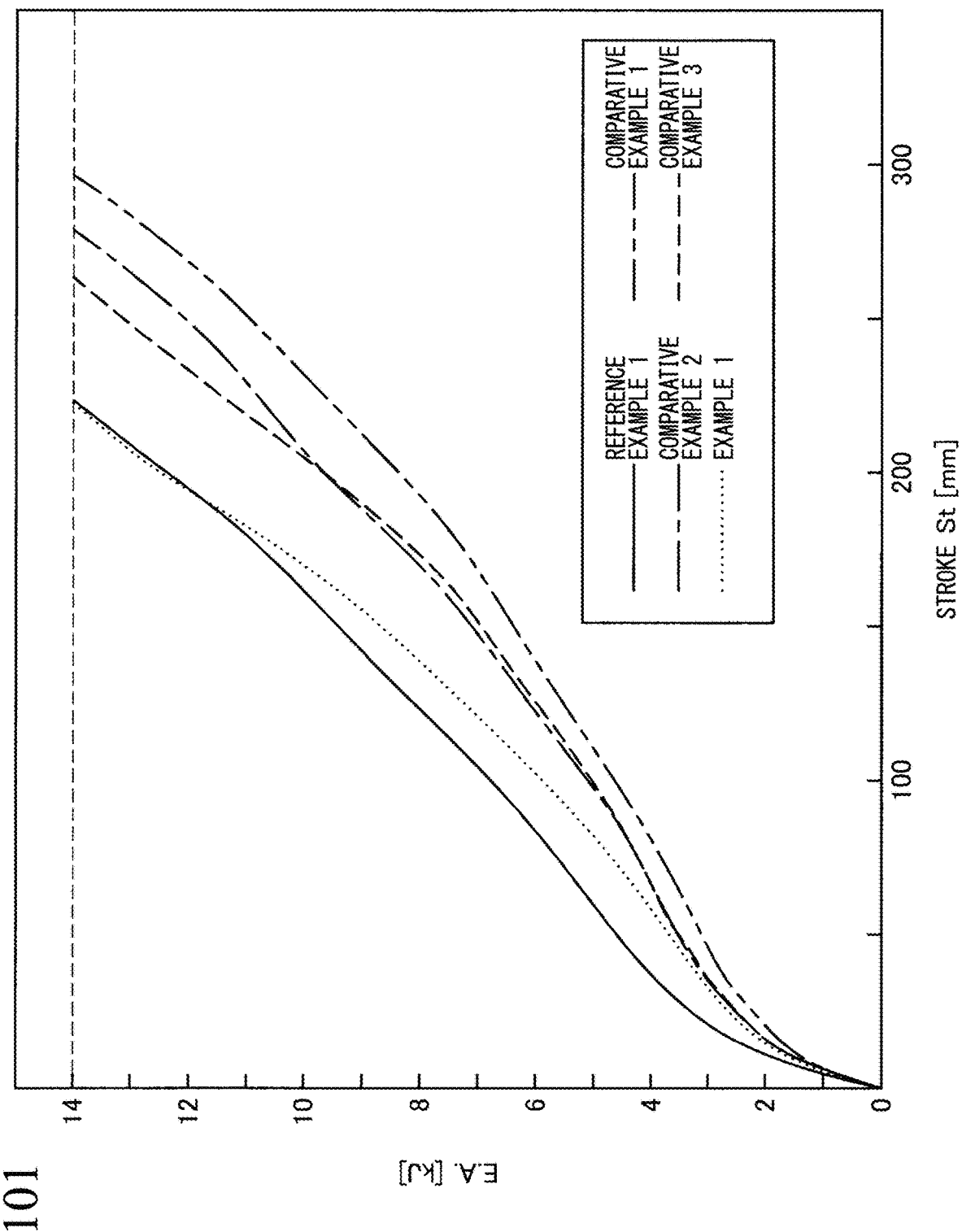
FIG. 101 is a graph showing an E.A. with respect to a stroke St of the frame according to each of samples according to the embodiment.
Figure 102:
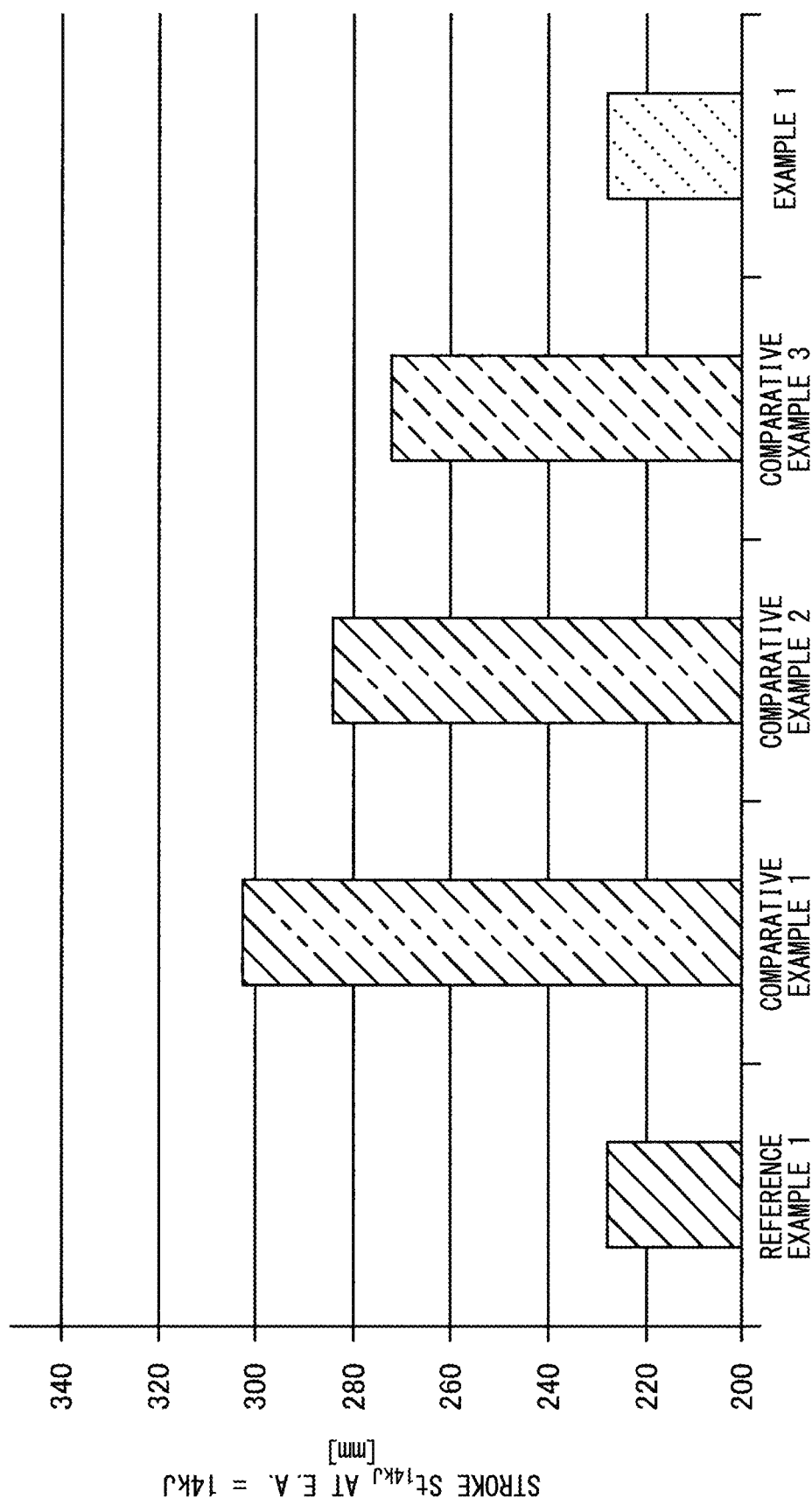
FIG. 102 is a graph showing a stroke St14 kJ with respect to E.A.=14 kJ of the frame according to each of the samples according to the embodiment.

Next, the calculation result of the E.A. for the stroke of the collision object will be described. FIG. 101 is a graph showing the E.A. with respect to the stroke St of the frame according to each of the samples. The frame according to each of the samples buckles almost completely at E.A.=14 kJ. FIG. 102 is a graph showing the stroke $St_{14\ kJ}$ with respect to E.A.=14 kJ of the frame according to each of the samples. As shown in FIG. 102, the stroke $St_{14\ kJ}$ of the frame according to Example 1 is smaller than the stroke $St_{14\ kJ}$ of the frame according to other comparative examples. Furthermore, compared to Reference Example 1, it could be seen that although the weight of the frame according to Example 1 was lower by about 30%, the stroke $St_{14\ kJ}$ of the frame was at an equivalent level.

In addition, as shown in FIG. 101, it could be seen that the rate of increase in the E.A. with respect to the increase in the stroke St of the frame according to Example 1 is larger than those of the frames according to other comparative examples. It is considered that this is because the cross-sectional shape of the frame in the bent portion due to the input of the collision load is maintained and thus the collision energy absorption amount is larger than that of other frames in which the cross-sectional shape is changed.

Figure 103:
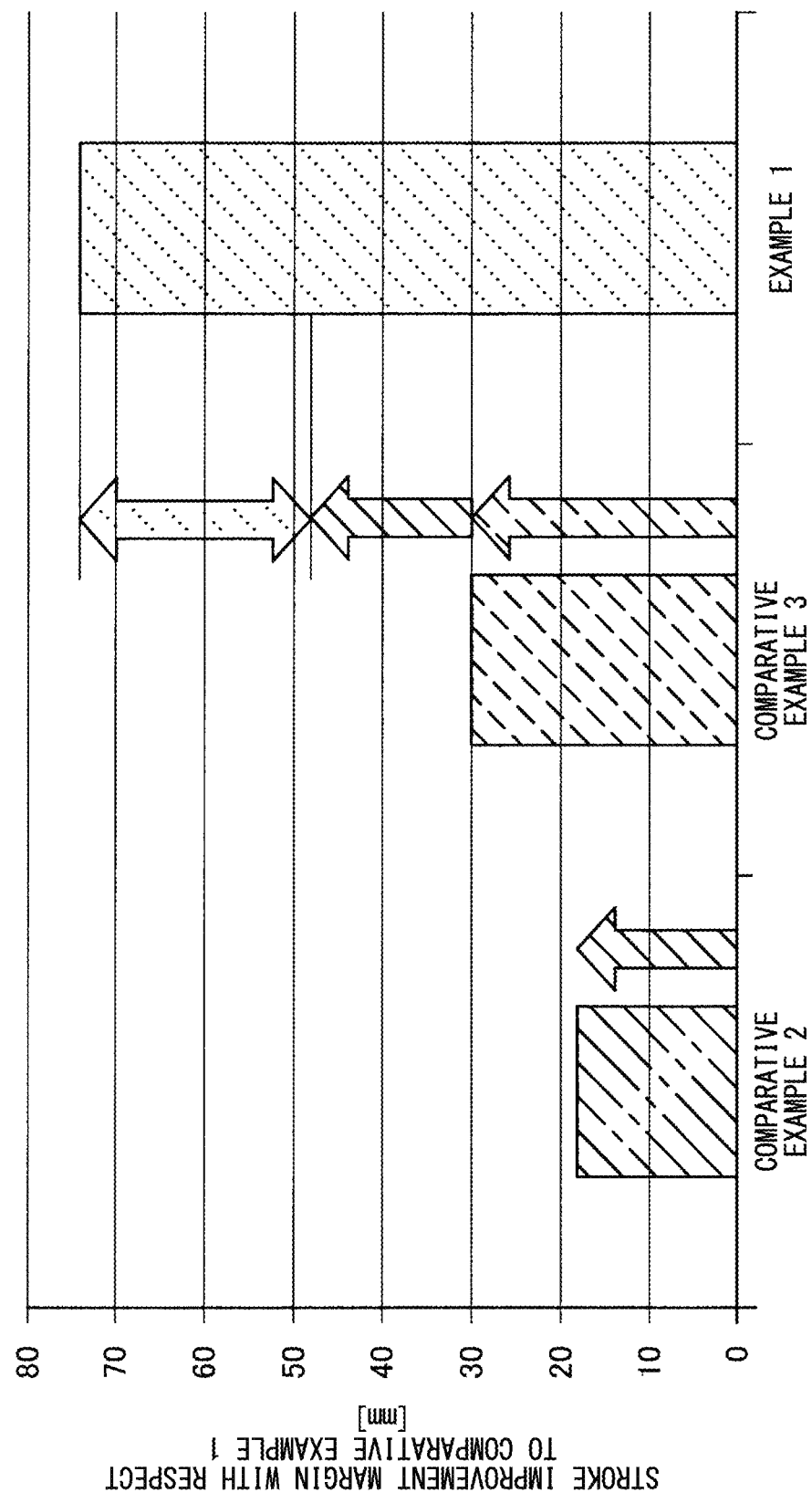
FIG. 103 is a graph showing improvement margins of the strokes St14 kJ of the frames according to Comparative Example 2, Comparative Example 3, and Example 1 with respect to the stroke St14 kJ of the frame according to Comparative Example 1 according to the embodiment.

FIG. 103 is a graph showing improvement margins of the strokes $St_{14\ kJ}$ of the frames according to Comparative Example 2, Comparative Example 3, and Example 1 with respect to the stroke $St_{14\ kJ}$ of the frame according to Comparative Example 1. As shown in FIG. 103, the improvement margin of the stroke $St_{14\ kJ}$ of the frame according to Example 1 is larger than the sum of the improvement margin of the stroke $St_{14\ kJ}$ of the frame according to Comparative Example 2 and the improvement margin of the stroke $St_{14\ kJ}$ of the frame according to Comparative Example 3. From this result, it became obvious that suppression of the change in the cross-sectional shape of the frame due to the reinforcement can be more effectively realized by disposing the filling member in close contact with the reinforcement.

From the present example, in the frame according to Example 1, the change in the cross-sectional shape of the frame due to the input of the collision load can be suppressed. Accordingly, it became obvious that it is possible to secure collision safety performance even in a frame that has been reduced in weight.

9.2. Examples Regarding Second Embodiment

In order to confirm the effects of the present invention, in the examples described below, the effect of improving the collision safety performance of the frame by the filling member 5 was verified. The following examples are merely for verification of the effects of the present invention, and the present invention is not limited to the following examples. The filling member according to each of the examples is referred to as "filling member 5" unless otherwise specified.

In order to verify the effect of improving the collision safety performance of the frame by the filling member 5, the present inventors calculated the maximum loads $L_{max}$ (kN) of various frames with respect to the same collision load using a simulation. The maximum load $L_{max}$ means the maximum load value in a load-stroke curve for the frame 1 when the collision load F is input to the frame 1. In other words, it can be said that the greater the maximum load $L_{max}$ for the same collision load, the higher the load bearing performance, that is, the higher the collision safety performance.

In the present example, the filling member 5 was disposed in close contact with a predetermined portion on the inner side of the bent portions 6A and 6B of the frame 1 shown in FIG. 12, and a collision body (not shown) was caused to collide with an end portion of the frame 1 in the longitudinal direction. Accordingly, the collision load F is input to the frame 1. The maximum load $L_{max}$ of the collision body after the input of the collision load F was analyzed for each of the examples and reference example, and the results were examined.

First, test conditions of the present example will be described. Each dimension (see FIG. 12) of the frame 1 used in the present example is as follows (unit is mm).

$L_{FL}=500$
$D_{FL1}=70$
$D_{FL2}=90$
$S_{FL}=60$
$L_{FMA}=70$
$L_{FMB}=70$

The sheet thickness of the first structural member 2 is 2.0 mm, and the strength of the first structural member 2 is 780 MPa. The sheet thickness of the second structural member 3 is 1.5 mm, and the strength of the second structural member 3 is 690 MPa. The weight of the frame 1 is 3.63 kg.

The disposition of the filling member 5 in the bent portion 6A according to each example is as follows. The numerical values in parentheses are values regarding the thickness and disposition position of the filling member 5.

Example 1: Disposition shown in FIG. 13 (a=10 mm, $b_1$=15 mm, $b_2$=15 mm)
Example 2: Disposition shown in FIG. 15 (a=10 mm)
Example 3: Disposition shown in FIG. 15 (a=3 mm)
Example 4: Disposition shown in FIG. 15 (a=30 mm)
Example 5: Disposition shown in FIG. 15 (a=50 mm)
Example 6: Disposition shown in FIG. 16 ($a_1$, $a_2$, $c_1$, $c_2$=10 mm)
Example 7: Disposition shown in FIG. 17 (a, c=10 mm)
Example 8: Disposition shown in FIG. 18 ($a_1$, $a_2$=10 mm)
Example 9: Disposition shown in FIG. 19 (a=10 mm)
Example 10: Disposition shown in FIG. 20 ($a_1$, $a_2$, $a_3$=10 mm)

The filling members 5 according to Examples 1 to 8 are disposed in close contact with the inner surface of the bottom wall part 2a (and the inner side of the ridge portion 2d). On the other hand, in the bent portion 6B, the filling member 5 according to the corresponding example is reversed in the X direction and is disposed in close contact with the inner surface of the top wall part 3a (and the inner side of the ridge portion 2e). For example, in the bent portion 6B, Example 1 has the disposition shown in FIG. 14. In addition, the filling members 5 according to Examples 9 and 10 are disposed in close contact with the inner surfaces of the bottom wall part 2a and the top wall part 3a even in the bent portion 6B.

Here, the density of the filling member 5 was set to 176 kg/m³, and the Young's modulus and yield stress of the filling member 5 were set to 100 MPa and 2.1 MPa.

In the reference example, the frame 1 is not provided with the filling member 5.

Table 2 shows the total weight of the frame 1 and the weight of the filling member 5 according to each of the examples and reference example.

TABLE 2

Total weight of frame and weight of filling member

|  | Total weight (kg) | Filling member weight (kg) |
|---|---|---|
| Example 1 | 3.67 | 0.032 |
| Example 2 | 3.68 | 0.042 |
| Example 3 | 3.65 | 0.018 |
| Example 4 | 3.70 | 0.071 |
| Example 5 | 3.74 | 0.107 |
| Example 6 | 3.65 | 0.013 |
| Example 7 | 3.64 | 0.006 |
| Example 8 | 3.71 | 0.072 |
| Example 9 | 3.67 | 0.036 |
| Example 10 | 3.74 | 0.103 |
| Reference Example | 3.63 | 0 |

The weight of the collision body colliding with the end portion of the frame 1 was set to 201 kg, and the speed of the collision body when colliding with the end portion of the frame 1 was set to 12 m/s.

Table 3 shows the weight of the filling member 5, the maximum load amount $L_{max}$ of the frame, and the load improvement rate $I_L$ (kN/g) according to each of the examples and reference example. The maximum load amount $L_{max}$ is a load that the frame can withstand against a collision load. The load improvement rate $I_L$ is a value obtained by dividing the difference between the maximum load of the frame according to the reference example and the maximum load of the frame according to an example by the weight (g) of the filling member 5 provided in the frame according to the example. That is, the load improvement rate $I_L$ is a value indicating the mass efficiency of the load bearing performance by the filling member 5.

TABLE 3

Weight of filling member, maximum load amount $L_{max}$ of frame, and load improvement rate $I_L$

|  | Filling member weight (kg) | Maximum load amount $L_{max}$ (kN) | Load improvement rate $I_L$ (kN/g) |
|---|---|---|---|
| Example 1 | 0.032 | 405 | 0.41 |
| Example 2 | 0.042 | 405 | 0.31 |
| Example 3 | 0.018 | 397 | 0.28 |
| Example 4 | 0.071 | 417 | 0.35 |
| Example 5 | 0.107 | 432 | 0.37 |
| Example 6 | 0.013 | 396 | 0.31 |
| Example 7 | 0.006 | 394 | 0.33 |
| Example 8 | 0.072 | 407 | 0.21 |
| Example 9 | 0.036 | 398 | 0.17 |
| Example 10 | 0.103 | 417 | 0.24 |
| Reference Example | 0 | 392 | — |

When Example 1 and Example 2 were compared, the same result was shown regarding the maximum load amount $L_{max}$, but Example 1 showed better results for the load improvement rate $I_L$. Therefore, the mass efficiency of the filling member 5 regarding the load bearing performance can be improved by disposing the filling member 5 in the center portion of the bottom wall part 2a (the top wall part 3a). Therefore, it is possible to further reduce the weight of a vehicle.

When Examples 2 to 5 were compared, the result was shown that both the maximum load amount $L_{max}$ and the load improvement rate $I_L$ are further improved as the thickness a of the filling member 5 is increased. Therefore, by adjusting the filling amount of the filling member 5 disposed on the inner surface of the bottom wall part 2a (the top wall part 3a) according to the collision safety performance required for the frame, a reduction in the weight of a vehicle can be achieved while securing appropriate load bearing performance.

When Examples 6 and 8 and Examples 7 and 9 were compared, Examples 8 and 9 showed better results for the maximum load $L_{max}$. Therefore, by disposing the filling member 5 in close contact with the inner surface of the side wall part 2b, the load resistance of the frame 1 can be further increased than simply disposing the filling member 5 in close contact with the inner side of the ridge portion 2d (2e).

For Example 10, a high maximum load amount $L_{max}$ was obtained. From this, by disposing the filling member 5 continuously in close contact with not only the bottom wall part 2a (the top wall part 3a) but also the ridge portion 2d (2e) and the side wall part 2b, not only an improvement in the collision energy absorption properties of the frame 1 but also a further improvement in the load bearing performance of the frame 1 can be achieved.

As described above in the examples, by disposing the filling member 5 in close contact with mainly the inner surface of the bottom wall part 2a (the top wall part 3a), it is possible to maintain the load bearing performance of the thinned frame 1 at a high level.

9.3. Examples Regarding Third Embodiment

In order to confirm the effects of the present invention, in the examples described below, the effect of improving the collision safety performance of the frame by the filling member 5 was verified. The following examples are merely for verification of the effects of the present invention, and the present invention is not limited to the following examples. The filling member according to each of the examples is referred to as "filling member 5" unless otherwise specified.

In order to verify the effect of improving the collision safety performance of the frame by the filling member 5, the present inventors calculated strokes St (mm) of various frames with respect to the same collision energy absorption amount (energy absorption: E.A.) using a simulation. As shown in FIG. 22, the stroke St indicates the amount of movement of a collision object from an end surface of the frame 1 on the collision side. That is, it can be said that the shorter the stroke St with respect to the same collision energy absorption amount, the higher the collision energy absorption properties, that is, the higher the collision safety performance.

In the present example, the filling member 5 was disposed in close contact with a predetermined portion on the inner side of the bent portions 6A and 6B of the frame 1 shown in FIG. 22, and a collision body (not shown) was caused to collide with an end portion of the frame 1 in the longitudinal direction. Accordingly, the collision load F is input to the frame 1. The maximum stroke $St_{max}$ of the collision body after the input of the collision load F was analyzed for each of the examples and reference example, and the results were examined.

First, test conditions of the present example will be described. Each dimension (see FIG. 22) of the frame 1 used in the present example is as follows (unit is mm).

$L_{FL}$=500
$D_{FL1}$=70
$D_{FL2}$=90
$S_{FL}$=60
$L_{FMA}$=70
$L_{FMB}$=70

The sheet thickness of the first structural member 2 is 2.0 mm, and the strength of the first structural member 2 is 780 MPa. The sheet thickness of the second structural member 3 is 1.5 mm, and the strength of the second structural member 3 is 690 MPa. The weight of the frame 1 is 3.63 kg.

The disposition of the filling member 5 in the bent portion 6A according to each example is as follows. The numerical values in parentheses are values regarding the thickness and disposition position of the filling member 5.

Example 1: Disposition shown in FIG. 23 (a=10 mm)
Example 2: Disposition shown in FIG. 24 ($a_1$, $a_2$=10 mm)
Example 3: Disposition shown in FIG. 25 ($a_1$, $a_2$=10 mm, $b_1$ to $b_4$=15 mm)
Example 4: Disposition shown in FIG. 26 ($a_1$ to $a_3$=10 mm)
Example 5: Disposition shown in FIG. 27 ($a_1$, $a_2$, $c_1$, $c_2$=10 mm)
Example 6: Disposition shown in FIG. 28 (a, c=10 mm)
Example 7: Disposition shown in FIG. 29 (a=10 mm)
Example 8: Disposition shown in FIG. 29 (a=3 mm)
Example 9: Disposition shown in FIG. 29 (a=30 mm)
Example 10: Disposition shown in FIG. 29 (a=50 mm)

The filling members 5 according to Examples 4 to 10 are disposed in close contact with the inner surface of the bottom wall part 2a (and the inner side of the ridge portion 2d). On the other hand, in the bent portion 6B, the filling member 5 according to the corresponding example is reversed in the X direction and is disposed in close contact with the inner surface of the top wall part 3a (and the inner side of the ridge portion 2e).

Here, the density of the filling member 5 was set to 176 kg/m³, and the Young's modulus and yield stress of the filling member 5 were set to 100 MPa and 2.1 MPa.

In the reference example, the frame 1 is not provided with the filling member 5.

Table 4 shows the total weight of the frame 1 and the weight of the filling member 5 according to each of the examples and reference example.

TABLE 4

Total weight of frame and weight of filling member

| | Total weight (kg) | Filling member weight (kg) |
| --- | --- | --- |
| Example 1 | 3.67 | 0.036 |
| Example 2 | 3.71 | 0.073 |
| Example 3 | 3.68 | 0.048 |
| Example 4 | 3.74 | 0.103 |
| Example 5 | 3.65 | 0.013 |
| Example 6 | 3.64 | 0.006 |
| Example 7 | 3.68 | 0.042 |
| Example 8 | 3.65 | 0.018 |
| Example 9 | 3.70 | 0.071 |
| Example 10 | 3.74 | 0.107 |
| Reference Example | 3.63 | 0 |

The weight of the collision body colliding with the end portion of the frame 1 was set to 201 kg, and the speed of the collision body when colliding with the end portion of the frame 1 was set to 12 m/s.

Table 5 shows the weight of the filling member 5, the maximum stroke $St_{max}$ of the collision body for the frame, and the stroke improvement rate $I_{St}$ (mm/g) according to each of the examples and reference example. As shown in FIG. 22, the maximum stroke $St_{max}$ indicates the maximum movement amount in the longitudinal direction of the frame 1 from an end surface of the frame 1 on the collision side after the collision object having a predetermined E.A. collides with the frame 1. The stroke improvement rate $I_{St}$ is a value obtained by dividing the difference between the maximum stroke of the frame according to the reference example and the maximum stroke of the frame according to an example by the weight (g) of the filling member 5 provided in the frame according to the example. That is, the stroke improvement rate $I_{St}$ is a value indicating the mass efficiency of the collision energy absorption properties by the filling member 5.

TABLE 5

Weight of filling member, maximum stroke $St_{max}$ of frame, and stroke improvement rate $I_{St}$

| | Filling member weight (kg) | Maximum stroke $St_{max}$ (mm) | Stroke improvement rate $I_{St}$ (mm/g) |
| --- | --- | --- | --- |
| Example 1 | 0.036 | 212 | 0.44 |
| Example 2 | 0.073 | 196 | 0.44 |
| Example 3 | 0.048 | 218 | 0.21 |
| Example 4 | 0.103 | 191 | 0.36 |
| Example 5 | 0.013 | 220 | 0.62 |
| Example 6 | 0.006 | 225 | 0.50 |
| Example 7 | 0.042 | 212 | 0.38 |
| Example 8 | 0.018 | 224 | 0.22 |
| Example 9 | 0.071 | 206 | 0.31 |
| Example 10 | 0.107 | 200 | 0.26 |
| Reference Example | 0 | 228 | — |

When Example 1 and Example 2 were compared, Example 2 showed better results for the maximum stroke $St_{max}$, but the stroke improvement rate $I_{St}$ was the same. Therefore, by adjusting the filling amount of the filling member 5 disposed on the inner surface of the side wall part 2b according to the collision safety performance required for the frame, a reduction in the weight of a vehicle can be achieved while securing appropriate collision energy absorption properties.

When Example 1 and Example 3 were compared, the result that in Example 1, the weight of the filling member 5 was smaller, and the maximum stroke $St_{max}$ was smaller was obtained. In addition, as shown in Examples 5 and 6, a high stroke improvement rate $I_{st}$ was obtained even in a case of being disposed only on the inner side of the ridge portion 2d. From this, it could be seen that by disposing the filling member 5 in close contact with the inner side of the ridge portion 2d (2e), the collision energy absorption properties of the frame 1 can be improved more effectively.

In Example 4, the lowest maximum stroke $St_{max}$ was obtained. From this, it could be seen that in order to maximize the collision safety performance of the frame 1, it is preferable to dispose the filling member 5 in close contact with not only the inner surface of the side wall part 2b but also the inner surface of the bottom wall part 2a (the top wall part 3a) and the inner side of the ridge portion 2d (2e).

Further, when Examples 7, 9, and 10 and Example 6 were compared, Examples 7, 9, and 10 showed better results for the maximum stroke $St_{max}$. Therefore, by disposing the filling member 5 in close contact with the inner surface of the bottom wall part 2a (the top wall part 3a), the stroke in a collision can be further reduced than by simply disposing the filling member 5 in close contact with the inner side of the ridge portion 2d (2e).

As described above in the examples, by disposing the filling member 5 in close contact with mainly the inner surface of the side wall part 2b, it is possible to maintain the collision energy absorption properties of the thinned frame 1 at a high level.

9.4. Examples Regarding Fourth Embodiment

In order to confirm the effects of the present invention, in the examples described below, the effect of improving the adhesion of the filling member (for example, resin material) according to the above embodiment to the hollow member (for example, metal member) was verified. The following examples are merely for verification of the effects of the present invention, and the present invention is not limited to the following examples.

In order to verify the effect of improving the adhesion of the filling member to the hollow member, the present inventors evaluated cross tension strength (CTS) by a cross tension test. More specifically, in this test, cross tension test pieces were prepared for each of the examples and comparative examples, and subjected to a tension test to evaluate the CTS, which is the joint strength. The magnitude of the joint strength corresponds to the degree of adhesion of the filling member to the hollow member.

Figure 104:
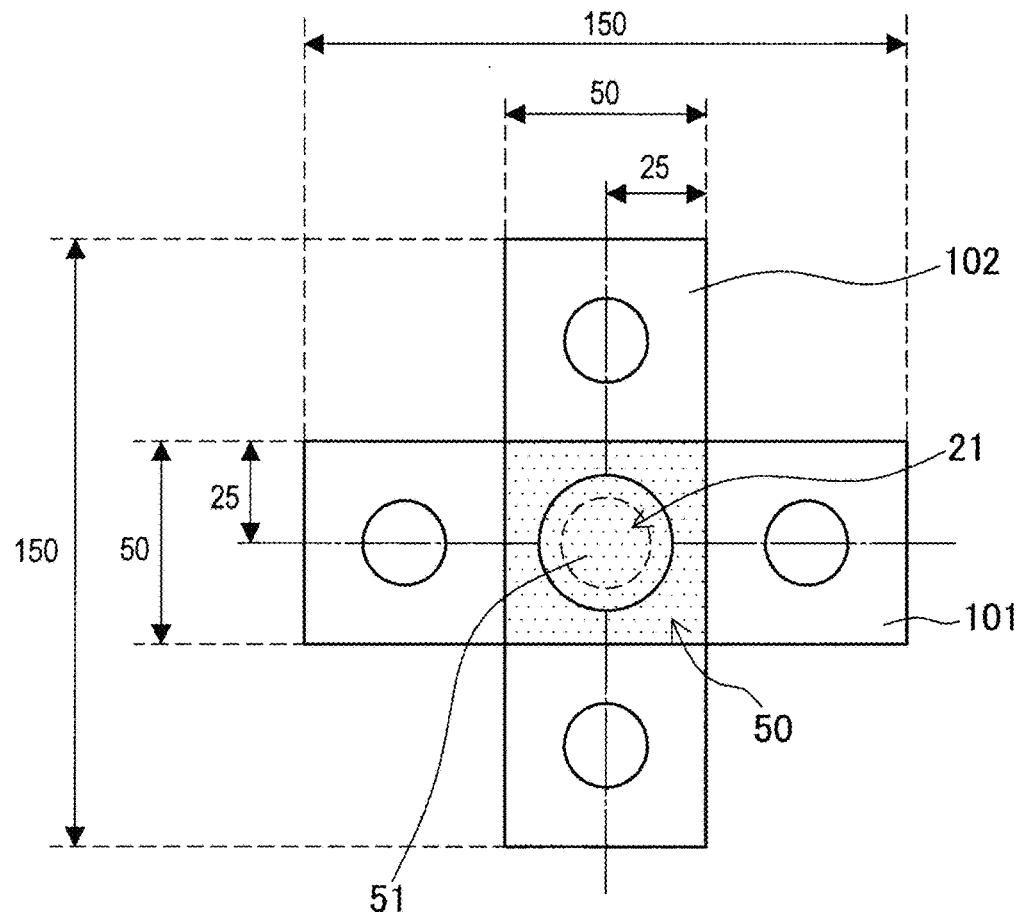
FIG. 104 is a top view showing the configuration of a sample used in a cross tension test according to Example 1 and Example 2 according to the fourth embodiment of the present invention.
Figure 105:
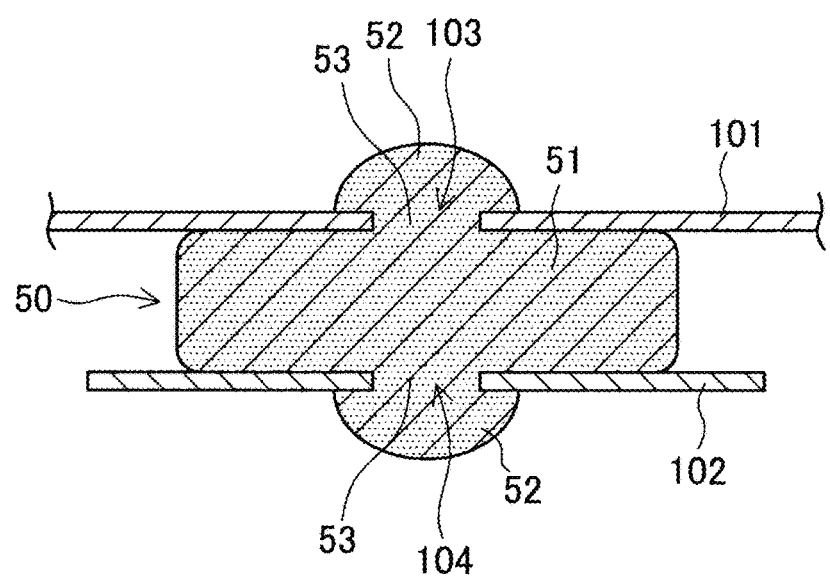
FIG. 105 is a side sectional view showing the configuration of the sample according to Example 1 according to the embodiment.

FIG. 104 is a top view showing the configuration of a sample used in the cross tension test according to Example 1 and Example 2. FIG. 105 is a side sectional view showing the configuration of the sample according to Example 1. As shown in FIGS. 104 and 105, the sample according to Example 1 is a cross tensile test piece obtained by joining a first test piece 101 and a second test piece 102 by filling the space between the first test piece 101 and the second test piece 102 with the filling member 50 and curing the filling member 50. In addition, wall holes 103 and 104 are provided at the centers of the first test piece 101 and the second test piece 102. Each of the wall holes 103 and 104 has a diameter of 22 mm.

A portion of the filling member 50 becomes the second filling portion 52 that swells outward from the wall holes 103 and 104 and is brought into close contact with the outer wall surfaces of the first test piece 101 and the second test piece 102. The first filling portion 51 and the second filling portion 52 that are in close contact with the inner wall surfaces of the first test piece 101 and the second test piece are connected by the third filling portion 53 that is provided in close contact with the wall holes 103 and 104. That is, the filling member 50 is in a state of being joined to the first test piece 101 and the second test piece 102 by adhesive force and being mechanically locked.

Figure 106:
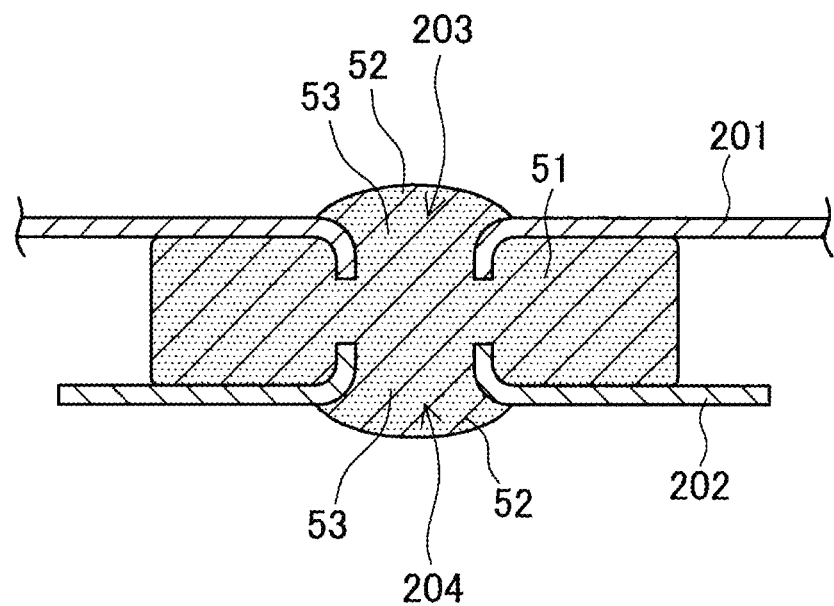
FIG. 106 is a side sectional view showing the configuration of the sample according to Example 2 according to the embodiment.

FIG. 106 is a side cross-sectional view showing the configuration of the sample according to Example 2. As shown in FIG. 106, the sample according to Example 2 is a cross tensile test piece obtained by joining a first test piece 201 and a second test piece 202 by filling the space between the first test piece 201 and the second test piece 202 with the filling member 50 and curing the filling member 50. Similarly to Example 1, wall holes 203 and 204 are provided at the centers of the first test piece 201 and the second test piece 202 according to Example 2. The wall holes 203 and 204 are subjected to burring, and the hole edge ends of the wall holes 203 and 204 protrude in directions facing each other. The diameter of the wall holes 203 and 204 after burring is 22 mm, respectively.

A portion of the filling member 50 becomes the second filling portion 52 that swells outward from the wall holes 203 and 204 and is brought into close contact with the outer wall surfaces of the first test piece 201 and the second test piece 202. The first filling portion 51 and the second filling portion 52 that are in close contact with the inner wall surfaces of the first test piece 201 and the second test piece are connected by the third filling portion 53 that is provided in close contact with the wall holes 203 and 204. That is, the filling member 50 is in a state of being joined to the first test piece 201 and the second test piece 202 by adhesive force and being mechanically locked.

Figure 107:
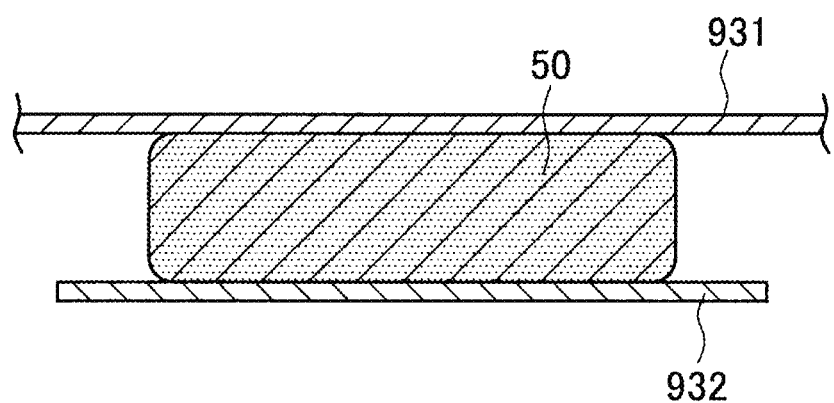
FIG. 107 is a side sectional view showing the configuration of a sample according to a comparative example according to the embodiment.

FIG. 107 is a side sectional view showing the configuration of a sample according to a comparative example. As shown in FIG. 107, the sample according to the comparative example is a cross tensile test piece obtained by joining a first test piece 931 and a second test piece 932 by filling the space between the first test piece 931 and the second test piece 932 with the filling member 50 and curing the filling member 50. No wall hole is provided at the centers of the first test piece 931 and the second test piece 932 according to the comparative example. Therefore, the filling member 50 is in a state of being joined to the first test piece 931 and the second test piece 932 only by adhesive force.

The characteristics and sizes of the first test piece, the second test piece, and the filling member used in each of the examples and comparative examples are as follows.

First Test Piece and Second Test Piece
  Tensile strength: 1180 MPa
  Size: width 50 mm, length 150 mm, thickness 1.4 mm
  Surface treatment: hot-dip galvannealing
Filling Member
  Material: Polyurethane
  Thickness: 10 mm In addition, fixing holes (diameter 20 mm) are provided on both end sides of the first test piece and the second test piece of each of the examples and comparative examples for fixing a jig for pulling the test pieces in the tensile direction during a tensile test.

In the cross tension test, the samples according to each of the examples and comparative examples were pulled at a speed of 1 mm/min, and the maximum load (N) was measured. The number of samples according to each of the examples and comparative examples was set to two.

Figure 108:
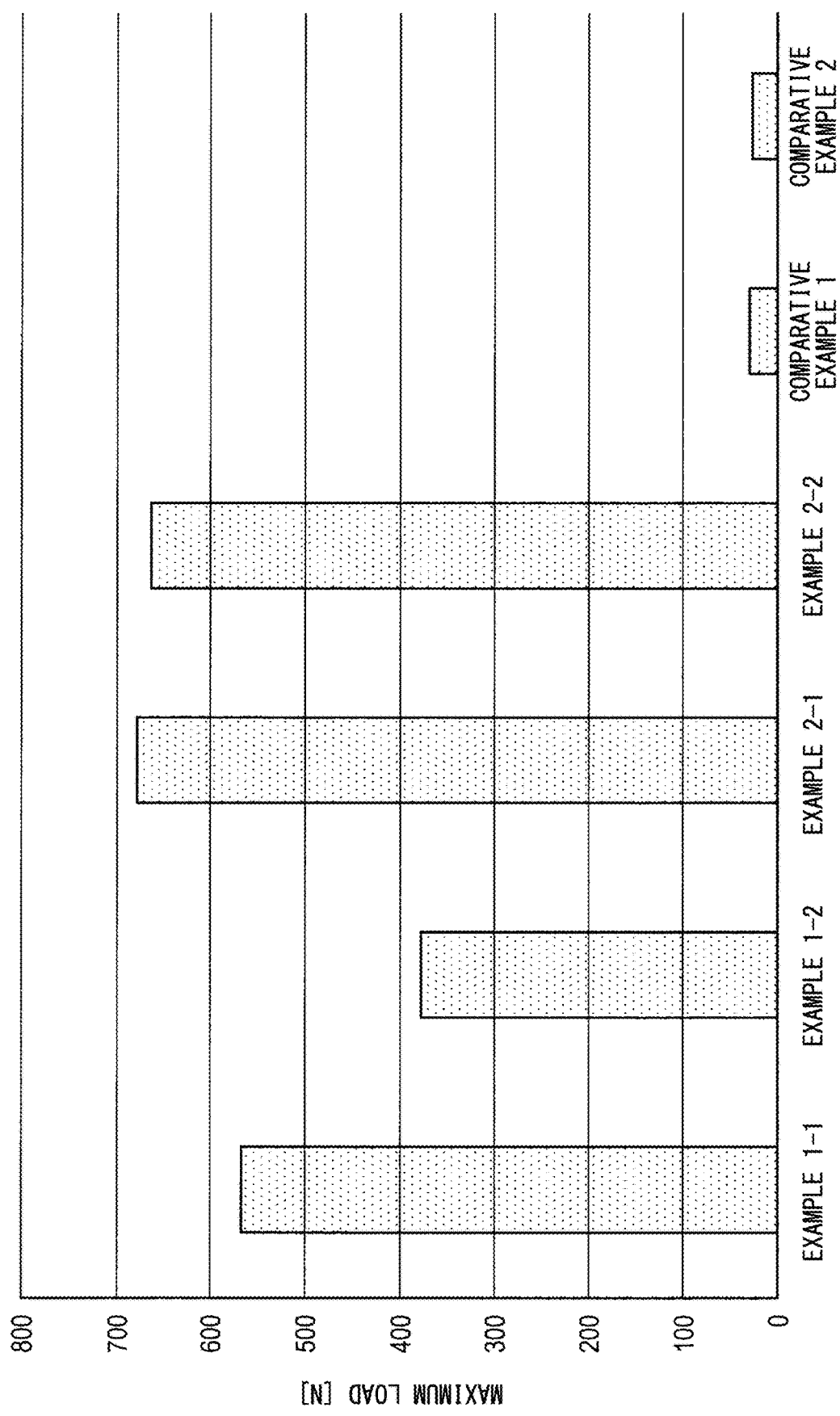
FIG. 108 is a graph showing the maximum load of each sample measured by the cross tension test according to the embodiment.

FIG. 108 is a graph showing the maximum load of each sample measured by the cross tension test. The graphs of Example 1-1 and Example 1-2 respectively show the test results of the samples according to Example 1. The graphs of Examples 2-1 and 2-2 respectively show the test results of the samples according to Example 2. The graphs of Comparative Example 1 and Comparative Example 2 respectively show the test results of the samples according to the comparative examples.

As shown in FIG. 108, it could be seen that the maximum loads of the samples according to Example 1 and Example 2 were significantly larger than the maximum loads of the samples according to the comparative examples. From this result, it could be seen that rather than simply adhering the filling member to the test piece corresponding to the hollow member, by bringing the filling member into close contact with both surfaces of the test piece so as to be locked to the test piece, the filling member can maintain the state of being in close contact with the test piece even when a high load is applied to the test piece.

Moreover, when Example 1 and Example 2 were compared, it could be seen that the maximum load of the sample according to Example 2 is larger than the maximum load of the sample according to Example 1. From this result, it could be seen that the joint strength between the test piece and the filling member can be further increased by providing the filling member so as to be bitten by the hole edge end of the wall hole subjected to burring.

As described above in the examples, by causing the filling member to pass through the hole provided in the test piece corresponding to the hollow member and to be brought into close contact with both surfaces of the test piece, the filling member does not easily fall off the test piece even if a high load is applied to the test piece. From this, it is possible to maintain the state in which the filling member is in close contact with the hollow member by employing the configuration in which the filling member is locked to the hollow member through the wall hole. That is, even when a load that can cause out-of-plane deformation of the hollow member due to the collision load is applied, the filling member can stably contribute to the collision safety performance of the vehicle structural member.

9.5. Example Regarding Disposition Range of Filling Member

In order to confirm the effects of the present invention, in the examples described below, the effect of improving the collision safety performance of the frame by the filling member 5 was verified. The following examples are merely for verification of the effects of the present invention, and the present invention is not limited to the following examples. The filling member according to each of the examples is referred to as "filling member 5" unless otherwise specified.

In order to verify the effect of improving the collision safety performance of the frame by the filling member, the present inventors calculated the amount of absorbed energy (energy absorption; E.A. (kJ)) of various frames with respect to the same stroke St (mm) using a simulation. The stroke St indicates the amount of movement of a collision object from an end surface of the frame 1 shown in FIG. 109 on the collision side. That is, it can be said that the higher the E.A. for the same stroke St, the higher the collision safety performance.

Figure 109:
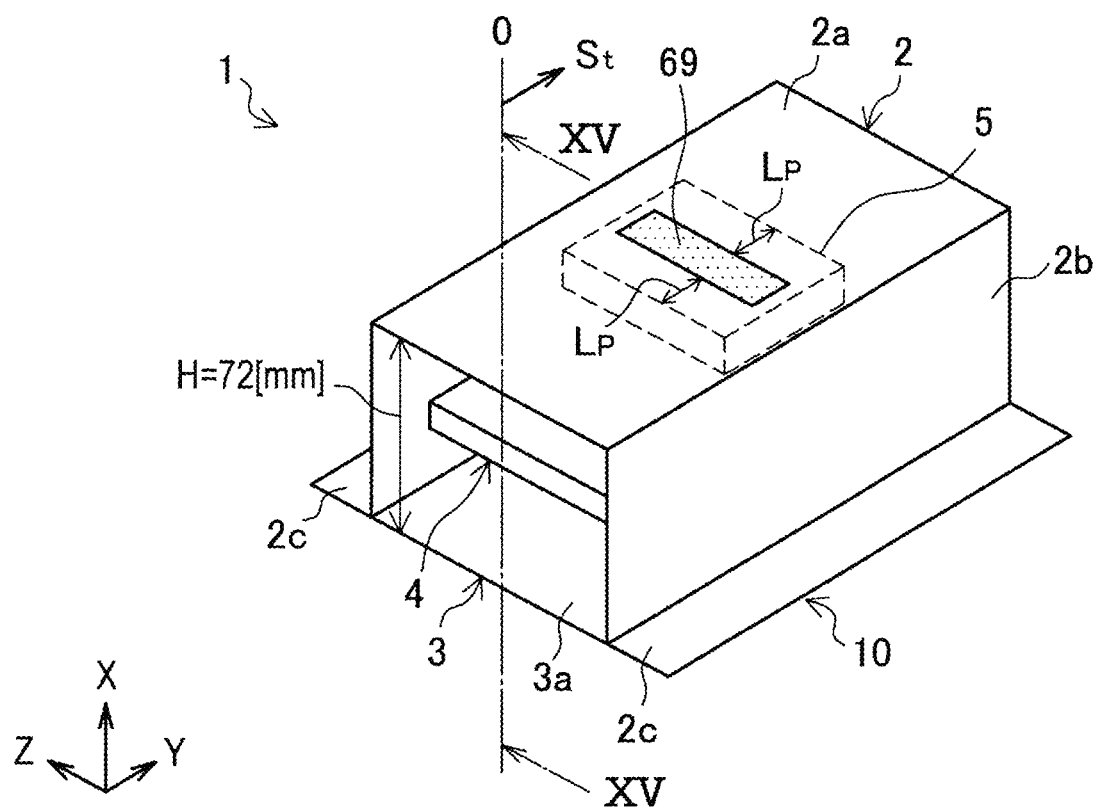
FIG. 109 is a view showing simulation settings of an example regarding the disposition range of the filling member.

FIG. 109 is a view showing simulation settings of an example according to the embodiment. As shown in FIG. 109, the frame 1 according to the present example includes the first structural member 2 having a hat-shaped cross-sectional shape and the second structural member 3 having a plate shape, and has a closed cross-sectional shape. Furthermore, the frame 1 has the reinforcement 4 therein. A bending induction portion is provided in one region 69 of the bottom wall part 2a. In each example, the filling member 5 is disposed in close contact with the inner surface of the region 69 where the bending induction portion of the frame 1 is provided. The extension length $L_P$ shown in FIG. 109 is the length of the portion of the filling member 5 that extends outward from the end portion of the bending induction portion in the longitudinal direction (Y-axis direction) of the bending induction portion. In this simulation, it was assumed that the extension lengths $L_P$ before and after the longitudinal direction are the same value.

The first structural member 2, the second structural member 3, and the reinforcement 4 are all formed of steel sheets. The sheet thickness of the first structural member 2 is 1.4 mm, and the strength of the first structural member 2 is 1180 MPa. The sheet thickness of the second structural member 3 is 1.4 mm, and the strength of the second structural member 3 is 1180 MPa. The sheet thickness of the reinforcement 4 is 0.5 mm, and the strength of the reinforcement 4 is 270 MPa. The Young's modulus of the filling member 5 is 100 MPa, and the yield stress thereof is 2.1 MPa. The cross-sectional height H of the hollow member 10 is 72 mm.

In addition, the kind of bending induction portion used in each example and each reference example, and extension length $L_P$ are as follows (the unit of dimensions is mm).

Example 1: Recessed part, $L_P$=0
Example 2: Recessed part, $L_P$=9
Example 3: Recessed part, $L_P$=18
Example 4: Recessed part, $L_P$=36 (corresponding to ½ of the cross-sectional height H)
Example 5: Recessed part, $L_P$=93
Example 6: Sheet thickness changing portion, $L_P$=0
Example 7: Sheet thickness changing portion, $L_P$=9
Example 8: Sheet thickness changing portion, $L_P$=18
Example 9: Sheet thickness changing portion, $L_P$=36 (corresponding to ½ of the cross-sectional height H)
Example 10: Sheet thickness changing portion, $L_P$=93
Reference Example 1: No recessed part and no filling member
Reference Example 2: No sheet thickness changing portion and no filling member The present inventors fixed both end portions in the longitudinal direction of the frame according to each example and each reference example, and applied 40 mm stroke compression bending at a constant speed of 500 mm/s. The E.A. for the stroke in each example and each reference example was calculated. Furthermore, the cross-sectional shapes taken along cutting-plane line XV-XV shown in FIG. 109 of the frames 1 according to the examples and the reference examples before and after the deformation by the simulation were compared.

Figure 110:
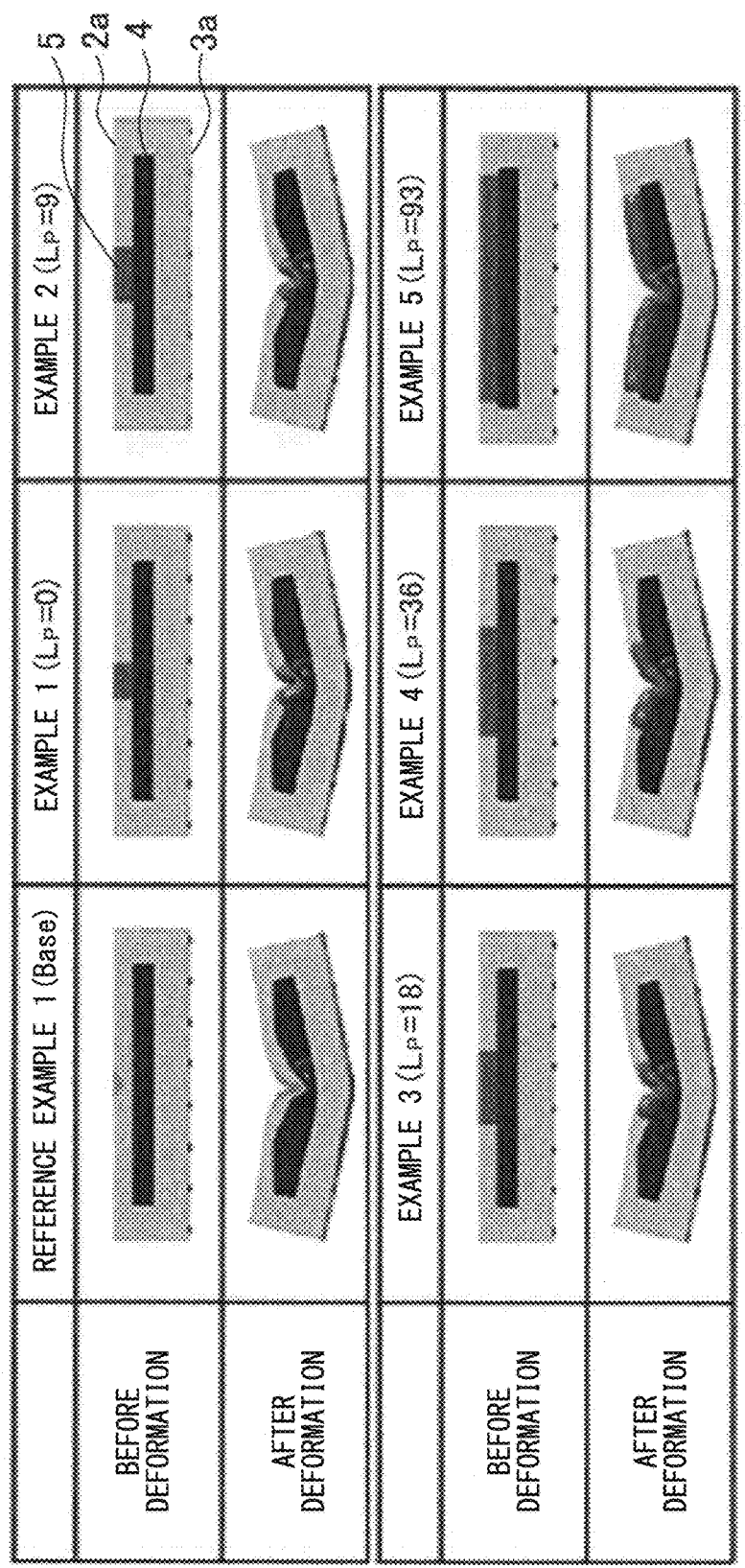
FIG. 110 is a view showing a list of sectional views before and after deformation of Examples 1 to 5 and Reference Example 1 regarding the disposition range of the filling member.

FIG. 110 is a view showing a list of sectional views before and after deformation of Examples 1 to 5 and Reference Example 1. In FIG. 110, sectional views before and after the deformation of Reference Example 1, Example 1, and Example 2 are shown in order from the left to the right in the upper section, and sectional views before and after the deformation of Example 3, Example 3, and Example 5 are shown in order from the left to the fight in the lower section. As a representative, only the sectional view of the frame 1 before the deformation of Example 2 is given reference numerals.

Figure 111:
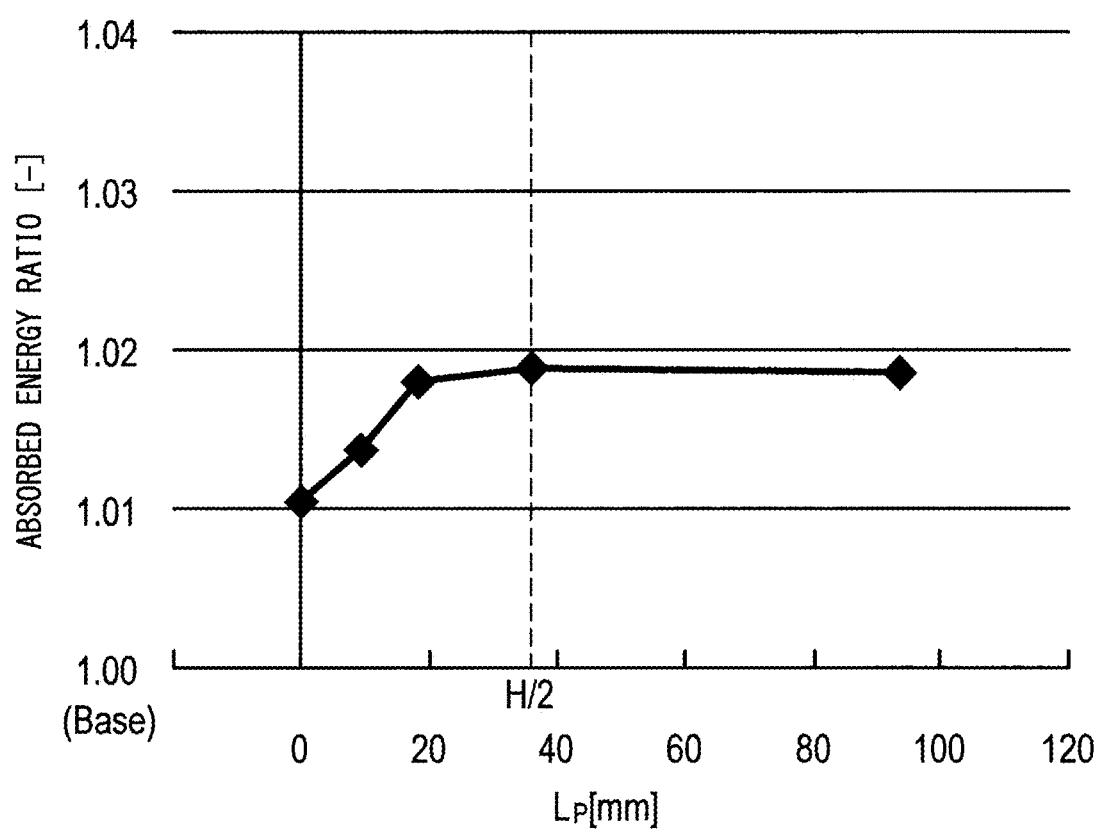
FIG. 111 is a graph showing absorbed energy ratios, which are the ratios of the amount of absorbed energy in Examples 1 to 5 and Reference Example 1 regarding the disposition range of the filling member in a case where the amount of absorbed energy in Reference Example 1 is set to 1.

FIG. 111 is a graph showing absorbed energy ratios, which are the ratios of the amount of absorbed energy in Examples 1 to 5 and Reference Example 1 in a case where the amount of absorbed energy in Reference Example 1 is set to 1. The horizontal axis of this graph is the extension length $L_P$, and the vertical axis is the absorbed energy ratio. The plot in the graph corresponds to Example 1, Example 2, Example 3, Example 4, and Example 5 in order from the left.

Referring to FIG. 111, the absorbed energy ratios of Examples 1 to 5 exceed 1. Therefore, by disposing the filling member 5, the amount of absorbed energy is improved, and the collision safety performance is improved.

When Example 1 and Examples 2 to 5 are compared, the absorbed energy ratios of Examples 2 to 5 are larger than the absorbed energy ratio of Example 1. Therefore, the absorbed energy ratio becomes larger and the collision safety performance is more improved when the filling member 5 is disposed so as to cover the peripheral portions of the bending induction portion on both sides in the longitudinal direction than when the filling member 5 is disposed only in the bending induction portion.

When Example 1 and Example 2, Example 2 and Example 3, and Example 3 and Example 4 are compared, the absorbed energy ratio increases as the extension length $L_P$ increases. Therefore, as the extension length $L_P$ increases, the amount of absorbed energy increases, and the collision safety performance can be improved.

When Example 4 and Example 5 are compared, even if the extension length $L_P$ increases, the absorbed energy ratio does not increase. The extension length $L_P$ in Example 4 corresponds to ½ of the cross-sectional height H of the hollow member 10. Therefore, when the extension length $L_P$ exceeds ½ of the cross-sectional height H of the hollow member 10, the collision safety performance is not improved even if the extension length $L_P$ is increased. In this regard, by disposing the filling member 5 within a range in which the extension length L is ½ of the cross-sectional height H of the hollow member 10, the filling member 5 that does not contribute to the improvement of the collision safety performance may not be wastefully disposed. Therefore, the collision safety performance can be improved with high mass efficiency by disposing the filling member 5 within a range in which the extension length $L_P$ is ½ of the cross-sectional height H of the hollow member 10.

Figure 112:
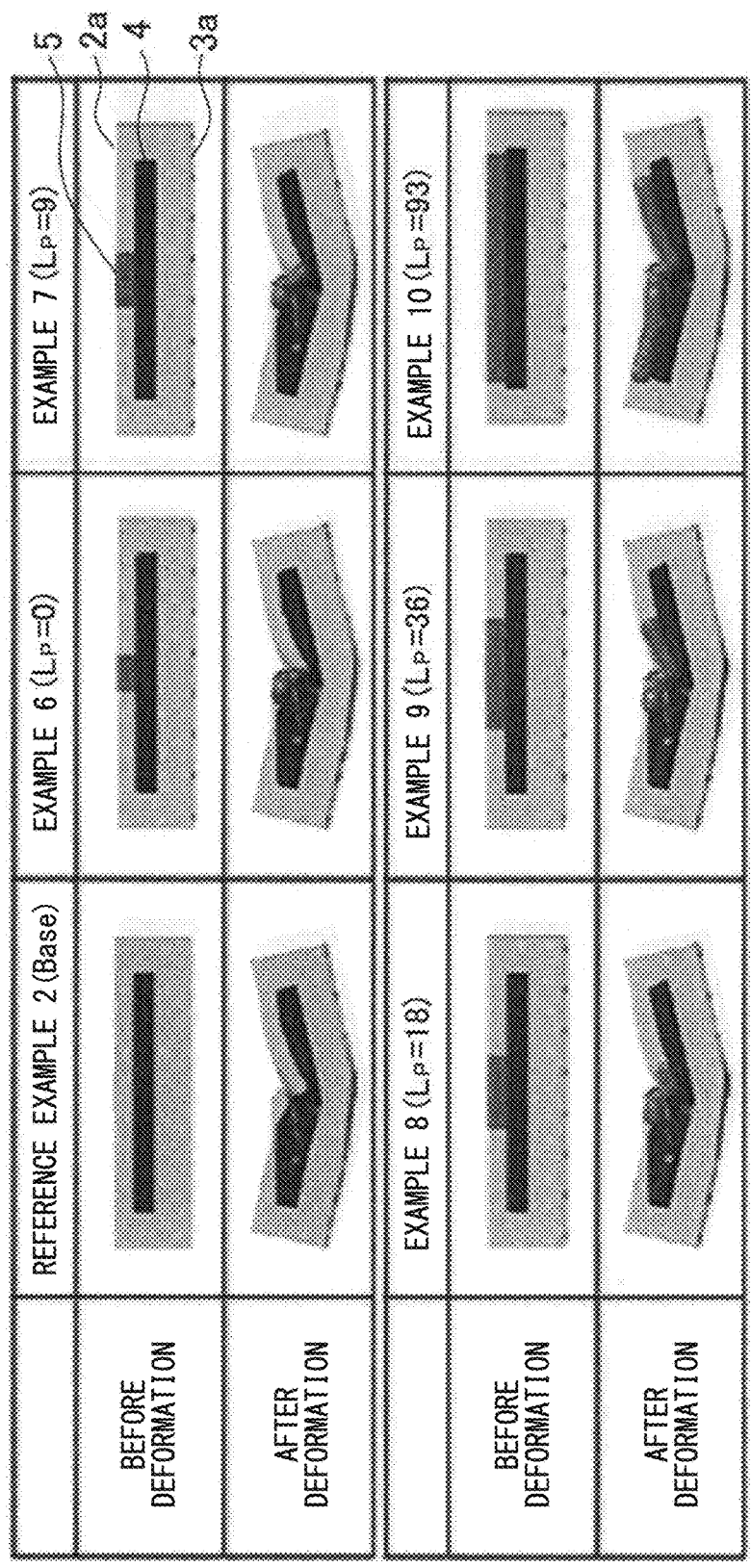
FIG. 112 is a view showing a list of sectional views before and after deformation of Examples 6 to 10 and Reference Example 2 regarding the disposition range of the filling member.

FIG. 112 is a view showing a list of sectional views before and after deformation of Examples 6 to 10 and Reference Example 2. In FIG. 112, sectional views before and after the deformation of Reference Example 2, Example 6, and Example 7 are shown in order from the left to the right in the upper section, and sectional views before and after the deformation of Example 8, Example 9, and Example 10 are shown in order from the left to the right in the lower section. As a representative, only the sectional view of the frame 1 before the deformation of Example 7 is given reference numerals.

Figure 113:
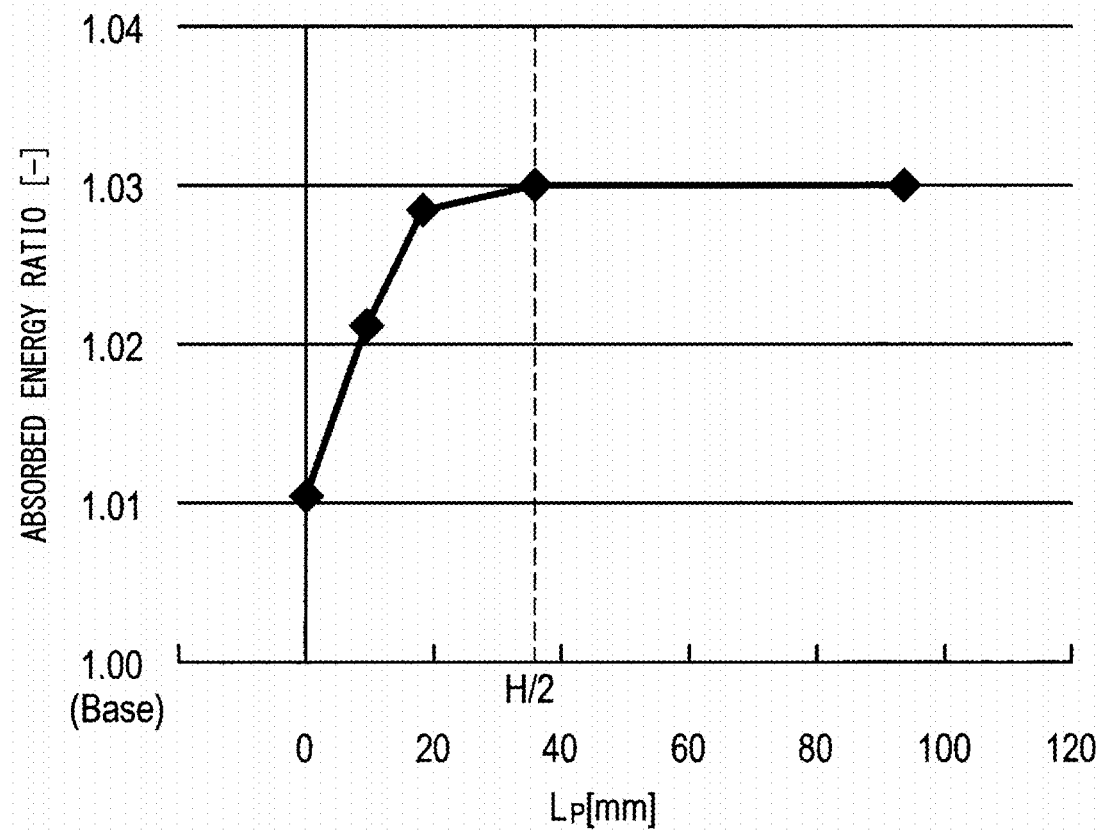
FIG. 113 is a graph showing absorbed energy ratios, which are the ratios of the amount of absorbed energy in Examples 6 to 10 and Reference Example 2 regarding the disposition range of the filling member in a case where the amount of absorbed energy in Reference Example 2 is set to 1.

FIG. 113 is a graph showing absorbed energy ratios, which are the ratios of the amount of absorbed energy in Examples 6 to 10 and Reference Example 2 in a case where the amount of absorbed energy in Reference Example 2 is set to 1. The horizontal axis of this graph is the extension length $L_P$, and the vertical axis is the absorbed energy ratio. The plot in the graph corresponds to Example 6, Example 7, Example 8, Example 9, and Example 10 in order from the left.

Referring to FIG. 113, the absorbed energy ratios of Examples 6 to 10 exceed 1. Therefore, by disposing the filling member 5, the amount of absorbed energy is improved, and the collision safety performance is improved.

When Example 6 and Examples 7 to 10 are compared, the absorbed energy ratios of Examples 7 to 10 are larger than the absorbed energy ratio of Example 6. Therefore, the absorbed energy ratio becomes larger and the collision safety performance is more improved when the filling member 5 is disposed so as to cover the peripheral portions of the bending induction portion on both sides in the longitudinal direction than when the filling member 5 is disposed only in the bending induction portion.

When Example 6 and Example 7, Example 7 and Example 8, and Example 8 and Example 9 are compared, the absorbed energy ratio increases as the extension length $L_P$ increases. Therefore, as the extension length $L_P$ increases, the amount of absorbed energy increases, and the collision safety performance can be improved.

When Example 9 and Example 10 are compared, even if the extension length $L_P$ increases, the absorbed energy ratio does not increase. The extension length $L_P$ in Example 9 corresponds to ½ of the cross-sectional height H of the hollow member 10. Therefore, when the extension length $L_P$ exceeds ½ of the cross-sectional height H of the hollow member 10, the collision safety performance is not improved even if the extension length $L_P$ is increased. In this regard, by disposing the filling member 5 within a range in which the extension length $L_P$ is ½ of the cross-sectional height H of the hollow member 10, the filling member 5 that does not contribute to the improvement of the collision safety performance may not be wastefully disposed. Therefore, the collision safety performance can be improved with high mass efficiency by disposing the filling member 5 within a range in which the extension length $L_P$ is ½ of the cross-sectional height H of the hollow member 10.

As described above in the examples, the collision safety performance can be improved by disposing the filling member 5 so as to cover the peripheral portions of the bending induction portion on both sides in the longitudinal direction. Furthermore, by disposing the filling member 5 within a range in which the extension length $L_P$ is ½ of the cross-sectional height H of the hollow member 10, the collision safety performance can be improved with high mass efficiency.

9.6. Examples Regarding Full Plastic Moment Changing Portion

In the following examples, the full plastic moment changing portion functioning as a bending induction portion was verified. The fact that the full plastic moment changing portion functions as a bending induction portion means that bending deformation is induced at the full plastic moment changing portion. In addition, the following examples are merely for verification of the full plastic moment changing portion which functions as a bending induction portion, and the present invention is not limited to the following examples.

In order to verify the full plastic moment changing portion functioning as a bending induction portion, the present inventors caused bending deformation in a plurality of hollow members having different degrees of change in the full plastic moment in the strength changing portion using a simulation. Then, the present inventors verified how the relationship between the position of the strength changing portion and the position where the bending deformation occurred changes according to the degree of change in the full plastic moment in the strength changing portion.

Hereinafter, the simulation settings of the present example will be described with reference to FIGS. 114 and 115.

Figure 114:
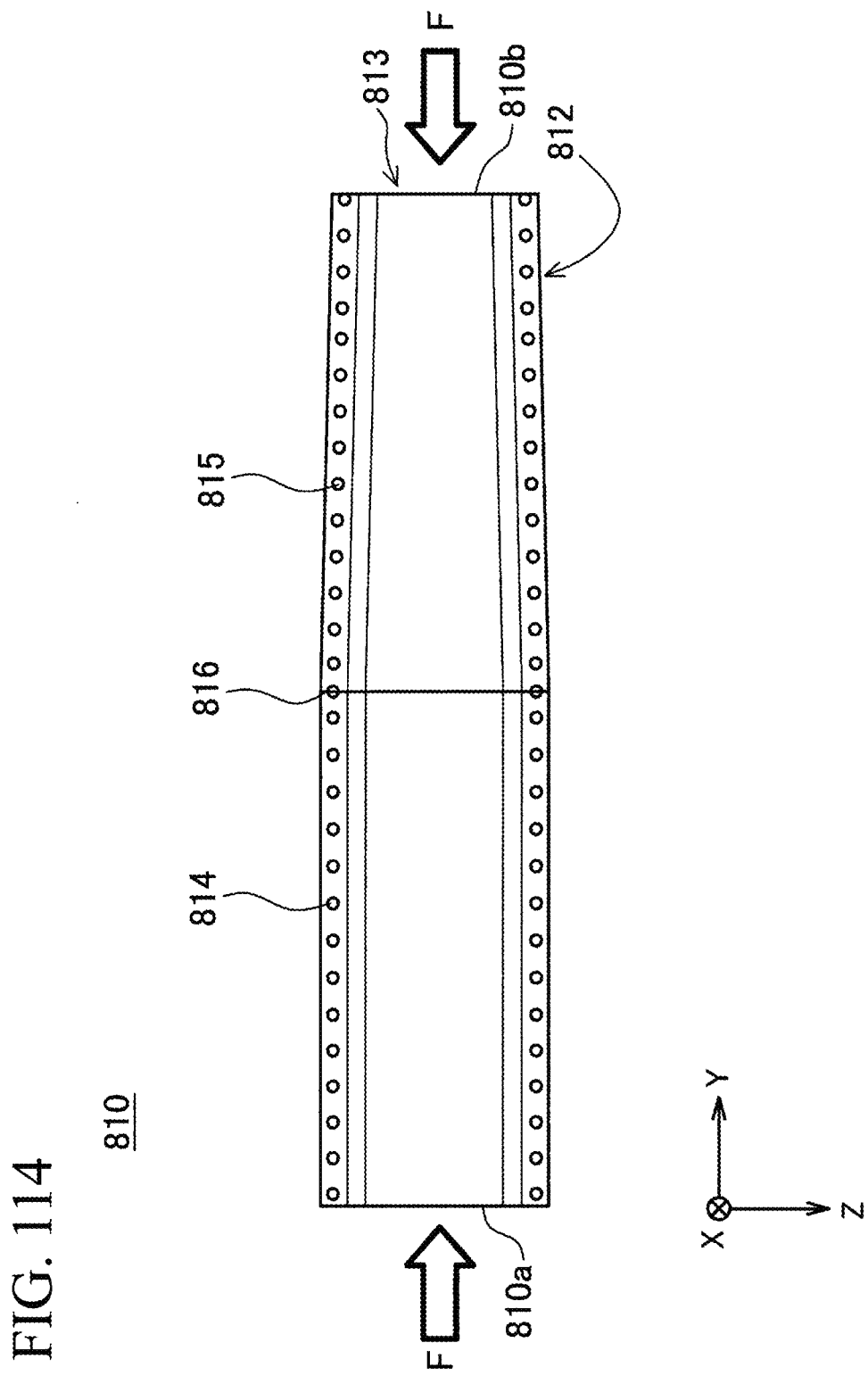
FIG. 114 is a plan view of a hollow member of an example regarding a full plastic moment changing portion.

FIG. 114 is a plan view of a hollow member of an example according to the embodiment. A hollow member 810 according to the present example includes a first structural member 812 having a hat-shaped cross-sectional shape and a second structural member 813 having a plate shape, and has a closed cross-sectional shape. In FIG. 114, the first structural member 812 is located on the inner side of the second structural member 813 in the X-axis direction, that is, hidden behind the second structural member 813, and the opening part of the hat-shaped cross-sectional shape faces the front side in the X-axis direction. The second structural member 813 is located on the front side in the X-axis direction, and has the Z-axis direction as the lateral direction and the Y-axis direction as the longitudinal direction. Both end portions of the first structural member 812 in the Z-axis direction abut both end portions of the second structural member 813 in the Z-axis direction, and the first structural member 812 and the second structural member 813 are joined together at the abutting portions. As shown in FIG. 114, the hollow member 10 includes a first strength portion 814 and a second strength portion 815. The first strength portion 814 is provided on a left end 810*a* side in the longitudinal direction of the hollow member 10. The second strength portion 815 is provided continuously to the first strength portion 814 on a right end 810*b* side in the longitudinal direction of the hollow member 10. In a case where the yield strength of the steel sheet is different between the first strength portion 814 and the second strength portion 815, the boundary portion between the first strength portion 814 and the second strength portion 815 becomes a strength changing portion 816. In this strength changing portion 816, the yield strength in the longitudinal direction of the hollow member 10 changes.

Figure 115:
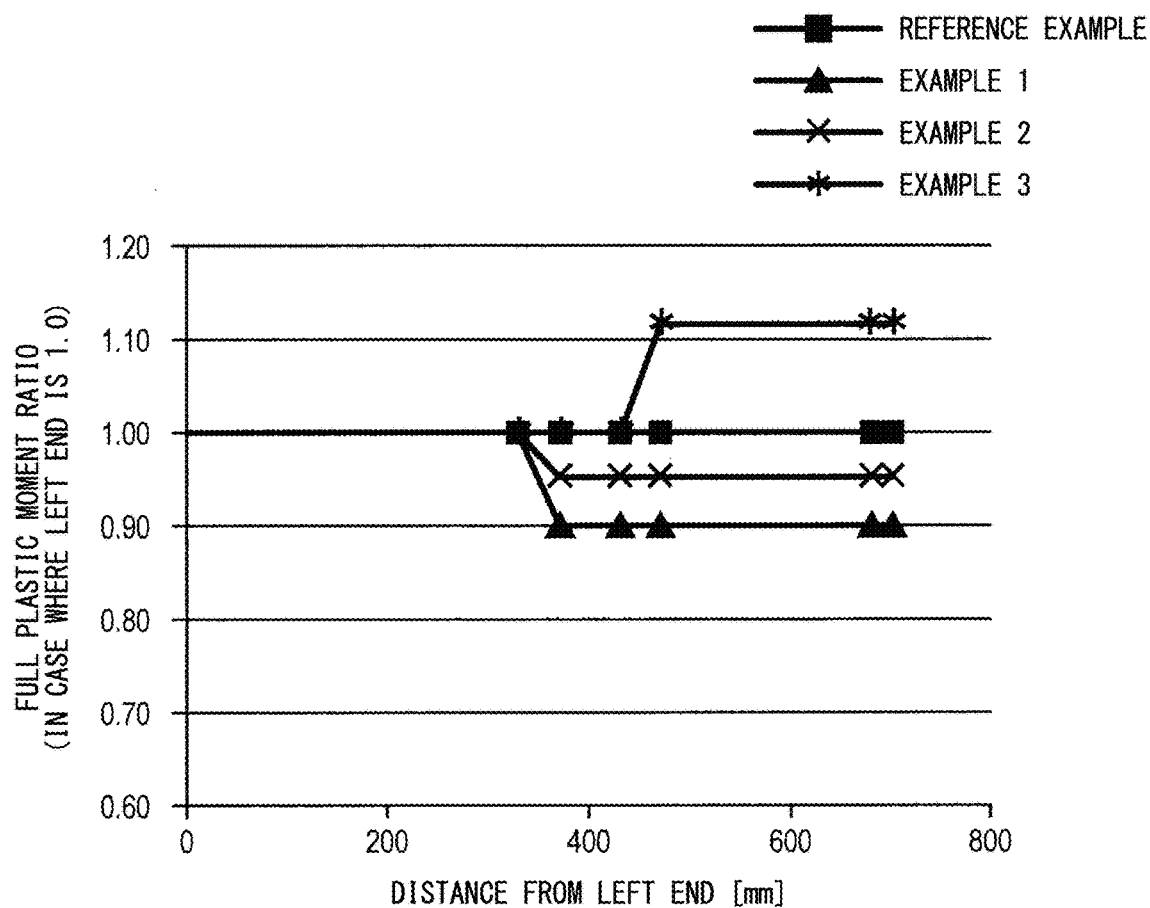
FIG. 115 is a graph showing changes in the longitudinal direction in the full plastic moment ratio of the hollow members according to each of the examples and reference example regarding the full plastic moment changing portion.

FIG. 115 is a graph showing changes in the longitudinal direction in the full plastic moment ratios of the hollow members 810 according to the examples and reference example. In FIG. 115, the changes in the full plastic moment ratios from the left end 810*a* to the right end 810*b* are shown with the left end 810*a* of the hollow member 810 as a reference (that is, 1.0). The full plastic moment ratio is calculated by dividing the value of the full plastic moment at a target point by the reference value of the full plastic moment. In FIG. 115, the full plastic moment ratio is calculated using the value of the full plastic moment at the left end 810*a* of the hollow member 810 as a reference value. A position where the full plastic moment ratio changes from 1.0 is the position of the strength changing portion 816. As shown in FIG. 115, in the reference example, the full plastic moment ratio does not change regardless of the position of the hollow member 810 in the longitudinal direction. That is, in the reference example, the first strength portion 814 and the second strength portion 815 have the same full plastic moment. Contrary to this, in Example 1, the full plastic moment ratio changes in stages between the left end 810*a* side and the right end 810*b* side of the hollow member 810, and the full plastic moment ratio on the right end 810*b* side is 0.9. In Example 2, the full plastic moment ratio changes in stages between the left end 810*a* side and the right end 810*b* side of the hollow member 810, and the full plastic moment ratio on the right end 810*b* side is 0.95. In Example 3, the full plastic moment ratio changes in stages between the left end 810*a* side and the right end 810*b* side of the hollow member 810, and the full plastic moment ratio on the right end 810*b* side is about 1.11.

Here, the full plastic moment ratio of the strength changing portion 816 is defined. The full plastic moment ratio of the strength changing portion 816 is calculated by dividing the smaller value of the full plastic moment values before and after the change in the strength changing portion 816 by the larger value. According to this definition, the full plastic moment ratio of the strength changing portion 816 in each of the examples and reference example is as follows.

Reference Example: 1.0
Example 1: 0.90
Example 2: 0.95
Example 3: 0.90

The present inventors compressed the hollow member 810 in the longitudinal direction by inputting a collision load F in opposite directions to both the end portions 810*a* and 810*b* in the longitudinal direction of the hollow member 810 according to each of the examples and reference example, whereby bending deformation was caused. Hereinafter, simulation results will be described with reference to FIGS. 116 to 120.

Figure 116:
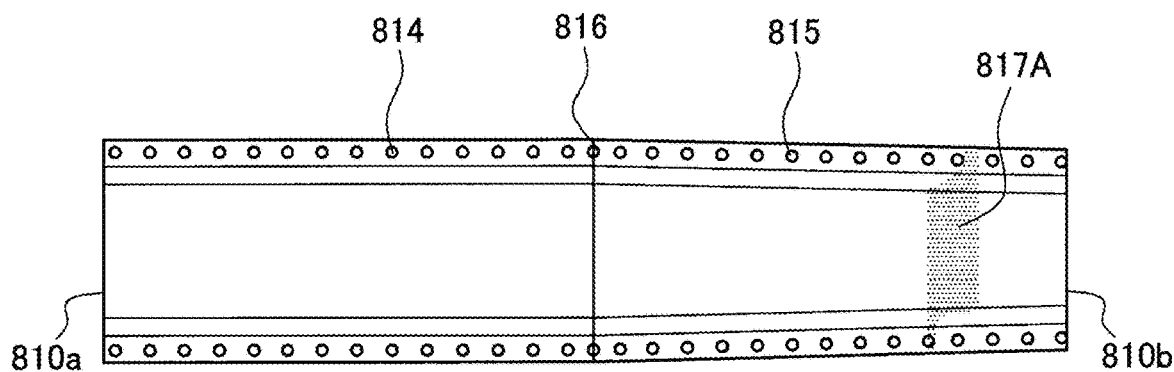
FIG. 116 is a view showing a region where bending deformation of a hollow member according to the reference example regarding the full plastic moment changing portion occurs.
Figure 117:
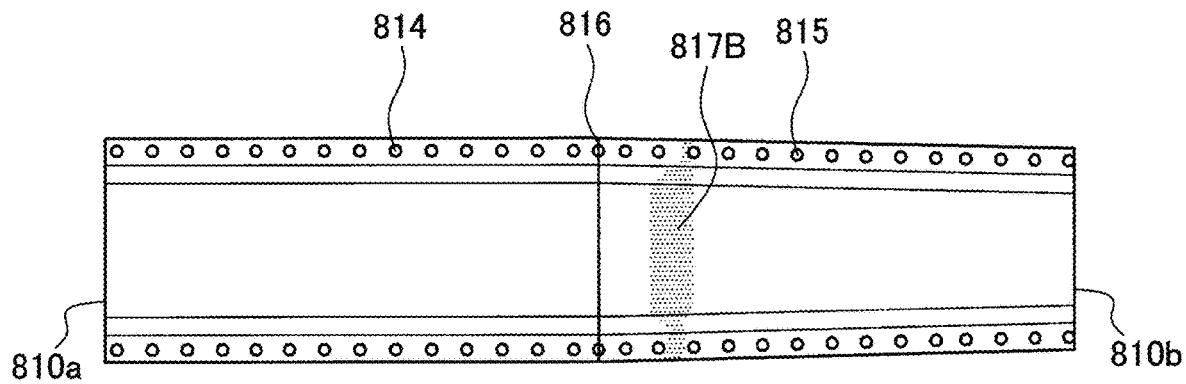
FIG. 117 is a view showing a region where bending deformation of a hollow member according to Example 1 regarding the full plastic moment changing portion occurs.
Figure 117:
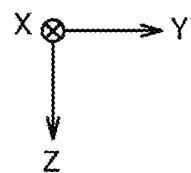
Figure 118:
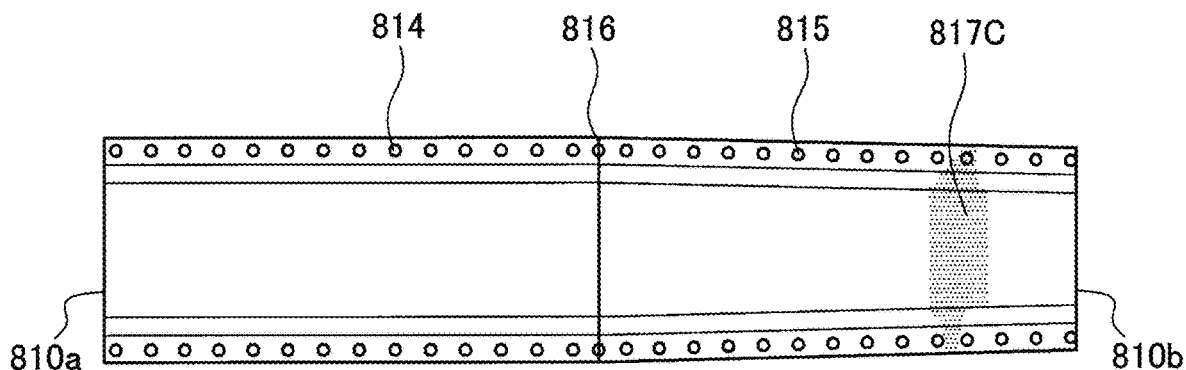
FIG. 118 is a view showing a region where bending deformation of a hollow member according to Example 2 regarding the full plastic moment changing portion occurs.
Figure 118:
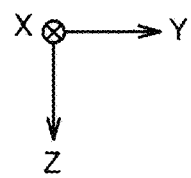
Figure 119:
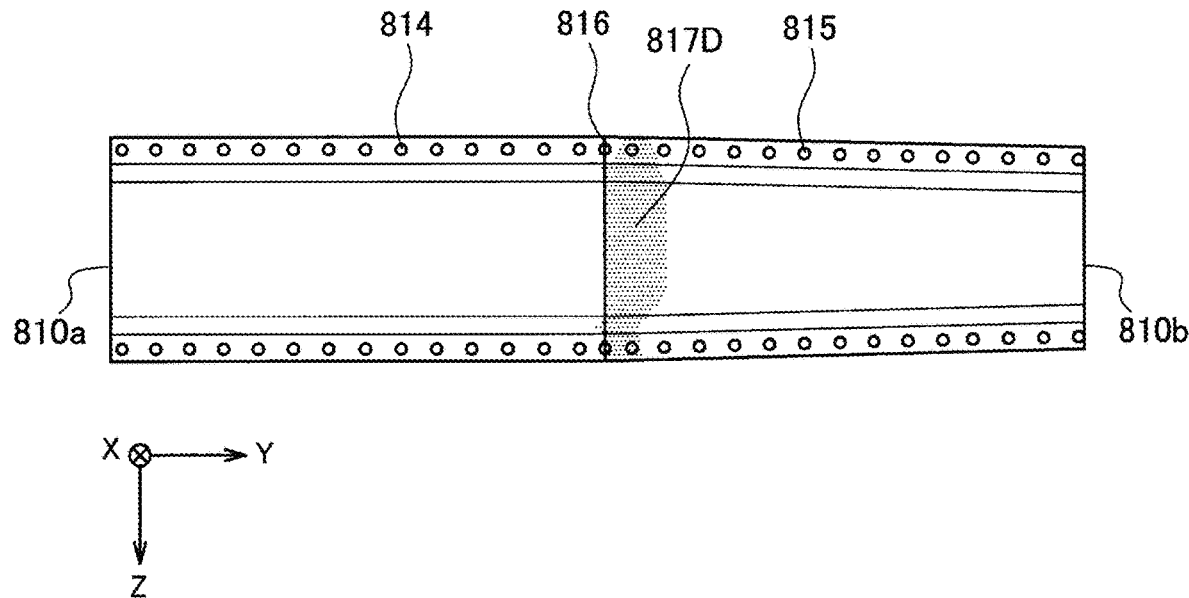
FIG. 119 is a view showing a region where bending deformation of a hollow member according to Example 3 regarding the full plastic moment changing portion occurs.

FIG. 116 is a view showing a region where bending deformation of a hollow member 810A according to the reference example occurs. As shown in FIG. 116, the bending deformation occurs in a region 817A located near the right end 810*b* of the hollow member 810A. FIG. 117 is a view showing a region where bending deformation of a hollow member 810B according to Example 1 occurs. As shown in FIG. 117, the bending deformation occurs in a region 817B located near the strength changing portion 816 of the hollow member 810B. FIG. 118 is a view showing a region where bending deformation of a hollow member 810C according to Example 2 occurs. As shown in FIG. 118, the bending deformation occurs in a region 817C located near the right end 810*b* of the hollow member 810C. FIG. 119 is a view showing a region where the bending deformation of the hollow member 810D according to Example 3 occurs. As shown in FIG. 119, the bending deformation occurs in a region 817D located near the strength changing portion 816 of the hollow member 810D.

Figure 120:
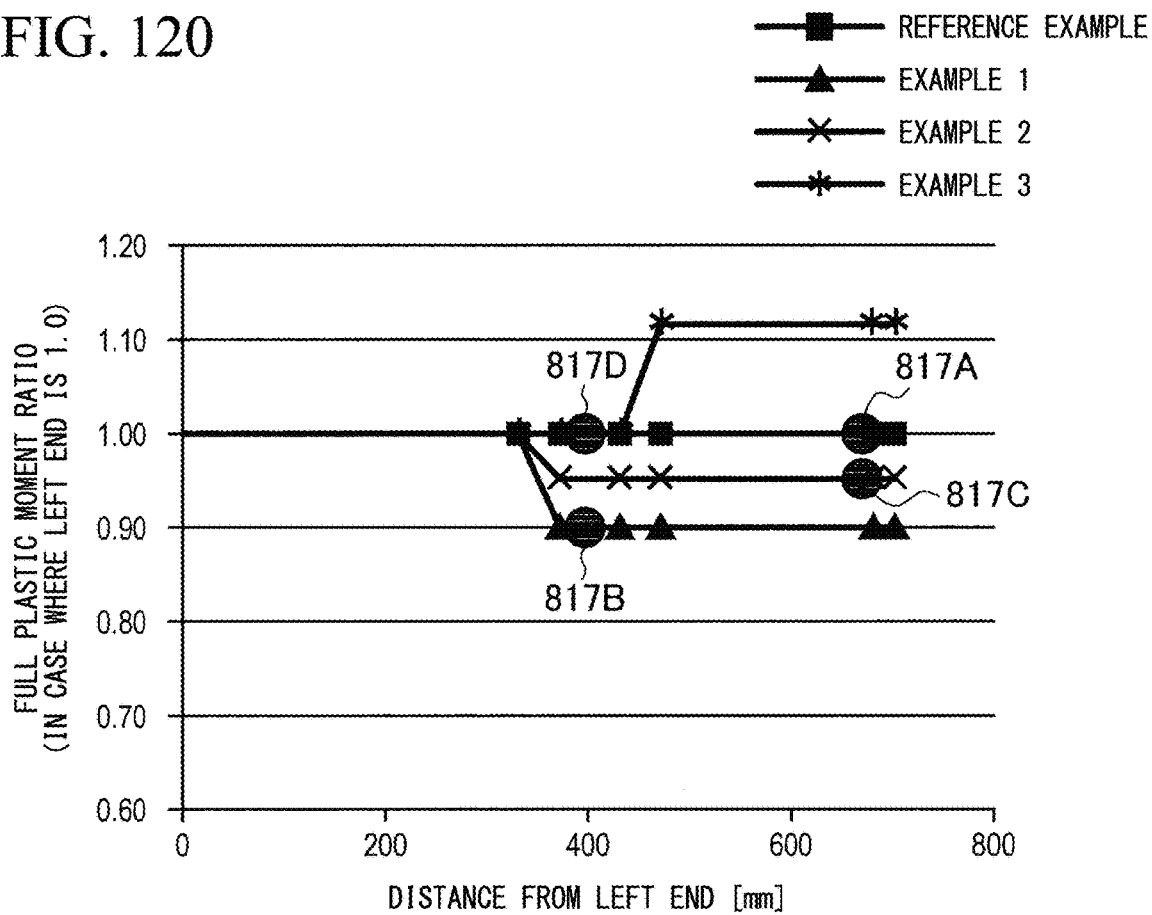

FIG. 120 is a graph showing changes in the longitudinal direction in the full plastic moment ratio of the hollow members 810 according to each of the examples and reference example and the positions where bending deformation occurs. As shown in FIG. 120, in Examples 1 and 3, bending deformation occurs in the regions 817B and 817D located near the positions where the full plastic moment ratio changes from 1.0 (that is, the position of the strength changing portion 816). From this, it can be seen that in Examples 1 and 3, the strength changing portion 816 functions as a bending induction portion. On the other hand, in Example 2, bending deformation occurs in the region 817C located away from the position where the full plastic moment ratio changes from 1.0. From this, in Example 2, it can be seen that the strength changing portion 816 does not function as a bending induction portion. In the reference example, bending deformation occurs in the region 817A at the same position as in Example 2 while the full plastic moment ratio was 1.0 and was not changed. That is, when the full plastic moment ratio of the strength changing portion 816 is 0.95 or more, the strength changing portion 816 does not function as a bending induction portion. On the other hand, in a case where the full plastic moment ratio of the strength changing portion 816 is 0.9, the strength changing portion 816 functions as a bending induction portion. From this, it can be said that the strength changing portion 816 can function as a bending induction portion in a case where the full plastic moment ratio of the strength changing portion 816 is 0.9 or less.

As described above, when the full plastic moment ratio of the strength changing portion 816 is 0.9 or less as shown in the above embodiment, the full plastic moment changing portion can function as a bending induction portion. In other words, the full plastic moment changing portion where the value of the full plastic moment decreases by 10% or more before and after the change can function as a bending induction portion.

9.7. Example Regarding Young's Modulus of Filling Member

In the following examples, the Young's modulus of the filling member capable of sufficiently improving the collision safety performance of the frame was verified. In addition, the following examples are merely for verification of the Young's modulus of a filling member, and the present invention is not limited to the following examples.

In order to verify the Young's modulus of the filling member capable of sufficiently improving the collision safety performance of the frame, the present inventors applied a collision load to a plurality of frames different in the Young's modulus of the filling member using a simulation and calculated the reaction force and the stroke. Hereinafter, simulation settings of the present example will be described with reference to FIGS. 121 to 125 and Table 6.

Figure 121:
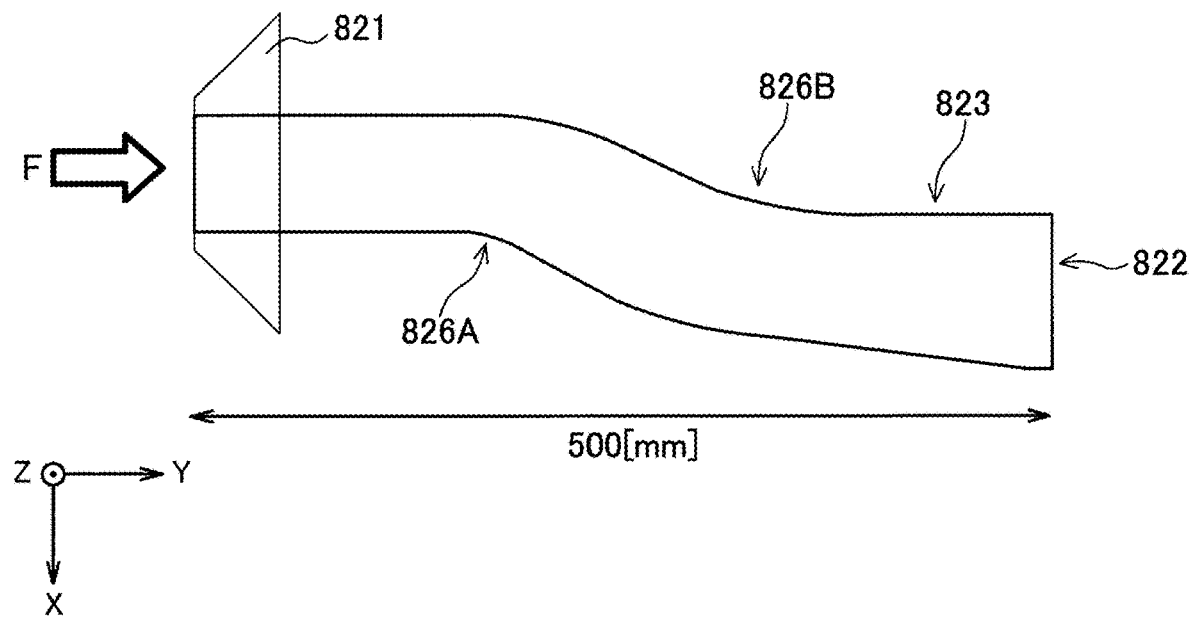

FIG. 121 is a side view of a frame of an example according to the embodiment. A frame 820 according to the present example includes a first structural member 822 having a hat-shaped cross-sectional shape and a second structural member 823 having a plate shape, and has a closed cross-sectional shape. In FIG. 121, the opening part of the hat-shaped cross-sectional shape of the first structural member 822 faces—side in the X-axis direction. The second structural member 823 has the Z-axis direction as the lateral direction and the Y-axis direction as the longitudinal direction. Both end portions of the first structural member 822 in the Z-axis direction abut both end portions of the second structural member 823 in the Z-axis direction, and the first structural member 822 and the second structural member 823 are joined together at the abutting portions. As shown in FIG. 121, the frame 820 is provided with bent portions 826A and 826B that are curved in the longitudinal direction (Y-axis direction). The bent portions 826A and 826B are bending induction portions of the frame 820. The length of the frame 820 in the longitudinal direction is 500 [mm]. The frame 820 does not include a reinforcement.

Figure 122:
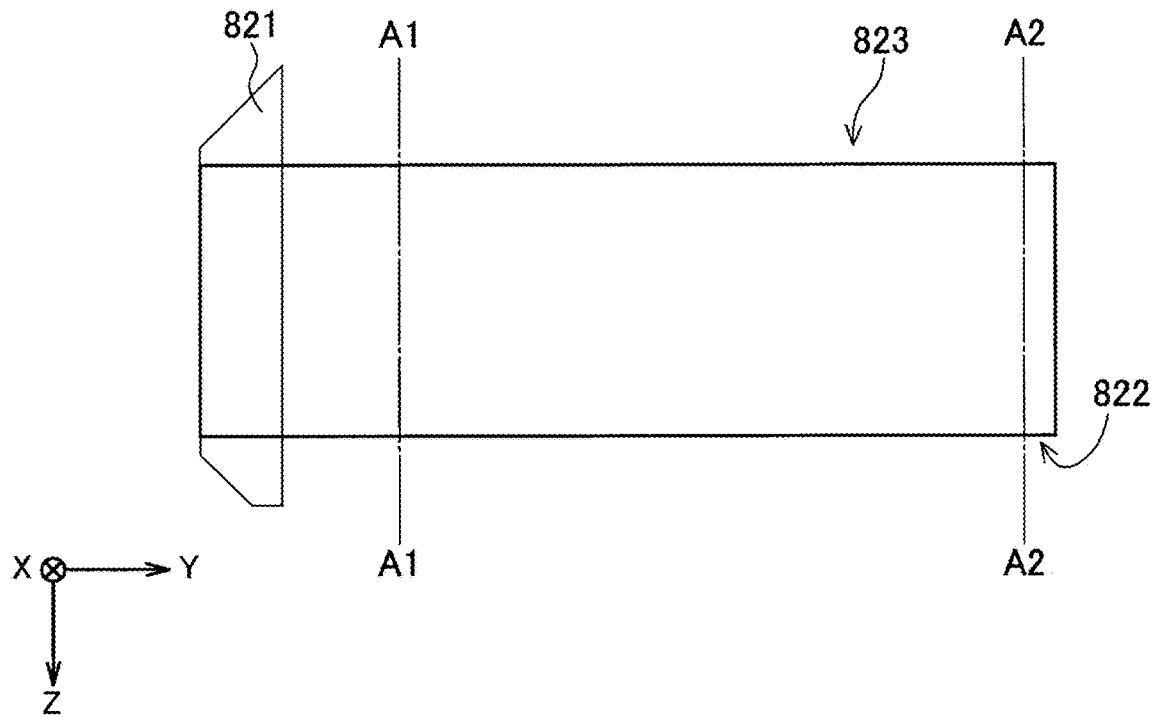
Figure 123:
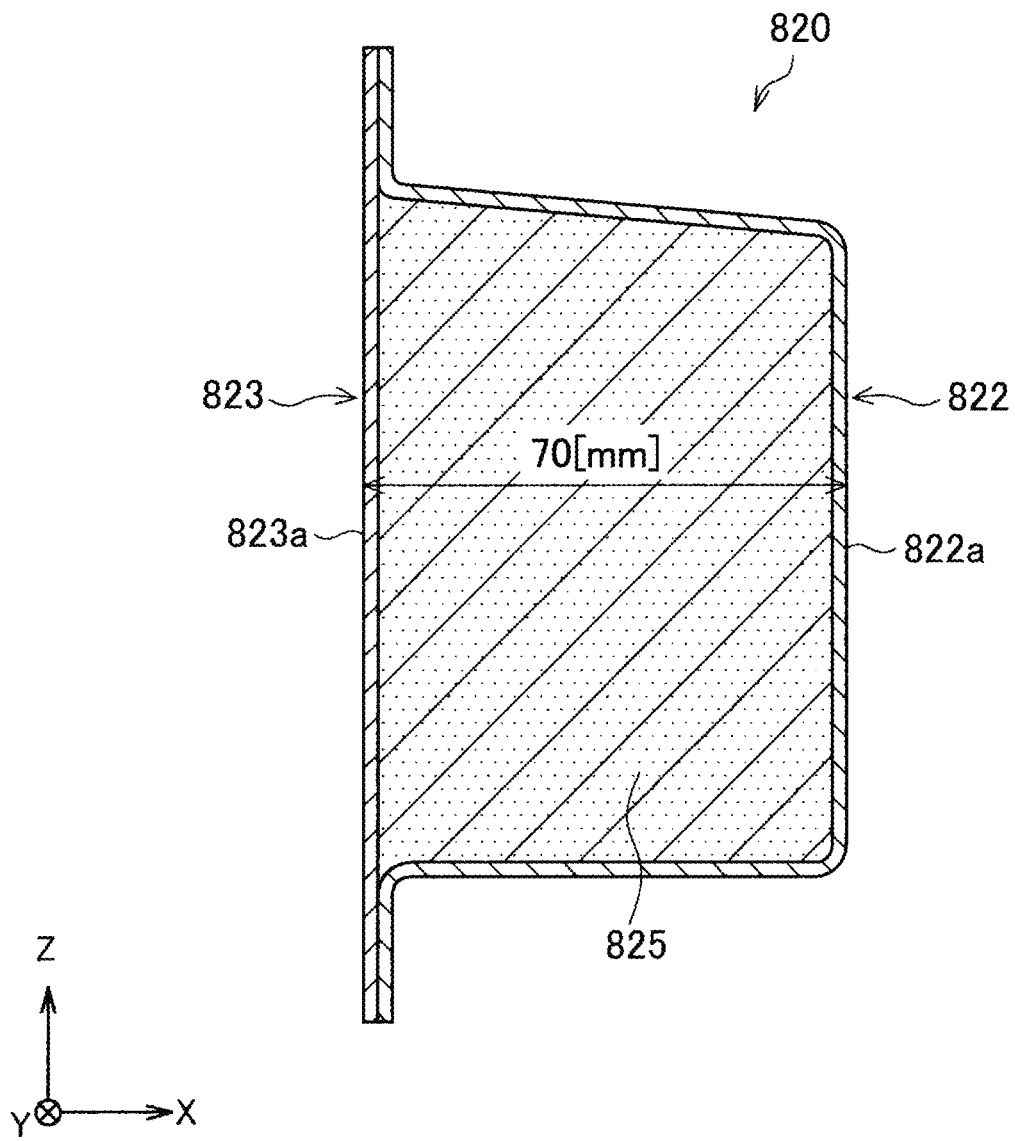
Figure 124:
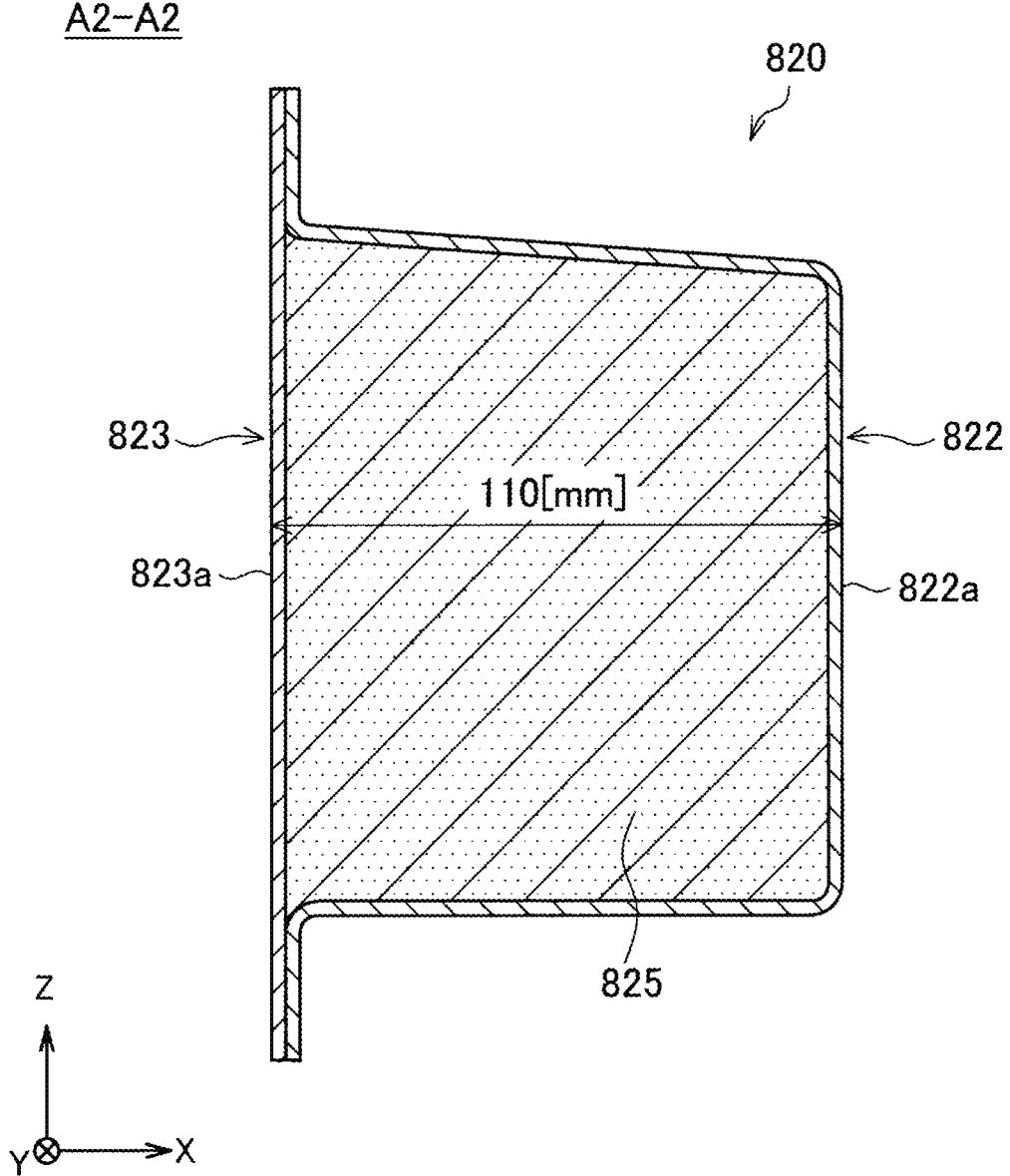
Figure 125:
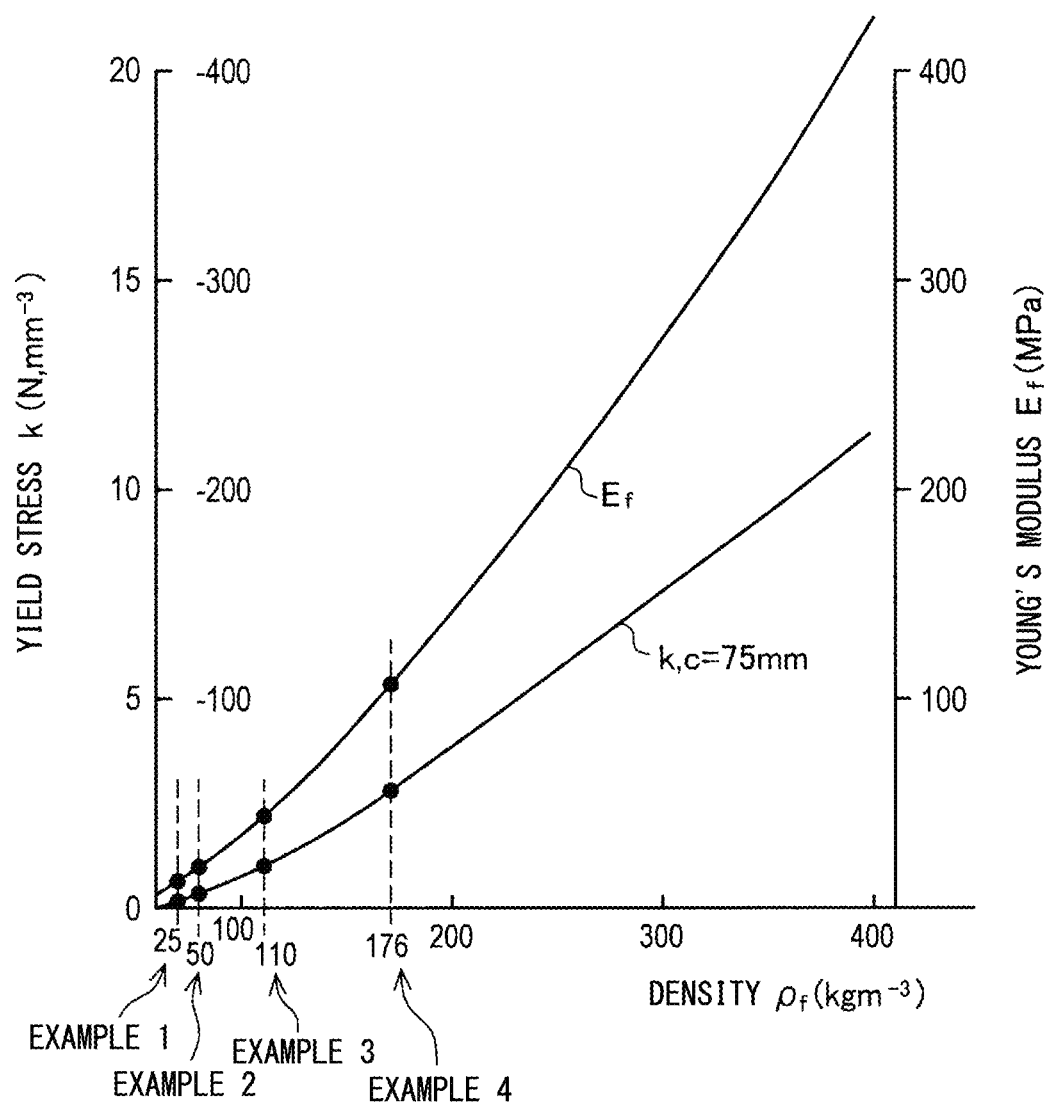

FIG. 122 is a plan view of the frame 820 shown in FIG. 121. FIG. 123 is a cross-sectional view of the frame 820 shown in FIG. 122 taken along cutting-plane line A1-A1. FIG. 124 is a cross-sectional view of the frame 820 shown in FIG. 122 taken along cutting-plane line A2-A2. As shown in FIGS. 123 and 124, a filling member 825 is disposed inside the frame 820 with no gap. Furthermore, the filling member 825 is adhered to the inner surface of the frame 820. The cross-sectional height of the frame 820 is defined as the distance between a bottom wall part 822a of the first structural member 822 and a top wall part 823a of the second structural member 823. As shown in FIG. 123, the cross-sectional height of the cross section along cutting-plane line A1-A1 is 70 [mm]. As shown in FIG. 124, the cross-sectional height of the cross section along cutting-plane line A2-A2 is 110 [mm].

Table 6 below shows the sheet thicknesses of the first structural member 822 and the second structural member 823, the density, the Young's modulus, and the yield stress of the filling member 825, and the total weight (excluding a top sheet 821) of the frame 820, and weight of the filling member 825 in the reference example and each of the examples. As shown in Table 6, the filling member 825 is not disposed in the reference example. The Young's modulus of the filling member 825 of each of the examples is 10 MPa in Example 1, 20 MPa in Example 2, 40 MPa in Example 3, and 100 MPa in Example 4. In addition, the relationship between the density, the yield stress, and the Young's modulus of the filling member 825 according to the present example is as in the graph shown in FIG. 125.

TABLE 6

Simulation settings of reference example and each example

| Simulation settings | Reference Example | Example 1 | Example 2 | Example 3 | Example 4 |
|---|---|---|---|---|---|
| Sheet thickness of first structural member/sheet thickness of second structural member [mm] | 780t2.0/ 690t1.5 | 780t2.0/ 690t1.5 | 780t2.0/ 690t1.5 | 780t2.0/ 690t1.5 | 780t2.0/ 6901t.5 |
| Density of filling member [ton/mm³] | — | 25e−12 | 50e−12 | 110e−12 | 176e−12 |
| Young's modulus/yield stress of the filling member [N/mm2] | — | 10/0.2 | 20/0.4 | 40/1.0 | 100/2.1 |
| Total weight (excluding top sheet)/weight of filling member [kg] | 3.37/0.0 | 3.48/0.11 | 3.58/0.22 | 3.85/0.48 | 4.14/0.77 |

The present inventors fixed first end portion (+ side in the Y-axis direction) in the longitudinal direction of the frame according to each of the examples and reference example, and caused the top sheet 821 shown in FIG. 121 and FIG. 122 to collide with the frame from the second end portion (− side in the Y-axis direction) at an initial speed of 12 [m/s]. In addition, the present inventors observed the deformation behavior in each of the examples and reference example, and calculated a reaction force and a stroke. The simulation results will be described below with reference to FIGS. 126 to 128.

Figure 126:
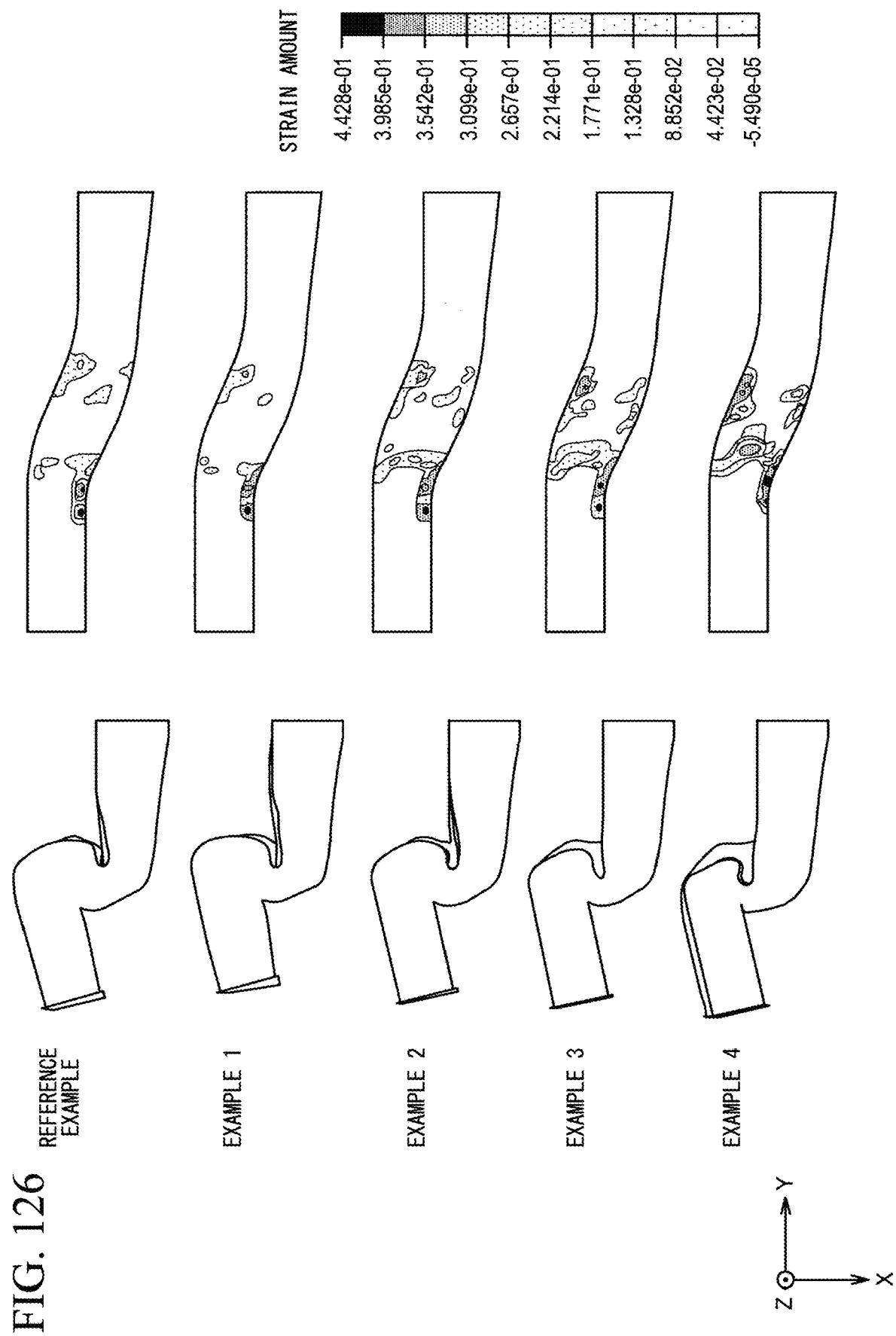

FIG. 126 is a view showing a list of deformation behaviors of each of the examples and reference example. In FIG. 126, the deformation behaviors of Reference Example, Example 1, Example 2, Example 3, and Example 4 are shown in order from the upper stage to the lower stage. The left side of each stage shows a state after the deformation of the frame 820, and the right side shows a distribution of strain amounts of the frame 820. When the states after the deformation of the frame 820 according to each of the examples and reference example shown on the left side in each stage in FIG. 126 are seen, the higher the Young's modulus of the filling member 825, the greater the deformation. When the strain amounts of the frame 820 according to each of the examples and reference example shown on the right side in each stage in FIG. 126 are seen, the higher the Young's modulus of the filling member 825, the wider the deformation region and the greater the strain amount. From these, it can be seen that as the Young's modulus of the filling member 825 is higher, the frame 820 is deformed in a wider region. The frame 820 absorbs the collision energy by deforming the collision energy as the deformation energy. That is, as the Young's modulus of the filling member 825 is higher, the frame 820 is dispersed in larger regions and absorbs the collision energy. Therefore, as the Young's modulus of the filling member 825 increases, the collision energy is less likely to concentrate on one point, and buckling can be less likely to occur. In addition, all the frames are deformed in a Z shape, and it can be seen that there is no significant change in the deformation mode due to the filling member 825.

Figure 127:
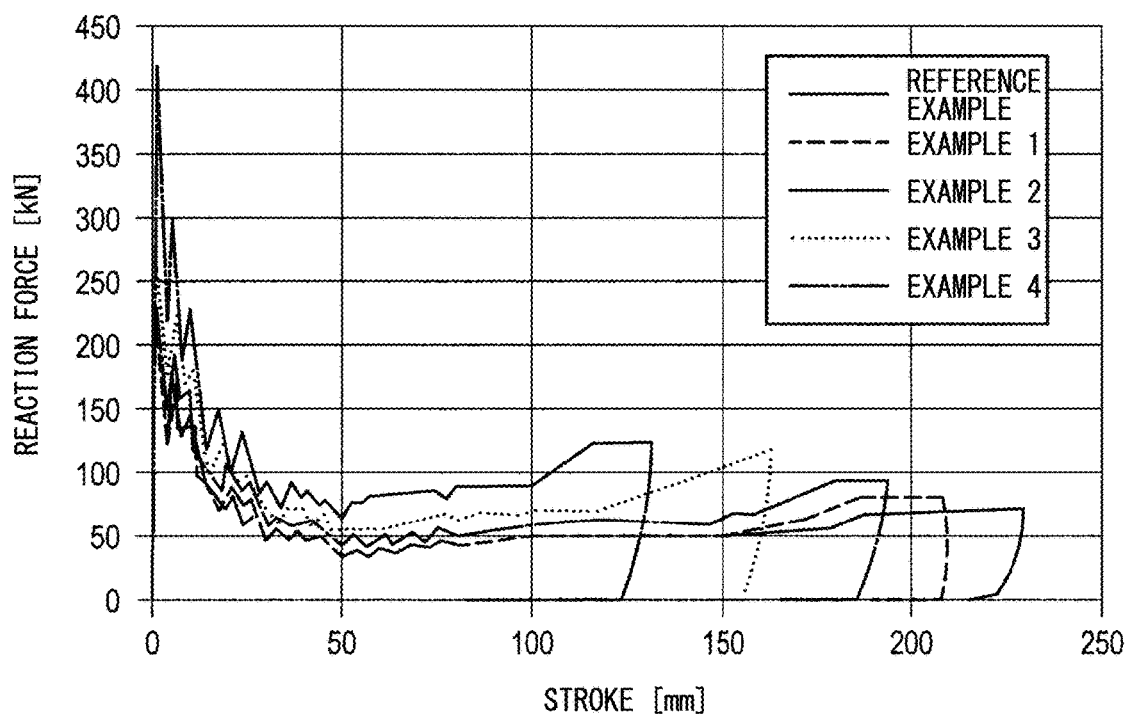

FIG. 127 is a graph showing reaction forces and strokes during deformation of each of the examples and reference example. In any case of each of the examples and reference example, the reaction force is highest at the beginning when the stroke is about zero, and the reaction force decreases while fluctuating as the stroke increases. Thereafter, after the reaction force increases temporarily, the reaction force rapidly decreases and becomes zero. In any case of each of the examples and reference example, the stroke starts to decrease at the timing when the reaction force suddenly decreases, and a part of the deformation is restored. When the graphs of the examples and reference example are compared, the higher the Young's modulus of the filling member 825, the higher the reaction force at the same stroke. That is, the frame 820 can be more tenaciously deformed as the Young's modulus of the filling member 825 is higher. Furthermore, when the graphs of the examples and reference example are compared, the higher the Young's modulus of the filling member 825, the shorter the final stroke. That is, the frame 820 can absorb the collision energy with a shorter stroke as the Young's modulus of the filling member 825 is higher.

Figure 128:
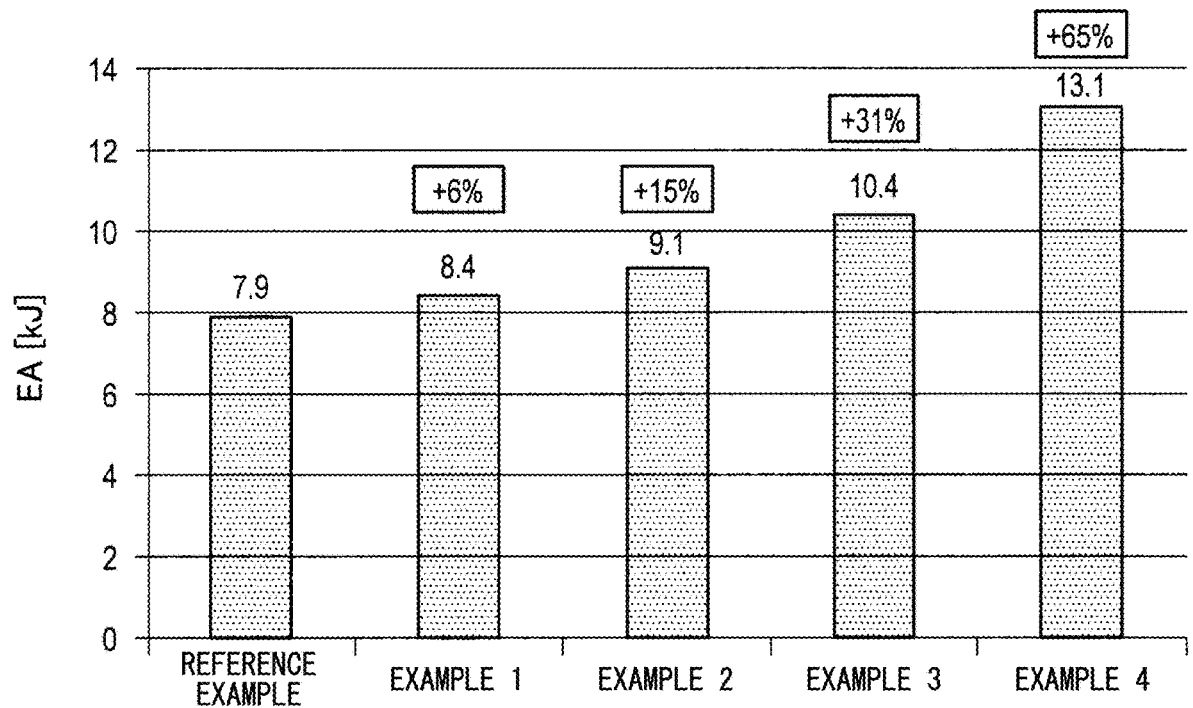

FIG. 128 is a graph showing the collision energy absorption amount (energy absorption; E.A. (kJ)) of each of the examples and reference example. In FIG. 128, in the order from left to right, the E.A. of Reference Example, Example 1, Example 2, Example 3, and Example 4 are shown. The E.A. improvement rate is calculated by dividing the value of the E.A. of a calculation object by the value of a reference E.A. The E.A. improvement rate based on the reference examples is 6% in Example 1, 15% in Example 2, 31% in Example 3, and 65% in Example 4. As described above, as the Young's modulus of the filling member 825 is higher, the E.A. is improved. In order for the frame to exhibit sufficient collision safety performance, the E.A. improvement rate is preferably 10% or more. That is, the Young's modulus of the filling member 825 is preferably 20 MPa or more.

As described above in the examples, as the Young's modulus of the filling member is higher, buckling is less likely to occur, deformation tenaciously occurs, and the collision energy can be absorbed with a short stroke. That is, as the Young's modulus of the filling member is higher, the collision safety performance of the frame is improved. Moreover, when the Young's modulus of the filling member is 20 MPa or more, the frame can exhibit sufficient collision safety performance.

While the preferred embodiments of the present invention have been described in detail above with reference to the accompanying drawings, the present invention is not limited to such examples. It is obvious that a person having ordinary knowledge in the technical field to which the present invention pertains can come up with various changes or modifications within the scope of the technical idea described in the claims, and as a matter of course, it is understood that these also belong to the technical scope of the present invention.

BRIEF DESCRIPTION OF THE REFERENCE SYMBOLS 1, 100 frame
2 first structural member
2a bottom wall part
2b side wall part
2c flange portion
2d, 2e ridge portion
3, 30 second structural member
3a top wall part
30a bottom wall part
30b side wall part
3c, 30c joint portion
4 reinforcement
4a main surface part
4b joint portion
5 filling member
6 bent portion (bending induction portion)
9 third structural member
10, 110 hollow member
20 wall part
21 wall hole
22 hole edge end
51 first filling portion
52 second filling portion
53 third filling portion
60, 64 hole
61 recessed part
62 protrusion
63 different strength portion

What is claimed is:
1. A hollow member comprising:
a hollow metal member having a bending induction portion in a portion thereof in a longitudinal direction, wherein the hollow metal member comprises a first metal sheet; and
a resin material made of a resin having a Young's modulus of 20 MPa or more and disposed in the bending induction portion in close contact with the metal member,
wherein in a cross section transverse to the longitudinal direction of the metal member, the resin material is disposed on only a side where a bend inside is present with respect to a boundary that halves the cross section in a height direction of the cross section defined by a direction from a center of mass of the cross section toward the bend inside induced by the bending induction portion, and in that the bending induction portion is a portion in which a radius of curvature of a locus of a center of mass along the longitudinal direction formed by the center of mass of a cross section of the metal member is 260 mm or less.

2. The hollow member according to claim 1, wherein the metal member includes a bottom wall part, a pair of side wall parts standing from both ends of the bottom wall part, and a top wall part facing the bottom wall part, and
a closed cross section is formed by the bottom wall part, the pair of side wall parts, and the top wall part.

3. The hollow member according to claim 2, wherein the resin material is disposed in close contact with an inner surface of at least one of the bottom wall part and the top wall part.

4. The hollow member according to claim 2, wherein the resin material is disposed in close contact with an inner surface of at least one of the pair of side wall parts.

5. The hollow member according to claim 1, wherein a second metal sheet is disposed on an inside of the metal member and joins to a first metal sheet forming the metal member.

6. The hollow member according to claim 5, wherein the resin material is disposed in close contact with the second metal sheet.

7. The hollow member according to claim 1, wherein the first metal sheet forming the metal member has a hole,
the resin material is made of a foamed resin, and
the resin material passes through the hole and is disposed in close contact with both an outer surface and an inner surface of the first metal sheet.

8. The hollow member according to claim 7, wherein a hole edge end of the hole is located inward of the metal member from the first metal sheet forming the metal member.

9. The hollow member according to claim 8, wherein the hole is a burring hole in which the hole edge end of the hole protrudes from an outside to an inside of the first metal sheet forming the metal member.

10. The hollow member according to claim 7, wherein the hole is provided with a recess portion recessed inward of the metal member from the first metal sheet forming the metal member, and
the hole is provided in an inner portion of the recess portion.

11. The hollow member according to claim 1, wherein the bending induction portion is a portion where a full plastic moment of the metal member changes in the longitudinal direction.

12. The hollow member according to claim 1, wherein the bending induction portion is a sheet thickness changing portion.

13. The hollow member according to claim 1, wherein the bending induction portion is a portion provided with a recessed part.

14. The hollow member according to claim 1, wherein the bending induction portion is a portion provided with a protrusion.

15. The hollow member according to claim 1, wherein the bending induction portion is a portion provided with a hole.

16. The hollow member according to claim 1, wherein the resin material is disposed so as to cover the bending induction portion and peripheral portions of the bending induction portion on both sides in the longitudinal direction.

17. The hollow member according to claim 16, wherein the resin material is disposed so as to cover the bending induction portion and the peripheral portions of the bending induction portion on both sides in the longitudinal direction within a range in which a distance from the bending induction portion to an end portion of the resin material in the longitudinal direction is ½ or less of a cross-sectional height of the metal member.

18. The hollow member according to claim 1, wherein the resin material is disposed in a portion of the bending induction portion and is not disposed in the other portion of the bending induction portion.

* * * * *